(12) United States Patent
Lin

(10) Patent No.: US 10,067,767 B2
(45) Date of Patent: Sep. 4, 2018

(54) PROCESSOR SYSTEM AND METHOD BASED ON INSTRUCTION READ BUFFER

(71) Applicant: SHANGHAI XINHAO MICROELECTRONICS CO. LTD., Shanghai (CN)

(72) Inventor: Kenneth Chenghao Lin, Shanghai (CN)

(73) Assignee: Shanghai Xinhao Microelectronics Co., Ltd., Shanghai (CN)

( * ) Notice: Subject to any disclaimer, the term of this patent is extended or adjusted under 35 U.S.C. 154(b) by 204 days.

(21) Appl. No.: 14/913,341

(22) PCT Filed: Aug. 18, 2014

(86) PCT No.: PCT/CN2014/084616
§ 371 (c)(1),
(2) Date: Feb. 19, 2016

(87) PCT Pub. No.: WO2015/024493
PCT Pub. Date: Feb. 26, 2015

(65) Prior Publication Data
US 2016/0202983 A1 Jul. 14, 2016

(30) Foreign Application Priority Data
Aug. 19, 2013 (CN) .......................... 2013-1-0362689

(51) Int. Cl.
*G06F 9/30* (2018.01)
*G06F 9/38* (2018.01)

(52) U.S. Cl.
CPC ........ *G06F 9/30145* (2013.01); *G06F 9/3005* (2013.01); *G06F 9/3802* (2013.01)

(58) Field of Classification Search
None
See application file for complete search history.

(56) References Cited

U.S. PATENT DOCUMENTS

| 5,499,348 | A | * | 3/1996 | Araki | G06F 9/3824 |
| | | | | | 711/100 |
| 5,717,944 | A | * | 2/1998 | Wilkinson | G06F 7/483 |
| | | | | | 712/14 |
| 5,764,946 | A | * | 6/1998 | Tran | G06F 9/3844 |
| | | | | | 711/118 |
| 5,875,315 | A | * | 2/1999 | Narayan | G06F 9/30152 |
| | | | | | 712/204 |
| 5,875,324 | A | * | 2/1999 | Tran | G06F 9/3842 |
| | | | | | 712/238 |

(Continued)

FOREIGN PATENT DOCUMENTS

| CN | 1650272 A | 8/2005 |
| CN | 1758214 A | 4/2006 |

(Continued)

*Primary Examiner* — Eric Coleman
(74) *Attorney, Agent, or Firm* — Anova Law Group, PLLC

(57) ABSTRACT

This invention provides a cache system and method based on instruction read buffer (IRB). When applied to the field of processor, it is capable of filling instructions to the instruction read buffer which can be directly accessed by processor core and the processor core outputs instruction to the processor core for execution autonomously and achieve a high cache hit rate.

20 Claims, 30 Drawing Sheets

(56) References Cited

U.S. PATENT DOCUMENTS

| | | | | |
|---|---|---|---|---|
| 5,974,542 A * | 10/1999 | Tran | ................. | G06F 9/3844 |
| | | | | 712/239 |
| 5,987,561 A * | 11/1999 | Witt | ................. | G06F 9/3004 |
| | | | | 711/128 |
| 6,185,675 B1 * | 2/2001 | Kranich | ............ | G06F 9/3804 |
| | | | | 711/125 |
| 8,180,998 B1 * | 5/2012 | Maher | ................. | G06F 9/52 |
| | | | | 712/20 |
| 8,918,625 B1 * | 12/2014 | O'Bleness | ........ | G06F 9/3834 |
| | | | | 712/214 |
| 2002/0082714 A1 * | 6/2002 | Kumamoto | ....... | G06F 1/3203 |
| | | | | 700/1 |
| 2003/0233532 A1 * | 12/2003 | Duranton | .......... | G06F 9/3836 |
| | | | | 712/214 |
| 2005/0005084 A1 * | 1/2005 | Burger | ............ | G06F 9/4436 |
| | | | | 712/10 |
| 2005/0198467 A1 * | 9/2005 | Fenney | ............ | G06F 9/3842 |
| | | | | 712/13 |
| 2012/0311305 A1 * | 12/2012 | Kobayashi | ....... | G06F 9/3891 |
| | | | | 712/221 |

FOREIGN PATENT DOCUMENTS

| | | |
|---|---|---|
| CN | 103176914 A | 6/2013 |
| CN | 103229145 A | 7/2013 |
| JP | 7-250089 A | 9/1995 |

* cited by examiner

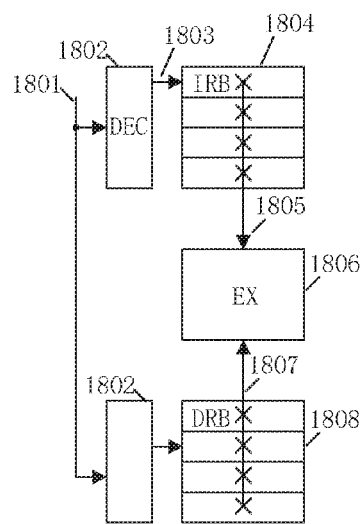
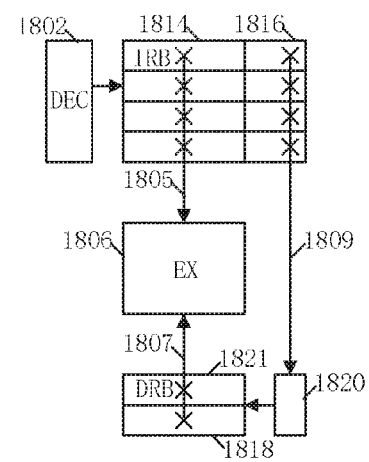
FIG. 18A
FIG. 18B
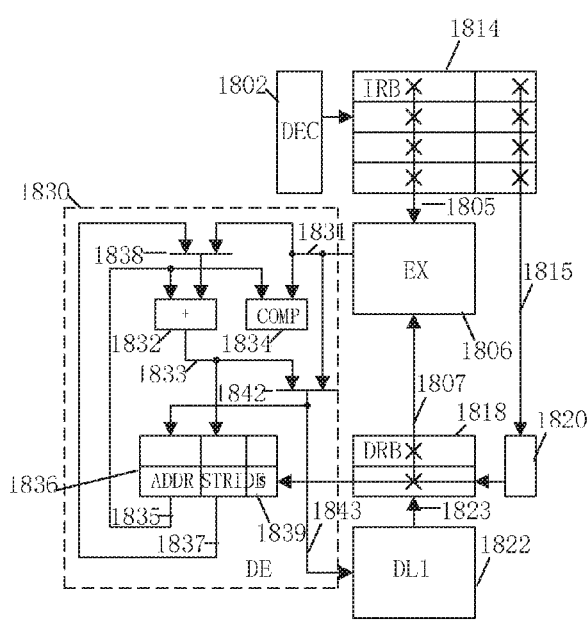
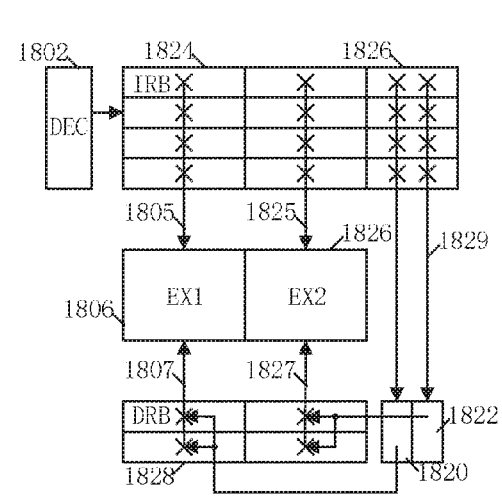
FIG. 18C
FIG. 18D

PROCESSOR SYSTEM AND METHOD BASED ON INSTRUCTION READ BUFFER

CROSS-REFERENCES TO RELATED APPLICATIONS

This application is a national phase entry under 35 U.S.C. § 371 of International Application No. PCT/CN2014/084616, filed on Aug. 18, 2014, which claims priority of Chinese Patent Application No. 201310362689.8, filed on Aug. 19, 2013, the entire contents of which are incorporated by reference herein.

FIELD OF THE INVENTION

The present invention generally relates to the fields of computer, communication and integrated circuit.

BACKGROUND

Cache's function in general is to copy part of the contents from lower memory to enable the fast access of those contents by even higher memory or processor core to sustain pipeline operations.

The addressing of existing cache is all based on the following method, match the tag section in an address with the tag read out from tag memory addressed by the indexed section of an address; read out the cache content which is addressed by the indexed section and offset section in the address. If the tag read out from the tag memory matches with the tag section in an address, then the content read out from the cache is valid, called cache hit. Otherwise, if the tag read out from the tag memory does not match with the tag section in an address, then the content read out from the cache is invalid, called cache miss. In the case of a multi-way set-associative cache, perform the said operation on all the Ways in parallel to detect which Way hits. The read out content corresponding to the hit Ways are valid content. If all of the Ways are 'miss', then all of the contents read out are invalid. The cache control logic fills the content from lower storage media into the cache after a cache miss.

BRIEF SUMMARY OF THE DISCLOSURE

Technical Problem

Cache misses can be divided into three categories: compulsory miss, conflict miss, and capacity miss. Compulsory misses are inevitable in the existing cache structure, except for a small portion of content, which is successfully pre-fetched. However, the existing pre-fetch operation has a sizable cost. In addition, even though multi-way set-associative cache is able to reduce the conflict miss, there is a limit of the number of Ways due to the power consumption and speed restrictions (for example multi-way set associative cache requires reading out and comparing tags of all of the Ways, and all of the content addressed by the same index at the same time).

The modern cache system usually consists of multiple layers of multi-way set-associative caches. New cache structures such as: victim cache, trace cache, and pre-fetch are all improvements based on existing cache structures. Nevertheless, with the widened processor/memory speed gap, the existing architecture, particularly the cache misses in multi category, has been the most serious bottle neck which hinders the performance improvement of modern processors.

Solution of the Problem

The disclosed methods and systems are directed to solve one or more problems set forth above and other problems.

An instruction cache system, herein, comprising: Processor core, the said processor core is used to execute instructions; instruction memory, the said instruction memory is used to store instructions; Instruction read buffer (IRB), the said instruction read buffer autonomously outputs instructions to processor to execute.

Optionally, the said instruction read buffer autonomously outputs instructions to processor core to execute based on the execution results of the instructions executed by processor core.

Optionally, each instruction in the IRB corresponds to a token passer, the said token passer passes token; the said IRB autonomously outputs the instruction corresponding to the token passer, which holds the token to processor core to execute.

Optionally, when executing the instructions in the same instruction block in sequential order, the said token passes from the current token passer to the next token passer in address sequence.

Optionally, when executing instructions in different instruction blocks, the said token is passed from the current token passer to the token passer corresponding to the next instruction through global bus.

Optionally, when executing instructions of different instruction blocks, reset all token passers, and insert token into the token passer corresponding to branch target instruction.

Optionally, the said IRB autonomously outputs a plural number of instructions including the instruction corresponding to the token passer that contains the token to processor core to execute in parallel.

Optionally, the said plural number of instructions are in the same instruction block.

Optionally, the said plural number of instructions are in different instruction blocks.

Optionally, perform dependency check on the said plural number of instructions, and based on the dependency check result, pass the token to the corresponding token passer, and based on the dependency result processor core executes a portion or all of the instructions in the said plural number of instructions through processor core.

Optionally, the said instruction cache system further includes: tracker, the said tracker moves forward to the first branch instruction after the instruction currently being executed in processor core, and outputs the fall-through instruction address and target instruction's address of the branch instruction; and when the said fall-through instruction or target instruction has not yet been stored in IRB, control instruction memory to fill IRB with the said fall-through instruction or target instruction.

Optionally, the said tracker moves forward to a certain number of branch instructions after the instruction currently being executed in the processor core, and outputs all of the fall-through instruction addresses and target instruction addresses of the said certain number of branch instructions; and when the instructions corresponds to all the said fall-through or target instruction addresses have not yet been stored in IRB, control instruction memory to fill the said fall-through instruction or target instruction into IRB.

Optionally, the said processor core has two front-end pipelines and one rear-end pipeline; the said IRB outputs the fall-through instruction and target instruction of the said branch instruction at the same time to the said two front-end pipelines to execute at the same time; and based on the branch instruction execution result selects one of the execution results of the two front-end pipelines to continue executing in rear-end pipeline.

This disclosure discloses a type of instruction cache method, wherein: the instructions processor core may execute are stored to IRB beforehand, and the said instruction read buffer autonomously outputs instructions to processor core to execute based on the execution results of the instructions executed by processor core.

Optionally, the said IRB autonomously outputs the instruction corresponding to the token passer, which holds the token to processor core to execute.

Optionally, Token is passed based on the execution result of instruction, and output the plural number of instructions that contain the instruction corresponding to the said Token to processor core to execute.

Optionally, perform dependency check on the said plural number of instructions, and based on the dependency check result, pass the token to the corresponding token passer, and based on the dependency result processor core executes a portion or all of the instructions in the said plural number of instructions through processor core.

Optionally, fill the fall-through instruction and the target instruction of a said branch instruction into IRB before processor core executes the branch instruction.

Optionally, the said processor core has two front-end pipelines and one rear-end pipeline; the said IRB outputs the fall-through instruction and target instruction of the said branch instruction at the same time to the said two front-end pipelines to execute at the same time; and based on the branch instruction execution result select one of the execution results of the two front-end pipelines to continue executing in rear-end pipeline.

Optionally, the said system further includes: first tracker, the read pointer of the said first tracker moves to the first instruction after the instruction currently being executed by the processor, and outputs the branch target addresses of the branch instructions in a plural number of instructions starting with the said first instruction; when the said first instruction or the said target instruction has not yet been stored into IRB, control instruction memory to fill the said first instruction or the said target instruction into IRB; and control IRB to output the plural number of instructions starting from the first instruction.

Optionally, in the said system, dependency check unit performs dependency check on the said plural number of instructions, and based on the dependency check result determine the increment amount of the read pointer of the first tracker to update the read pointer, and based on the dependency check result processor core executes part or all of the said plural number of instructions.

Optionally, in the said system, the said first tracker outputs the said first instruction address and the next block instruction address to IRB, to control the plural number of instructions of sequential address starting from the said first instruction outputted from IRB.

Optionally, in the said system, based on the received said first instruction address, IRB sets the corresponding zigzag word line to valid, thus enabling the read ports zigzag word line controls to output the said plural number of instructions.

Optionally, in the said system, when the valid signal on the said zigzag word line arrives at the boundary of an instruction block, it is passed onto a bus, through which it is received by another zigzag bus on an instruction block determined by the next block instruction address, enabling the read ports the other zigzag bus controls to output corresponding instructions.

Optionally, in the said system, the first tracker outputs the said first instruction address and its next block instruction address, target instruction address and its next block instruction address to IRB, to control IRB to output plural number of instructions starting from the said first instruction to the first branch instruction, and instructions of contiguous address starting from the branch target instruction.

Optionally, in the said system, based on the said first instruction address received, IRB sets the corresponding zigzag word line to valid, thus enabling the read ports that are controlled by the zigzag word line to output instructions starting from the said first instruction to the first branch instruction, the valid signal is passed to target word line when it reaches the said first branch instruction, and is received by the second zigzag word line in an instruction block determined by branch target address, the second zigzag word line controls its corresponding read ports to output corresponding instructions; and when the valid signal on the said zigzag word lines arrive at the boundary of an instruction block, it is passed onto a bus, through which it is received by other zigzag buses on an instruction block determined by the next block instruction addresses, enabling the read ports the other zigzag buses control to output corresponding instructions.

Optionally, in the said system, the said processor core has two sets of front-end pipelines and one set of rear-end pipeline; the said first tracker outputs the said first instruction address and its next block instruction address, target instruction address and its next block instruction address to IRB, to control the IRB to output the plural number of instructions of contiguous address starting from the said first instruction to one set of the front-end pipelines to execute; to control the IRB to output the plural number of instructions of contiguous address starting from the branch target address of the said first branch instruction to another set to execute; and based on the execution result of the branch instruction select the execution result of one of the two sets of said front-end pipelines to continue executing in rear-end pipeline.

Optionally, in the said system, the said processor core has two sets of front-end pipelines and one set of rear-end pipeline; the said system also includes a second tracker; the said first tracker outputs the said first instruction address and its next block instruction address, and the target instruction address to IRB, to control IRB to output the plural number of instructions with contiguous address starting from the said first instruction to a set of front-end pipelines to execute; the said second tracker outputs the next block instruction address of the said target instruction to IRB, to control the IRB to output the plural number of instructions with contiguous address starting from the branch target instruction of the said first branch instruction to another set of front-end pipelines to execute; and based on the execution result of the branch instruction select the execution result of one of the two sets of said front-end pipelines to continue executing in rear-end pipeline.

Optionally, in the said system, the said processor core has plural sets of front-end pipelines and one set of rear-end pipeline; the said first tracker outputs the said first instruction address and its next block instruction address to IRB, to control IRB to output the plural number of instructions with contiguous address starting from the said first instruction to a set of front-end pipelines to execute; the said first tracker outputs the branch target instruction addresses and their next block addresses of all of the branch instructions in the plural number of instructions with contiguous addresses starting from the said first address to IRB, each of those addresses controls IRB to output a plural number of instructions with contiguous addresses starting from each of the branch target instructions to the other front-end pipelines to execute; and the total number of branch instructions is less than the number of sets of front-end pipelines.

Optionally, in the said system, the said processor core has plural sets of front-end pipelines and one set of rear-end pipeline; the said first tracker outputs the said first instruction address and its next block instruction address to IRB, to control IRB to output the plural number of instructions with contiguous address starting from the said first instruction to a set of front-end pipelines to execute; the said first tracker outputs the branch target instruction addresses and their next block addresses of every layer of the branch instructions in the plural number of instructions with contiguous addresses starting from the said first address to IRB, each of those addresses controls IRB to output a plural number of instructions with contiguous addresses starting from each of the branch target instructions in every layer of branches to the other front-end pipelines to execute; and the total number of branch instructions in the said every layer is less than the number of sets of front-end pipelines.

Optionally, in the said system, each set of front-end pipeline constitutes a Way, the corresponding execution unit in each set of front-end pipeline constitutes a slot; dependency check module performs dependency check on each Way starting from the said first instruction, based on the dependency check result of each Way to produce the read pointer increment for each Way and to control the execution unit of the corresponding Way to execute part or all of the corresponding instruction, based on the dependency check result of each Way; Based on the execution result of branch instruction in each Way, select execution units in one Way of the Ways to complete execution in the corresponding rear-end pipelines, but terminate the execution in execution unit of other Ways; and select the instruction address and read adder increment of one of the Ways to update the tracker read pointer based on the execution result of branch instructions in each Way.

Optionally, in the said system, organize IRB by Ways; or organize IRB by slots.

Optionally, in the said system, the said dependency check module is configurable, and can be configured to decrease the system's maximum number of instruction issue.

Optionally, the said system also includes data read buffer and data engine; the said data engine fills to the data read buffer in advance the data that may be used by load instruction in the instruction read buffer.

Optionally, in the said system, the said data read buffer's table entry and instruction read buffer's table entry are one-to-one correspondence, the data corresponds to a data fetch instruction can be directly found from data read buffer through the position of the said data fetch instruction in the instruction read buffer; or the said data read buffer's table entry is less than instruction read buffer's table entry and each of the instruction read buffer items contains a pointer, the data corresponds to a data fetch instruction can be found through decoding the said pointer of the data fetch instruction entry in the instruction read buffer.

Optionally, the said method further includes: the read pointer of the said first tracker moves to the first instruction after the instruction currently being executed by the processor, and outputs the branch target addresses of the branch instructions in a plural number of instructions starting with the said first instruction; when the said first instruction or the said target instruction has not yet been stored into IRB, control instruction memory to fill the said first instruction or the said target instruction into IRB; and control IRB to output the plural number of instructions starting from the first instruction.

Optionally, in the said method, dependency check unit performs dependency check on the said plural number of instructions, and based on the dependency check result determine the increment amount of the read pointer of the first tracker to update the read pointer, and based on the dependency check result processor core executes part or all of the said plural number of instructions.

Optionally, in the said method, the said first tracker pointer outputs the said first instruction address and the next block instruction address to IRB, to control the plural number of instructions of sequential address starting from the said first instruction outputted from IRB.

Optionally, in the said method, based on the received said first instruction address, IRB sets the corresponding zigzag word line to valid, thus enabling the read ports zigzag word line controls to output the said plural number of instructions.

Optionally, in the said method, when the valid signal on the said zigzag word line arrives at the boundary of an instruction block, it is passed onto a bus, through which it is received by another zigzag bus on an instruction block determined by the next block instruction address, enabling the read ports the other zigzag bus controls to output corresponding instructions.

Optionally, in the said method, the first tracker pointer outputs the said first instruction address and its next block instruction address, target instruction address and its next block instruction address to IRB, to control IRB to output plural number of instructions starting from the said first instruction to the first branch instruction, and instructions of contiguous address starting from the branch target instruction.

Optionally, in the said method, based on the said first instruction address received, IRB sets the corresponding zigzag word line to valid, thus enabling the read ports that are controlled by the zigzag word line to output instructions starting from the said first instruction to the first branch instruction, the valid signal is passed to target word line when it reaches the said first branch instruction, and is received by the second zigzag word line in an instruction block determined by branch target address, the second zigzag word line controls its corresponding read ports to output corresponding instructions; and when the valid signal on the said zigzag word lines arrive at the boundary of an instruction block, it is passed onto a bus, through which it is received by other zigzag buses on an instruction block determined by the next block instruction addresses, enabling the read ports the other zigzag buses control to output corresponding instructions.

Optionally, in the said method, the said processor core has two sets of front-end pipelines and one set of rear-end pipeline; the said first tracker pointer outputs the said first instruction address and its next block instruction address, target instruction address and its next block instruction address to IRB, to control the IRB to output the plural number of instructions of contiguous address starting from the said first instruction to one set of the front-end pipelines to execute; to control the IRB to output the plural number of instructions of contiguous address starting from the branch target address of the said first branch instruction to another set to execute; and based on the execution result of the branch instruction select the execution result of one of the two sets of said front-end pipelines to continue executing in rear-end pipeline.

Optionally, in the said method, the said processor core has two sets of front-end pipelines and one set of rear-end pipeline; the said first tracker pointer outputs the said first instruction address and its next block instruction address, and the target instruction address to IRB, to control IRB to output the plural number of instructions with contiguous address starting from the said first instruction to a set of front-end pipelines to execute; the said second tracker outputs the next block instruction address of the said target instruction to IRB, to control the IRB to output the plural number of instructions with contiguous address starting from the branch target instruction of the said first branch instruction to another set of front-end pipelines to execute; and based on the execution result of the branch instruction select the execution result of one of the two sets of said front-end pipelines to continue executing in rear-end pipeline.

Optionally, in the said method, the said processor core has plural sets of front-end pipelines and one set of rear-end pipeline; the said first tracker pointer outputs the said first instruction address and its next block instruction address to IRB, to control IRB to output the plural number of instructions with contiguous address starting from the said first instruction to a set of front-end pipelines to execute; the said first tracker pointer outputs the branch target instruction addresses and their next block addresses of all of the branch instructions in the plural number of instructions with contiguous addresses starting from the said first address to IRB, each of those addresses controls IRB to output a plural number of instructions with contiguous addresses starting from each of the branch target instructions to the other front-end pipelines to execute; and the total number of branch instructions is less than the number of sets of front-end pipelines.

Optionally, in the said method, the said processor core has plural sets of front-end pipelines and one set of rear-end pipeline; the said first tracker pointer outputs the said first instruction address and its next block instruction address to IRB, to control IRB to output the plural number of instructions with contiguous address starting from the said first instruction to a set of front-end pipelines to execute; the said first tracker pointer outputs the branch target instruction addresses and their next block addresses of every layer of the branch instructions in the plural number of instructions with contiguous addresses starting from the said first address to IRB, each of those addresses controls IRB to output a plural number of instructions with contiguous addresses starting from each of the branch target instructions in every layer of branches to the other front-end pipelines to execute; and the total number of branch instructions in the said every layer is less than the number of sets of front-end pipelines.

Optionally, in the said method, each set of front-end pipeline constitutes a Way, the corresponding execution unit in each set of front-end pipeline constitutes a slot; dependency check module performs dependency check on each Way starting from the said first instruction, based on the dependency check result of each Way to produce the read pointer increment for each Way and to control the execution unit of the corresponding Way to execute part or all of the corresponding instruction, based on the dependency check result of each Way; Based on the execution result of branch instruction in each Way, select execution units in one Way of the Ways to complete execution in the corresponding rear-end pipelines, but terminate the execution in execution unit of other Ways; and select the instruction address and read adder increment of one of the Ways to update the tracker read pointer based on the execution result of branch instructions in each Way.

Optionally, in the said method, organize IRB by Ways; or organize IRB by slots.

Optionally, in the said method, the said dependency check module is configurable, and can be configured to decrease the system's maximum number of instruction issue.

Optionally, in the said method, the data read buffer is filled in advance with the data that may be used by load instruction in the instruction read buffer.

Optionally, in the said method, the said data read buffer's table entry and instruction read buffer's table entry are one-to-one correspondence, the data corresponds to a data fetch instruction can be directly found from data read buffer through the position of the said data fetch instruction in the instruction read buffer; or the said data read buffer's table entry is less than instruction read buffer's table entry and each of the instruction read buffer items contains a pointer; the data corresponding to a data fetch instruction can be found through decoding the said pointer of the data fetch instruction entry in the instruction read buffer.

Other aspects of the present disclosure may be understood by those skilled in the art in light of the description, the claims, and the drawings of the present disclosure.

Benefits of the Invention

The system and method disclosed is capable of providing the fundamental solution for cache structure using in digital system. The conventional mechanism fills instruction after cache miss. The system and methods of the said invention fill the instruction read buffer in the instruction cache system before the processor executes the said instruction, thus can prevent or sufficiently hide compulsory miss. The system and method of this disclosure provides a fully associative cache structure, thus prevent or sufficiently hide conflict miss and capacity miss. In addition, the system and method of the said disclosure is capable of providing instruction for processor core execution by IRB autonomously, avoids the tag matching in the time critical path of cache reading, Therefore, it may run at a higher clock frequency and the power consumption is significantly lower than the conventional cache system. The other advantages and applications are obvious to one skilled in the art.

BRIEF DESCRIPTION OF THE DRAWINGS

FIG. 6B illustrates another exemplary illustration of;

FIG. 18A illustrates an exemplary embodiment of a processor system that contains the said data read buffer of this disclosure;

FIG. 18B illustrates another exemplary embodiment of a processor system that contains the said data read buffer of this disclosure;

FIG. 18C illustrates another exemplary embodiment of a processor system that contains the said data read buffer of this disclosure;

FIG. 18D illustrates another exemplary embodiment of a processor system that contains the said data read buffer of this disclosure;

BEST MODE

Figure 8:
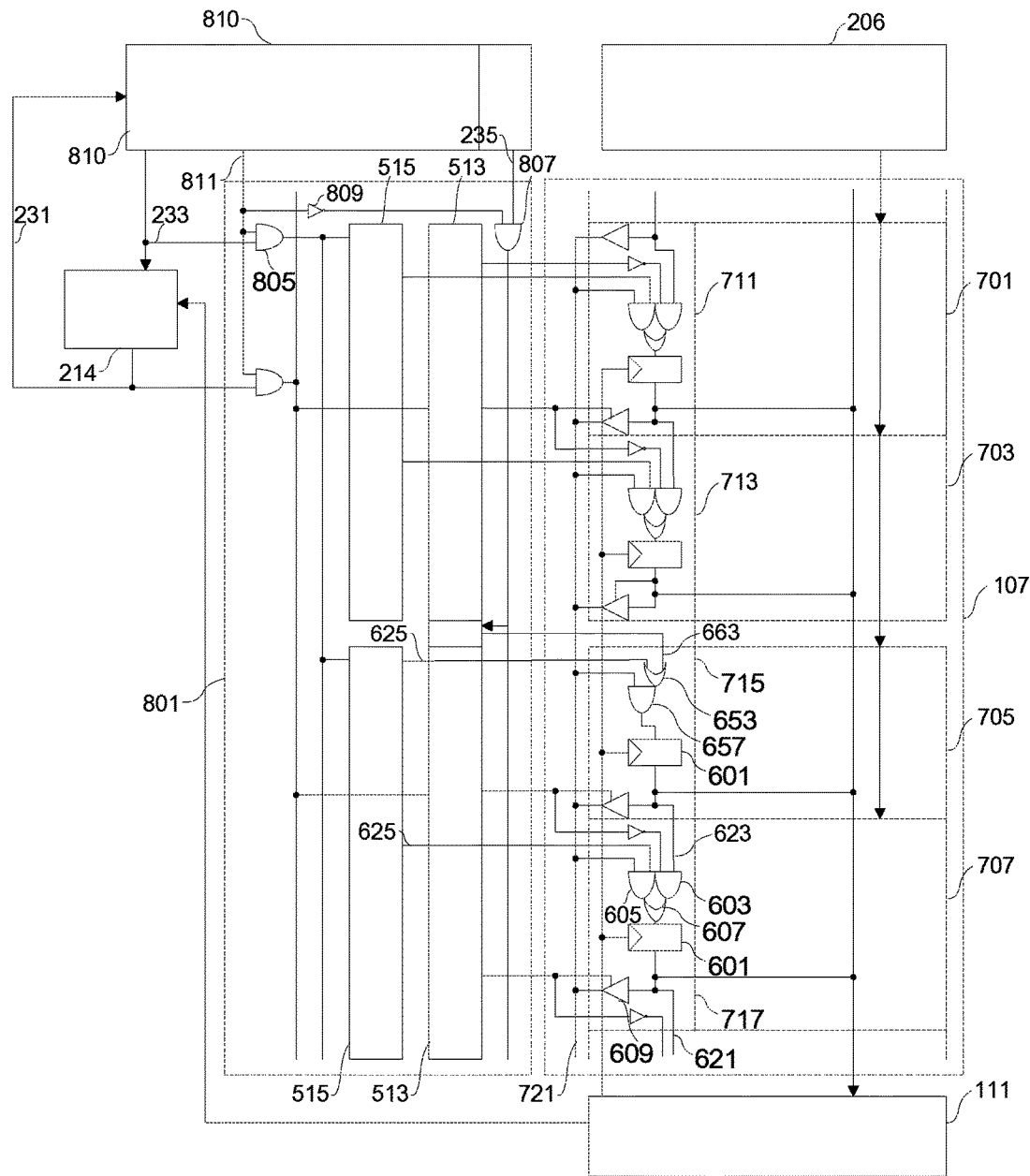
FIG. 8 illustrates an exemplary embodiment the said dynamic prediction of this disclosure.

FIG. 8 illustrates one of the exemplary embodiments related to the best mode of the disclosed invention.

DETAILED DESCRIPTION

Reference will now be made in detail to exemplary embodiments of the invention, which are illustrated in the accompanying drawings in connection with the exemplary embodiments. By referring to the description and claims, features and merits of the present invention will be clearer to understand. It should be noted that all the accompanying drawings use very simplified forms and use non-precise proportions, only for the purpose of conveniently and clearly explaining the embodiments of this disclosure.

It is noted that, in order to clearly illustrate the contents of the present disclosure, multiple embodiments are provided to further interpret different implementations of this disclosure, where the multiple embodiments are enumerated rather than listing all possible implementations. In addition, for the sake of simplicity, contents mentioned in the previous embodiments are often omitted in the following embodiments. Therefore, the contents that are not mentioned in the following embodiments can be referred to in the previous embodiments.

Although this disclosure may be expanded using various forms of modifications and alterations, the specification also lists a number of specific embodiments to explain in detail. It should be understood that the purpose of the inventor is not to limit the disclosure to the specific embodiments described herein. On the contrary, the purpose of the inventor is to protect all the improvements, equivalent conversions, and modifications based on spirit or scope defined by the claims in the disclosure. The same reference numbers may be used throughout the drawings to refer to the same or like parts.

Although CPU is used as an example for the cache system in this disclosure, this invention can be applied to the cache system of any proper processor system such as general purpose processor, CPU, MCU, DSP, GPU, SOC, and ASIC.

In this disclosure, the instruction and data addresses mean the main memory addresses of the instruction and data. For the sake of simplicity, assume in this disclosure the virtual address is the same as the physical address. However, the method disclosed by this invention can also be applied in the case address translation is required. In the disclosure, current instruction means instruction currently being executed or acquired by the processor core; current instruction block means the block containing the instruction currently being executed by the processor core.

Figure 1A:
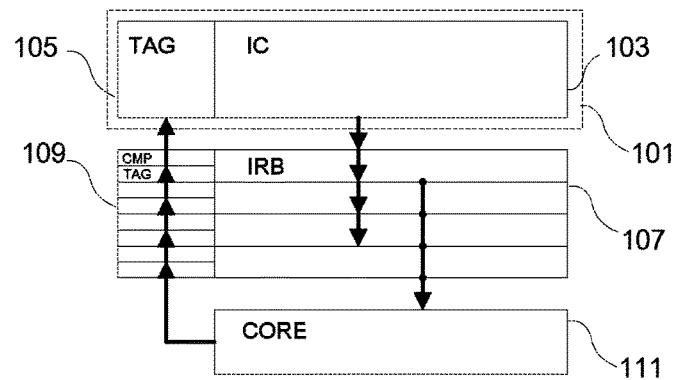
FIG. 1A illustrates an exemplary embodiment of a basic processor system based on the said instruction cache system of this disclosure.

Please refer to FIG. 1A, which is an exemplary basic processor system using the said instruction cache system consistent with the embodiments. In FIG. 1A, instruction cache system 101 includes the instruction memory 103 which stores instructions and the TAG memory 105, which stores the address tags. The listed components are for description purpose, and can include other components, while some components may have been left out. The components listed can be from multiple systems. They can be physical or virtual, implemented through hardware (such as integrated circuit), implemented through software or can be a combination of both hardware and software.

When the processor core (CPU Core) 111 executes an instruction, it first reads instruction from a higher-level memory. Here, the memory hierarchy level means the distance from the processor core 111. The closer to the processor core 111 it is, the higher the level. A higher-level memory in general is faster but has less capacity compared to a lower level memory.

This embodiment differs from the conventional cache-based processor system in that there is an instruction read buffer (IRB) 107 and its corresponding address tag storage matcher 109. Here, the capacity and the latency of the instruction read buffer 107 are respectively smaller and shorter than those of instruction memory 206, and its access time is also shorter. Instruction memory 103 and instruction read buffer 107 can be any suitable memories, such as register, register file, SRAM, DRAM, flash memory, hard disk, solid state disk, or any suitable memory or any new future memory. Instruction memory 103 can function as a memory of the system, or as a level 1 cache when other cache levels exist. It can be subdivided into memory blocks on the memory section that stores the data the processor core 111 will fetch, such as instructions in the instruction block.

Specifically, processor core 111 sends the address of the current instruction to address tag storage matcher 109 for matching. If matched, it indicates the current instruction is already in IRB 107, which can be obtained from IRB in a shorter latency; otherwise, it indicates the current instruction has not yet been stored in IRB 107, Therefore, address tag storage matcher 109 sends the instruction address of the current instruction to tag memory 105 for matching. If matched in tag memory 105, then the instruction block contains the current instruction and may be fetched from instruction memory 103, and filled to IRB 107; at the same time the current instruction is sent to processor core 111. If it is not matched in 105, then tag storage 105 sends the address of the current instruction to an even lower level memory to fetch the instruction block containing the current instruction, fills instruction memory 103 and IRB 107 with the instruction block, and sends the current instruction to processor core 111.

In this process, it takes the least time when processor core 111 can directly fetch the current instruction from IRB. As used herein, it is desirable to fill as many as possible of the instructions that will likely be used to IRB 107 beforehand, to prepare for the fetching by processor core 111.

Specifically, the singular or plural number of following sequential instruction blocks can be filled into IRB 107 besides (in addition to?) filling the instruction block containing the current instruction into IRB 107. This way, when processor core 111 completes fetching of the last instruction in the current instruction block, it can fetch the next instruction (which is in the next instruction block of the said current instruction block) right away, Therefore, reducing the wait time for instruction fetch.

In addition, the instruction blocks of the branch target instructions of part of or all of the branch instructions in IRB 107 can also be filled into IRB 107. For example, the instruction block of the branch target instruction of a branch instruction in the current instruction block can be filled into IRB 107, the instruction block of a branch target instruction of a branch instruction in the instruction block that is at least one next in sequence of the current block can also be filled into IRB 107, ready to be fetched by processor core 111. In this disclosure, branch instruction or branch point means any proper instruction form that causes processor core 116 to change its execution flow (such as: to execute an instruction not in order). Branch instruction or branch source means an instruction for branch operation, branch source address may be the instruction address of the branch instruction itself; branch target means the target instruction the branching of a branch instruction becomes; branch target address means the address the program becomes when a branch of a branch instruction is successfully taken, that is, the instruction address of branch target instruction.

In this embodiment, existing technology can be used in determining the branch target address of the branch instruction, Therefore, the branch target instruction block can be found and filled into IRB 107. For example, processor core 111 calculates the branch target address by executing the branch instruction and then stores the corresponding branch target instruction block into IRB 107. Also, branch target instruction block can be filled to IRB based on the branch target address recorded in branch target buffer. This way, when a branch is determined as taken by processor core 111 on a branch instruction in the Current instruction block, the corresponding branch target instruction can be obtained from IRB 107 to reduce the wait time in acquiring the instruction.

As used herein, the program counter in the processor core can be further improved so it skips certain instructions and only fetches other instructions to acquire instructions selectively, besides acquiring instructions from IRB in program execution order. Please refer to FIG. 1B, which is an exemplary improved program counter consistent with this embodiment.

Figure 1B:
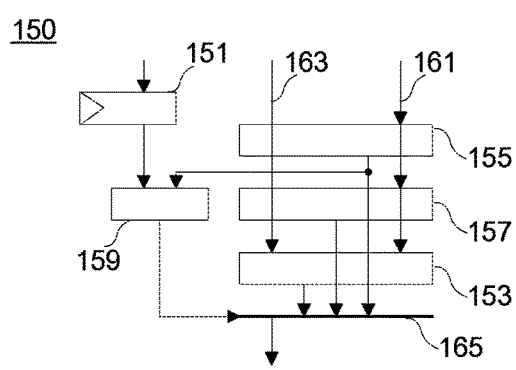
FIG. 1B illustrates an exemplary embodiment of a said improved program counter of this disclosure.

In FIG. 1B, in program counter 150, adder 153 calculates branch target address, which is obtained by adding the branch target offset 163 to Current instruction address 161. Adder 155 calculates fall-through instruction address, which is the instruction address obtained by adding the length of one instruction to the Current instruction address 161. Adder 157 calculates the second instruction address after the Current instruction, which is obtained by adding the length of two instructions to Current instruction address 161. Register 151 stores the instruction address of the instruction before the instruction that will be skipped, comparator 159 compares the instruction address in register 151 with the Current instruction address 161, and controls multiplexer 165.

If branch is successfully taken, then multiplexer 165 selects the output of adder 153, which is branch target address. Otherwise, multiplexer 165 selects the output of adder 155 or adder 157 based on the comparison result of comparator 159. Specifically, when the instruction address stored in register 151 is different from the current instruction address that means the fall-through instruction after the Current instruction is not the instruction to be skipped. Therefore, the output of comparator 159 controls multiplexer 165 to select the output of adder 155, which is the instruction address of the fall-through instruction so the processor core acquires the instruction after the Current instruction. When the instruction address stored in register 151 is the same as the Current instruction address that means the fall-through instruction after the Current instruction is the instruction to be skipped. Therefore, the output of comparator 159 controls multiplexer 165 to select the output of adder 157, which is the instruction address of the second instruction after the Current instruction so the processor core skips the fall-through instruction after the Current instruction, and directly acquires the second instruction after the Current instruction. In this way, the instruction skip function is implemented.

As used herein, the branch target address of a branch instruction may be calculated before the processor core 111 executes the branch instruction, and fills the branch target instruction block to IRB 107 beforehand. Please refer to FIG. 2, which is an exemplary processor system containing the said IRB system.

Please refer to FIG. 1, the processor unit includes filler 202, an active list 204, a scanner 208, a track table 210, a tracker 214, an instruction memory 206, an instruction read buffer 107, and a processor core 111.

Filler 202 fetches instructions or instruction block from lower level memory and fills them into instruction memory 206 based on the address provided by active list 204. Then, the instruction block is filled into instruction read buffer 107 from instruction memory 206, ready to be read by processor core 111. Here, fill means move instruction from a lower-level memory to a higher-level memory. Memory access means the processor core 111 reads instructions from memory or from instruction read buffer 107.

The memory block in both the table entries in table 204 and instruction memory 206 correspond to each other one-to-one. In each of the entries of active list 204 is a pair of memory block addresses of an instruction block, and its block number (BNX) in memory 206. The block number in this invention indicates the location of the storage block in instruction memory 206. The branch target instruction address generated by scanner 208 can be matched with the instruction block memory address stored in active list 204 to determine if the branch target is already stored in instruction memory 206. If the target instruction block is not yet in instruction memory 206, then it is filled into 206. At the same time, a corresponding pair of instruction block addresses and block number (BNX) will be established in active list 204. The Match referred to in this disclosure means comparing two values. When the two values are equivalent then the match is successful, else it is 'not a match'.

Scanner 208 scans the instructions from lower-level memory that were filled to instruction memory 206, and extracts information such as: instruction type, instruction source address, and branch offset, and based on this information calculates the branch target address. In this invention, branch instruction or branch point is any appropriate instruction that can cause processor core 116 to change the execution flow (such as: executes instruction not in order). Branch source means a branch instruction; branch source address is the instruction address of the branch instruction; branch target instruction is executed after a successful branch. Branch Target Address is the address a successful branch transfer transfers to; it is also the address in the branch target instruction. For example, instruction type can include conditional branch instruction, unconditional branch instruction, and other instruction types, etc. Instruction type can include condition branch instruction sub categories, such as branch on unequal, on greater, etc. Unconditional branch instruction can be viewed as a type of condition branch instruction, with always taken condition. Other information can also be included. Scanner 208 sends the above information and address to other modules, such as active list 204 and track table 210.

Instruction read buffer 107 contains at least one instruction block including the current instruction block. Every row in instruction read buffer can contain a lesser number or the same number of instructions as the number of instructions in an instruction block in memory 206. When each row of IRB and an instruction block have the same number of instructions, the corresponding instruction block number can represent the IRB rows. If the rows in IRB 107 have fewer instructions than those in memory instruction block, multiple rows would be equivalent to one instruction block, and a less significant address bit can be added to the block number to identify the IRB row. For example, if there is an instruction block whose BNX is '111', its corresponding rows in IRB 107 will be identified as '1110'; and '1111'.

For ease of following explanation, the rows in IRB 107 are assumed to have the same number of instructions as the number of instructions in instruction blocks in instruction memory 206.

In the present disclosure, instruction read buffer 107 may actively provide instructions to processor core 111 for execution according to the current instruction execution situation of the processor core 111.

Track Table 210 has a plural number of track points. A track point is a table element of a track table. It can hold at least one instruction's information, such as instruction type branch target address, etc. In this invention, an instruction in instruction memory is addressed by the same track table address of its corresponding track table entry. The track table entry corresponds to a branch instruction containing the track table address of its branch target instruction. A track is a plural number of track entries (track points) corresponding to one instruction block in the instruction memory 206. The same block number indexes a track and its corresponding instructions block. The track table includes at least one track. The number of track points can be the same number of entities in a row on track table 210. Track table 210 can also be organized in other forms.

The first address (BNX) and second address (BNY) can be employed to index a track point (i.e. instruction) in the track table (instruction memory). The first address represents the instruction block number of the track point; the second address represents the position (address offset) of the track point (and its corresponding instruction) in the track (memory block). If the track point has a branch type, the address content of the track point denotes its branch target. The first address in the track point identifies the target track and the second address identifies the target instruction on the target track. Therefore, track table is a table whose own address corresponds to branch source instruction and its content corresponds to branch target address.

Scanner 208 extracts the instruction information being stored in instruction memory 206, and then stores the extracted information in the corresponding entries in track table 210. If the instruction is a branch instruction, the branch instruction's branch target instruction address is calculated and sent to Active List 204 to be matched. When it is matched, it gets the block number (BNX) of the branch target instruction. If branch target address is not yet in active list 204, the branch target address is sent to filler 202 that reads instruction blocks from lower-level memory. At the same time, replacement logic in the active list assigns a block number BNX for the instruction block; the more significant part of the target address is stored in the active list 204 entry and the instruction block fetched by Filler 202 is filled into the memory block indicated by the block number. Then the BNX and the lower part of target address are stored in the corresponding TT entry as first and second address.

The tracks in Track Table 210 and the memory block in instruction memory 206 correspond one-to-one and both use the same pointer. The instructions to be executed by Processor Core 111 can all be filled into instruction memory 206 and IRB 107. To preserve program order relationship between tracks, there is an end track point beyond the track point corresponding to the last instruction on every track, which stores the first address of the sequential next track's instruction block. If instruction memory 206 stores multiple instruction blocks, when an instruction block is being executed, the sequential next instruction block is stored into instruction memory 206 and IRB 107, ready to be executed by processor core 111. The address of the next instruction block is the sum of the address of the previous instruction block and the block size. This address is also sent to Active List 204 for matching, the instruction block obtained is filled into instruction memory 206 and the BNX is filled into the end track point of the current track. The instructions in this new block being filled into 206 are also scanned by scanner 208, and the extracted information fills the corresponding track as described before.

Read pointer of tracker 214 points to the track point in track table 210 which corresponds to the first branch instruction after the entry in track table. The read pointer of tracker 214 is comprised of a first address pointer and a second address pointer. The first address pointer points to the track currently being executed in track table 210. The second address pointer points to the first branch track point, or the end point if there is no branch track point remaining on the track, after the track point corresponds to the current instruction currently being executed. The first address pointer indexes instruction memory 206, fetching the target or next instruction block to be filled into IRB 107, in preparation for Core 111 to execute if it successfully takes a branch.

If tracker 214 points to a branch instruction but the branch is not taken, the read pointer of tracker 214's points to the next branch track point, or the End track point if there is no more remaining branch track point on the track. IRB 107 provides fall-through instructions following the not taken branch instruction for Core 111 to execute.

If branch instruction pointed to by the tracker 114 takes a branch, the first address and the second address of the branch target become the new address pointer of the tracker, pointing to the track point corresponding to the branch target in the track table. The new tracker address pointer also points to the recently filled branch instruction block, making it the new current instruction block. Instruction read buffer 107 provides branch target instruction and the sequential instructions of the current branch instruction to processor core 111 for execution. Then, the read pointer of the tracker 214 points to the first branch instruction track point after the current instruction in the track corresponding to the new instruction block, or to the End track point if no more branch track points remain on the track.

If tracker 214 points to the End track point in the track, the content of the End track point is updated to the read pointer of tracker 214, that is, the read pointer points to the first track point of the next track, thereby pointing to the new current instruction block. Then, the read pointer of the tracker 214 points to the first branch instruction track point after the current instruction in the track containing the current instruction in the track table 210; or End track point when there are no more branch track points in the remaining track. Repeat the said sequence. The instruction may be filled to the instruction memory 206 and IRB 107 before it is executed by processor core 111. The Core 111 may fetch the instruction with minimum latency, Therefore, improving the performance of the processor.

Figure 3A:
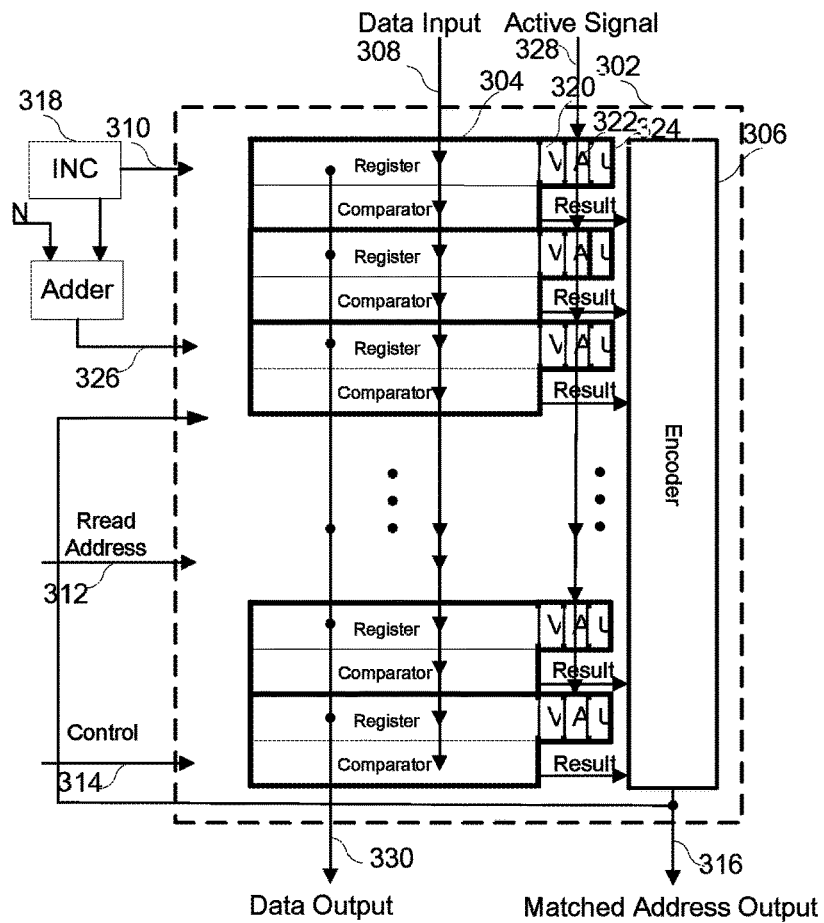
FIG. 3A illustrates an exemplary embodiment of the said active list of this disclosure.

FIG. 3A illustrates an exemplary active list consistent with the disclosed embodiments. As shown in FIG. 3A, the main body portion of active list may include a data/address bidirectional addressing unit 302.

The data/address bidirectional addressing unit 302 may include a plurality of entries 304. Each entry 304 includes a register, a flag bit 320 (i.e., V bit), a flag bit 322 (i.e., A bit) a flag bit 324 (i.e., U bit), and a comparator. Result from the comparator may be provided to encoder 306 to generate a matching entry number, that is, block number. Control 314 may be used to control read/write state. V (valid) bit of each entry 320 may be initialized as '0', and A (Active) bit for each entry 322 may be written by an active signal on input line 328.

A write pointer 310 may point to an entry in data/address bidirectional addressing unit, and the pointer is generated by a wrap-around increment unit 318. The maximum number generated by wrap-around increment unit 318 is the same as the total number of entries. After reaching the maximum number, the next number is generated from wrap-around increment unit 318 by increasing one to start from '0', and continues the increment until reaching the maximum number again. When the write pointer 310 points to the current entry, V bit and A bit of the current entry may be checked. If both values of V bit and A bit are '0', the current entry is available for writing. After the write operation is completed, wrap-around increment unit 318 may increase the pointer by one (1) to point to next entry. However, if either V bit or A bit is not '0', the current entry is not available for writing, wrap-around increment unit 318 may increase the pointer by one (1) to point to next entry, and the next entry is checked for availability for writing.

During writing, the data that is written through inputted block address data input 308 is compared with the content of the register of each entry. If there is a match, the entry number is outputted by matched address output 316, and the write operation is not performed. If there is no match, the inputted data is written into the entry pointed to by the address pointer 310, and the V bit of the same entry is set to '0'. The entry number is provided onto match address output 216, and the address pointer 310 points to the next entry. For reading, the content of the entry pointed to by the read address 312 is read out by data output 330. The entry number is outputted by matched address output 316, and the V bit of the selected entry is set to '1'.

U bit of an entry 324 may be used to indicate usage status. When write pointer 310 points to an entry 304, the U bit of the pointed entry 324 is set to '0'. When an entry 304 is read, the U bit of the read entry 324 is set to '1'. Further, when a write pointer 310 generated by wrap-around increment unit 318 points to a new entry, the U bit of the new entry is checked first. If the U bit is '0', the new entry is available for replacement, and write pointer 310 stays on the new entry for possible data to be written. However, if the U bit is '1', write pointer 310 further points to the next entry. Optionally, a window pointer 326 may be used to set the U bit of the pointed entry to '0'. The entry pointed to by the window pointer 326 is N entries ahead of write pointer 310 (N is an integer). The value of window pointer 326 may be obtained by adding value N to the write pointer 310. The N entries between write pointer 310 and window pointer 326 are considered as a window. The unused entries may be replaced when write pointer 310 moves on to N entries. The replace rate of the entries can be changed by changing the size of window (i.e., changing the value of N). Alternatively, the U bit may include more than one bit, thus becoming the U bits. The U bits may be cleared by write pointer 310 or window (clear) pointer 326, and the U bits increase '1' after each reading. Before writing operation, the U bits of a current entry are compared to a predetermined number. If the value of U bits is less than the predetermined value, the current entry is available for replacement. If the value of U bits is greater than or equal to the predetermined value, write pointer 310 moves to the next entry.

Figure 2:
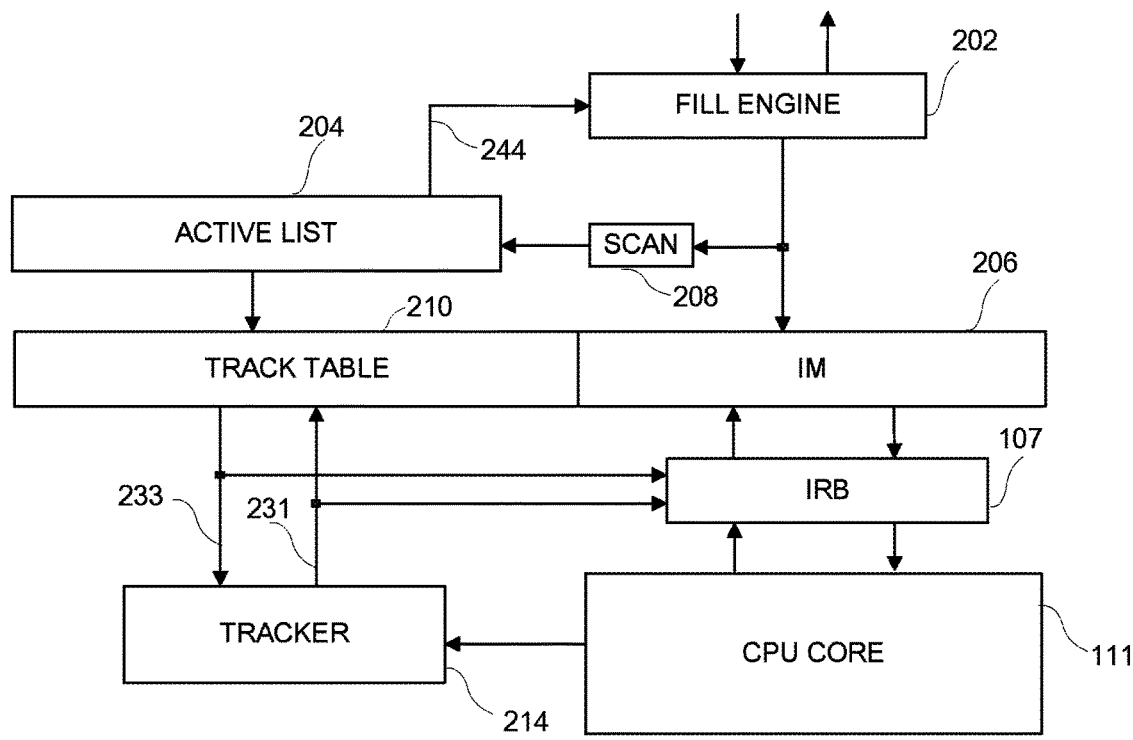
FIG. 2 illustrates an exemplary embodiment of a processor system based on the said instruction cache system of this disclosure.

Back to FIG. 2, as used herein, when the address from scanner 208 does not match in active list 204, the address will be sent to filler 202 to fetch the corresponding instruction block from lower level memory. At the same time, the active list 204 assigns an entry storing the block address of the instruction block and thus forming a block address/block number pair. Block address in this disclosure means the address of the starting instruction of the instruction block. The instruction memory in this disclosure is logically divided into a plural number of memory blocks. Each memory block stores an instruction block and corresponds to an Active List, which stores the block address. The same block number addresses an Active List entry and its corresponding instruction memory block in memory 206.

The scanner 208 may examine every instruction from the instruction memory 206, extract instruction type, and calculate branch target instruction address. The said branch target address may be calculated as the sum of branch address and the branch offset. The more significant part of the branch target address is matched with the content of Active List 204 to obtain the corresponding block number, which is the first address. The less significant part of branch target address, the offset address within the block, is the second address.

For the End track point, the sum of instruction block address and the instruction block length is the block address of the next sequential instruction block. Then the block address can be matched as a branch target address to obtain its block number, which is stored in the End point.

If the more significant part of target address is matched in active list 204, then active list 204 outputs the corresponding block number to track table 210. If it is not matched, then Active List 204 sends this address to fill 202 via bus 244 to fill the corresponding instruction block to instruction memory while assigning a block number to this address and outputting this block number to track table 210.

A new track can be placed into a replaceable row in track table 210. If there is a branch instruction in the instruction block corresponding to the said new track, a branch track point is built in the corresponding track entry. The said branch track point can be located by the address of branch source instruction. For example, the more significant part of branch source address can be mapped into a track number (block number) and index a track; the less significant part (offset) of the source address indexes an entry on the track.

Each track point or track table entry in the track table row may have a format including type field, first address (XADDR) field, and second address (YADDR) field. Other fields may also be included. The type field represents the instruction type of the corresponding instruction. Type field can represent the type of the instruction corresponding to the track point, such as conditional branch, unconditional branch, and other instructions. XADDR field is also known as first dimension address, or first address. YADDR field is also known as second dimension address, or second address.

The content of a new track point can correspond to a branch target address. That is, the branch track point stores the address information of a branch target instruction. For example, the block number of the target track in track table 210 is stored in the said branch track point as first address. The offset address of the branch target instruction is the second address stored in the said branch track point.

The End track point of the tracks is a special track point. Because the End track point points to the first instruction of the Next block, the format of the End track is a type of unconditional branch and the first address of the sequential next block in program order, but without the second address. Alternatively, a constant '0' can be placed in the second address field.

Figure 3B:
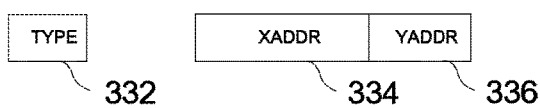
FIG. 3B illustrates an exemplary embodiment of the said track point format of this disclosure.
Figure 3B:
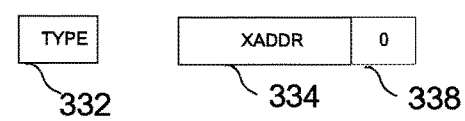
Figure 3C:
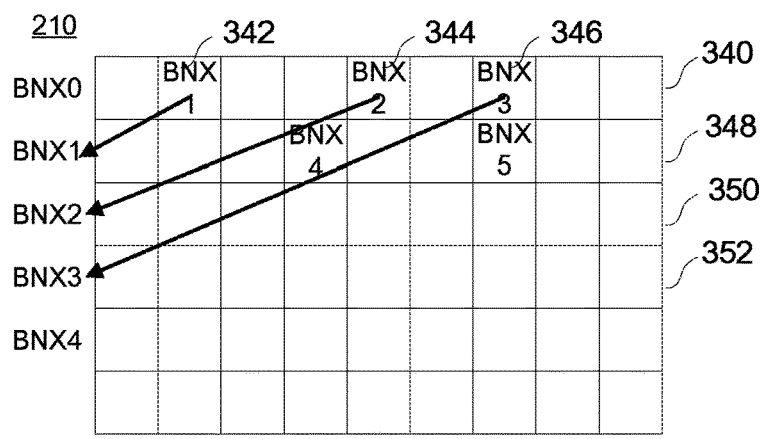
FIG. 3C illustrates an exemplary embodiment of the method of constructing a new track using track table of this disclosure.

FIG. 3B shows an exemplary track point format consistent with the disclosed embodiments. As shown in FIG. 2A, non-ending track point may have a content format including an instruction type 322, a first address 334, and a second address 336. The instruction type of at least two track points of the track may be read out at the same time. Therefore, the instruction types of all non-ending track points in the track may be stored together, while the first address and the second address of these non-ending track points may be stored together. The End track point may only have a content format including an instruction type 332 and a first address 334, and a constant 338 with a value '0'. Similarly, instruction type 332 of the End track point and non-ending track points may also be stored together, while the first address 334 and constant 338 of the End track point may be stored after the first address and the second address of all non-ending track points of the track. Further, because the second address of the ending track point is the constant 338 with a value of '0'; Therefore, the constant may not be stored. The second address '0' is produced directly when tracker 214 points to the ending track point.

As shown in FIG. 2B, an existing track 340 (denoted as BNX0) may include three branch instructions or branch points 342, 344, and 346. When examining branch point 342 (a target block number BNX1 is matched or assigned in the active list), a new track 348 (next available row denoted as BNX1) is created to contain the target instruction of branch point 342, and the block number in track table 210 (i.e., BNX1) is recorded in branch point 324 as the first address. Similarly, when examining branch point 344 (a target block number BNX2 is matched or assigned in the active list), another new track 350 (denoted as BNX2) is created in track table 210 and the block number is recorded in branch point 344; when examining branch point 546 (a target block number BNX3 is matched or assigned in the active list), another new track 352 (denoted as BNX3) is created in track table 210 and the block number is recorded in branch point 346. Therefore, new tracks corresponding to all branch points in a single track may be created.

As used herein, the second address stored in the track point of each branch instruction is an offset of the instruction block containing the branch target instruction of the branch instruction.

The described various embodiments above use a direct addressing mode to calculate the branch target address and implement an instruction pre-fetching operation. However, an indirect addressing mode may also be used. In the indirect addressing mode, at the beginning, the register value (e.g., a base register value) is determined, thereby calculating the branch target address. The register value is changed based on the result of instruction execution. Therefore, when a new value is calculated for the base register of an indirect branch but is not yet written into the base register, the new value can be bypassed to perform the target address calculation and subsequent operations.

Figure 3D:
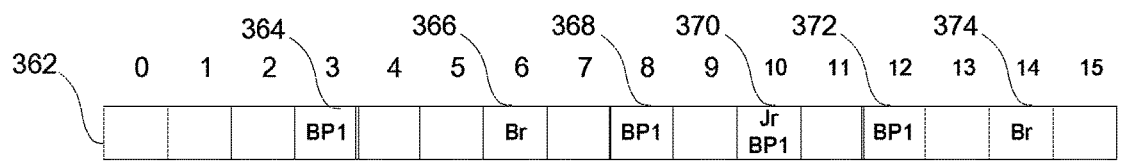
FIG. 3D illustrates an exemplary embodiment that confirms basis address register value updates instruction position of this disclosure.

As shown in FIG. 3D, track 362 includes a series of track points constituted of information sent by scanner 208 and active list 204. As used herein, a track is composed of 16 track points. A track point corresponds to one instruction. The sixth track point 366 and the fourteenth track point 374 respectively correspond to a direct addressing branch instruction. The tenth track point 370 corresponds to an indirect addressing branch instruction with base register BP1. When scanner 208 examines an instruction in the instruction block, all instructions updating the value of register 'BP1' may be found in the instruction block, that is, the instructions corresponding to the third track point 364, the eighth track point 368, and the twelfth track point 372. Therefore, track point 368 corresponding to the last instruction that updates the base register BP1 before the indirect addressing branch track point 370 may be determined. An interval number between the track point 368 and indirect addressing branch track point 370 is '2', that is, an interval of two instructions. Thus, the number of interval instructions (i.e., value '−2') may be recorded in the content of indirect addressing branch track point 370.

As used herein, when the branch instruction corresponding to track point 366 does not take a branch, the second address of read pointer in tracker 214 points to track point 370. The content of track point 370 is read out, including the number of interval instructions '2'. Thus, when the position value of the instruction currently executed by the processor in the track (i.e., low address offset of program counter) is less than or equal to '2', then the value of the second address of the read pointer in the tracker 214, and the base register value are updated. At this time, the base register value BP1 may be obtained from the processor core 111, performing the branch target address calculation and the subsequent operations.

As used herein, the base register value may be obtained through a variety of methods, such as an additional read port of the register in the processor core 111, or the time multiplex mode from the register in the processor core 111, or the bypass path in the processor core 111, or an extra register file for data pre-fetching.

Figure 3E:
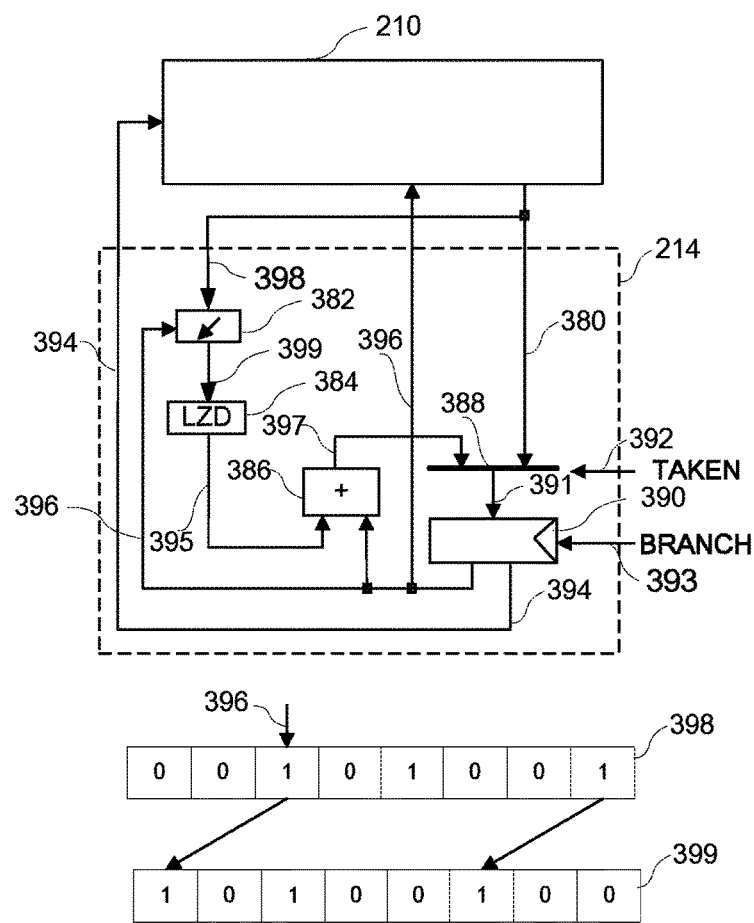
FIG. 3E illustrates an exemplary embodiment of the movement of the read pointer of the said tracker in this disclosure.

FIG. 3E is an exemplary movement of the read pointer of the tracker consistent with the disclosed embodiments. In this embodiment, the read pointer of the tracker skips the non-branch instructions in the track table, and moves to the next branching point of the track table to wait for branch decision by the processor core 111. The parts or components without relevance may be omitted in the present embodiment in FIG. 3E. In the present embodiment, assuming that the instruction type and other extracted instruction information stored in the memory 210 are arranged from left to right in increasing address order, i.e., the program order. It is also assumed that the instruction type '0' in the memory 210 indicates that the corresponding instruction is a non-branch instruction, and the instruction type '1' in the memory 210 indicates that the corresponding instruction is a branch instruction.

The entry representing the instruction pointed to by the second address 396 (block offset, BNY) in a track pointed to by the first address 394 (block number, BNX) in the memory 210 may be read out at any time. A plurality of entries, even all entries representing instruction types in a track indexed by the first address 394 in the memory 210, may be read out at the same time.

On the right of the entry corresponding to the instruction with the largest offset address in each row of the memory 210, an end entry is added to store the address of the next instruction currently being executed in sequence. The instruction type of the end entry is always set to '1'. The first address of the instruction information in the end entry is the instruction block number of the next instruction. The second address (BNY) is always set to zero and points to the first entry of the instruction track. The end entry is defined as an equivalent unconditional branch instruction. When the tracker points to an end entry, an internal control signal is always generated to make multiplexer 388 select the output 380 of the track table (TT) 210; another control signal is also generated to update the value of register 390. The internal signal may be triggered by the special bit in the end entry of TT 550, or when the second address 396 points to the End entry.

In FIG. 3E, the tracker 114 mainly includes a shifter 382, a leading zero counter 384, an adder 386, a multiplexer 388, and a register 390. A plurality of instruction types representing a plurality of instructions that are read out from the TT 210 are shifted to the left by shifter 382. The shift amount is determined by the second address pointer 396 outputted by register 390. The left most bit of the shifted instruction type 399 outputted by the shifter 382 is a step bit. The signal of the step bit and BRANCH signal from the processor core together determine the update of the register 390. The multiplexer 388 is controlled by the signal TAKEN. The output 391 of the multiplexer is the next address, which includes the first address portion and the second address portion. When TAKEN is '1' (there is a branch), the multiplexer 388 selects output 380 of the TT 210 (including the first address and the second address of the branch target) as the output 391. When TAKEN is '0' (there is no branch), the multiplexer 388 selects the current first address 394 as the first address portion of the output 391, and the output 397 of the adder as the second address portion of the output 391. Instruction type 399 is sent to the leading zero counter 384 to calculate the number of '0' instruction types (indicating the corresponding instruction is a non-branch instruction) before the next '1' instruction type (indicating the corresponding instruction is a branch instruction). In the calculation, the step bit is treated as if it is a '0' regardless of if the step bit is actually a '0' or '1'. The number 395 (step number) of the leading '0' is sent to the adder 386 to be added with the second address 396 which is outputted by the register 390 in order to obtain the next branch source address 397. It should be noted that the next source branch address is the second address of the next branch instruction of the current instruction, and the tracker 214 skips non-branch instructions that are before the next source branch address.

When the second address points to an entry representing an instruction, the shifter controlled by the second address shifts a plurality of the instruction types outputted by the TT 210 to the left. At this moment, the instruction type representing the instruction read out by the TT 210 is shifted to the left-most step bit of the instruction type 399. The shift instruction type 399 is sent into the leading zero counter to count the number of instructions before the next branch instruction. The output 395 of the leading zero counter 384 is a forward step of the tracker. This step is added to the second address 396 by the adder 386. The result of the addition operation is the next branch instruction address 397.

When the step bit signal of the shifted instruction type 399 is '0', which indicates that the entry of the TT 210 pointed to by the second address 396 is a non-branch instruction, the step bit signal controls the update of the register 390; the multiplexer 388 selects next branch source address 397 as the second address 396 while the first address 394 remains unchanged, under the control of '0' TAKEN signal 392. The new first and second addresses point to the next branch instruction in the same track, non-branch instructions before the branch instruction are skipped. The new second address controls the shifter 396 to shift the instruction type 398, and the instruction type representing the branch instruction is placed in step bit 399 for the next operation.

When the step bit signal of the shifted instruction type 399 is '1', it indicates that the entry in the TT 210 pointed to by the second address represents branch instruction. The step bit signal does not affect the update of the register 390, while BRANCH signal 393 from the processor core controls the update of the register 390. The output 397 of the adder is the next branch instruction address of the current branch instruction in the same track, while the output 380 of memory is the target address of the current branch instruction.

When the BRANCH signal is '1', the output 391 of the multiplexer 388 updates the register 390. If TAKEN signal 392 from the processor core is '0', it indicates that the processor core has determined to execute operations in sequence at this branch point. The multiplexer 388 selects the source address 397 of the next branch. The first address 394 outputted by the register 390 remains unchanged, and the next branch source address 397 becomes the new second address 396. The new first address and the new second address point to the next branch instruction in the same track. The new second address controls the shifter 396 to shift the instruction type 398, and the instruction type representing the branch instruction bit is placed in step bit 399 for the next operation.

If the TAKEN signal 392 from the processor core is '1', it indicates that the processor core has determined to jump to the branch target at this branch point. The multiplexer selects the branch target address 380 read out from the TT 210 to become the first address 394 outputted by the register 390 and the second address 395. In this case, the BRANCH signal 393 controls the register 390 to respectively latch the first address and the second address as the new first address and the new second address. The new first address and the new second address may point to the branch target addresses that are not in the same track. The new second address controls the shifter 396 to shift the instruction type 398, and the instruction type representing the branch instruction bit is placed in step bit 399 for the next operation.

When the second address points to the end entry of the track table (the next line entry), as previously described, the internal control signal controls the multiplexer 388 to select the output 530 of the TT 210, and update the register 390. In this case, the new first address 394 is the first address of the next track recorded in the end entry of the TT 210, and the second address is zero. The second address controls the shifter 396 to shift the instruction type 398 zero bit to start the next operation. The operation is performed repeatedly, Therefore, the tracker 214 may work together with the track table 210 to skip non-branch instructions in the track table and always point to the branch instruction.

As used herein, Active List 104 needs replacement when it is full and a new block address/block number pair is created. A correlation table, which records the status of each block as a target of a branch, is employed to prevent the track table entry from branching to a block that has already been replaced. Only the blocks in instruction memory together with their corresponding Active List entries, which are not branch targets, are candidates for replacement.

Figure 4A:
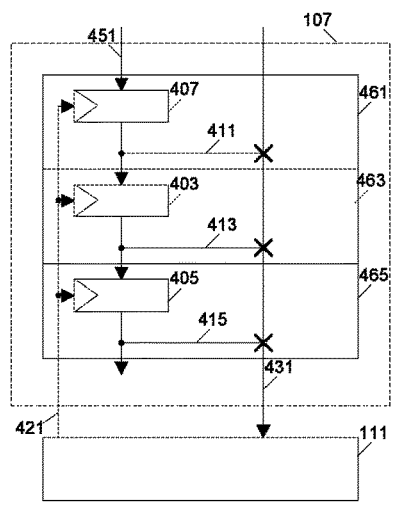
FIG. 4A illustrates an exemplary illustration of filling the said IRB and using the IRB to directly provide instructions to processor core to execute.

FIG. 4A is an exemplary embodiment of the said IRB 107 that provides instructions to Core 111 for execution consistent with this disclosure. IRB 107 may store a single or plural number of instruction blocks. A line in instruction cache may contain a single or a plural numbers of instruction blocks that have contiguous instruction address.

As used herein, Token controls the instruction issue. In FIG. 4A, 461, 463, and 465 are the storage of three sequential instructions in IRB in the order of program from top to bottom. The cross represents the read port on the said storage, each of them is controlled by token passers 407, 403, and 405 through word lines 411, 413, 415 to issue the instruction stored in the storage through bus 431 to processor core 111. Token is the enable state stored in the said passers. Only one passer has the Token in single instruction issue. When the Token is passed from top to bottom, it is passed to the next passer every clock cycle, the corresponding instruction is issued from IRB through bus 431. Processor core 111 can hold instruction issuing by stopping clock 421.

Figures 5A, 5B, 5C:
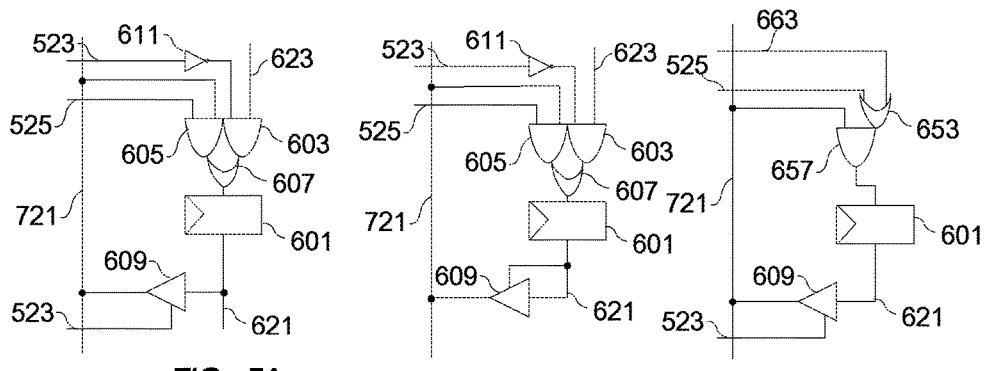
FIG. 5A illustrates an exemplary embodiment of the body token passer an IRB block.
FIG. 5B illustrates an exemplary embodiment the last token passer in an IRB block.
FIG. 5C illustrates an exemplary embodiment of the first token passer in an IRB block.

As used herein, the Token is passed to the token passer of the branch target and stops passing to the next instruction of the branch instruction, when the branch instruction has successfully taken branch. The token passer in FIG. 4A needs to be modified. Refer to FIG. 5A, the token passed from the previous stage of token passer comes in through logic 603, 607 and is latched in token passer 601 at the rising edge of the control clock and appears at output 621. If the IRB corresponding to this token passer stores the branch target instruction, which the program is going to branch to, the control line 525 obtained by decoding the branch target address controls the Token on bus 721 to pass to register 601 through logic 605, 607, making the corresponding branch target instruction issue from IRB. If the IRB corresponding to this token passer stores the next (fall-through) instruction after the branch target instruction, which is taken, the control line 523 obtained by decoding the branch source address, is inverted by inverter 611 which shuts off input 623 to block the Token passed to this stage of token passer from the token passer where the branch source is. If the IRB corresponding to this token passer stores the branch source instruction, which is taken, the control line 523 obtained by decoding the branch source address, turns on the transfer gate 609 to pass the Token to bus 721 to be received by the token passer corresponding to branch target instruction. Therefore, decoders are needed to decode the branch instruction address and branch target address provided by the tracker in order to designate the branch source instruction and the branch target instruction.

When executing the last instruction in an instruction block, the Token is passed to the token passer corresponding to the first instruction in the sequential next instruction block. This requires a mechanism to indicate the last instruction in an instruction block, it also needs a decoder to decode the Next block instruction address provided by the tracker to designate this block. Thus, the token passers of the first instruction and of the last instruction are modified accordingly. FIG. 5B shows the last token passer in an instruction block. It is similar to the token passer in FIG. 5A; the difference is in that pass gate 609 is directly controlled by signal 621. The Token will be put on bus 721 when it is passed to 621. FIG. 5C shows the first token passer in an instruction block. It is similar to the token passer in FIG. 5A; the difference is in that there is no previous token passer stage, the only source of Token is from bus 721. Both control line 525 from branch target decoder and control line 663 from the Next sequential block address decoder will make the Token pass to this stage of token passer through logic 653, 657.

Figure 4B:
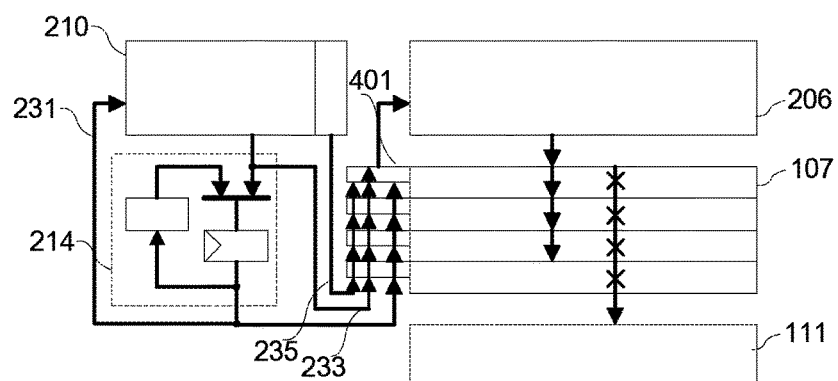
FIG. 4B illustrates an exemplary embodiment of the filling of the said IRB and using the IRB to directly provide instructions to processor core to execute.

FIG. 4B is an exemplary embodiment of the said IRB 107 that provides instructions to Core 111 for execution consistent with this disclosure. For ease of explanation, only TT 210, tracker 214, instruction memory 206, IRB 107, its control unit 401, and processor core 111 are shown.

In FIG. 4B, read pointer 231 of tracker 214 moves along a track in track table 210 and stops at the first branch entry after the instruction currently being executed and sends the track point address (that is the BNX, BNY value of read pointer 231) to the branch source address decoder in the IRB control unit 401. The content of the track point entry (that is the BN of branch target track point 233), are also sent to branch target decoder in control unit 401. In addition, the content of the End point (the BN address of first instruction in the next sequential instruction) is also sent to the Next block decoder in control unit 401.

Control unit 401 stores the corresponding block numbers of the instructions blocks in IRB 107. In this embodiment, each IRB block of the IRB stores one instruction block of memory 206. Control unit 401 matches first address (BNX) of the received branch source BN, branch target BN, and End Point with its content. The Current instruction block is already in IRB 107, Therefore, the branch source BNX is matched, and the IRB block corresponding to the matched entry is holding the Current instruction block. If the matching to target BNX or the Next block BNX is successful, then the corresponding instruction blocks are already in IRB. The unmatched BNX is sent to memory 206 to fetch the needed instruction block to fill in a replaceable block in IRB 107. The replaceable block is determined in a similar manner as the replacement of Active List 204.

Figure 4C:
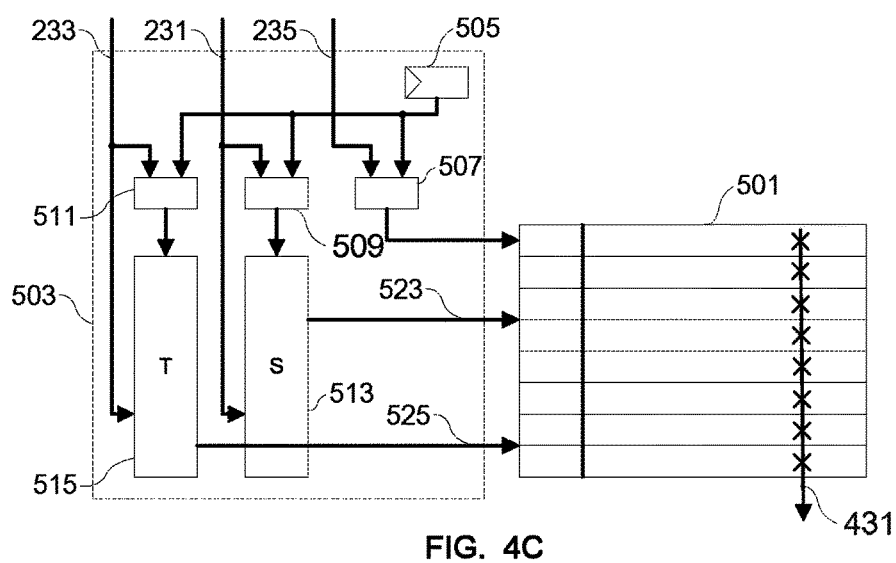
FIG. 4C illustrates an exemplary embodiment of the said control unit executing matching operation of this disclosure.

Further, the second address (BNY) in the branch source or branch target BN is used to index the corresponding branch instruction or branch target instruction from IRB 107. FIG. 4C is an exemplary matching process of the said control consistent with the disclosed embodiments. In this embodiment, presume instruction memory 206 already contains all the needed instruction blocks. If instruction memory 206 does not have the next instruction block, then active list 204 outputs the corresponding instruction address through filler 202 to lower-level memory and fetch the corresponding instruction block as described before, the process is not repeated here.

FIG. 4C shows an IRB block 501 and its corresponding sub-block 503 in control unit 401. In this embodiment, an instruction block 501 holds 8 instructions organized from top to bottom in increasing offset address order. Sub-block 503 consists of first address register 505, the Next instruction block address comparator 507, branch target address comparator 511, target address decoder 515, and branch source decoder 513. 505 stores the block number (BNX) of instruction block 501.

The Next instruction block comparator 507 compares the Next instruction block BNX on bus 235 with the content of 505. If matched, the matched output of 507 points to the first instruction in 501 (top instruction in FIG. 4C), indicating instruction block 501 is the Next sequential instruction block of the instruction block currently being executed (the instruction block pointed to by pointer 231), and the instruction pointed to by the matched output is the next instruction processor core 111 needs after the execution of the Current instruction block. Block 501 is not the next sequential block if it is not matched.

Branch source Comparator 509 compares BNX on bus 231 with the content of 505. If matched, the matched output of 509 enables branch source address decoder 513 to decode the BNY address on bus 231. Output 523 of decoder 513 points at one of the instructions in 501: the branch source instruction. If not matched, output of 509 disables source decoder 513, so all word line outputs 523 of decoder 513 are '0', not enabling read ports of any instructions.

Branch target Comparator 511 compares BNX on bus 233 with the content of 505. If matched, the matched output of 511 enables branch source address decoder 515 to decode the BNY address on bus 233. Output 525 of decoder 515 points to one of the instructions in 501, the branch target instruction. If not matched, output of 509 disables branch target decoder 515, so all word line outputs 525 of decoder 515 are '0', not enabling read ports of any instructions.

Back to FIG. 4, when read pointer 231 of tracker 214 points to a new track, the End point 235 is read out and sent to control unit 401 for matching. If not matched, that means the corresponding Next instruction block is not yet in IRB 107, the control unit 401 sends the Next block BNX to instruction memory 206 to fetch the corresponding instruction blocks and fill them into IRB 107. The position filled in is the Next block of the Current block in ITB 107. If matched, that means the Next instruction block corresponding to the track is already in IRB 107, then the Next sequential block can be directly identified in IRB 107.

Read pointer 231 of Tracker 214 moves and stops at the first branch point after the track point corresponding to the instruction currently being executed as previously described. As used herein, the branch source and branch target addresses are sent to control unit 401 and compared as described in FIG. 4C. The branch source location can be identified since the instruction block containing the branch source is already in IRB 107. The branch target location can also be identified through matching. The control unit 401 sends the branch target BNX to memory 206 to fetch the corresponding instruction block and fill it to IRB 107 if not matched. Therefore, the target location is known in IRB 107.

Thus, locations of branch source, branch target, and first instruction of the next sequential block are found through matching in control unit 401.

As used herein, the clock received by 401 depends on the system clock and the pipeline status of process core 111. Control Unit 401 receives a valid clock when Core 111 needs an instruction. Control Unit 401 receives no clock signal when Core 111 does not need new instructions, for example, during pipeline stall. Token passers are included in 401, and each passer corresponds to an instruction. The passers pass an active Token signal, which denotes the instruction the CPU needs. Control Unit 401 updates the token passer for every valid clock cycle, and passes the Token to the token passer corresponding to the instruction the Core 111 needs next. Thus, the control unit controls IRB 107 to output the right instruction to Core 111 based on the Token signal.

This embodiment is only an example of how the control unit 401 takes initiatives in serving instructions to Core 111 based on its needs. Other handshake signals or communication protocols to guarantee control unit 401 that take initiative in sending needed instructions to processor core 111 are also under the protection of this disclosure.

Figure 6A:
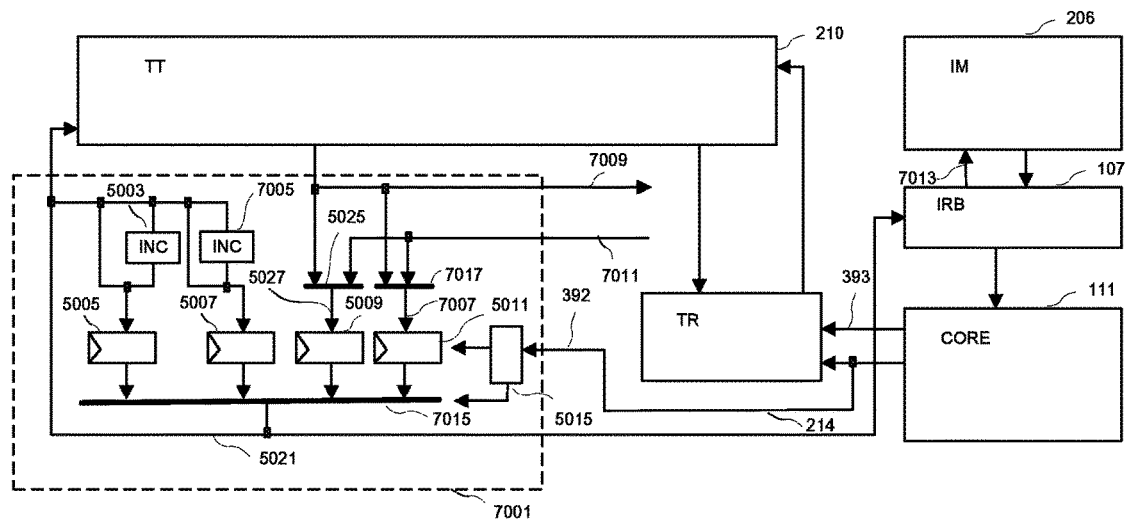
FIG. 6A illustrates an exemplary embodiment of filling two layers of branch target instruction blocks into IRB in this disclosure.

More particularly, based on the depth of instruction lookahead, a plurality of tracks can be established at the same time to fill more instruction segments to cover the response time when fetching instructions from the lower level memory. FIG. 6A illustrates an exemplary two-level prefetching logic consistent with the disclosed embodiments. For ease of explanation, FIG. 6A only shows processor core 111, an instruction memory 206, an IRB 107, a track table 7126, a tracker 170, and a multi-pointer addressing device 7001. For simplicity, other modules are omitted.

The multi-pointer addressing device 7001 may include incrementers 5003 and 7005, pointer registers 5005, 5007, 5009, and 5011, multiplexer 7015, and branch decision logic 5015. The pointer registers 5005, 5007, 5009, and 5011 are used to store four branch instructions corresponding to the second level branch points of the current instruction being executed.

The incrementers 5003 and 7005 may perform the increment-by-one operation on one set of the pointer registers from the two sets of pointer registers (i.e., 5005 and 5007, 5009 and 5011) to increase the second address (BNY) by one to reach the next branch point in the same track. Further, multiplexers 7015 may respectively select one pointer from each pointer register pair 5005 and 5007, and 5009 and 5011 for addressing the track table 7126. The branch decision logic 5015 may process or decode the branch taken signal from the processor core to generate simultaneous write-enable signals for the four pointer registers and select signals for the multiplexers 7013 and 7015.

Further, when the bus 7009 carries the BN of the target track point read out from the track table 210, the multiplexer 5025 or 7017 selects the input from the bus 7009, and the BN is directly stored in the pointer register 5011. If the bus 5021 does not carry BN of the target track point read out from the track table 210, the active list may be matched, filled, and the corresponding BN may be outputted to the selectors 5025 and 7017 via bus 7011 and to be stored in the pointer register 5011.

Figure 6B:
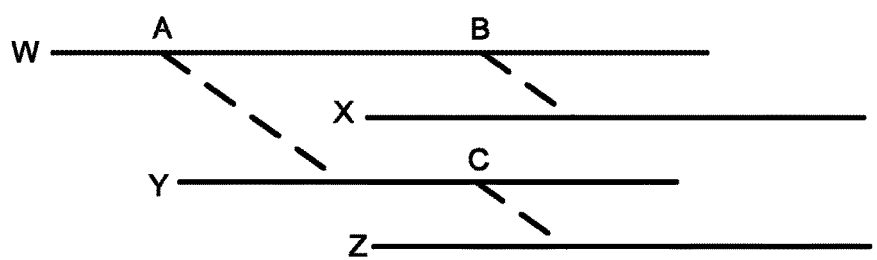

FIG. 6B, is an exemplary illustration of IRB filling two layers of branch target instruction blocks consistent with this embodiment. Presume the read pointer of the current tracker 214 points to branch point A on track W, then pointer register 5005 points to the sequential execution track of the first branch point B after branch point A on track W (which is still on track W), pointer register 5009 points to the branch target (track X) of the branch point B on track W; pointer register 5007 points to the sequential execution track of the first branch point C on the branch target track of branch point A (track Y), pointer register 5011 points to the branch target (track Z) of the branch point C.

This way, the BNs of the two layers of subsequent instruction blocks (a total of four instruction blocks including the sequential execution block and branch target block) pointed to by the read pointer of tracker 214 are stored in pointer registers 5005, 5007, 5009, and 5011. The BNXs outputted by this pointer register may be sent in turn through bus 5021 to the control unit of IRB 107 for matching. If successfully matched, that means the instruction block corresponding to the BNX is already stored in IRB 107. If not matched, the BNX is sent to instruction memory 206 through bus 7013 to fetch the corresponding instruction block and fill in a storage block designated by the replacement algorithm in IRB 107. Thus, IRB 107 contains the instruction block of the branch point pointed to by tracker 214 read pointer (such as the instruction block corresponding to track W in FIG. 6B), the branch target instruction block of the said branch point (such as the instruction block corresponding to track Y in FIG. 6B), and the branch target instruction block of the first branch point in the said branch target instruction block (such as the instruction block corresponding to track X in FIG. 6B), and the branch target instruction block of the next branch point on the instruction block of the branch point pointed to by tracker 214 read pointer (such as the instruction block corresponding to track Z in FIG. 6B).

The above embodiment only describes the prefetching of instruction blocks corresponding to two layers of branch points. However, people skilled in the art shall be able to increase similar parts, apparatuses, or software, to expand this method to the prefetching of instruction blocks corresponding to more layers based on this disclosure and embodiment. Those are also in the scope of this invention.

The organization of IRB can consist of the Current instruction block, the Next instruction block, and the branch target instruction block. Each of those blocks are in a fixed location, Therefore, copy the successfully taken branch target instruction block into the Current instruction block, as the branch target before a successful branch is now the Current instruction. New branch target instruction block is written into the location of branch instruction block. By the same reason, the Next instruction block is copied into the Current instruction block when executing the Next instruction block, and the new Next instruction block will be filled into the location of the Next instruction block.

The organization of IRB can consist of multiple instruction blocks. Using the decoder in 401, determine the Current instruction block based on the branch source address 231, determine the Next instruction block based on the Next instruction block address 235. The replacement of the instruction blocks may be through the same method as active list replacement or through LRU.

Figure 7A:
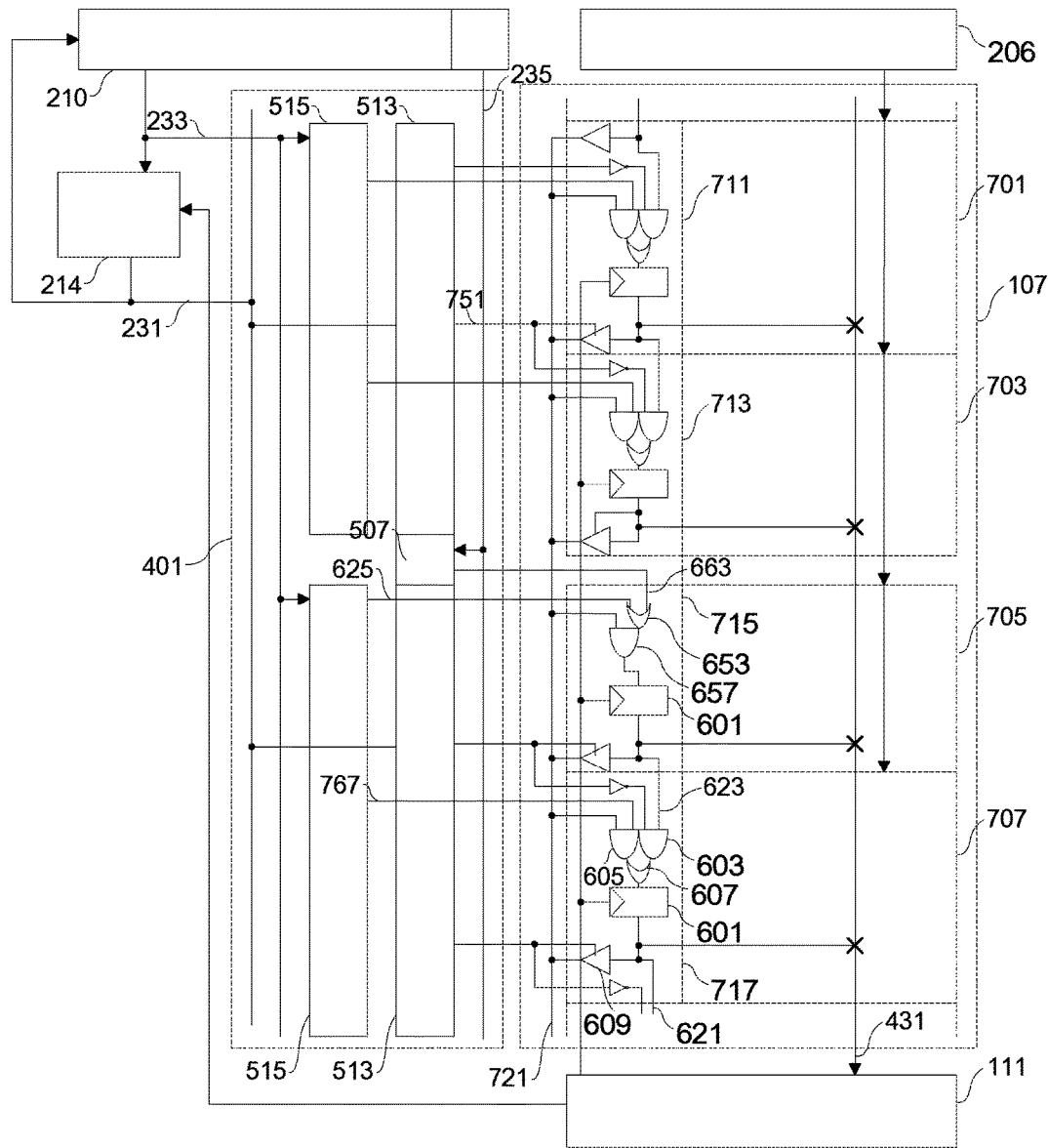
FIG. 7A illustrates an exemplary embodiment of token passing mechanism, the IRB issuing instructions to processor core for execution under the control of track table/ tracker.

FIG. 7A illustrates an exemplary combination of token passer mechanism, track table, and a tracker controls IRB 107 providing instruction to processor core 111 for execution consistent with the disclosed embodiments. For ease of explanation, FIG. 7A only illustrates a track table 210, an instruction memory 206, a tracker 214, a control unit 401, and an IRB 107 which includes a token passer. In the instruction memory 107, instruction 701 and instruction 703 are in the same instruction block, and instruction 703 is the last instruction of this instruction block; instruction 705 and instruction 707 are in the same instruction block, and the instruction 705 is the first instruction of this instruction block. Accordingly, the token passer 711 corresponds to instruction 701, the token passer 717 corresponds to instruction 707, and its interior structure is the same as the structure in FIG. 5A. The token passer 715 corresponds to instruction 705 and its interior structure is the same as the structure in FIG. 5C.

As used herein, with the passing of the token signal, the IRB 107 provides corresponding instructions to processor core 111 for execution. The read pointer 231 of track 214 looks ahead and stops at the next branch point of the current instruction. Then, it sends the BNX of this tracker point to multiple branch source comparators 509 in the control unit 401 through bus 231. The result of the comparator indicates that the current instruction block is in the instruction segment where the instructions 701 and 703 located. Then, it sends the BNY on bus 231 to the branch source decoder 513; the result of the decoder indicates this branch instruction is stored in register 701. The decoded word line 751 controls the pass-gate in token passer 711 to drive token bus 721. At the same time, the word line 751 also blocks the input path of next stage token passer.

The branch targets in track table 210 pointed to by the read pointer 231 of tracker 214 are read out, and are sent to multiple branch target comparators 511 in the control unit 401 through bus 233. The result of the comparator indicates that the current instruction block is located in the instruction segments of memory 705 and 707. Then it sends the BNY on bus 233 to the branch target decoder 511 on the current instruction block, the result of decoder indicates this branch instruction is stored in register 707. The decoded word line 767 controls the token passer to receive the token through bus 721.

When Token is passed to token passer 711, the Token controls the branch instruction stored in memory 701 to be sent to CPU 111 for execution through instruction bus 431. At the same time, the token is put on token bus 721 through the pass-gate controlled by word line 751. Of all the token passers connected to 721, only 717, under the control of 767, is able to receive input. At this time, the CPU core 111 decodes that the received instruction is a branch instruction, and controls the clock of control unit 401 to pause the token passing.

If the execution result of the branch instruction is taken, the CPU core resumes in giving clock to control unit, the token is passed into the token passer 717. The branch target instruction of register 707 is sent to CPU core 111 under the control of the token through instruction bus 431. At the same time, the read pointer 231 of tracker 214 also points to the next branch point of the track of the track table 210 corresponding to register 707. If the branch target instruction stored in memory 707 is not a branch instruction, the token may pass to the next token passer from token passer 717 in next clock cycle.

If the execution result of the branch instruction is not taken, the CPU core uses disable signal to control the decoders 513 and 515 in control unit 401 to output '0'. At this time, the pass-gate in token passer 711 does not drive the token bus 721, the input circuit of token passer 713 enables token passing. Then the CPU core 111 resumes giving clock to control unit 401, the token is passed to token passer 713 from token passer 711. The next instruction 703 of branch source instruction 701 is sent to CPU core 111 controlled by the token.

The instruction 703 is the last instruction of an instruction block, thus the token passer 713 automatically puts the token on token bus 721. If the instruction 703 is a branch instruction, the pointer 231 of tracker stops at this branch point, for the detailed process referred to in the above embodiments. If the instruction 703 is not a branch instruction, the pointer 231 of tracker does not stop at this point. According to the information of the next track at the end of the current track, the pointer points to the first branch point in the next track. In this situation, the tracker issues an enable signal to index the next instruction block. Under the control of this signal, the address of next instruction address is sent to multiple next instruction comparators 507 in the control unit 401 through bus 235. The result of the comparator indicates that the next branch instruction is in the instruction block of instructions 705 and 707. It controls the input of token passer 715 to receive the token on token bus 721. Then the token is sent to token passer 715 and the instruction 705 is sent to CPU core 111 through token bus 431 in next clock cycle.

To improve CPU performance, it is not necessary to wait for the execution result of a branch instruction, but rather using branch prediction, to provide either the fall-through instruction or branch target instruction to CPU core 111 for speculate execution while the branch decision is not yet generated. If the speculation is incorrect, the execution results or the intermediate results of incorrectly predicted instructions are cleared, and then the correct instruction is provided to CPU core 111 for execution.

Figure 7B:
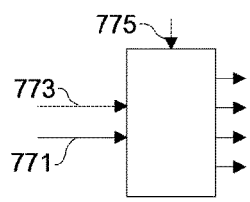
FIG. 7B illustrates an exemplary embodiment of the said source decoder in this disclosure.

The static branch prediction, according to the characteristics of branch instructions (such as jump forwards or backwards), predicts if the branch is taken or not taken successful or unsuccessful. Regarding a type of embodiment of the static prediction herein, please refer to FIG. 7A. The function of each module in this embodiment is similar to the described above. The difference is in that the source decoder not only implements the function in the above embodiment, but also includes an ALL signal. Refer to FIG. 7B, which is an embodiment of the said source decoder.

In FIG. 7B, when branch source block number BNX matches successfully and outputs an enable signal 775, if the ALL signal 771 is invalid ('0'), then it decodes according to the BNY 773 of branch source, only one bit of the output of the decoder is valid ('1'); if the ALL signal 771 is valid ('1'), all the outputs of the decoder are valid ('1').

Back to FIG. 7A, first the prediction of branch is not taken is used as an example to illustrate the static prediction. As is shown in the above embodiments, along with the token signal passing, the IRB 107 provides the corresponding instructions to CPU core 111 for execution. The read pointer 231 of track 214 looks ahead and stops at the next branch point of the current instruction. It sends the branch source address and branch target address to control unit 401 to compare with the address stored in the control unit. The result of the comparison, as in the previous embodiment, branch source is instruction 701, branch target is instruction 707. Also like the previous example, the word line 767 generated by branch target decoder controls the token passer 717, and it may receive token from bus 721.

Unlike the previous example, in this embodiment the branch is predicted as not taken, the control unit 401 doesn't match the branch source BN, thereby, does not prevent the token passer 711, which corresponds to the branch source address, from passing the token signal to the next token passer 713. Thus, when the branch instruction has been provided to processor core 111 to execute but the result is not yet known, the succeeding instruction of the branch instruction may be provided to the processor core 111 for continued execution, to fulfill the not taken static branch condition. As described in the previous example, when the last instruction of the Current instruction block (instruction 703 here) is provided to processor core 111 to execute, then the Token is passed to the first token passer (715 here) of the Next instruction block, to ensure providing instructions to processor core 111 continuously.

The prediction is correct if the branch decision of the branch instruction executed by processor core 111 is not taken, then read pointer 231 of tracker 214 moves ahead and stops at the next branch point and the token passer in IRB 107 continues passing the Token step by step, provide instructions to processor core 111 for execution.

The prediction is incorrect if the branch decision of the branch instruction executed by processor core 111 is taken, then the ALL signal received by the source decoder in the instruction block where the Token is, then all outputs of the source decoder are '1'. Then, the Token is blocked from passing no matter which instruction it is on, the Token is passed onto the global bus 721. At the same time, target decoder corresponding to the branch target instruction block decodes the branch target BNY and controls the token passer corresponding to the branch target instruction receive the Token from bus 721. Thus, Token is passed to the token passer corresponding to branch target instruction, and Therefore, outputs the branch target instruction to processor core 111 for execution. Processor core 111 clears the execution result or intermediate result of the wrong instruction based on prior art technology.

Now, the prediction of branch taken is used as an example. As is shown in the above embodiments, along with the token signal passing, the IRB 107 provides the corresponding instructions to CPU core 111 for execution. The read pointer 231 of track 214 looks ahead and stops at the next branch point of the current instruction. It sends the branch source address and branch target address to control unit 401 to compare with the address stored in the control unit. Control unit 401 matches the branch target BN and found the branch target instruction in IRB 107 based on the corresponding target decoder output.

The control unit 401 matches the branch source BNX, and the source address decoder in the matched entry decodes the branch source BNY, the decoded result prevents the token passer corresponding to the branch source instruction from passing to the next token passer but rather pass the Token signal to global bus 721.

At the same time, the control unit 401 matches the branch target instruction and the matched target decoder decodes the branch target BNY, control the token passer corresponding to the branch target instruction receiving the Token on global bus 721. Then, the Token is passed to the succeeding token passer after the branch target instruction and output corresponding instructions to fulfill the taken static branch prediction condition. In the same way, if the last instruction of the instruction block of the branch target instruction is provided to processor core 111 to execute, then the Token is passed to the Next instruction block to ensure providing instruction to processor core 111 continuously.

When the execution result of the said branch instruction is branch taken, the prediction is correct. It updates the branch target BN value corresponding to the read pointer 231 of the tracker 214, and the pointer moves to the new track pointed to by the target BN, and stops on the next branch point of the current track. The token signal is successively passed to next token passer and it provides instructions to the CPU core 111 for execution. The prediction is correct if the branch decision of the branch instruction executed by processor core 111 is taken, then read pointer 231 has the value of the said branch target BN, that is move to the track of the branch target track point and use this track as the Current track and continuously move to the next branch point. And the token passer in IRB 107 continues passing the Token step by step, provide instructions to processor core 111 for execution.

The prediction is incorrect if the branch decision of the branch instruction executed by processor core 111 is not taken, then the ALL signal received by all of the source decoders are valid, then all outputs of the source decoder are '1'. Then, the Token is blocked from passing no matter which instruction block it is in, and the Token is passed onto the global bus 721. At this time, only token passer 717 under the control of branch target decodes word line 767 may receive the Token on token bus 721 Therefore, Token is passed into token passer 717, and instruction 707 is issued to processor core 111 through bus 431 under the control of the Token. Processor core 111 clears the execution result or intermediate result of the wrong instruction.

No matter the branch prediction is correct or not, the read pointer of tracker stops at the predicted branch point until the result of branch execution is generated. Then it moves to the next branch point. Thus, the IRB 107 provides the correct instructions to CPU core 111.

FIG. 8 illustrates an exemplary dynamic branch prediction consistent with the disclosed embodiments. For ease of illustration, FIG. 8 only shows a track table 810, an instruction memory 206, a track 214, a control unit 801 and an instruction read buff 107 that includes a token passer. Herein, the instruction memory 206, track 214, control unit 801, and IRB 107 are the same as those in FIG. 7A. The difference is in the track table also includes a read port to provide branch prediction information 811. Track table 810 includes branch prediction bits corresponding to each branch point entry of track table. Branch prediction information is stored in branch point entries in track table. When the read pointer 231 of the tracker points to the branch source entry in track table 810, it reads out a target address from a read port on branch source entry 233, at the same time branch prediction information 811 is also read out from the said read port. This information 811 is sent to the newly added inverter 809, AND logic 803, 805, and 807 of control unit 801, these signals together control dynamic branch prediction based on token passing. If the prediction is not taken, the AND gate 803 allows the Next block instruction address to match with the Next block instruction decoders in control unit 801 and points to the first instruction of the matched block; but AND gates 805 and 807 only allow the BNX portion of branch source address 231 and branch target address 233 to match with the first address register in 801, designate the branch source instruction block and branch target instruction block but do not allow the BNY portion decoded in 801 and thus disable the word lines corresponding to branch source and branch target. If the branch prediction 811 predicts taken, then AND gate 803 does not allow the Next instruction block address to be matched with the Next address comparator in 801, Therefore, will not point at the first instruction of the Next instruction block; however, AND gates 805 and 807 allow the BNX and BNY portion on branch source address 231 and branch target address 233 to match and decode enable the word lines corresponding to branch source and branch target.

As used herein, along with the token signal passing, the IRB 107 provides instructions to CPU core 111. Read pointer 231 of tracker 214 moves ahead and stops on the next branch point, reads out the branch target BN 233 and the corresponding branch prediction information 811. Control unit 801 matches the branch target BN and decodes by the corresponding target decoder and find the branch target instruction in IRB 107.

When the prediction information is not taken ('0'), the said prediction signal is inverted to '1' through inverter 809 and this signal enables AND gate 807. The other input port of AND gate 807 comes from the content of the end point 235 of the current track. The AND gate 807 sends the Next instruction block number stored in the end point to control unit 801 to match and find the corresponding Next instruction block in IRB 107.

The AND gates 803 and 805 receive the "not taken" ('0') prediction information, and block the passing of branch source address 231 and branch target address 233, making all of the outputs of source decoder and target decode in control unit 801 '0'. Thus, the token passer corresponding to the branch source instruction pass the token signal to its next token passer, so the succeeding instructions of the branch source instruction is provided to CPU core 111 to continue execution, and thus implements the effect of 'not taken' dynamic prediction. When the last instruction of the Current instruction block is provided to CPU core 111, the token signal is passed to the Next instruction block and continues to provide instructions to CPU core.

At this time, if the branch decision by processor core 111 of the said branch instruction is not taken, the branch prediction is correct, the read pointer 231 of track 214 moves and stops at the next branch point. And the token passer in IRB 107 continues passing the Token step by step, provide instructions to processor core 111 for execution.

The prediction is incorrect if the branch decision of the branch instruction executed by processor core 111 is taken, then the ALL signal received by all of the source decoders are valid, then all outputs of the source decoder are '1'. Then, the Token is blocked from passing no matter which instruction block it is in, and the Token is passed onto the global bus 721. At this time, AND gate 805 is enabled, the BNY of the branch target address 233 is sent to the BNY decoder in the branch target instruction block in 801 to output corresponding word line, control the token passer corresponding to the branch target instruction receives the Token from global bus 721. Thus, Token is passed to the token passer corresponding to the branch target instruction and outputs the branch target instruction to processor core 111 for execution. Processor core 111 clears the execution result or intermediate result of the wrong instruction.

On the other hand, when the prediction information states branch is taken ('1'), the said taken signal inverts to '0' through inverter 809 and it disables the AND gate 807. Thus the next instruction number stored in the ending point is not sent to control unit 801, that prevents the Token signal from being passed to the token passer corresponding to the first instruction in the Next block of the instruction block which contains the branch source instruction, while the Token signal is passed to token passer corresponding to the branch target instruction.

At the same time, AND gates (803 and 805) receive the prediction taken ('1') signal, it separately outputs valid BNX and BNY signals to the source decoder and target decoder. At this time, the branch source BNX is matched by control unit 801, according to the BNY of branch source, the source decoder corresponding to the matched BNX outputs a signal avoid the token signal passes to the next token passer and passes the token signal to global bus 721.

The branch target BNX address is matched with each of the BNXs stored in control unit 801, and the target decoder corresponding to the matched BNX decodes the branch target BNY and outputs the decoded result. The result controlling the Token passer corresponds to the branch target instruction that receives Token signal from global bus 721. Thus, the Token signal is sent to the Token passer corresponding to the branch target instruction and the branch target instruction is provided to CPU core 111 for execution. Hereafter, the Token signal is sent to the token passers. Each token passer corresponds to the following instructions of the branch target instruction and outputs the corresponding instructions in sequence. The effect is equivalent to a static branch prediction.

AND gate 807 resumes in receiving and passing the track point 235 (next instruction block address) when the token signal is sent to the token passer corresponding to the branch target instruction. The content of the end point of the branch target's instruction block is sent to control unit 801 to match, and then find the corresponding next instruction block in IRB 107. This way, once the last instruction of branch target block is provided to CPU core 111 to execute, the token signal is sent to the next instruction block and it may continue to provide instructions to CPU.

When the CPU core 111 executes the said branch instruction as branch taken, that means the prediction is correct. It updates the read pointer 231 of the tracker 214 to the value of branch target BN, and the pointer moves to the new track the said branch target track point is on, and it stops at the next branch point of the current track. The token passer in IRB 107 passes the token signal to next token passer and it continues to provide instructions to the CPU core 111.

When CPU core 111 executes the result of the said branch instruction is branch not taken, the prediction is incorrect. The source decoder corresponding to the instruction where the token signal is located is valid and the output of the source decoder is '1'. At this time, regardless of if the token signal is stored in any one of the instruction registers, it blocks the token signal from passing and puts it on the global bus 721. The branch source address 231 adds '1' and puts it onto the target address bus 233, and the address is decoded in control unit 801 and generates a target word line. This word line corresponding to the token passer of the next instruction of the branch source instruction controls token passer to receive token signal from global bus 721. Thus, the token signal is again sent to the token passer corresponding to the next instruction of branch target instruction, and it provides the instruction to CPU core 111. It must clear the next instructions and their intermediate results of the branch instruction in the pipeline.

Figure 9A:
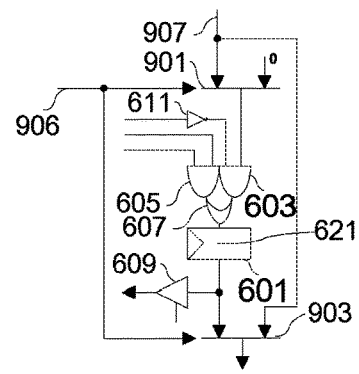
FIG. 9A illustrates an exemplary embodiment of the improved token passer corresponding to every instruction in IRB in this disclosure.

As used herein, the said token passer may be improved, so certain instructions are not to be issued out through instruction bus 431 to implement instruction folding, such as branch folding. FIG. 9A is an exemplary refined token passer for every instruction in the IRB consistent with the embodiments.

The token passer in FIG. 9A is similar to the token passer in FIG. 6A, herein, token signal register 601, AND gate 603 and 605, OR gate 607, pass gate 609, and inverter 611 are the same as in FIG. 6A. In FIG. 9A, the difference is the token passer has additional multiplexers 901 and 903, the two multiplexers are controlled by the same control signal 906. The said control signal may be the output of the comparator 159 in FIG. 1B, the control signal from the tracker based on information stored in track table, or signal generated by decoding the instruction outputted from IRB ahead of time. The multiplexer 901 selects input 907 and the multiplexer 903 selects the output 621 of the register 601 when the control signal 906 is valid. At this time, the working mode of token passer may be the same as the previous embodiments, and thus not repeated here. When the control signal 906 is invalid, the multiplexer 901 selects '0', so despite what the token value arrived in 907 may be the state of token passer 621 is '0' which prevents its corresponding instruction from being outputted from IRB. The multiplexer 903 selects input signal 907, thus the token signal on 907 skips the current stage token passer and is directly passed to next stage token passer.

Figure 9B:
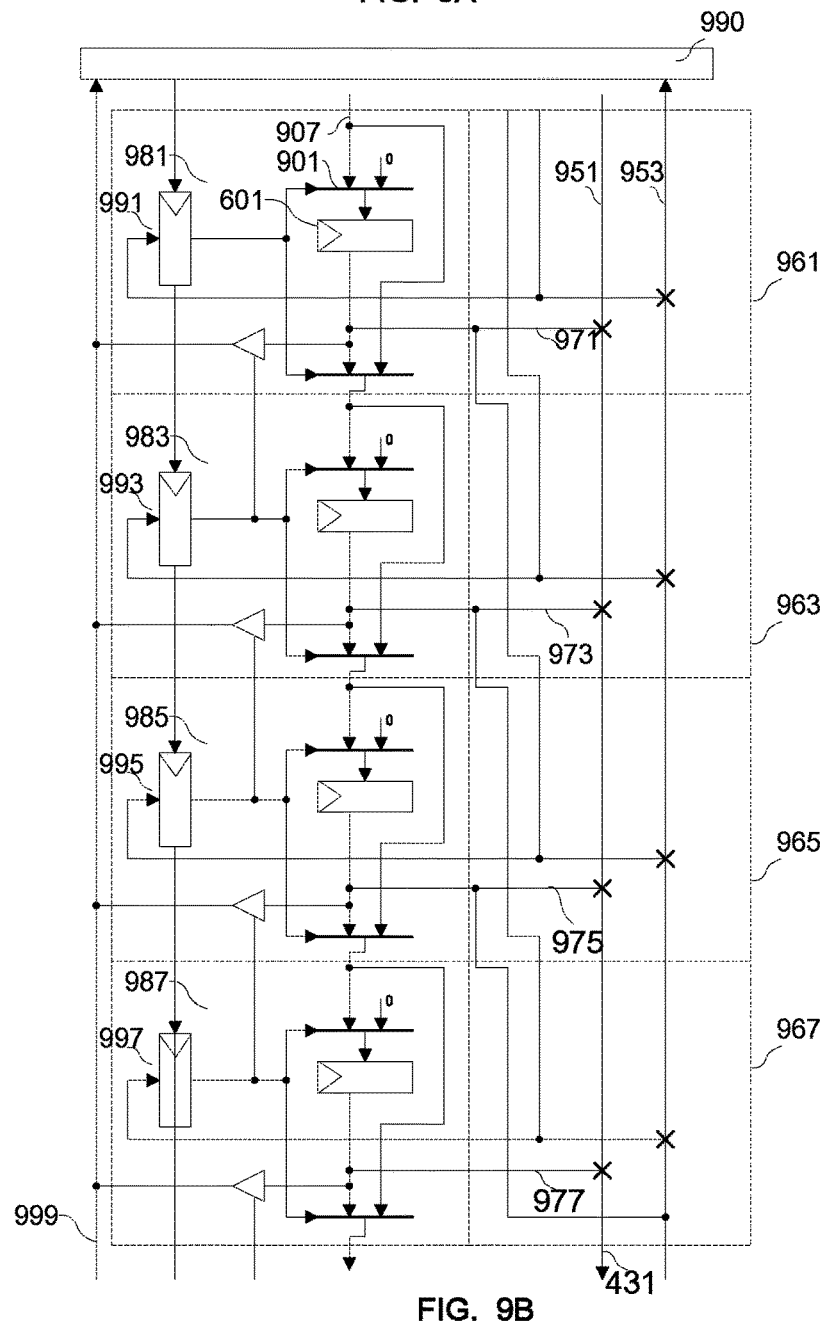
FIG. 9B illustrates an exemplary embodiment of instruction folding through decoding the instructions issued by IRB ahead of time.

FIG. 9B is an exemplary instruction folding through decoding the early issued instructing by IRB consistent with the embodiments. The token passers (981, 983, 985 and 987) have the same structure. For ease of explanation, all of the token passers are only depicted as a simple register in this figure, the register may be reset to '0' to delete the Token from branch source. Actually, the token passer may be any arbitrary structure that implements the function of token passing. In this embodiment, each line of IRB has two read ports. Herein, the output port 431 outputs the Current instruction where the Token is, the output port 953 outputs all or part of the information of the second next instruction of the Current instruction ahead of time. The rest the token passers connect to the storage in the same manner. When the token is passed to token passer 981, the token state bit 971 outputs the instruction stored in memory 961 from the output port 431 to CPU core. It also outputs the instruction stored in memory 965 from the output 953 to pre-processor 990 for pre-processing.

The pre-processor 990 performs simple decoding on the instruction that flow out ahead of time. If it finds instruction 965 is a branch instruction, then it sets instruction 965 as skipable. To do that, it sends a clock signal to update flag registers in all token passers such as flag register 981, 983, 985 and 987. Herein, only the flag register of token passer 985 latches token state 971 as a 'valid flag', which indicates instruction 965 in instruction storage may be skipped. Because the Token is not at the token state bits 973, 975 and 977, their corresponding flag registers 991, 993 and 997 latched in 'invalid' flag. When the token signal is sent to token passer 983, the token state 973 is '1', the pass-gate in token passer 983 sends the token signal to bus 999 under the control of flag 995. Based on the pre-decode result of branch stored in the pre-processor, branch prediction mechanism decides the direction of Token movement. If the branch prediction is taken, the Token on token bus 999 is insert into a token passer designated by the branch target decoder; and all registers in the instruction block where the token passer 983 is located are reset to '0'. Thus, the token is sent to branch target instruction. If the branch prediction is not taken, the token signal is not inserted to the branch target and the token passers in the instruction block which contains 983 are not set to '0'. In this situation, two multiplexers in the token passer 985 under the control of flag 995 send the Token to token passer 987 and '0' is inserted into the token passer 985. Thus, the Token skips branch instruction 965. Despite whether the branch prediction is correct, the branch instruction is not executed, so that it does not take up execution time.

The pre-processor 990 perform simple decoding on the instruction that flow out ahead of time. If it finds instruction 965 is a load/store instruction, then it sets instruction 965 as skipable. To do that, it sends a clock signal to update flag registers in all token passers such as flag register 981, 983, 985 and 987. Herein, only the flag register of token passer 985 latches token state 971 as a 'valid flag', which indicates instruction 965 in instruction storage may be skipped. Because the Token is not at the token state bits 973, 975 and 977, their corresponding flag registers 991, 993 and 997 latched in 'invalid' flag. When the token signal is sent to token passer 983, the token state 973 is '1', the pass-gate in token passer 983 sends the token signal to bus 999 under the control of flag 995. Based on the pre-decode result of load/store stored in the pre-processor, the pre-processor ignores the Token on bus 999. In this situation, two multiplexers in the token passer 985 under the control of flag 995 send the Token to token passer 987 and '0' is inserted into the token passer 985. Thus, the Token skips branch instruction 965, so that it does not take up execution time.

Figure 9C:
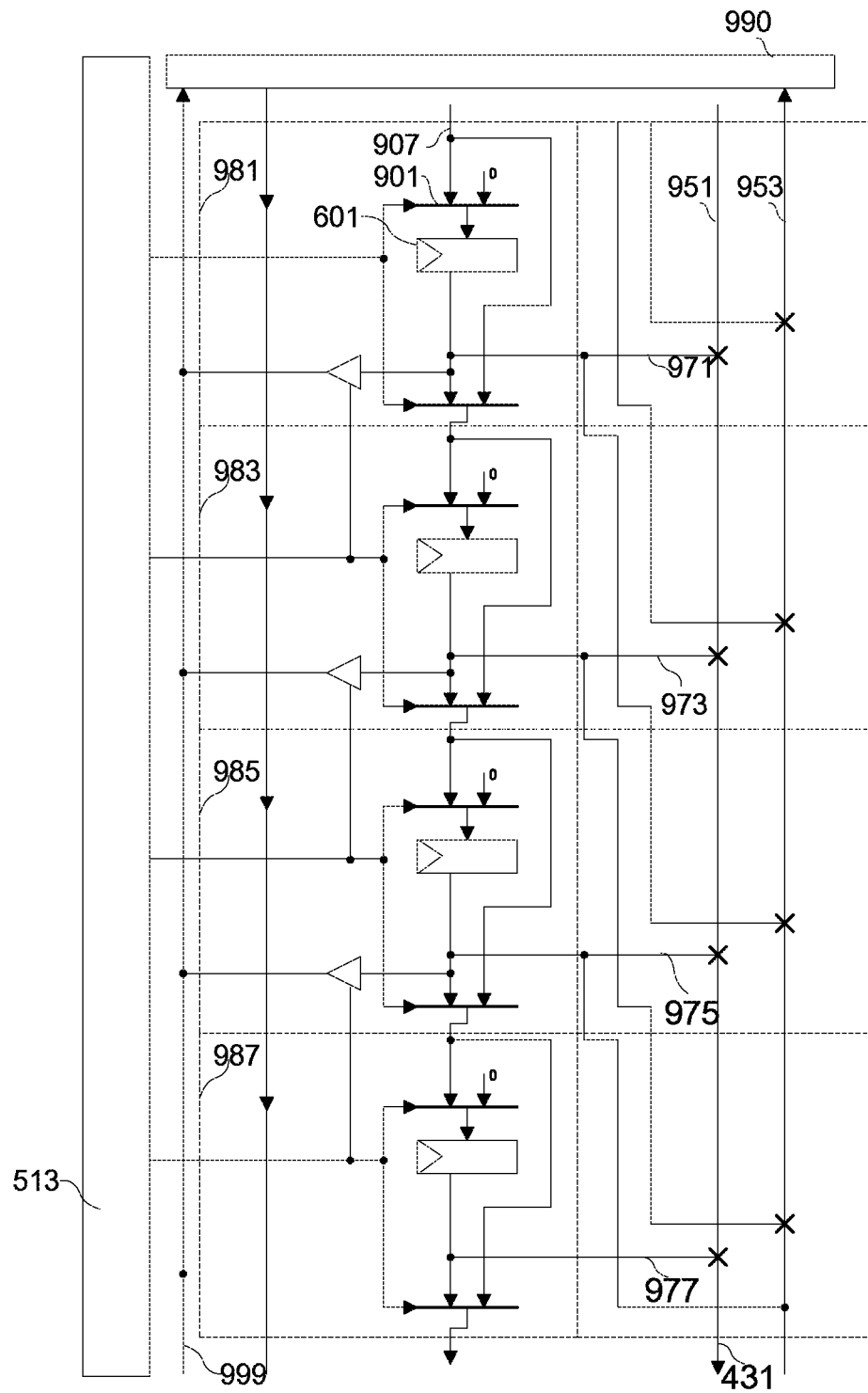
FIG. 9C illustrates another exemplary embodiment of instructions.

Instruction folding may also be performed by track table, tracker together with token passer in FIG. 9B. FIG. 9C shows a branch instruction example. The tracker stops on the next branch instruction of the instruction currently being executed, the pointer of which is decoded by the instruction source address decoder in the control unit, and the decoded result controls the two multiplexers in token passer. Take instruction 965 as a branch instruction again, the instruction source address decoder control line to token passer 985 is '1', the control lines to other token passers are '0'. Thus, the Token in token passer 983 is sent to branch target if the branch prediction is taken; or sent to token passer 987 skipping token passer 985 if the predictions is not to take. The other instructions, such as the load/store instructions may be handled by the same method, it only takes to set up an entry in track table for an instruction that is to be folded. When the tracker stops at this entry, it controls the token passer through branch source address decoder to skip the instruction being fold, in order to save execution time.

In addition, it may implement the function of repeatedly providing the same instruction to CPU core. Specifically, clock signals to all token signal registers 601 in token passers may be shut off, pausing the passing of token signals. This way, IRB outputs the instruction corresponding to the current token signal in every clock cycle. It may implement the function that repeatedly provides the same instruction to CPU core.

Figure 10A:
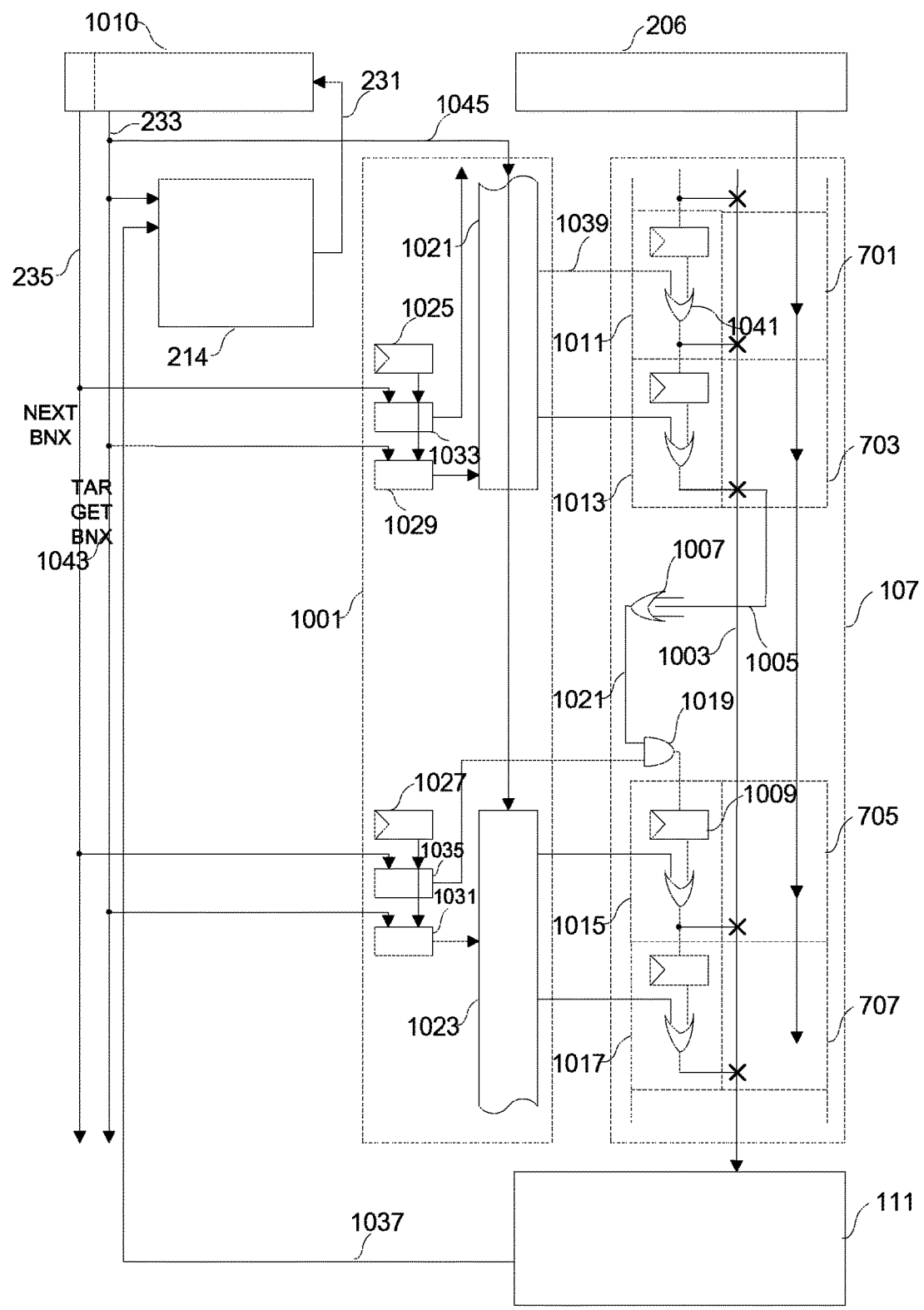
FIG. 10A illustrates an exemplary embodiment of the said token passing signal in this disclosure.

FIG. 10A illustrates another exemplary token signal passer consistent with the disclosed embodiments. For ease of explanation, FIG. 10A only includes a track table 1010, an instruction memory 206, a tracker 214, a control unit 1001, and an IRB 107 which includes some token passers. Herein, the token passers (1011, 1013, 1015 and 1017) each correspond to instructions (701, 703, 705 and 707). Instruction memory 206 and tracker 214 are the same as in FIG. 7A. The token signal registers in the token passers have a reset port so that all the token signal registers may be reseted to '0' at the same time. The control unit 1001 includes target decoders (such as 1021 and 1023), registers (such as 1025 and 1027) which are used to store BNX of the corresponding instruction blocks, target BNX comparators (such as 1029 and 1031) which are used to match BNX of the branch target block and next BNX comparators (such as 1033 and 1035) which are used to match BNX of the next instruction block. Herein, the function of Target BNX comparator is the same as that of the comparator 511 in FIG. 5C and the function of Next BNX comparator is the same as the comparator 507 in FIG. 5C. In this embodiment, when the token signal is passed in an instruction block in sequence, the detailed process is the same as in FIG. 7 or FIG. 8.

The branch source pointer 231 of tracker 214 points to track table 1010, then it reads out the branch target address 233. Herein, the target BNX 1043 portion is sent to branch target comparators (such as comparator 1031 and 1033) in control unit 1001 and compared with the BNX address of each instruction. The corresponding branch target decoder (1021 or 1023) is enabled if it matches one of the BNXs stored in the register. The enabled decoder receives the BNY of branch target address and inserts the token signal into the token passer corresponding to the branch target instruction. In control unit 1001, once the branch is taken, it resets the whole token passer to '0', and clears the token signal corresponding to branch source instruction block and the target decoder generates token signal and inserts it into the token passer corresponding to the branch target instruction. In this embodiment, the input of the token signal register of the first token passer corresponds to each instruction block and comes from an AND gate. One input of the AND gate comes from the global bus 1021, the other input comes from the output of the next instruction block BNX comparator.

The tracker 214 also reads out the next instruction block address 235 through branch source pointer 231 from track table 1010 and then sends the address to each next instruction block comparator (such as comparator 1033 and 1035) in control unit 1001 and compares with each instruction block BNX (such as the BNX stored in registers 1025 and 1027). The matched result is sent to AND gate (such as 1019) of the first token passer of the corresponding instruction. The global bus 1021 in this embodiment replaces the global bus 721 in FIG. 7, the token state of the last token passer of all instruction blocks couple to one input of the OR gate 1007. Thus, the output 1021 of OR gate 1007 is '1' when token reaches the last token passer of any instruction block. The token bus 1021 couples to one input of the AND gate (such as 1019) of the first token passer of all instruction blocks. The other inputs of these AND gates couple to the output of the corresponding next instruction block comparator. At this time, the output of the matched comparator is '1' and the state of the bus 1021 is '1', thus the output of the AND gate that corresponds to the match instruction block is '1' and the token is sent to the first token passer of the corresponding instruction block. The tracker 214 also reads out the next instruction block address 235 through branch source pointer 231 from track table 1010 and then sends the address to each next instruction block comparator (such as comparators 1033 and 1035) in control unit 1001 and compares it with each instruction block BNX (such as the BNX stored in register 1025 and 1027). The matched result is sent to AND gate (such as 1019) of the first token passer of the corresponding instruction block. In this embodiment, the token state of the last token passer of each instruction block couples with one input of the OR gate 1007 to generate the global bus 1024. Thus, the output 1021 of OR gate 1007 is '1' when Token reaches the last token passer of any instruction block. The token bus 1021 couples with one input of the AND gate (such as 1019) of the first token passer of each instruction block. The other input of these AND gates couples with the output of the corresponding Next instruction block comparator. At this time, the output of the matched comparator (such as the comparator 1035) is '1' and the state of the bus 1021 is '1', thus the output of the AND gate corresponding to the match instruction block is '1' and the Token is sent to the first token passer of corresponding instruction block.

Further, the output of OR gate 1007 is sent to the AND gate (such as AND gate 1019) that corresponds to each instruction block. The other input of the said AND gate couples with the output of the Next comparator (such as the comparator 1033 and 1035), which is used to determine the next instruction block. Its output is sent to the first token passer (such as token passer 1015) in an instruction block in IRB 107. The Next block BNX is read out from the End track point on the current track in track table 1010 and is sent to next BNX comparators in control unit 1001 through bus 235, and this BNX is compared with the BNX of the corresponding instruction. Here, the instruction block of instructions (705 and 707) is the next instruction block, so only the result of next BNX comparator 1035 is '1', the results of the other next BNX comparators are '0'. Thus the AND gate 1019 outputs a '1' and this value is written into token signal register 1009. The value of token signal registers in other token passers are '0', thus the token signal may pass to the token passer that corresponds to the first instruction of next instruction block pointed to by the End point in track table. It outputs the correct instruction to CPU core for execution and the Token is passed to next instruction block from the current instruction block.

On the other hand, when the branch instruction is taken, it needs to pass a token from the token passer that corresponds to the current instruction to the token passer that corresponds to the branch target instruction. Let's assume that the token passer 1017 in FIG. 10A corresponds to the branch target instruction and the instruction 701 is the branch target instruction. In this embodiment, when the branch TAKEN signal 1037 is generated by CPU core 111, this signal is sent to the reset port of all token signal registers to clear the token signal. The target BNX is read out from track table 1010 and is sent to all target BNX comparators to be compared. In this example, only the result of the target BNX comparator 1029 is '1', and it controls the target decoder 1021 to decode the BNY of target track point. Based on the decoding result, the word line 1039 of target decoder 1021 is '1', it inserts token signal to OR gate 1042, and controls the memory 701 to output branch target instruction 701 to CPU core 111 through bus 1003. In the next clock cycle, the token signal is passed to token passer 1013 and outputs instruction 703.

In addition, it may adopt static branch prediction in FIG. 7 or dynamic branch prediction to improve the efficiency of fetch instruction. If the branch predictor predicts not taken, the IRB 107 provides the next instruction of the branch source instruction to CPU core without waiting for the result of the branch execution. The detailed process may refer to the above embodiments, which is not repeated herein.

If the branch predictor predicts taken, the IRB 107 resets the token passer to '0' without waiting for the execution result of branch instruction, and inserts a Token in the token passer of the branch target to provide the branch target instruction to processor core 111 as described before. The branch target token passer is designated through decoding the branch target address provided by the tracker. A mechanism is needed to designated the position of the branch source, for example, by instruction decode (e.g. the decoding of the normal instructions sent to process core, or the decoding of instructions outputted from IRB 107 ahead of time shown in FIG. 7); or by the branch source address provided by tracker, that request branch source decoder be placed in control unit 1001. If the said branch instruction does take the branch, then IRB 107 continue provides subsequent instructions. If the branch is not taken, then clear all of the result or intermediate results of the instructions after the branch instruction, reset token signal register in all token passers, and insert a Token in the position of the instruction after the branch instruction, which is obtained by adding to branch source track point 231 (branch source address of the branch instruction) kept by tracker 214, to provide the right instruction (the fall-through instruction) to processor core 111.

As used herein, the processor pipeline may be portioned into front-end pipeline and back-end pipeline by the location of the TAKEN signal. A duplicated front-end pipeline may be added to the CPU core so that the IRB may provide both the fall-through instruction and the branch target instruction to the CPU core after a branch instruction. The two front-end pipelines in CPU core execute the instructions after the branch instruction, when the TAKEN signal 1037 is generated; it selects one of the two execution results of front-end pipeline to be further executed by the back-end pipeline. It ensures the pipeline suffers penalty-less branching no matter if the branch is taken or not.

Figure 10B:
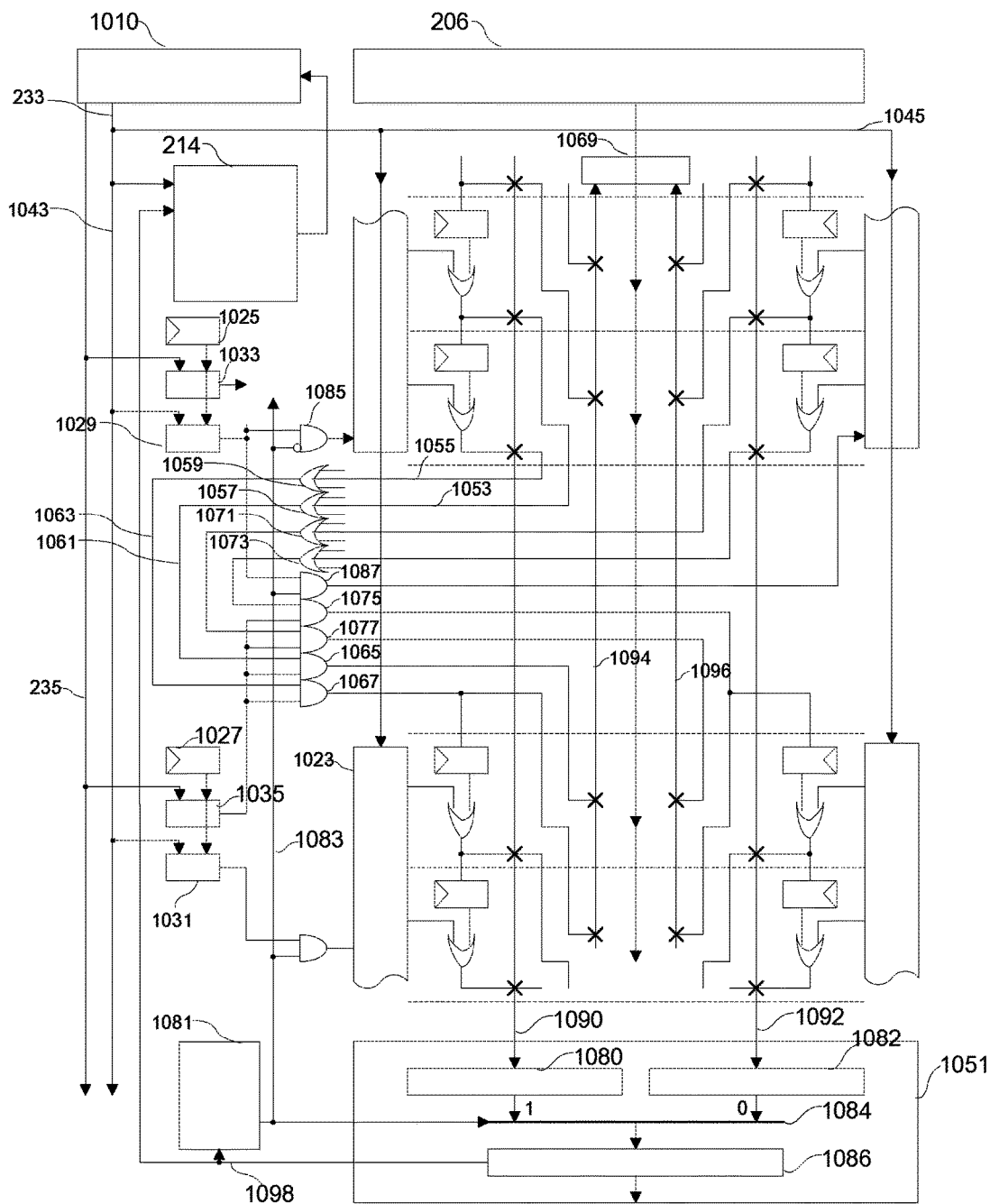
FIG. 10B illustrates another exemplary embodiment of the said token passing signal in this disclosure.

FIG. 10B illustrates an exemplary penalty-less branching processor consistent with the disclosed embodiments. In this embodiment, the track table 1010, instruction memory 206 and tracker 214 are the same as those of the structure in FIG. 10A.

The difference between FIG. 10A and FIG. 10B is that the CPU core 1051 includes two front-end pipelines (1080 and 1082) and a back-end pipeline 1086. The multiplexer 1084 selects an intermediate execution result from the two front-end pipelines according to TAKEN signal, and sends the result to back-end pipeline. In addition, each instruction stored in IRB corresponds to two token passers and two output buses (1090 and 1092) which couple to CPU core 1051. Each instruction corresponds to two buses (1094 and 1096) which are used to read out the instruction two cycles ahead and send it to data engine 1069. When IRB includes the instruction block where the branch source instruction is located and the instruction block where the branch target instruction is located, it may send the branch instruction and the next instruction through two buses to the two front-end pipelines (1080 and 1082) of CPU core 1051, and it selects one of the correct pipelines to the back-end pipeline (1086) for execution. There are four token passing buses (such as buses 1061, 1063) couple to the next instruction block and there are also four OR gates (1057, 1059, 1071 and 1073) to drive these buses because it may output four instructions at every clock cycles. Each token passer corresponding to one instruction includes four AND gates (such as AND gates 1075, 1077, 1065 and 1067). One input port of the four AND gates couple to the output of the next instruction block comparator 1035, the other input of the four AND gates separately couple to the said four token buses, the outputs of the AND gate are passed to the token state of the instruction block. In this embodiment, each instruction block of IRB corresponds to two token passers and two target decoders.

The two token passers have the same structures and they alternately correspond to the current instruction block and branch target instruction block. Take the left token passer for example, its structure is the same as the structure in FIG. 9, it may provide the current instruction and its next second instruction for normal execution and separately process the load/store instruction ahead by two cycles. Herein, the instruction corresponding to token signal is sent to CPU core 1051 for execution, its next second instruction is sent to data engine 1069 to process the load/store instruction ahead of time. It doesn't need to pre-process the branch instruction because the structure of this embodiment may eliminate the performance penalty of the branch instruction.

In this embodiment, the token signal is passed over global bus when the two instructions outputted are not in the same instruction block. That is, the current instruction is located in the current instruction block but the instruction after the next instruction is located in the Next instruction block. Specifically, the last two token passers of an instruction block may each output the value of its token signal register and send the value to OR gates (1057 and 1059) through buses (1053 and 1055). When the Token signal is at the token passer before the last token passer of the current instruction block, IRB outputs the corresponding instruction, the token signal is also sent to OR gate 1057 through bus 1053 and the output of OR gate 1057 is sent to AND gate 1065 through global bus 1061. In here, it is assumed that the token passer coupled to AND gate 1065 is the Next instruction block. The output of AND gate 1065 is because the other input of the AND gate 1065 couples with the output of Next BNX comparator whose output is '1'. Therefore, the first instruction of the said Next instruction block may be outputted with the instruction before the last instruction of the current instruction block at the same time. On the other hand, when the token signal is at the last token passer of the current instruction block, IRB outputs the corresponding instruction, the token signal is also sent to OR gate 1059 through bus 1055 and the result of the OR gate 1059 is sent to AND gate 1067 through global bus 1063. The output of AND gate 1067 is '1' because the other input port of AND gate 1067 couples with the output of Next BNX comparator which is '1', thus the second instruction of the said next instruction block may be outputted with the last instruction of the current instruction block at the same time.

For the token passers on the right in this figure, the detailed process may refer to the above description, and will not be repeated here.

In addition, according to the TAKEN signal 1098, the toggle counter 1081 is used to keep track of which front-end pipeline corresponds to the current instruction block and which one corresponds to the target instruction block. Specifically, it assumes the left front-end pipeline and the token passer correspond to the current instruction block, that is the current token is passing in the left token passers, the output 1083 of toggle counter 1081 is '1', Therefore, it disables the AND gate 1085 that corresponds to the left target decoder and enables the AND gate 1087 that corresponds to the right target decoder. The multiplexer 1084 selects the intermediate result of front-end pipeline under the control of signal 1083 and sends the results to back-end pipeline 1086 for execution. According to the branch target address 233 of tracker 214, the left token passer inserts target token into the branch target address and is controlled to send target instruction and its next instruction to CPU core 1051. These instructions in left front-end pipeline are executed until the branch target instruction reaches the last stage of pipeline 1082. The CPU core 1051 pauses the clock of right token passers, thus it stops to output more instructions from bus 1092 and waits for the result of branch decision. When the branch instruction of the left instruction bus 1090 is executed, according to the result of branch decision, it generates the corresponding output 1083 to control the whole system. If the branch is not taken, that is the TAKEN signal is '0', the output 1083 of toggle counter 1081 is '1' and it also selects the execution result of left front-end pipeline 1080 and sends the result to back-end pipeline 1086. The left front-end pipeline also corresponds to the current instruction block. According to track address of tracker 214 the right token passers outputs the next branch target instruction and its subsequent instructions to CPU core. If the branch is taken, that is the TAKEN signal is '1', and the output 1083 of toggle counter 1081 is '0'. It controls the multiplexer 1084 to select the execution result of right front-end pipeline 1082 and send the result to back-end pipeline 1086. At this time, the CPU core resumes in providing clock to right token passer, the target token becomes current token and the instruction from right instruction bus 1092 becomes the current execution instruction and it provides the current instruction to right front-end pipeline 1082. The signal 1083 resets the enable signal of right branch target decoder to '0' through AND gate 1087 so that the right target decoder doesn't generate token signal. The signal 1083 enables the left branch target decoder through AND gate 1085 and it inserts the token into left token passer group. The instructions from left instruction bus 1090 are sent to left front-end pipeline 1080 until the branch target instruction reaches the last stage of pipeline 1080. At this time, the CPU core holds the clock of left token passer group. It stops to pass branch target token and output instructions and waits for the result of branch decision. At this time, the instruction bus 1090 of left token passer and the left front-end pipeline 1080 correspond to branch instruction. The instruction bus 1092 of right token passer and the right front-end pipeline 1082 correspond to the current instruction. Each taken branch sets the TAKEN signal 1098 to '1' and it triggers the toggle counter 1081, thus the module response for the current instruction and the module response for the branch target instruction are exchanged with each other.

Similarly, when the right front-end pipeline and token passer correspond to the current instruction block, the detailed process may refer to the situation that the left front-end pipeline and token passer correspond to the current instruction block, which is not repeated herein.

Despite whether the branch is taken or not, the CPU core may receive the instructions from IRB and execute these instructions continuously, thus it may eliminate performance loss of branch instruction.

Figure 11:
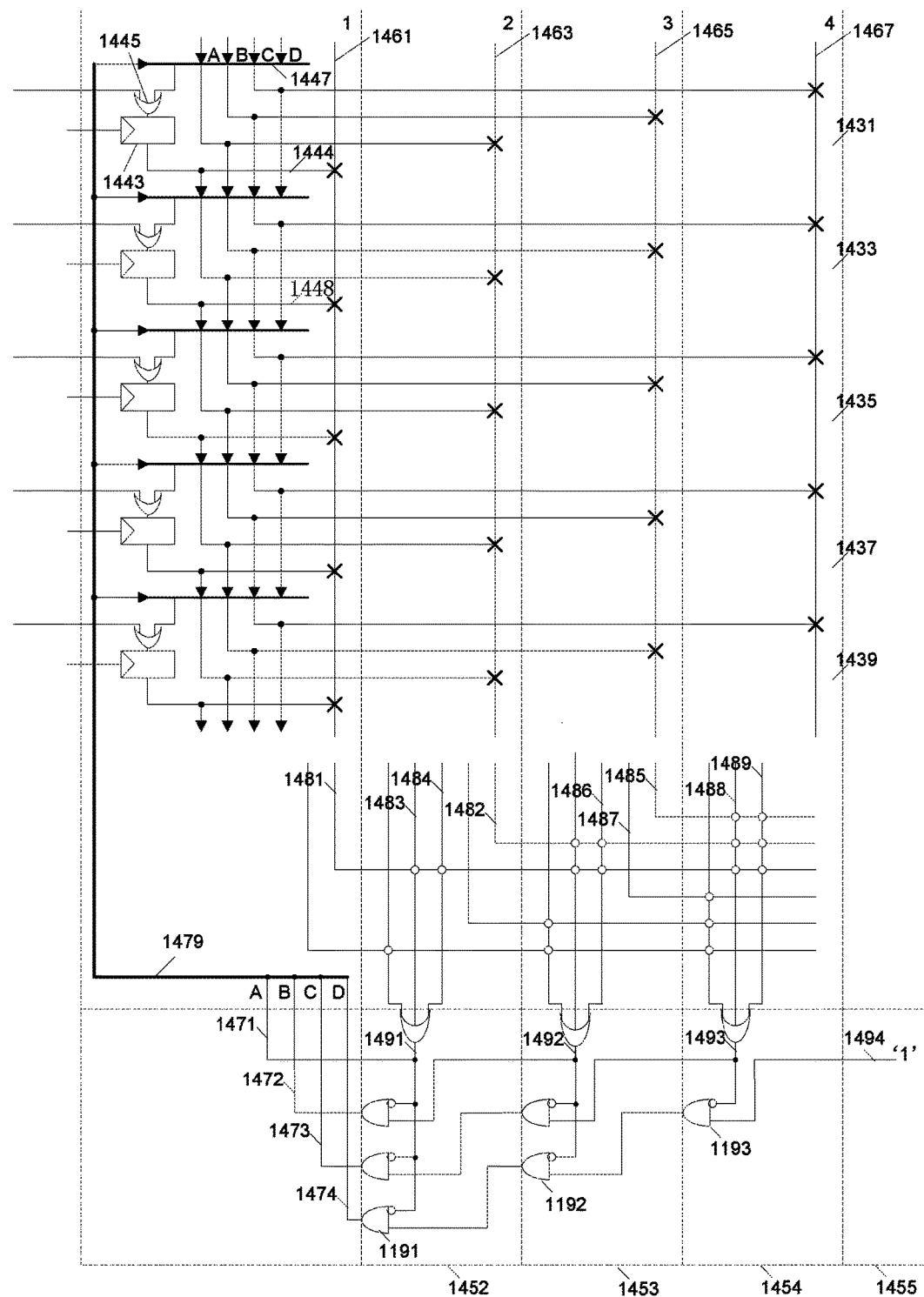
FIG. 11 illustrates an exemplary embodiment of IRB outputting multiple sequential instructions in parallel to processor core for execution ILP.

FIG. 11 illustrates an exemplary IRB sequentially outputting multiple instructions in ILP structure consistent with the disclosed embodiments. In FIG. 11, the target decoder 515 is the same as the target decoder in the above embodiments. In addition, each instruction memory of IRB has four read ports. According to need, it may read out the instruction from any one of the instruction memories. It may read out instructions from the said four read ports of IRB through buses (1461, 1463, 1465 and 1467) and it sequentially sends the four instructions to dependency check unit and CPU core, and it may write multiple instructions into IRB from exterior memory (such as instruction cache). The CPU core has the same four execution units and these units separately receive and execute different instruction from buses (1461, 1463, 1465 and 1467). Each execution unit may execute all instructions in the instruction set and the four execution units share data memory such as the RF. For ease of explanation, it only illustrates a part of the token passer and omits the other parts. Take the token passer 1431 for example, the register 1443 is used to store token signal, the OR gate 1445 is used to receive the insertion of the taken signal when the branch is taken or the token passed from four input multiplexer 1447. The four input multiplexers (such as the multiplexer 1447) in each token passer are controlled by dependency check unit and it determines whether or not to accept the token of token passer corresponding to the first or the first two or the first three or the first four instructions when the instruction is executing in sequence.

The token signal may control the simultaneous output of four sequential instructions. For example, the token signal 1444 stored in register 1443 may control the output of instruction 1431 through bus 1461, instruction 1433 through bus 1463, instruction 1435 through bus 1465, and instruction 1437 through bus 1467 in the same clock cycle. When token signal 1444 is passed to next token passer, the token signal 1448 may output instruction 1433 through bus 1461, instruction 1435 through bus 1463, instruction 1437 through bus 1465, and instruction 1439 through bus 1467 in the same clock cycle. The token signal may also be passed from token passer 1431 to token passer 1439, so that instruction 1439 and the three instructions follows it may be outputted in the same clock cycle. Token passing is selected by the four-input multiplexer in each token passer implement. For example, token signal 1444 couples to the A input (the left most) of the four-input multiplexer in token passer 1433 and couples to input B (the second input from the left) of four-input multiplexer in token passer 1435 and couples to input C (the third input from left) of the four-input multiplexer in token passer 1437 and couples to input D (the right most input) of four-input multiplexer in token passer 1439. All of the four-input multiplexers are controlled by Dependency Check Unit. If the multiplexer selects input A, the Token is sent to the next instruction; if the multiplexer selects input B, the Token is sent to the instruction after the next instruction; if the multiplexer selects input C, the Token is sent to the third instruction; if the multiplexer selects input D, the Token is sent to the fourth instruction.

Dependency Check Unit checks the Read after Write (RAW) hazard of the four instructions outputted in parallel from IRB. If the source (operand) register address of an instruction is the same as the destination register address of a prior instruction, a RAW dependence has occurred, so these two instructions may not be executed at the same time. The Dependency Check Unit also checks the dependency between a branch instruction and the instruction which may affect the branch condition. That is the instruction that may affect the branch decision condition and the branch instruction may not be issued at the same time (outputted from IRB).

Four instructions read out from IRB are in sequence from left to right. The instruction outputted from bus 1461 is the first instruction; the instruction outputted from bus 1463 is the next instruction of the first instruction and it is called the second instruction; the instruction outputted from bus 1465 is the next instruction of the second instruction and it is called the third instruction; the instruction outputted from bus 1467 is the next instruction of the third instruction and it is called the fourth instruction. In this embodiment, an example of each instruction using at most two source registers and one destination register is used for illustration. Other situations may be deduced from this situation. In the checking process, the destination register addresses (1481,

1482 and 1485) extracted from the first three instructions are compared with the source register addresses (1483, 1484, 1486, 1487, 1488 and 1489) extracted from the instructions after the first instruction. In FIG. 11, a hollow circle represents a comparator. Herein, the source register address of the first instruction are not compared with the destination register numbers extracted from the instructions in an instruction block; the source register address of the second instruction need to be compared with the destination register address of the first instruction; the source register address of the third instruction needs to be compared with the destination register addresses of the first and second instructions; the source register address of the fourth instruction needs to be compared with the destination register addresses of the first three instructions. Specifically, the destination register address 1481 of the first instruction is compared with each source register address (1483 and 1484) of the second instruction, each source register address (1486 and 1487) of the third instruction, and each source register address (1488 and 1489) of the third instruction. The destination register address 1482 is compared with each source register address (1486, 1487, 1488 and 1489). The destination register address 1485 is compared with each source register address (1488 and 1489). When a source register address of one instruction is the same as one of the destination register addresses of the prior instructions, these two instructions may not be executed in the same clock cycle.

Branch instruction dependency checking is similar to RAW hazard checking. The branch condition is updated by a certain instruction executed before the branch instruction. A common practice is that an instruction updates a register which is used by the branch instruction to make branch decision, such as a condition flag register or a register which is used for comparison by a branch instruction. If the instruction set uses condition flag register, then decoding the first three instructions indicates whether the instruction updates the flag register, and then send the results to the last three instructions and compare with each signal; the signal indicates whether the instruction is a branch instruction or not. For example, the first instruction updates the flag register and the fourth instruction is branch instruction, thus the fourth instruction may not be issued in this clock cycle, it must wait for the flag register is updated and then executing in next clock cycle. If the instruction set adopts condition destination register, the method is the same as the process of RAW hazard, that is the source register addresses of the last three instructions compared with the condition destination register addresses of the first three instructions. This comparison is included in RAW hazard detection, so that it doesn't need comparison logic. FIG. 11 is an embodiment of updating flag register, it has both RAW hazard detection and also additional branch hazard detection.

Performing OR operations on all of the comparison results in each of the second, third, and fourth instructions. The output of OR gate indicates this instruction has hazard with the prior instruction, so that this instruction may not be executed in the same clock cycle, but rather it needs to be outputted from IRB in the next clock cycle. If the second instruction has hazard with the first instruction, only the first instruction of the four instructions outputted may be executed in this clock cycle, four instructions starting from the second instructions of the two instructions that have dependency in the prior cycle. If the second instruction has no hazard but the third instruction has hazard, only the first two instructions of the four instructions outputted may be executed in this clock cycle, four instructions starting from the third instruction that have dependency will be issued next cycle. If the second and third instructions have no hazard but the fourth instruction has hazard, only the first three instructions of the four instructions outputted may be executed in this clock cycle, four instructions starting from the fourth instruction that have dependency will be issued next cycle. If the second, third, and fourth instructions all have no hazard, then all four instructions of the four instructions outputted may be executed in this clock cycle, four instructions starting from the first instruction after the four instructions outputted are issued next cycle for processor execution. The Token passing must abide by the rules described above.

Which instruction may be executed in next clock cycle depends on the location where the hazard occurred and the priority between multiple hazards. The hazard of the instruction of the left side has priority over the hazard of the instruction of the right side. In this embodiment, this function is implemented by priority encoder. The priority encoder has a similar structured shift blocking logic corresponding to each instruction. When an instruction has a hazard its corresponding shift block logic blocks the 'hazard' signal propagated by the shift block logic to its right, but produces its own hazard signal corresponding to the instruction. When an instruction has no 'hazard' then the shift block logic downshifts the 'hazard' position signal from its right and pass it to the shift block logic to the left.

Let's assume that Token is in token passer 1431, that is the control line 1444 is '1', it controls the issue of the instruction stored in the memory 1431 (simply called instruction 1431 in the following) through bus 1461, and the instruction 1433 through bus 1463, and the instruction 1435 through bus 1465, and the instruction 1437 through bus 1467 all at the same time. If there is no hazard between the four instructions, the shift block logics (1452, 1453, and 1454) don't block the signal passing. The signal on wires (1471, 1472 and 1473) each corresponds to the shifted second instruction hazard bit 1491, the shifted third instruction hazard bit 1492 and the shifted fourth instruction hazard bit 1493 are all '0' (there is no hazard detected on the second, third, and fourth instructions). Because the wire 1494 is fixed to couples with '1', the signal of wire 1494 passes to signal 1474 through 4 shift logic. Thus, the control signal of the four-input multiplexer in each token passer is '0001', it selects the fourth input of each four-input multiplexer. Except for the four-input multiplexer in token passer 1439, the fourth input of each four-input multiplexer is '0'. The fourth input of the multiplexer in token passer 1439 that couples with the control line 1444 is '1'. Thus, the Token is sent to token passer 1439. In next clock cycle, IRB outputs four instructions in sequence from instruction 1439 to CPU core for execution and also to dependency check unit to perform dependency checking.

Let's assume the instruction 1431 and its next three instructions are issued at the same time again. If only the fourth instruction 1437 has hazard with one of its prior instructions, the hazard bit 1493 of the fourth instruction is '1', thus the output of AND gate in shift block logic 1454 is '0' and it blocks the passing of signal 1494, the signal 1493 reaches signal 1473 through three stage shifter. The control signal of the four-input multiplexer in each token passer is '0010', it selects the third input of each multiplexer. Except for the four-input multiplexer in token passer 1437, the third input of each four-input multiplexer is '0'. The third input of the multiplexer in token passer 1437 couples with the control line 1444 is '1'. Thus, the Token is sent to token passer 1437. In next clock cycle, IRB outputs four instructions in sequence from instruction 1437 to CPU core for execution and also to dependency check logic to perform dependency checking. The instruction 1437 is outputted from bus 1461 of the first lane this cycle (it was outputted from bus 1467 of the fourth lane in the previous clock cycle).

Let's assume the instruction 1431 and its next three instructions are issued at the same time again. If the second instruction 1433 and the fourth instruction 1437 have hazard with the instructions before themselves, the hazard bit signal 1493 of the fourth instruction is '1', thus the output of AND gate in shift block logic 1454 is '0' and it blocks the passing of signal 1494 and the signal 1493 shifts left to its left shift block unit. However, at this time the hazard bit signal 1491 of the second instruction is '1', the outputs of the three AND gates in shift block logic are '0', it blocks the passing of signal 1493. The signal 1491 reaches signal 1471 that the control signal of the four-input multiplexer in each token passer is '1000' it selects the first input of each multiplexer. Except the four-input multiplexer in token passer 1433, the first input of each four-input multiplexer is '0'. The first input of the multiplexer in token passer 1433 couples with the control line 1444 is '1'. Thus, the Token is sent to token passer 1433. At next clock cycle, IRB outputs four instructions in sequence from instruction 1433 to CPU core for execution and also to dependency check logic to perform dependence checking. This time, the instruction 1433 is outputted from bus 1461 (it was outputted from bus 1463 in the previous clock cycle).

When the destination register address 1481 is the same as one of the source register addresses (1483 and 1484) corresponding to the second instruction, the output signal 1471 of OR gate 1491 is '1', and it forces the signals (1472, 1473 and 1474) to output '0'; otherwise, the output signal 1471 of OR gate 1491 is '0'.

When the destination register address (1481 or 1482) is the same as one of the source register addresses (1486 and 1487) corresponding to the third instruction, the output signal 1472 of OR gate 1492 is '1', and it forces the signals (1473 and 1474) to output '0'; otherwise, the output signal 1472 of OR gate 1492 is '0'.

When the destination register address (1481,1482 or 1485) is the same as one of the source register addresses (1488 and 1489) corresponding to the fourth instruction and the outputs of OR gates (1491 and 1492) are '0', the output signal 1473 of OR gate 1493 is '1', and it forces the signal 1474 to output '0'; otherwise, the output signal 1473 of OR gate 1493 is '0'.

Only when the output signals of OR gates (1491, 1492 and 1493) are '0', the output signal 1474 is '1'; otherwise, the output signal 1474 is '0'.

Thus, the output signals generated by logic 1471, 1472, 1473 and 1474 combine together to form a selecting signal 1479 which controls all of the multiplexers in each token passer. Take the token passer 1431 as an example, the output signals 1471, 1472, 1473 and 1474 each correspond to one of the four inputs from left to right (that are input A, B, C, and D) of multiplexer 1447.

Let's assume the Token signal is in token passer 1431, the four instructions corresponding to token passers 1431, 1433, 1435 and 1437 are sent to dependency check unit and execution unit at the same time each through buses 1461, 1463, 1465 and 1467. The result of dependency checking determines which instructions are to be executed in parallel. At the same time, the control signal 1479 outputted by dependency check unit is sent to each token passer to control the Token passing.

If the Dependency Check Unit finds that the first instruction of the said four instructions has RAW hazard with at least one of the other three instructions, then each multiplexer in all token passers selects input A. Token signal is in token passer 1431 at this time, in the four multiplexers 1431, 1433, 1435, 1437, only the input A of multiplexer 1433 is '1', the inputs of other three multiplexers are '0'. Thus, only the output of the multiplexer in Token passer 1433 is '1', the outputs of other three Token passers are '0'. The Token signal is sent to Token passer 1433, it indicates the instruction that corresponds to Token passer 1433 may be sent to execution unit through bus 1461. At next clock cycle, IRB sends four instructions starting with the instruction corresponding to token passer 1433 to execution unit and Dependency Check Unit.

If the Dependency Check Unit finds that the first two instructions of the said four instructions has no RAW hazard with each other but at least one of the first two instructions has RAW hazard with the third instruction, then each multiplexer in all token passers selects input B. Token signal is in token passer 1431 at this time, in the four multiplexers 1431, 1433, 1435, 1437, only the input B of multiplexer 1435 is '1', the inputs of other three multiplexers are '0'. Thus, only the output of the multiplexer in Token passer 1435 is '1', the outputs of other three Token passers are '0'. The Token signal is sent to Token passer 1435. It means now only the instruction that corresponds to Token passer 1431 and 1433 may be sent to execution unit through bus 1461 and 1463. At next clock cycle, IRB sends four instructions starting with the instruction corresponding to token passer 1435 to execution unit and Dependency Check Unit. Other situations can be deduced by analogy, and Therefore, pass the Token signal to a certain token passer based on the dependency of the four sequential instructions, to enable the IRB to output the right instructions.

In this embodiment, the input clock or power supply of an execution unit corresponding to the said instructions which are not able to be executed in parallel, to stop the execution of the said instruction; clearing the execution result of the said instruction will have the same effect.

As used herein, modification of the way of blocking in the dependency check unit may support less number of instruction parallel issue; but increase the number of inputs on multiplexers in the token passer and do the corresponding modification of way of blocking in the dependency unit may support higher parallel issue rate. For example, in FIG. 11, if 3-issue is needed, simply remove AND gates 1191, 1192 and 1193 and couples the hazard bit signal 1493 to a fixed '1'. Thus only one of the three signals 1471, 1472 and 1473 in the control signal 1479 is '1' and the signal 1474 is always '0'. Based on the result of dependency checking of the first three instructions (that are the instructions on buses 1461, 1462 and 1463), the Token signal is passed to the next first, second, or third token passers after the current token passer to implement a three-issue instruction parallelism. It may implement any appropriate instruction issue number abiding by the above method. Configure in a similar way to implement any other appropriate maximum instruction issue rate. Thus blocking the corresponding AND gates in the dependency check module by wiring can support a lesser issue rate without changing other modules; removing the corresponding logic (such as the corresponding OR gate, AND gate, and wires), will have the same effect.

The ILP multi-issue structure in FIG. 11 may issue multiple instructions in each clock cycle. Let's assume branch prediction of a branch instruction is not taken, when a branch instruction issues at the first lane, the second lane, or the third lane, the fall-through instructions of the branch source instruction may be issued from the lane to the right of the lane where the branch source instruction is located. At the next clock cycle, the branch target instruction may be issued at the first lane and its following instructions respectively issued at the second, third, and fourth lane. If the branch decision is taken, thus the fall-through instructions of the branch source instruction and their intermediate execution results may be cleared (such as not writing back the results to RF).

Figure 12A:
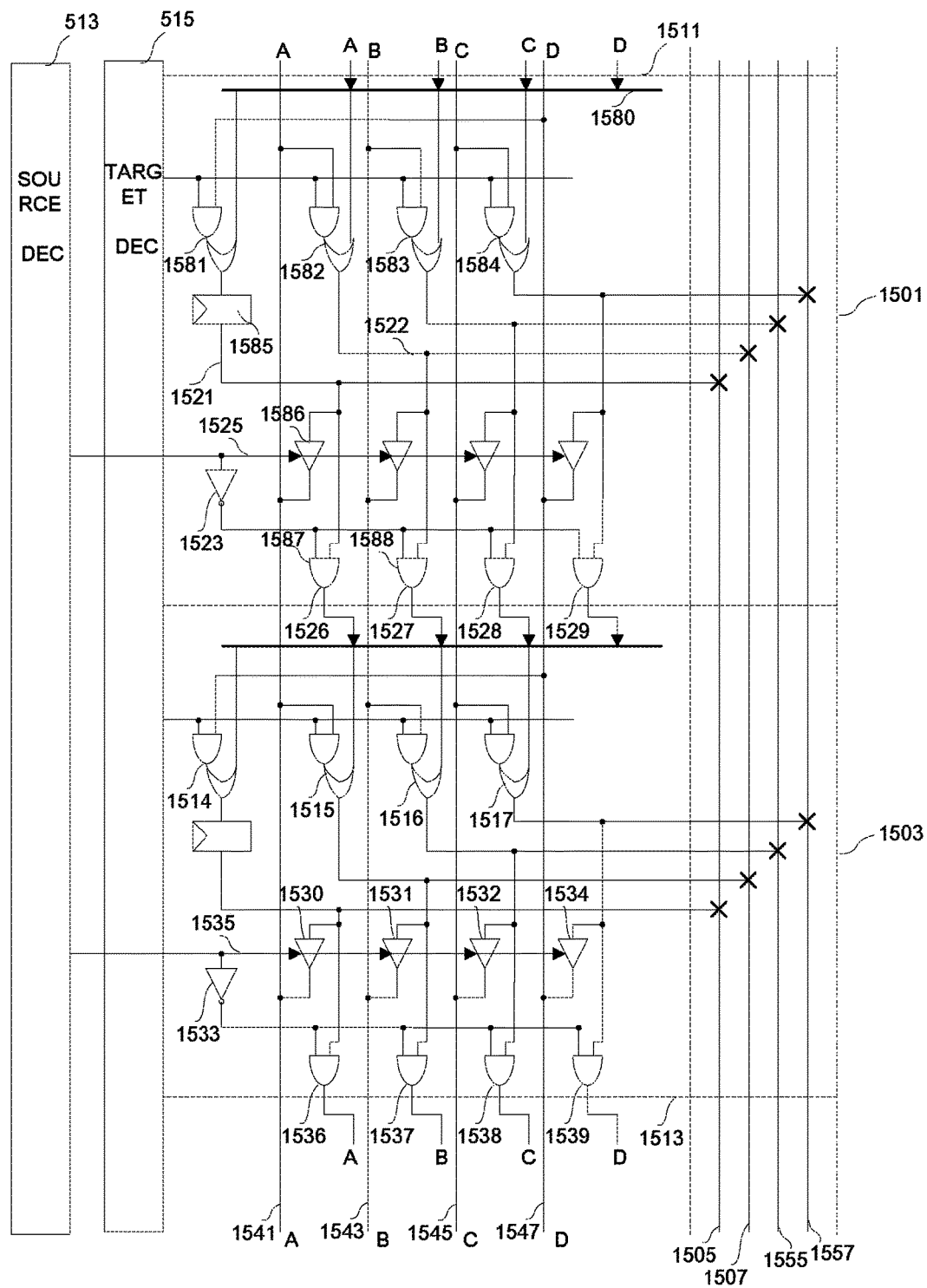
FIG. 12A and FIG. 12B are exemplary embodiments of the said lossless branching of this disclosure.
Figure 12B:
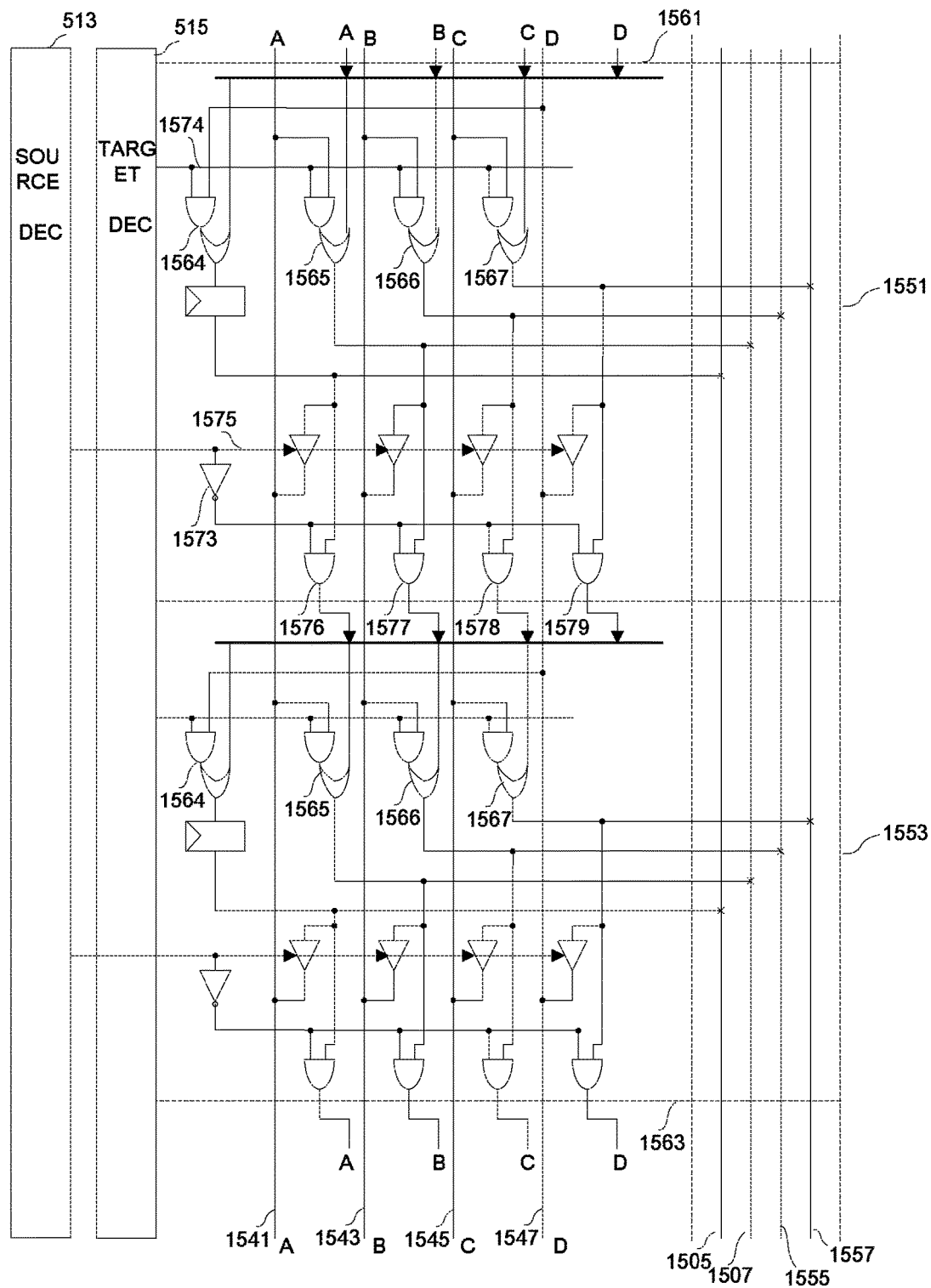

As used herein, a branch source instruction, the branch target instruction, and its following instructions may be issued in the same clock cycle if the branch prediction of a branch instruction is taken, that may implement penalty-less ILP branching. FIG. 12A and FIG. 12B illustrate exemplary penalty-less branching-less consistent with the disclosed embodiments. FIG. 12A illustrates two instructions (1501 and 1503) of an instruction block in IRB and their corresponding token passers 1511 and 1513, wherein the instruction 1503 is a branch instruction. FIG. 12B illustrates two instructions (1551 and 1553) of an instruction block in IRB and their corresponding token passers 1561 and 1563, wherein the instruction 1551 is the branch target instruction of branch instruction 1503. In order to implement penalty-less branching-less branching, the token passer in this embodiment has the combination of the function of token passer in FIG. 7A and the function of token passer in FIG. 11. The four-input multiplexer 1580 selects the Token passer in the prior four stages of token passers, the output of the multiplexer 1580 couples to AND-OR gate (AO gate) 1581 and its result is stored in register 1585. The AO gate 1581 also under the control of target decoder 515, receives the Token from branch source and inserts the Token into register 1585. Wherein, the output 1521 of register 1581 controls the instruction 1501 to directly output at the instruction bus of the first lane 1505, the Token from branch source instruction received by register 1585 comes from the token bus of the fourth lane 1547. That means, if the branch source is issued at the fourth lane, the branch target is issued at the next clock cycle at the first lane, and the signal 1521 passes through AND gate 1587 and AO gate 1515, the instruction 1503 and its fall-through instructions may be each issued at the second lane 1507, the third lane 1555 and the fourth lane 1557. The principle is similar to that of the embodiment in FIG. 11. AO gate 1582 receives the Token from branch source in the token bus of first lane 1541 and generates the control signal 1522 to issue the instruction 1501 at the second lane 1507. By passing, the Token also controls the instruction 1503 to issue at the third lane 1555 and the next instruction of instruction 1503 to issue at the fourth lane 1557. AO gate 1583 receives the Token from branch source in the token bus of second lane 1543 to control the instruction 1501 to issue at the third lane 1555, and by passing it also controls the instruction 1503 to issue at the fourth lane 1557. AO gate 1584 receives the Token from the branch source on the third lane 1547 to control the instruction 1501 issuing at the fourth lane 1557. In this embodiment, token passer buses (1541, 1543, 1545 and 1547) it each couples with all the token passers and the instruction output buses (1505, 1507, 1555 and 1557) each couples with all memory in IRB.

In addition, the token passer also includes 4 pass-gates and 4 AND gates. For example, in token passer 1513, under the controlling of branch source decoder, the Token of first lane is passed to token bus of the first lane 1541 through pass-gates 1530; the Token of second lane is passed to token bus of the second lane 1543 through pass-gates 1531; the Token of third lane is passed to token bus of the third lane 1545 through pass-gates 1532; the Token of fourth lane is passed to token bus of the third lane 1547 through pass-gates 1534. Under the control of branch target decoder, each AND gate (1536, 1537, 1538 and 1539) may block the passing of the Token of token passer 1503 to its next token passer. The operation is similar to that of the embodiment in FIG. 7.

In FIG. 12A, for the instruction block where the branch instruction 1503 is located, it may use the same method in FIG. 11 to issue multiple instructions. Let's assume, the maximum issue rate is 4 in this embodiment, and branch instruction 1503 is predicted to be taken. If the number of instruction issue including branch instruction 1503 is less than 4, the remaining number of instruction issue may be used to issue branch target instruction and its succeeding instructions. For example, when Token is on control line 1521, and instruction in 1503 is branch instruction, which is branch target is instruction 1551 in FIG. 12B. The IRB is capable of issuing in parallel instruction 1501 from the first lane bus 1505, branch source instruction 1503 from the second lane bus 1507, and may be in another instruction block branch target instruction 1551 from the third lane bus 1555, and instruction 1553 from the fourth lane bus 1557 in the same clock cycle to processor core and dependency check unit, Specifically, as used herein, the assistant module where the token signal is located uses control signal 1521 to control the output of instruction 1501 through bus 1505. Because the instruction 1501 is not a branch instruction, the control signal 1525 of the token passer 1511 corresponding to the output of the source decoder 513 is '0', the signal 1525 passes through an inverter 1525 to become '1', and this inverted signal couples with one of the inputs of each AND gate (1526, 1527, 1528 and 1529). At this time, only the other input of AND gate 1526 is '1' (this is the Token signal from token passer 1511), the other input of each of the other three AND gates is '0'. Thus, the output of AND gate 1526 is '1', the outputs of AND gates (1527, 1528, and 1529) are '0'. The output of AO gate 1515 in token passer 1513 is '1', the outputs of AO gates (1514, 1516 and 1517) are '0'. Thus, the output of AO gate 1515 controls the instruction 1503 outputted from bus 1507.

In this embodiment, because the branch prediction is taken, the control signal 1535 of the token passer 1513 corresponding to the output of the source decoder 513 is '1', the signal 1535 passes through an inverter 1533 to become '0', and this inverted signal couples with one input of each AND gate (1536, 1537, 1538 and 1539), thus the outputs of the above four AND gates are '0', it blocks the Token signal passing. At the same time, under the control of signal 1535, the pass-gates (1530, 1531, 1532 and 1534) are opened. Only the input of pass-gate 1531 is '1' that is the bus 1543 is '1', the other buses (1541, 1545 and 1547) are all '0'. So that, in the instruction block where the branch instruction 1503 is located, only the branch instruction 1503 and its previous instruction 1501 are outputted to execution unit and Dependency Check Unit.

In FIG. 12B, because the instruction 1551 is a branch target instruction, the token passer 1551 control signal 1574 outputted by the target decoder 515 is '1'. Because bus 1543 is '1', and the buses (1541, 1545, and 1547) are '0'. Thus, the outputs of AO gates (1564, 1565, and 1567) are '0', but the output of AO gate 1566 is '1', it controls the instruction 1551 to be outputted from bus 1555.

Similarly, if instruction 1551 is not a branch instruction, the token passer 1561 controls signal 1575 outputted by the source decoder 513 is '0', the signal 1575 passes through an inverter 1573 to become '1', and this inverted signal couples with one input of each AND gate (1576, 1577, 1578 and 1579). At this time, only the other input of AND gate 1578 is '1' from the AO gate 1566 in token passer 1561, but the other inputs of the other three AND gates are all '0'. Thus, the output of AND gate 1578 is '1', the outputs of AND gates (1577, 1578 and 1579) are '0'. Therefore, the output of AO gate 1567 in token passer 1563 is '1', the outputs of AO gates (1564, 1565 and 1566) are '0', the output of AO gate 1567 controls instruction 1553 to be outputted from bus 1557.

Based on the method described above, the branch source instruction and branch target instruction and its fall-through instructions may be issued in the same clock cycle. In addition, based on the above embodiments, the branch source instruction and its fall-through instructions may be issued when the branch prediction is not taken. Therefore, using the said structure and methods consistent with the disclosed embodiments, penalty-less branching for ILP may be implemented.

Figure 13:
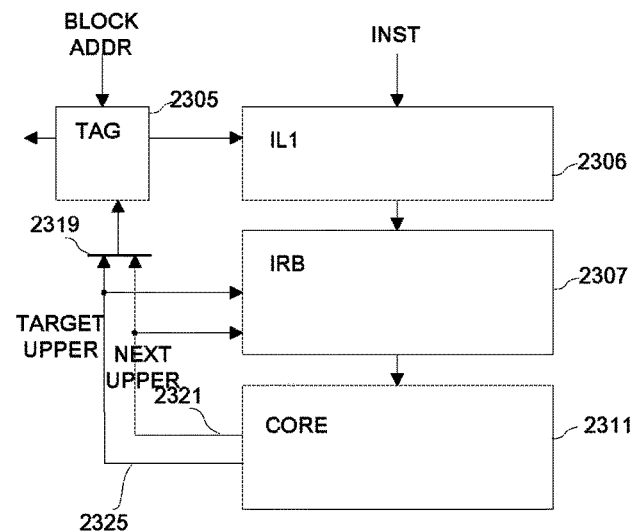
FIG. 13 illustrates another exemplary embodiment of the said processor system.

As used herein, the parts and components in the prior embodiments may be combined to form processor system in more variety to implement the same function FIG. 13 is another exemplary processor system consistent with the embodiments.

In FIG. 13, the said processor system contains a tag memory 2305, an instruction memory 2306, an IRB 2307, and a processor core 2311.

The rows of tag memory 2305 one to one correspond to the rows of instruction memory 2306, every row is used to store the block address of the corresponding instruction block in instruction memory 2306.

The structures and functions of instruction memory 2306 and IRB 2307 are similar to the instruction memory and IRB of the previous embodiment. Its differences lie in the memory blocks of instruction memory 2306 one to one correspond to the rows of tag memory 2305. Therefore, the BNX obtained from matched block addresses in tag memory 2305 may be used to find the corresponding micro-op block in instruction memory 2306. Instead of BNX of the block, the register in the control unit of IRB 2307 now stores the block address of the current block. In this embodiment, the end mark representing the last instruction of the instruction block is stored in the last token passer in IRB 2307. This way, when token signal is passed to the last instruction of instruction block, IRB 2307 not only outputs the corresponding instruction to be executed by processor 2311, but also outputs the said end mark to update the instruction block address.

Figure 14:
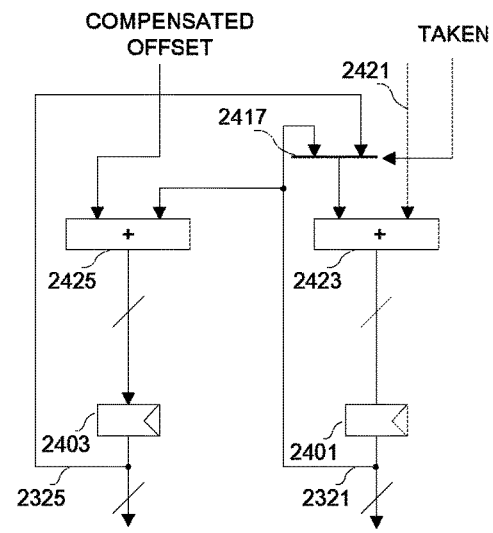
FIG. 14 illustrates an exemplary embodiment of the said instruction address generator module of this embodiment.

Processor core 2311 is a modified processor core, in which the address generation module only produces instruction block address. The said instruction block address represents the block address of instruction block. After obtaining BNX from successfully matching tag memory 2305, the position in instruction memory 2306 of the instruction block represented by the current block address may be found. FIG. 14 illustrates a schematic diagram of an exemplary instruction address generation module consistent with the disclosed embodiments.

As used herein, the branch target instruction may be calculated by instruction generation block using the instruction block that is directly used by instruction address generator module and the revised branch offset value. Here, the revised branch offset value may be found by the sum of the instruction block offset address of the branch instruction and the branch offset, and is stored to the storage unit corresponding to the said branch instruction in instruction memory 2306. Because branch target address is equal to the sum of branch instruction address and branch offset value, branch instruction address is equal to the sum of branch instruction block address and offset value within the branch instruction block. Therefore, in this disclosure, branch target address is equal to the sum of branch instruction block address and the revised branch offset value.

As shown in FIG. 14, when an instruction is executed in order, register 2401 outputs an instruction block address; when a branch target instruction is executed, register 2403 outputs an instruction block address. Multiplexer 2417 is controlled by TAKEN signal which indicates whether a branch is taken.

Specifically, when the CPU core 2311 executes the sequential instructions, if an instruction currently executed by CPU core 2311 is not the last instruction in the instruction block, multiplexer 2417 selects the value outputted from register 2401 to feed back to register 2401. Thus, the value of register 2401 is kept unchanged (that is, the instruction block address outputted from register 2401 is unchanged). That is, the value outputted from bus 2321 is the original instruction block address.

If an instruction currently executed by CPU core 2311 is the last instruction in the instruction block, multiplexer 2417 selects the value outputted from register 2401 as one input of adder 2423. The other input of adder 2423 is signal 2421 ('1') from IRB 2307 representing that the current instruction is the last instruction in the instruction block, such that the instruction block address stored in register 2401 is incremented by 1 to obtain a new instruction block address. The new instruction block address is written back into register 2401. The value outputted from bus 2321 is the next instruction block address.

If CPU core 2311 executes a branch instruction and the branch is taken, adder 2425 obtains the address of a new instruction block by adding the current instruction block address sent from register 2401 to the upper bit portion of the compensated branch offset sent from IRB 2307. The value outputted from bus 2325 is the branch target instruction block address.

It should be noted that the instruction block address generation module is inside CPU core 2311, and the instruction block addresses respectively outputted by the instruction block address generation module via bus 2321 and bus 2325 are selected to perform a matching operation in tag memory 105. However, the instruction block address generation module may also exist separately outside CPU core 2311. The operating process of the instruction block address generation module outside CPU core 2311 is the same as the operating process of the instruction block address generation module inside CPU core 2311, which are not repeated here.

Returning to FIG. 13, the instruction block addresses respectively outputted by CPU core 2311 via bus 2321 and bus 2325 are selected by multiplexer 239 and sent to the control unit in IRB 2307 to perform a match operation with the instruction block addresses stored in IRB 2307, determining whether the instruction block corresponding to the instruction block corresponding to the block address is stored in IRB 2307. If the instruction block corresponding to the instruction block corresponding to the block address is not stored in IRB 2307, based on the above method, the instruction block corresponding to the instruction block corresponding to the block address is stored in IRB 2307 before CPU core executes the instruction block. The instruction block address is also sent to tag memory 105 to perform a matching operation to determine whether the instruction block corresponding to the instruction block corresponding to the block address is stored in instruction memory 2306 and the corresponding block number BNX when the instruction block corresponding to the instruction block corresponding to the block address is stored in instruction memory 2306. As the passing of the taken signal, IRB 2307 outputs the corresponding instructions in order for CPU core 2311 execution. The process may refer to the process in FIG. 6.

Specifically, when the CPU core 2311 executes the instructions according to the order of the addresses and the last instruction in the current instruction block is not executed, because the instruction block address is unchanged, the instruction block address does not need to perform the corresponding matching operation in IRB 2307 and tag memory 105. The token signal in IRB 2307 is passed in every token transmitter corresponding to the current instruction block in order, providing the corresponding instructions for CPU core 2311 execution.

When the next sequential instruction block is executed, multiplexer 2319 selects the instruction block address (i.e., the address of the instruction block corresponding to the next instruction block) from bus 2321. The instruction block address is performed a matching operation matched? in IRB 2307.

If the instruction block address is matched successfully in the control unit in IRB 2307, the corresponding instruction block is the next instruction block.

If the instruction block address is matched unsuccessfully in the control unit in IRB 2307, the instruction block address is sent to tag memory 105 to perform a matching operation. In this case, if the matching operation is successful, BNX is obtained. The instruction block pointed to by the BNX in instruction memory 2306 is filled into the memory block determined by the replacement algorithm in IRB 2307, such that IRB 2307 contains the next instruction block.

If the instruction block address is matched unsuccessfully in tag memory 105, the low bit of instruction block address is filled with '0' to form a complete instruction address (that is, the instruction address of the first instruction corresponding to the instruction block address). Based on the previous method, the instruction address is sent to the lower level memory to obtain the corresponding instruction block. The obtained instruction block is converted to the instruction block via converter 109, and the instruction block is filled into the memory block pointed to by the BNX determined by the replacement algorithm in instruction memory 2306. The mapping relationship obtained by a conversion operation is stored in the row pointed to by the BNX in the mapping module. At the same time, the instruction block in instruction memory 2306 is filled into the memory block determined by the replacement algorithm in IRB 2307, such that IRB 2307 contains the next instruction block.

Thus, when the token signal is passed to the token transmitter corresponding to the last instruction in the current instruction block (that is, when CPU core 2311 executes the last instruction), the token signal is passed from the token transmitter corresponding to the last instruction in the current instruction block to the token transmitter corresponding to the first instruction in the next instruction block under the control of the ending flag. Then, as the Token signal is passed, IRB 2307 outputs the corresponding instruction in order for CPU core 2311 execution.

When IRB 2307 outputs the branch instruction to CPU core 2307 for execution, the address of branch target instruction block may be calculated by adding the upper bit portion of the compensated offset address to the block address of the branch instruction as shown in FIG. 14. The address of branch target instruction block is sent to the control unit in IRB 2307 to perform a matching operation. The address of branch target instruction block is also sent to tag memory 2305 to perform a matching operation.

If the address of branch target instruction block is matched successfully in the control unit in IRB 2307, the instruction block that is matched successfully is the branch instruction block corresponding to the branch target instruction. At this time, because instruction memory 2306 contains all the instruction blocks in IRB 2307, BNX may be obtained successfully by performing a matching operation on the instruction block address in tag memory 105. Then, the low bit portion 2331 of the compensated branch offset is used as the instruction block offset. The instruction block offset is sent to mapping module 107. Based on the mapping relationship included in the row pointed to by the BNX, the instruction block offset is converted to the instruction offset address 2333. Based on the instruction offset address 2333, the branch target instruction may be found in the instruction block that is matched successfully in IRB 2307.

If the address of branch target instruction block is matched unsuccessfully in the control unit in IRB 2307, the instruction block address is sent to tag memory 105 to perform a matching operation. In this case, if the matching operation is successful, BNX is obtained. The instruction block pointed to by the BNX in instruction memory 2306 is filled into the memory block determined by the replacement algorithm in IRB 2307, such that IRB 2307 contains the branch target instruction block. At the same time, the low bit portion 2331 of the compensated branch offset is used as the instruction block offset. The instruction block offset is sent to mapping module 107. Based on the mapping relationship included in the row pointed to by the BNX, the instruction block offset is converted to instruction offset address 2333. Based on instruction offset address 2333, the branch target instruction may be found in the branch target instruction block in IRB 2307.

Thus, when the execution result of the branch instruction is not yet generated by CPU core 2311, according to the order of the addresses, the token signal continues to be passed in order and the corresponding instructions are outputted to CPU core 2311 for execution. When CPU core 2311 executes the branch instruction and generates the execution result of the branch instruction, if the branch is not taken, the token signal continues to be passed in order and the corresponding instruction is outputted to CPU core 2311 for execution; if the branch is taken, CPU core 2311 clears the execution results or the intermediate results of the executed instructions following the branch instruction. At the same time, according to the previously described method in FIG. 6, the passing of the token signal is suspended. The token signal is inserted into token transmitters corresponding to the BNX and the BNY in IRB 2307, such that IRB 2307 outputs the corresponding branch target instruction for CPU core 2323 execution. Then, as the Token signals are passed, IRB 2307 outputs the corresponding instructions in order for CPU core 2311 execution.

Figure 15:
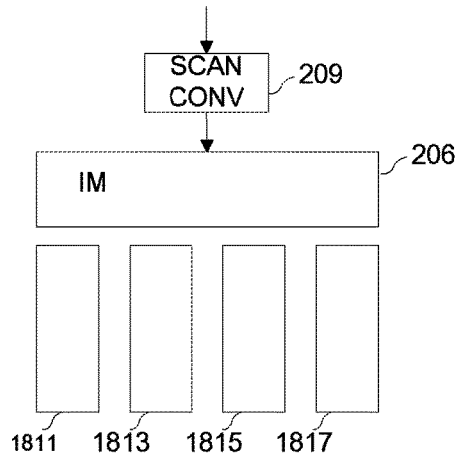
FIG. 15 illustrates an exemplary embodiment of the IRB base multi-core processors supporting a plural number of instruction sets in this disclosure.

The said IRB equipped processor may be expanded as multi core processor, and support more than one instruction set. FIG. 15 is an exemplary multi core IRB equipped processor that supports multiple instruction sets consistent with this disclosure. In the FIG. 206 is instruction memory, 209 is scan converter, 1811, 1813, 1815 and 1817 are four processor cores. Lanes 1811, 1813, 1815, and 1817 execute instructions of instruction set A only. The scan function of scan converter 209 is similar to the function of scanner 208, but it also has converting function, and may convert the inputted instructions of instruction set B into the corresponding instructions of instruction set A. Therefore, the embodiment of FIG. 15 may support instruction set A and instruction set B at the same time. When executing instruction set A, scan converter only performs the scan function, and does not perform the instruction set converting function. Only when executing instruction set B, scan converter 209 not only performs scanning function, but also performs instruction set converting function. The conversion of instructions occurs before instructions are stored in instruction memory 206, thus instruction memory 206 only has the instructions of instruction set A. Therefore, when each lane transfers and allocates instructions, as long as the target is hit in instruction memory 206, there is no need to wait for the instruction conversion.

Further, there are two instruction set converter mechanisms in scan converter 209, which respectively convert instruction set B and instruction set C to instruction set A. Under this circumstance, it is equivalent as different lanes and different threads in multi lane processor are executing instructions of different instruction sets.

As used herein, all the methods and implementations of this disclosure may be expanded to cache systems with more layers of memory hierarchy.

As used herein, the IRB can be improved further by directly controlling IRB with tracker and outputting multiple instructions to processor in the situation without any token registers to implement functionality the same way as the embodiment in FIG. 11. Another embodiment of providing multiple sequential instructions to processor at the same time by IRB in ILP structure stated hereto.

In this embodiment, track table 210 not only outputs target track point BN through bus 1633 after selecting by target select module 1649 based on the addressing of read pointer outputted by tracker 1607, but also outputs next instruction block address in track end point which comes from bus 1635 pointed to by read pointer 1631. The above address is sent to IRB 107 and multiplexer 1609 through buses 1633 and 1635. For ease of display and explanation, IRB in FIG. 16A only exhibits 3 instruction blocks (i.e. instruction blocks 1601, 1603 and 1605) and the instruction block 1601 only exhibits 4 instruction entries (i.e. 1611, 1613, 1615 and 1617). The operation principle and execution procedure can be deduced from the technical scheme stated in embodiment herein, as IRB contains more instruction blocks and instruction entries. Specifically, the processor contains 3 identical execution units executing and respectively receiving instructions from buses 1661, 1663 and 1665, which resembles embodiment in FIG. 11. Each of the execution units can execute all instructions in the instruction set, and all 3 execution units share data memory, such as register file 1629.

Each instruction storage unit in IRB 107 can accept instructions from outer memory (for example instruction cache 206) through bus 1667. A block in instruction cache 206 is placed in instruction block from top down by program order. There are 3 read ports in each instruction storage unit and each read port provides instructions to an execution unit.

Each instruction block in IRB 107 contains one decoder module. As is the case for decoder module 1617 in instruction block 1601, its first address memory 505, branch target comparator 511, current first address comparator 509, and current second address decoder 513 are the same as the corresponding components stated in previous embodiments (called branch source comparator and branch source address decoder). The first address memory 505, which is written along with instructions, stores BNX of the instruction block. The BNX coming from tracker 1607 through 1631 is compared with BNX stored in the first address memory 505 by the first address comparator 509, and the instruction block is the current instruction block if the result matches. Then it enables the second address decoder 513, which decodes BNY in read pointer 1631, and there is and only is one '1' in its output signals 1641, 1643, 1645 and 1647. However, the outputs of the second address decoder are all '0' if the result of first address comparator 509 mismatches.

The instruction blocks comprise an array, in which the instructions are arranged from top down by program order and each row stores one instruction, whereas each column contains a read port corresponding to an execution unit in each row. The outputs of second address decoder 513 in IRB 107 control the read ports on all columns through a word-line extended from top left to bottom right. It issues 3 sequential instructions through buses 1661, 1663 in the order from left to right and 1665 to dependency check module 1627 and execution units 1621, 1623 and 1625, so that continuous instructions can be issued to multiple execution units at the same clock cycle. An instruction can be issued to the execution unit through read port at any column depending on the demand.

Similarly, the BNX of branch target coming from track table 210 and selected by module 1649 is compared with the BNX stored in the first address memory 505 by branch target comparator 511. It indicates that the instruction block is the one where branch target is located if they match, and the result is only used to judge whether the branch target already is already stored in IRB 107.

The BNX of next instruction block outputted by track table 210 is compared with the BNX stored in the first address memory 505 by next block address comparator 1619. It indicates the corresponding instruction block is the next instruction block if the inputs of comparator match. The result of comparator controls one input of all AND gates in row NO. 1 of IRB (except for the leftmost column, in which read ports on all rows are directly driven by the second address decoder 513), such as the AND gate 1637 and 1639, and another input of all these AND gates connects to the token bus (bus 1667 for example) to receive the position where the last instruction is issued in another IRB block, filling the remaining columns with instructions in the current instruction block, which make most of the execution unit. The read port control line in the last row of all these IRB blocks connect to an OR gate, such as OR gate 1647 or 1649, whose output is the token bus such as 1667 and 1669 and is also the input of the AND gates 1637 and 1639. The output of next block address comparator 1619, whose purpose resembles that of branch target comparator 511, is also used to judge whether the next instruction block is already in IRB 107.

As used herein, track table 210 consists of three components: instruction type field 1671, branch target track point field 1673 and next instruction block number 1675 in this embodiment. The instruction type field 1671 contains all instructions' type information on the track, for instance, the instruction type is '1' if it's a branch instruction, otherwise it is '0'. Each item in branch target track point field 1673 corresponds to a track point on the track. If a track point is branch point, its branch target track point field 1673 contains the information of target track point of the branch instruction. The track, which is addressed by BNX in the read pointer 1631 of tracker 1607 in the embodiment herein, outputs its next instruction block number 1675 to bus 1635 as the BNX of next instruction block, and output all contents of instruction type field 1671 and branch target track point field 1673 to branch target selection module 1649.

Figure 16A:
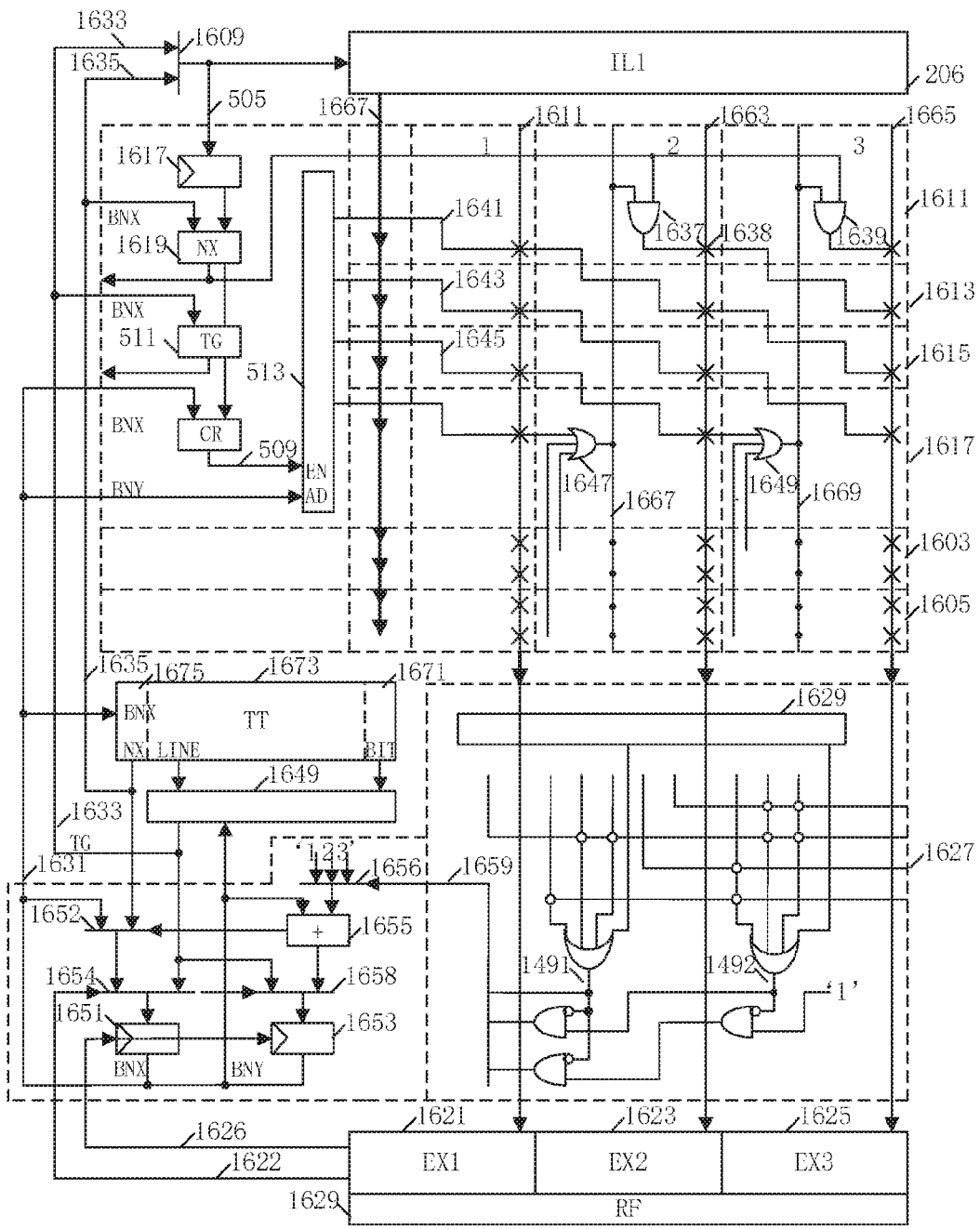
FIG. 16A illustrates another exemplary embodiment of IRB outputting multiple sequential instructions to processor core for execution in parallel in the said ILP structure of this disclosure.
Figure 16B:
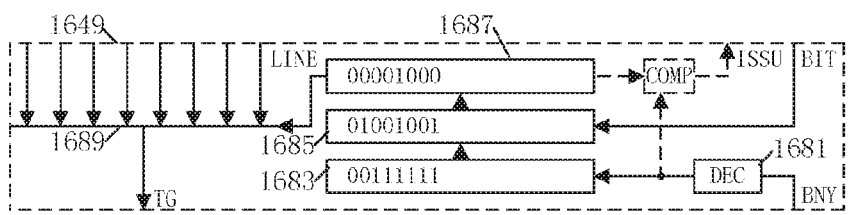
FIG. 16B illustrates an exemplary embodiment of the said branch target selecting module of this disclosure.

As used herein, an embodiment of branch target selection module stated in this invention is illustrated in FIG. 16B. The functionality of the stated branch target selection module is to select branch target track point BN of the first branch point, starting at the BNY that read pointer 1631 points to, from the row where tracker 1607's read pointer 1631 points to. In the embodiment herein, the branch target selection module 1649 consists of decoder 1681, masker 1683, register 1685, priority logic 1687 and multiplexer 1689. Register 1685 stores contents ('01001001' as shown in figure) read out from track table 210's instruction type field 1673. The decoder 1681 receives BNY in tracker 1607's read pointer 1631 (suppose it's '2', namely the first branch point starting from this BNY located at the 3rd entry in the track), and achieves a mask word ('00111111' as shown in figure) after decoding the BNY, making the bits before it set to '0' and others set to '1'. The priority logic performs logic AND operation on the mask word and content stored in register 1685, '00001001' as to this embodiment. The priority declines from the left to the right, Therefore, the '1' with highest priority is preserved and all others are set to '0', '00001000' as to this example, which is sent to multiplexer 1689 as select signal hereafter. Multiplexer 1689 then operates according to the signal and selects the entry specified by branch target track point field 1673 coming from track table 210. In the embodiment herein, because the signal is '00001000', multiplexer 1689 passes the 4th entry's branch target track point BN in branch target track point field 1673 (i.e. the first branch point starting from this BNY) through bus 1633.

As shown in FIG. 16A, branch target BNX and next instruction block BNX are compared with the BNX stored in the control module by branch target comparator and next block address comparator in corresponding control module through bus 1633 and 1635 respectively. The result whether or not branch target instruction block already exists in IRB 107 can be achieved by conducting logic OR on all branch target comparators' results. For instance, it indicates that the branch target instruction block hasn't been stored in IRB 107 if the result of logic OR is '0' on all branch target comparators' results. The branch target BNX on bus 1633 is then passed to instruction cache 206 by multiplexer 1609 for addressing. The IRB block designated by replacement algorithm is filled with branch target instruction block, and the BNX is filled into the first address memory 505 in IRB block's decode module. By the same way, whether or not the next instruction block already exists in IRB 107 can be achieved by performing logic OR on all next block address comparators' results. The next instruction block's BNX on bus 1635 is then passed to instruction cache 206 by multiplexer 1609 for addressing if the next instruction block has not yet been stored in IRB 107. The next instruction block read out from the instruction cache is filled in to the IRB block designated by the replacement algorithm and the BNX is stored in corresponding memory 505. As a result, it is reasonable to suppose the next instruction block or branch target instruction block to be executed by processor has already been stored in IRB 107 in the following explanations.

The tracker 1607 consists of two registers, four multiplexers, and one adder. Register 1651 and 1653 respectively store BNX and BNY of the read pointer. Multiplexer 1656 passes fixed value '1', '2' or '3' to adder as address increment according to the dependency check result between instructions generated by dependency check module 1627. The value added to the BNY of read pointer sent by register 1653, is the new BNY of read pointer. For example, multiplexer 1656 passes '3' to adder 1655 if there is no dependency in 3 instructions provided by IRB 107, which is the BNY corresponds to the 3rd instruction behind current BNY after addition.

The multiplexer 1658 selects output of adder 1655 and BNX outputted by branch target selection module 1649 under the control of branch decision signal 1657 sent by execution unit. There are independent branch judgment logics in execution units 1621, 1623, and 1625. There are independent instruction decoders corresponding to execution units in the dependency check module 1627. It only executes the first branch instruction in the case of a certain class of branch instructions, which generates branch condition and checks the branch type at the same time, as well as the case of issuing multiple branch instructions in one cycle. The signal 1657 derives from the encoding of the first branch instruction's (i.e. the first branch instruction in program order) branch decision in each execution unit by priority encoder, which utilizes the branch types decoded by instruction decoder. Functionality of the priority encoder resembles 1687 in FIG. 16B. For example, if the branch type's signal in all columns are '011' in which '1' refers to the branch instruction in the column, priority encoder generates a control word '010' with only one '1' which corresponds to the leftmost '1', to select branch decisions of all execution units as branch decision signal 1657. It also generates a control word '110' with '1' before the first '1' in branch type signal and all '0's after the bit, which controls the write back to registers and memory of execution unit, and the result of execution unit which corresponds to the '0' column in control word is not written back. Another input is added to the OR gate (such as OR gate 1942) in the dependency check module so as to accept a third control word '001' with format that only the second branch instruction is '1'. This leads to the output of OR gate 1492 as '1'. If there are no dependencies between the instructions, the signal 1657 controls the multiplexer and passes '2' to adder 1655 as the increment, which is then added to current address pointer's BNY and then used as next cycle's address pointer BNY. The second branch instruction, which has been issued at current cycle, will be re-issued at next cycle to execution unit 1621, and its succeeding two instructions will be respectively issued to execution unit 1623 and 1625.

The multiplexer 1658 passes the branch target track point's BNY outputted by the branch target selection module 1649 to register 1653 in order to update the BNY's read pointer in the case that the branch is taken. If not taken, multiplexer 1658 passes the BNY outputted by adder 1655 to register 1653.

The multiplexer 1652 selects BNX value between current read pointer BNX (namely current instruction block BNX) and the next instruction BNX derived from track table 210 under the control of carry bit generated by adder 1655. It passes the next instruction block's BNX outputted by track table 210 to multiplexer 1654 when adder 1655 generates carry bit, indicating all instructions in current instruction block have been sent to execution unit. However, it passes the next instruction block's BNX outputted by register 1651 to multiplexer 1654, when adder 1655 doesn't generate the carry bit, indicating there are instructions that haven't been sent to the execution unit in the current instruction block.

The multiplexer 1654 selects value between the output of multiplexer 1652 and branch target BNX outputted by branch target selection module 1649 which is also under the control of branch decision signal 1657. When the branch is taken, multiplexer 1654 passes branch target track point's BNX outputted by branch target selection module 1649 to register 1651 in order to update the BNX of read pointer.

Whereas it passes BNX outputted by multiplexer 1652 to update register 1653 if the branch is not taken. Registers 1651 and 1653 update at each cycle unless there is an exception. For example, execution unit 1621 stalls the pipeline or cache miss and so on. It terminates the update of register 1651 and 1653 through control line 1626 once the exception happens.

Besides, the multiplexer 1652 can be omitted by sending the next instruction block's BNX, which is directly outputted by track table 210 on bus 1635 to the multiplexer 1654, and controlling the update of register 1651 with the branch TAKEN signal and the carry output of adder 1655. If the branch is not taken, the multiplexer 1654 passes branch target BNX, which is outputted by branch target selection module to register 1651 controlled by the TAKEN signal. If the branch is not taken and adder 1655 generates the carry bit, the multiplexer 1654 passes the BNX of the next instruction block which is outputted by track table 210 to register 1651 controlled by the carry signal. However, register 1651 won't be updated and preserves the original BNX in the case that branch is not taken and there is no carry bit generated by adder 1655.

Thus, tracker 1607 generates a read pointer 1631 and sends it to the control modules corresponding to all IRB blocks at each clock cycle. As is the case of module 1617, if its corresponding instruction block is the current instruction block, the current second address decoder 513 decodes BNY in read pointer 1631 under the control of the match signal generated by the current first comparator 509, setting corresponding outputs to '1' and others to '0'. The situation that the branch is not taken is elaborated herein first. For example, the current second address decoder 513's output control line 1641 is '1', and 1643 as well as 1645 are '0' if the BNY of read pointer 1631 is '0'. As illustrated in FIG. 16A, three continuous instructions stored in instruction memory unit 1611, 1613 and 1615 are read out and sent to execution units 1621, 1623, 1625, and dependency check module 1627 under the control of signal 1641. Tracker 1607 adds '1', '2', or '3' to BNY in the read pointer and preserves the value of BNX according to result of dependency check module 1627, and then the new pointer points to the first instruction of 3 sequential instructions outputted in parallel.

For instance, the control line 1647 of the second address decoder 513 is '1', control line 1641, 1643 and 1645 are all '0' if the BNY of read pointer is '3'. As illustrated in FIG. 16A, instructions stored in memory cell 1617 are read out through bus 1661 under the control of line 1645, and the OR gate 1647 outputs '1' to token bus 1667 because its input control line 1647 is '1', i.e. issue instructions across boundary of read buffer.

One input of AND gates 1637 and 1639 is the output of comparator 1619, '1' as in this case in the control module corresponding to the next instruction block, and other inputs are respectively bus 1667 and 1669. The value of control line 1638 is '1' because all two inputs of AND gate 1637 are '1', making the memory unit 1611 and 1613 output instructions respectively through bus 1663 and 1665. Thus, the instruction on bus 1661 is the last instruction of current instruction block, while instructions on buses 1663 and 1665 are the respective first, second instructions of next instruction block, i.e. it outputs 3 continuous instructions which are sent to execution units 1621, 1623, 1625 and dependency check module 1627. If we regard the IRB blocks as an array, the next block address selects the first row of certain block (the first instruction in this block), and the column information of the last instruction in previous instruction block (denoted as the column right to the one occupied) is passed to all IRB blocks through token bus. It issues all instructions from the read port on the selected row and column until all columns/execution units are utilized in the same clock cycle. Tracker 1607 is responsible for adding '1', '2' or '3' to BNY in the read pointer based on the output of dependency check module 1627. In the embodiment herein, the carry bit generated by adder 1655 is definitely '1' because it adds at least '1' to BNY. As a result, the next instruction block's BNX, which is derived from the output of track table 210 is stored in register 1651 and the sum of adder 1655 is stored in register 1653. The newly obtained read pointer points to the first instruction of 3 continuous instructions in the next instruction block to be outputted in parallel next time.

The following paragraphs focus on the explanations that the branch is taken. The execution unit judges the first branch instruction in program order under the control of priority judgment logic if there is branch instruction in the issued instructions after being decoded by dependency check module 1627, and its result controls multiplexers 1654 and 1658. Multiplexer 1654 passes output of multiplexer 1652 and multiplexer 1658 passes output of adder 1655 if the branch is not taken, and the execution procedure at next cycle is exactly the same as that of the above non-branch instructions.

The results of execution units after the one corresponding to the branch instruction won't write back to registers such as register file 1629 if the branch is not taken (the same situation as executing non-branch instruction). Meanwhile, both multiplexers 1654 and 1658 pass branch target track point derived from track table and transferred by bus 1633 under the control of valid branch decision 1622. Registers 1651 and 1653 in tracker 1607 respectively update their contents to BNX and BNY of the branch target track point, which constitute the new current read pointer. The decoder in IRB enables the corresponding word-line to control the read port of instruction memory unit where the branch target instruction is located. As a result, the instruction at the leftmost column is sent to execution unit 1621 through bus 1661, and its succeeding instructions are sent to execution units from the left to right. Besides, the newly obtained read pointer is sent to track table 210 through bus 1631 to read out the corresponding track. Information on the track of branch target, which is provided by track table, is utilized by tracker 1607 and decoder in IRB 107.

If the IRB block boundary is crossed in the procedure stated above, as is the case if the last instruction in IRB block is branch target, the instruction is issued to execution unit 1621 through bus 1661 and the token bus 1667 is validated. The IRB block, which matches the address of branch target instruction's next instruction block derived from track table 210 through bus 1635, issues the first instruction to execution unit 1623 through bus 1663 and the second instruction to execution unit 1625 through bus 1665. The following operations resemble the non-branch instruction. A new read pointer is achieved by adding the branch target to increment 1659 determined by dependency check module 1627 in next cycle, and it is decoded by the decoder in IRB 107 to locate the position of instructions to be issued.

Figure 17:
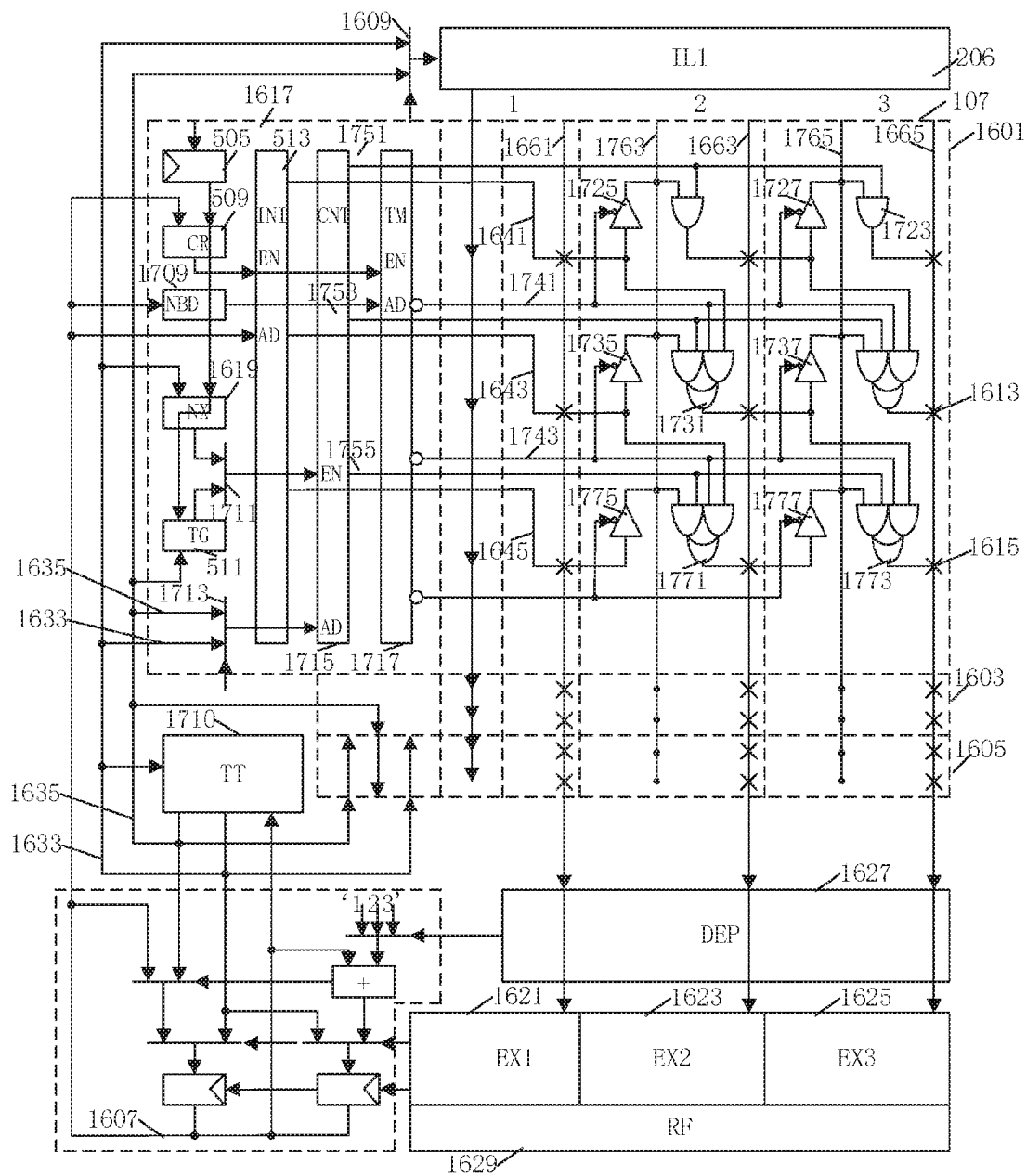
FIG. 17 illustrates another exemplary embodiment of IRB outputting multiple sequential instructions to processor core for execution in parallel in the said ILP structure of this disclosure.

As used herein, the embodiment in FIG. 16A can be further improved according to the technical scheme in this invention. Another embodiment of ILP structure stated herein that IRB provides multiple sequential instructions to processor at the same time is illustrated in FIG. 17. If there is branch among the multiple instructions which are designated by tracker's read pointer in this embodiment, the IRB not only outputs the branch instruction and the instructions before it but also the succeeding sequential instructions of the branch or succeeding instructions starting from its branch target according to the information of branch prediction stored in track table.

As used herein, the instruction cache 206, dependency check module 1627, execution units 1621, 1623 and 1625, register file 1629, tracker 1607, and multiplexer 1609 are the same as the corresponding components in embodiment of FIG. 16A. The track table 1710 in FIG. 16 contains the track table 210 and branch target selects module 1649 in FIG. 16A for the purpose of facilitating exhibition. The embodiment is different from the one in FIG. 16A in that there is additional predictor 1709, multiplexers 1711 and 1713, target decoder 1715 and the end decoder 1717. Each instruction memory unit in IRB 107 also contains additional control logic. Each instruction memory unit contains triple state gate logic, and the first instruction memory unit of each instruction block also contains AND gate while the other instruction memory unit contains complex gate. For example, the AND gates 1721, 1723 and triple state gates 1725, 1727 in instruction memory unit 1611, the complex gates 1731, 1733 and triple state gates 1735, 1737 in instruction memory unit 1613, and the complex gates 1771, 1773 and triple state gates 1775, 1777 in instruction memory unit 1615.

Specifically, the first address storage 505, branch source comparator 509, branch target comparator 511, next address comparator 1619, and branch source decoder 513 in control module 1617 are the same as corresponding components in embodiment of FIG. 16A.

In the embodiment herein, the output of branch source comparator 509 not only controls the enablement of branch source decoder 513, but also the enablement of end decoder 1717. The predictor 1709 generates corresponding control signal according to the branch prediction information stored in the current track of track table 1710 and the BNY of read pointer 1631, and then sends the signal to the end decoder 1717, producing clear signal 1741, 1743 or 1745 for corresponding instruction memory unit. The default value of the end decoder 1717's clear signal is '1', indicating that it doesn't terminate the pass of control signal 1641, 1643 or 1645. The AND gate's or complex gate's output in corresponding instruction memory is '0' and the triple state gate is enabled once the clear signal is '0', terminating the pass of corresponding control signal with value '1' to next instruction memory unit. The control signal is then sent to all instruction blocks through bus 1763 or 1765.

The multiplexer 1711 and 1713 in each control module passes the input correlated to branch target (i.e. the output of branch target comparator 511 and branch target BNY on bus 1633), enabling the branch target decoder 1715 in control module corresponding to the branch target instruction block. The control signals of instruction memory unit which the branch instruction corresponds to, are generated by the branch target decoder and control the AND gate or complex gate in the instruction memory unit in order to pass the value '1' on bus 1763 or 1765 to this instruction memory unit. The corresponding instructions are read out subsequently. This way, IRB 107 can provide branch instruction and its target instruction at the same time.

For the purpose of facilitating explanation, suppose that the second instruction in an instruction block is a branch instruction predicted as branch taken and its branch target is the zero instruction in this block in the following example. As stated before, the control signal 1645 generated by branch source decoder 513 is '1' if the read pointer 1631 points to this instruction block and the BNY is '2', and the instructions are read out from instruction memory unit 1615 to bus 1661. The predictor 1709 sends BNY (i.e. '2') of the branch instruction to the end decoder 1717 because the branch instruction is predicted as taken. The end decoder 1717 generates clear signals 1741, 1743, and 1745 with respective values '1', '1' and '0' under the enablement of branch source comparator 509's output. Triple state gate 1775 is then enabled, and the value '1' of control signal 1645 is passed to bus 1763 (the value on bus 1765 is '0').

Meanwhile, the branch target decoder 1715 is enabled by multiplexer 1711's result, which is derived from the output of comparator 511, takes the branch target BNX on bus 1633 as its input and outputs control signals 1751, 1753, and 1755 with respective values '1', '0', '0'. The outputs of AND gate 1721 and 1723 in instruction memory unit 1711 are '1' and '0', as well as the outputs of complex gates 1731 and 1733 in instruction memory unit 1713 are respectively '0' and '1'. Thus, the instruction memory units 1613 and 1615 put corresponding instructions on buses 1663 and 1665 under the control of AND gate 1721's and complex gate 1733's output respectively.

As used herein, the IRB 107 issues instructions where the read pointer 1631 points to up to the branch instruction together with the branch target and its succeeding instructions to execution units 1621, 1623, 1625 and dependence check module 1627, in the case that the branch among the 3 continuous instructions which are pointed to by tracker 1607's read pointer are predicted as taken. However, if the branch instruction is predicted as not taken as illustrated in the embodiment of FIG. 16A, the IRB 107 issues instructions starting from the instruction the read pointer 1631 points to up to the branch instruction together and its succeeding instructions of contiguous address to execution units 1621, 1623, 1625 and dependency check module 1627.

In the embodiment stated above, the IRB can issue multiple instructions to execution unit at each cycle. Because these instructions might contain multiple data access instructions, a data read buffer (DRB), which is used to store the instructions that execution unit might need, can be added into the system together with corresponding data needed by these data access instructions for execution unit. By this way, the pipeline stall time can be decreased or even be eliminated when it is waiting for data.

As used herein, another embodiment of processor system including DRB is illustrated in FIG. 18A. The decode module 1802 (whose structure and functionality is the same as the decode module 1617 in FIG. 16A or FIG. 17) which corresponds to IRB 1804, receives BN outputted by tracker on bus 1801, and generates control signal (i.e. IRB address 1803) that addresses IRB 1804. The entries (namely memory cell) in DRB 1808 put one-to-one corresponding with entries in IRB and they are both addressed by the control signal derived from decode modules 1802 which receives BN on bus 1801. Every entry in DRB 1808 consists of valid bit, data and multiple read ports in the embodiment hereto, each of which corresponds to an execution unit 1806. The structure and functionality of DRB 1808 and IRB 107 in embodiment of FIG. 16A or 17 are identical, i.e. each entry contains one write port and several read ports, and each read port provides data to an execution unit. The entry in DRB 1808, whose corresponding entry in the IRB 1804 passes LOAD instruction to execution unit 1806 through bus 1805, also passes corresponding data to execution unit 1806, or passes the data at another clock cycle alternatively based on the specific pipeline architecture. It could be implemented by adding delay unit between bus 1801 and decoder 1802 to adapt the timing sequence. Besides, it's feasible to utilize only one decoder 1802 and provide addresses to IRB 1804 and DRB 1808 through bus 1803 at the same time.

As used herein, another embodiment of processor system including DRB is illustrated in FIG. 18B. The number of entries in DRB 1818 is different from the number of entries in IRB 1814 herein, whereas its structure and functionality is the same as IRB 107 in embodiment of FIG. 16A or FIG. 17. There is an additional field in each entry of IRB 1814, which is used to store a data read buffer address (DRBA), and an additional DRBA decoder 1820, which is used to decode DRBA and select corresponding entry in DRB. The DRBA stored in the IRB entry is passed by bus 1809 and selects one entry in DRB 1818 after being decoded by decoder 1820 when this IRB entry issues instructions to execution unit 1806 through bus 1805. The data stored in the selected DRB entry is then also sent to execution unit 1806 at a proper pipeline cycle (which could be implemented by delaying the address pass on bus 1809). If an entry in IRB is replaced by other instructions, the DRBA in the replaced entry is read out and stored in a replacement module.

As used herein, another embodiment of processor system including DRB is illustrated in FIG. 18C. There is a data engine 1830 that fills entries in DRB herein and consists of an adder 1832, a stride memory 1836 and multiplexers 1838, 1842. A data address 1835, stride value 1837 and status bit 1839 comprise each entry in the stride memory 1836. It inspects the instructions every time the instruction block is filled, and respectively allocates an entry in stride memory and DRB for each data load instruction. This could be implemented by filling an available DRBA into IRB entry corresponding to the data load instruction, which is done by replacement logic, completing initialization of stride memory entry and DRB entry. As to the detailed implementation, part or even all contents of stride memory (data address 1835, stride value 1837 or status bit 1839 for example) could be stored in DRB 1818 or track table's corresponding entry. However, the embodiment in FIG. 18C illustrates independent DRB 1818 and stride memory 1836. The data address is computed according to the content of stride memory 1836, which is addressed by decoding the result of decoder 1820 on DRBA from bus 1815. Data engine 1830 is responsible for writing and updating the content of DRB 1818 and stride memory 1836. The status bit in stride memory 1839's entry and the valid bit in DRB 1818's entry are both set to '0' at the initial allocation.

The contents of stride memory 1836 and DRB 1818 which are addressed by DRBA on bus 1815 are read out when a data read instruction is issued the first time by IRB 1814 through bus 1805. The valid bit of DRB entry is '0' at this time, directing the execution unit to stall the pipeline and wait for data, whereas the status bit 1839 of stride memory entry is '0', directing the data engine 1930 to wait for data address 1831 to be generated by execution unit 1806 (or computed by the data engine itself, such as achieving the data address by adding the data base address in data read instruction to the data offset). The data from cache 1822, which is indexed by address 1831 selected by multiplexer 1842 a sent through bus 1843, is filled into corresponding entry in DRB 1818 through bus 1823, making the valid bit of this entry and status bit 1839 in corresponding stride memory entry to be set to '1'. Execution unit reads out data from DRB through bus 1807 and completes the pipeline operations if the valid bit of the wanted DRB entry is '1'. The valid bit is then reset to "0", and data address on bus 1843 is filled into corresponding entry's data address field 1835 in stride memory 1836.

If the data read instruction is issued again, the '0' valid bit of corresponding entry in DRB 1818 directs the pipeline in execution unit to be stalled and wait for the data to be filled into DRB 1818. The '1' status bit 1839 of corresponding entry in stride memory 1836 directs the data engine to wait for the data address on bus 1831 generated by execution unit again, based on that the data is read out from data cache 1822 and filled into the corresponding entry in DRB 1818, then setting its valid bit as '1'. Thus, execution unit 1806 may read out the data needed from bus 1807 and proceed in execution as stated before. Then the '1' valid bit and '1' status bit control the Multiplexer 1838 in data engine to select data address 1831 of this time to adder 1832. The adder 1832 subtracts the old data address 1835 stored in stride memory 1836 from data address 1831, and the result (difference, namely data stride) is stored in stride field 1837 in the entry of stride memory 1836.

Furthermore, the result 1833 of adding stride value in stride field 1837 to current data address on bus 1831 selected by multiplexer 1838 is the possible data address when the data load instruction is executed the next time. The resulting address is sent to bus 1843 after being selected by multiplexer 1842 and stored in data address field 1837 in the corresponding entry in stride memory 1836. Data engine reads out data from data cache 1833 in advance according to the data address on bus 1843, and then stores it in the DRB 1818. The corresponding status bit is set to '2' and valid bit is set to '1'. It is worth noticing that the corresponding entry in stride memory 1836 stores pre-calculated next data address and data stride value while the corresponding entry in DRB 1818 stores pre-fetched next data, as well as that both the entry in DRB 1818 and the entry in stride memory 1836 are pointed to by DRBA in the entry of IRB 1814 which corresponds to the data load instruction.

As a result, data needed by the data load instruction is already stored in DRB 1818 once the instruction is executed again, which is pointed to by DRBA in the entry of IRB corresponding to the instruction, and could be sent to bus 1807 at a proper time. Thus, execution unit 1806 does not have to wait to fetch data from data cache. Because the value of status bit 1839 is '2', the data engine 1836 again calculates the next data address for next time by adding data address 1835 to data stride 1837 to fetch data. It also updates the corresponding entries in stride memory 1836 and DRB 1818 and sets the valid bit to '1'.

The above methods and devices can improve efficiency of data loading in a loop. However, it is necessary to verify due to pre-fetching data on a possible data address. The embodiment in FIG. 18C utilizes comparator 1834 to compare possible data address 1835 with the real data address 1831 generated by execution unit when it executes the data read instruction, so as to verify the correctness of the possible addresses. It keeps the pre-fetched data, proceeds in the following operation, and keeps the status bit as '2' if these two addresses are identical, or otherwise sets the status bit to '1', re-computes data stride and repeats the above procedure from this state.

Embodiment with structure in FIG. 18A could also cooperate with data engine. One method is keeping the number of entries in stride memory exactly the same as that of the number of entries in DRB 1808 and preserving the relation of one-to-one correspondence (the number of entries in IRB, DRB and stride memory are all the same in fact). Therefore, address bus 1803 could seek address on DRB and stride memory at the same time. Another way is keeping the number of entries in stride memory different from that in DRB. It could also seek address on stride memory using bus 1803 using this method. However, the stride memory must be fully-associative because addresses on bus 1803 are not continuous (not all instructions are data read instruction), hence it needs an addressing mechanism in order to inspect which is the hit address and proceed following read or write operation.

The stated replacement logic is essentially a storage pool, storing available addresses of DRB entries. An available DRBA is filled into field 1816 once a new data read instruction is filled into IRB. If the existing entry in IRB is replaced by another data read instruction, its corresponding DRBA is sent back to storage pool.

As used herein, another embodiment of processor system including DRB is illustrated in FIG. 18D. The method employed herein is the same as that of the embodiment in FIG. 18B, providing data to execution unit by DRB, whereas the difference is in that the DRB in this embodiment could provide multiple data at the same time. IRB 1824 is similar to the one in embodiment of FIG. 16A or FIG. 17, and the structure of DRB resembles IRB, i.e. each entry contains multiple read ports and could provide data to different execution units at the same time. Specifically, the instruction bus 1805 and 1825 respectively provide instructions to execution unit 1806 and 1826. Furthermore, the DRBA corresponding to the entry on bus 1805 is passed to decoder 1820 through bus 1809, making DRB 1828 provide corresponding data to execution unit 1806 through bus 1807; whereas the DRBA corresponding to the entry on bus 1825 is passed to decoder 1822, making that DRB 1828 provide corresponding data to execution unit 1826 through bus 1827. By this method, the data corresponding to the data read instruction is sent to execution unit automatically by DRB when the instruction is issued to IRB.

Figure 19A:
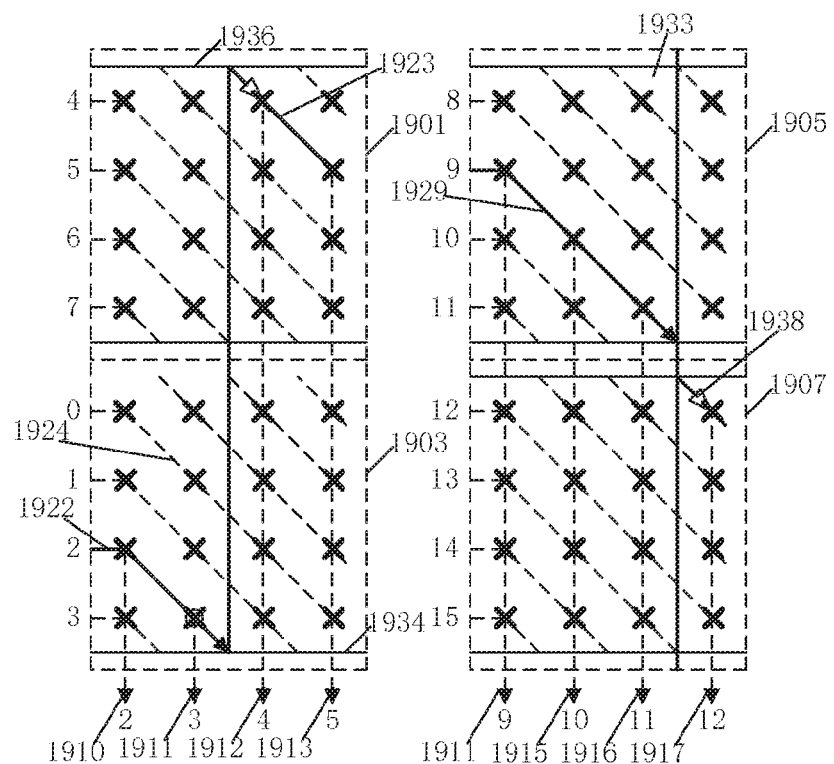
FIG. 19A illustrates an exemplary embodiment of the said multi-issue IRB of this disclosure.

Please refer to FIG. 19A for an embodiment of multi-issue IRB elaborated in invention hereto. The structure and functionality of IRB formulated in this embodiment is the same as the one in FIG. 16A. The IRB is denoted in the form of matrix or array and each row corresponds to an instruction memory cell, which is used to store a single instruction, and each column must contain at least one read port. Besides the above, each column also contains a bus connected to all read ports in different rows of the same column. The bus in each column is connected to a corresponding execution unit and dependency check module. In order to facilitate addressing, the IRB could be spliced into a few IRB blocks. The IRB fills IRB with the content of a single IRB block each time. Instructions are sorted by natural order of program in each IRB such as the arrangement from top down stated in former embodiment. And the execution unit is arranged by natural order of program too for the sake of executing the instructions in sequence. For example, the execution unit is arranged from left to right in this embodiment and the leftmost execution unit executes the first instruction in the instruction flow, and the next one executes the second instruction in the instruction sequence, and the rightmost one executes the last instruction. The leftmost execution unit, read ports to corresponding IRB, and bus will be named as the zero column, and the following ones will be respectively named as the first, second, third column.

The word-line is in the form of a straight line and is parallel or perpendicular to address-line in general memory so that it can read the content of a group of memory cells, for example a series of bits in instruction. However, the word-line is placed in the diagonal or zigzag direction in this embodiment, which enables the ability of reading content from multiple memory cells according to a specific sequence, such as reading multiple instructions by natural sequence in program. The IRB shown in FIG. 19A is an abstraction of IRB in the embodiment of FIG. 16. The IRB contains IRB block 1901, 1903, 1905 and 1907. These IRB blocks share buses 1910, 1911, 1912 and 1913, and each bus could transmit a whole instruction to corresponding execution unit respectively from the zero column to the third column. Every instruction block can be arranged at any IRB block because the IRB employs a fully associative structure. The cross marks in FIG. 19A denotes read ports, i.e. there are 4 read ports in each row. Although these ports correspond to the same instruction memory cell, they can issue instructions to execution units of all columns respectively. Besides, an IRB contains 4 lines in this example, and the digits leftward of the IRB indicate the instruction address of the corresponding instruction in memory cells. The diagonal word-line in FIG. 19A is driven by leftward decoder, as is in the case of word-line 1920, spanning IRB from the top left to the bottom right until reaching one of these boundaries. The word-line could receive token from the token bus at the top boundary of IRB in this embodiment. The word-line stated above could open all read ports connected to the instruction memory cells belonging to it. As a result, IRB could output succeeding instructions in sequence from the position the token is received no matter if the token comes from the left or right.

IRB shown in FIG. 19A of this embodiment could output 4 consecutive instructions to 4 execution units each clock cycle (no matter whether these 4 instructions are located in the same IRB block or not). For the IRB blocks 1901 and 1903 shown in FIG. 19A, suppose that the last instruction address executed in former clock cycles is '1', execution will proceed from instruction address '2' this cycle. IRB blocks 1905 and 1907 in FIG. 19A exhibit the status of the next clock cycle. Current cycle, hereafter referred to as CU address, is '2', while next instruction block address where the instruction block CU is located, is hereafter referred to as NX address, is '4'. As shown in FIG. 16A, the word-line 1922 is opened at the left boundary address '2' of IRB 1903 under the control of decoder in control module. Meanwhile, the next instruction control signal 1936 in IRB 1901 corresponding to the next instruction block is reset as '1', as depicted in the embodiment of FIG. 16A. Buses 1910 and 1911 output the instruction with address '2', hereafter referred to as instruction 2, and the instruction with address '3', hereafter referred to as instruction 3, respectively. It will stop the transfer towards bottom right when word-line 1933 reaches the bottom of IRB 1903. Despite that word-line 1922 intersects with the end control line 1934, it is hereafter referred to as the END control line, the token upon it will be inserted to token bus 1931 (denoted as solid arrow, and the intersection and injection could be implemented in OR gate 1647 in FIG. 16A). Notice that there are 3 token buses among 4 columns, while only the one used is displayed in the figure. The token bus is used to receive tokens from the left side, and then transfer it to the right side. The position of the token bus indicates which column the last instruction in the source instruction block corresponds to, and which column the first instruction in target instruction block corresponds to. At this point, token issued by the first column is transmitted to the second column through token bus 1931. Because only the next instruction block control line 1936, which belongs to block 1901, is '1' in the IRB, the token is received by this block. Thus token is transmitted to word-line 1923 when token bus 1931 intersects with next instruction block control line 1936 (denoted as hollow arrow, and the intersection could be implemented by AND gate 1637 in FIG. 16A). Buses 1912 and 1913 will respectively output instruction 4 and instruction 5 under the enablement of word-line 1923 hereafter. Execution unit will identify instruction 3 received from bus 1911 as a branch type and the branch target is instruction 9 after decoding these 4 instructions (as shown in FIG. 19A with circle denoting read port). Then execution unit will make the decision not to take the branch when executing instruction 3. As a result, execution unit will complete all operations in pipeline for instructions 2, 3, 4, 5.

However, all instructions issued after the branch instruction will be interrupted once execution unit makes the decision to take the branch. Instructions 4 and 5 in the second and third columns will be interrupted and no longer write to registers or memories in this case. The execution unit will only complete all operations of instructions 2 and 3 in the pipeline. Target address '9' will be transmitted to control module as CU address in order to enable block 1905 and validate word-line 1929 in it. Meanwhile, the start address of block 1905's next instruction block will be '12', leading to the validation of control line 1938 in the next instruction block control line of IRB 1907. Block 1905 will respectively output instructions 9, 10 and 11 through 3 read ports under the enablement of word-line 1929. As formulated before, token will be issued to token bus 1933 when word-line 1929 arrives at END control line 1905. When token bus 1933 intersects with next instruction control line 1938, token will be transmitted to word-line 1939 to enable the output of instruction 12. Instructions 9, 10, 11 and 12 will be issued to execution unit at the same time in this way.

IRB in FIG. 19A could issue 4 instructions automatically only if the control module provides CU and NX address. Based on the same idea, one could issue consecutive multiple instructions (these instructions may be located in the same IRB) at the same time, according to the description elaborated in this invention no matter how the issue width changes, as is the case of number of columns and execution units. The END control line is fixed at the bottom of each IRB in this embodiment and it will transmit the token to the token bus rightward when token arrives at it. This will be implemented through connecting the word-line towards the bottom in IRB with the corresponding OR gate in FIG. 16A of this embodiment. The stated OR gate will be used to drive the token bus between the column it is located and the rightward one.

Furthermore, the structure of embodiment elaborated in FIG. 17 could issue branch instructions, branch target instructions, and succeeding instructions in one clock cycle. Please refer to FIG. 19B, another embodiment of multi-issue IRB stated in this invention. The IRB in this embodiment is another abstraction of the one in FIG. 17. For the sake of further improving parallel issue efficiency of instructions, the IRB stated in this embodiment could select succeeding instructions of the following address of the branch instruction or the branch target instruction and its succeeding instructions according to branch prediction information of the branch instruction, and issue them together with the branch instruction itself to execution unit. This is different from the case in FIG. 19A's embodiment, where the branch instruction and its succeeding instruction of succeeding address are issued to the execution unit followed by clearing these succeeding instructions when branch taken. In this embodiment, means of disposal are the same as the one in FIG. 19A if there is no branch instruction among the issued instructions or branch predictor predicts the branch will not be taken, this will not be repeated here.

However, it does need another two addresses besides CU address and NX address once the branch is predicted as taken. One is branch source address, hereafter referred to as SO address, i.e. the address of branch instruction itself. If the control line, which SO address corresponds to, intersects with the word-line the token is located in, the token will be passed to the succeeding instruction of sequential address and be issued to the token bus. The other one is branch target address, hereafter referred as TG address. If the control line which TG address corresponds to intersects with the token bus where the token located, it can receive token from the token bus and pass it to the corresponding word-line, such as the complex gate 1731 shown in FIG. 17. Please notice that once the branch is predicted as taken in this embodiment, CU address will be '5', SO address will be '6' (namely instruction 6 is branch), TG address will be '3' and NX address will be '4' (the next instruction block mentioned here refers to sequential address next instruction block of instruction block where the branch target instruction located).

There are two different disposing methods according to the means of addressing next instruction block of branch target instruction block. In the first method, IRB only issues branch instruction, branch target instruction, and its succeeding instructions until the instruction block terminates rather than issue instructions in next instruction block with sequential address of instruction block where the branch target located in order to avoid conflict on the token bus between TG control line and NX control line when they are valid at the same time. The NX control line of IRB is completely invalid because NX address won't be transmitted to the control module, as formulated by former embodiment in FIG. 17. The second method employs an additional token bus between two columns in the vicinity. By this means, one token bus is used to transmit token to TG address and the other could transmit token to NX address at the same time. Besides, passing on word-line will be terminated by the time token arrives at branch source instruction (that is it intersects with SO control line) and the token will be issued to TG token bus when the branch instruction is predicted as taken. Although the branch source instruction is the last instruction in instruction block, token won't be issued to NX token bus at the time. The possible conflict is eliminated this way and TG token bus only correlates with TG control bus and NX token bus only correlates with NX control bus. Further description will elaborate as follows.

The word-line 1925 is valid from IRB's left boundary because CU address is '5'. Meanwhile, SO control line 1942, TG control line 1946 and NX control line 1948 are all valid according to corresponding address. Word-line 1925's enablement of corresponding read port, leads to the zero column outputting instruction 5 and the first column outputting instruction 6 (namely the branch instruction denoted as circle in FIG. 19B). Because word-line 1925 intersects with SO control line 1942, the token is issued to TG token bus 1962 (this could be implemented in triple state gate in FIG. 17). SO control line 1942 terminates the token passing procedure of word-line 1925 towards bottom right at the time (this could be implemented by inverted input of complex gate in FIG. 17), Therefore, despite the succeeding instruction 7's read port of the branch instruction 6's sequential address is on the word-line 1925, instruction 7 won't be issued. The NX token control bus 1962 will not interact with token of TG token bus 1962. When TG token bus 1962 intersects with TG token bus 1946, the token upon it will be issued to word-line 1921, which occurs in the second column outputs instruction 3. It stops when word-line 1921 arrives at bottom of block 1957, and because word-line 1921 intersects with END control line 1955, the token upon it (denoted as solid arrow in FIG. 19B and could be implemented by triple state gate in FIG. 16A) will be issued to NX token bus 1933. When NX token bus 1933 intersects with NX control line 1948, the token upon it will be issued to word-line 1951 (denoted as hollow arrow in FIG. 19B and could be implemented by AND gate in FIG. 17). Word-line 1951's enablement of corresponding read port leads to the third column to output instructions 3 and 4. By this way, instructions 5, 6, 3 and 4 located in different instruction blocks will be respectively output from the zero, first, second and third columns in the same clock cycle.

Figure 19B:
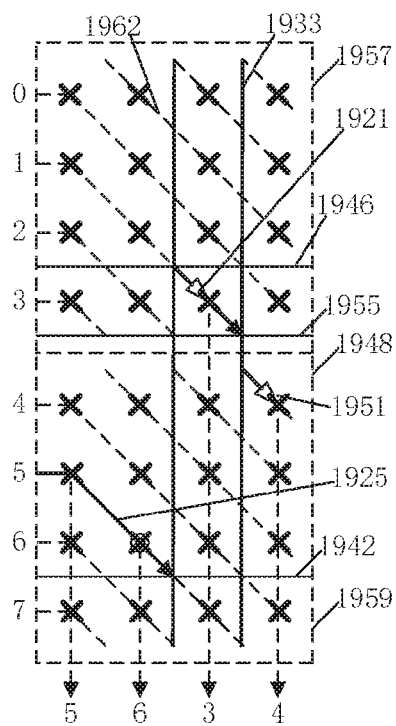
FIG. 19B illustrates another exemplary embodiment of the said multi-issue IRB of this disclosure.

Furthermore, the structure of IRB in FIG. 19B could issue multiple instructions (number of issued instructions is equal to the number of columns or execution units in structure) in parallel no matter if the branch instruction and its target instruction are located at the same IRB block. Control unit conducts IRB to complete correct operations with the result of branch transfer judgment provided to IRB at a reasonable time. Moreover, when track table issues the next instruction block's address of the current instruction block and target instruction's address of the branch in current instruction block, control unit needs to inspect whether the instruction block corresponding to these addresses have already been stored in IRB in advance as specified in this embodiment in FIG. 16A or 17. The word-line is passed along the diagonal from top left to bottom right in this embodiment. Functionality stated above could be implemented by logic gate in direction of word-line pass, as depicted in the embodiment of FIG. 17, while it is implemented by inserting token at the left or upper boundary of IRB in embodiment of FIG. 16A.

For the purpose of adapting processor system to use IRB to issue instructions, some minor changes could be made on the structure in this embodiment in terms of technical scheme stated in this invention. The proposed processor system will be named as lane processor for abbreviation in the following specification. Each lane consists of IRB, an execution unit, and a dependency check module between the adjoining lanes, which resembles the column in the previous embodiment. This is different from FIG. 16A or 17 in that the IRB corresponding to each lane has its own memory cell, control (decoder) module, and controller (tracker for example), while all columns in processor in embodiment of FIG. 16A or 17 (hereafter referred to as column processor) share the same control module and controller. In addition, there are configurable inter-lane buses between register files of different lanes, making it possible for register files of any lanes to accept or reject inputs from a neighboring lane.

In order to change the direction of word-line's passing, we can add a token multiplexer at the read port of IRB to select from 3 token sources as per the technical scheme of this invention. The stated token source is comprised of a token coming from control module that corresponds to the current lane (for token insertion), a token coming from left lane's read port with the same position as current lane (this causes current lane and its left lane to output the same instruction) and token coming from left lane's read port with upper position (this causes current lane to output next instruction of its left lane's read port). Accordingly, the selection of token source stated above respectively corresponds to MIMD flow processing mode, SIMD flow processing mode and ILP mode.

Figure 20A:
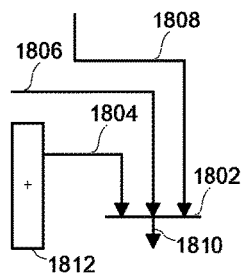
FIG. 20A illustrates an exemplary embodiment of the said token selector of this disclosure.

Please refer to FIG. 20A, an embodiment of token multiplexer described in this invention. Every read port is controlled by the output of a token multiplexer hereto. As in the case of token multiplexer 1802 in FIG. 20A, its first input 1804 comes from the current second address decoder 1812 of control model where it is located, its second input 1806 comes from the read port of left lane with the same location and its third input 1808 comes from left lane's read port with upper position. When token multiplexer of each lane selects input 1806, tracker provides the corresponding lane with relating address (such as CU address, SO address, TG address and so on) making it possible for each lane to execute instructions from different locations of IRB, hereafter referred to as column correlation for the configuration mode of token multiplexer. Only the tracker of the leftmost lane provides correlation address while other lanes accept tokens coming from left lane with the same position when token multiplexer of all lanes select input 1806 and Therefore, all lanes execute instructions at the same location in IRB. This configuration mode of token multiplexer is hereafter referred to as row correlation. Only the tracker belonging to the leftmost lane provides correlation address while other lanes accept token from corresponding left lane with the same position when token multiplexer of all lanes select input 1808 and Therefore, each lane executes neighboring instruction in IRB. The configuration mode of token multiplexer above is hereafter referred to as diagonal correlation. As used herein, lane processor could run in different modes through configuring the select signal in token multiplexer, and could make use of dependency check module and whether disconnect inter-lane bus.

Figure 20B:
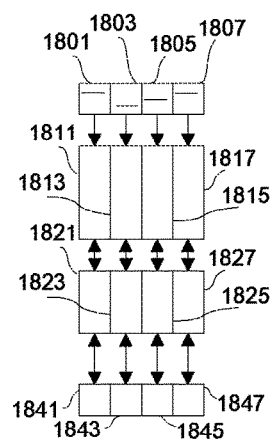
FIG. 20B illustrates an exemplary embodiment of the lane processor of this disclosure executed in MIMD mode.

Please refer to FIG. 20B, an embodiment of lane processor run in MIMD mode as stated herein. There are four lanes 2011, 2013, 2015 and 2017 in the lane processor system and each lane is comprised of an execution unit, load/store unit, IRB and register file in this embodiment. IRB 2001, execution unit 2011, register file 2021, load/store unit 2041 correspond to lane 2011, IRB 2003, execution unit 2013, register file 2023, load/store unit 2043 correspond to lane 2013; IRB 2005, execution unit 2015, register file 2025, load/store unit 2045 correspond to lane 2015; and IRB 2007, execution unit 2017, register file 2027, load/store unit 2047 correspond to lane 2017.

Token multiplexer is configured as column correlation (namely select token from control module), dependency check module is configured as not in use and inter-lane bus is configured as disconnected when processing MIMD flow. The IRBs of four lanes store different programs and control module of each lane provides correlating addresses to corresponding lanes under the control of independent trackers, making it possible for the four lanes to issue and execute different instructions in parallel. Register files of each lane respectively load data from or write data to data cache through corresponding load/store unit. Each lane can execute different programs at the same time based on different data sources because both inter-lane bus and dependency check module are disabled in this mode, namely program and data between different lanes are not correlated with each other, and thus implements functionality of MIMD flow processor.

Figure 20C:
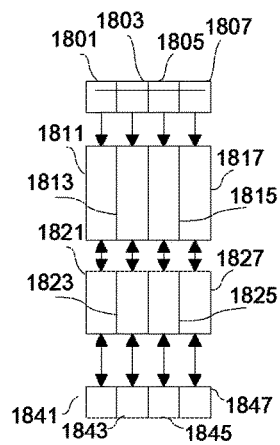
FIG. 20C illustrates an exemplary embodiment of the lane processor of this disclosure executed in SIMD mode.

As used herein, an embodiment of lane processor run in SIMD flow mode refers to FIG. 20C. Each module's structure and functionality in the embodiment herein is the same as corresponding modules in FIG. 20B. Token multiplexer is configured as row correlation (i.e. select token from left lane's port with same position), dependency check module is configured as disabled and inter-lane bus is configured as disconnected when conducting SIMD flow processing. Read instruction buffer of all four lanes and store same instruction block and provide same instructions to the lanes by the means of row correlation under the control of one tracker. Inter-lane bus and dependency check module are not used in this mode, Therefore, different data could be stored in register file and the load/store unit corresponding to each lane and respectively conduct read/write operation on different data address. All four lanes execute the same program while data in each lane could be different, and thus implement the same functionality as the existing SIMD flow processor.

Figure 20D:
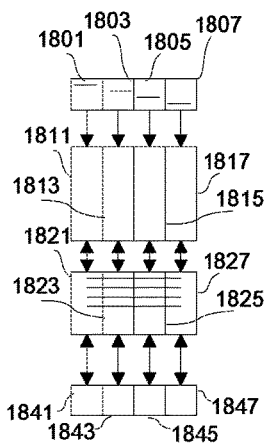
FIG. 20D illustrates an exemplary embodiment of the lane processor of this disclosure executed in ILP mode.

An embodiment of lane processor run in ILP stated herein is illustrated in FIG. 20D. The structure and functionality of each module is the same as corresponding ones in FIG. 20B. The token multiplexer is configured to diagonal correlation (namely select token from left lane at the upper position), dependency check module is enabled and inter-lane bus is configured as connected when proceeding in ILP. The IRBs of four lanes store the same instruction block of a program, and respectively provide 4 continuous instructions of the same program to four lanes by the means of diagonal correlation under the control of one tracker. The dependency check module is responsible for judging how many instructions of the four can be executed concurrently and to determine the CU address of next clock cycle. The execution unit of each lane fetches operands from register file of its lane, Therefore, computation results of each lane's execution unit must be transferred by inter-lane bus and then stored in register files of all four lanes. Thus, the fetched operands of each execution unit behave the same way as fetching operands from one shared register file. Every lane's load/store unit could load/store data with different addresses from data cache in the embodiment hereto. The multiple lane processor could implement functionality which resembles the existing multi-issue ILP processors under this mode. Structure and functionality of the lane processor hereto is the same as that of the IRB stated in embodiment of FIGS. 19A and 19B whereas each lane corresponds to one column in the former embodiment.

Issue following instruction or branch target together with instruction itself based on branch information of branch prediction in embodiment of FIG. 17. As used herein, there is another way of processing branch without performance loss and is independent with branch prediction information. The fundamental idea is to split the pipeline of execution unit into front-end pipeline and back-end pipeline, execute instructions with sequential address and branch target together with succeeding instructions at the same time using two front-end pipelines and issue one group execution result to back-end pipeline from two sets of instructions stated above based on the decision of branch instruction by execution unit. The front-end pipeline consists of phases from the first to the one that produces branch decision and back-end pipeline consists of all other phases under the situation of multi-issue.

Figure 21:
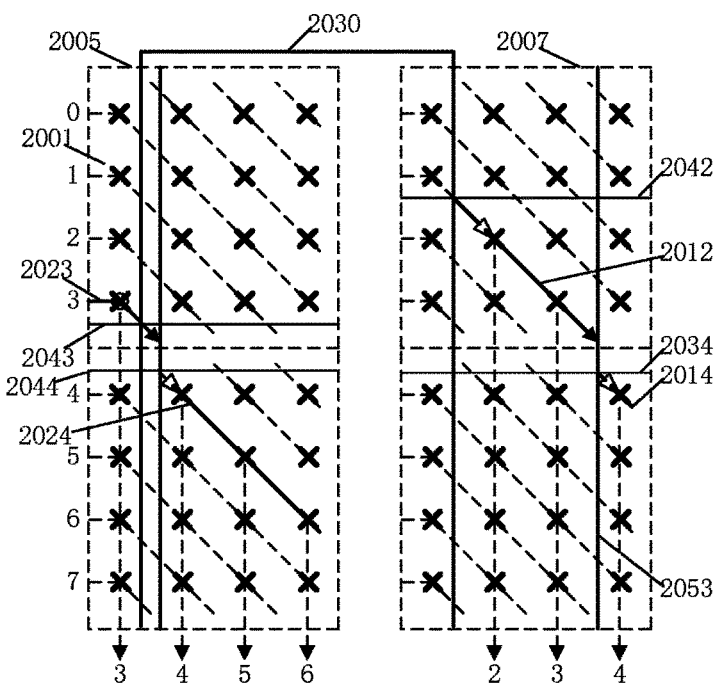
FIG. 21 illustrates an exemplary IRB structure of the said lossless branching.

An IRB implements branch process without performance loss as stated herein is illustrated in FIG. 21. Every column has its own pipeline to implement parallel execution of 4 instructions and is comprised of 2 front-end pipelines and 1 back-end pipeline. Specifically, each memory cell has 8 read ports and is divided into 2 groups, respectively corresponding to front-end pipelines P and Q in IRB of FIG. 21. Each set has 4 read ports, which are used to issue 4 instructions. As exhibited in FIG. 21, group 2005 and group 2007 each contain 4 ports of instruction blocks 2001 and 2003 and provide instructions to front-end pipelines P and Q. Only TG token bus in the corresponding column is connected while NX token bus and other control lines (such as SO control line, END control line, TG control line, NX control line and so on) are disconnected in the embodiment herein.

Process method is the same as that of FIG. 19A if front-end pipeline executes current instruction and there is no branch among these instructions. However, group 2007 provides front-end pipeline Q branch target and following instructions corresponding to the first branch in these instructions besides group 2005 provide instructions to front-end pipeline P by the means stated in FIG. 19A if there is branch in these instructions. As a result, the control module not only provides CU address, SO address, TG address to IRB but also provides the sequential next instruction block address of instruction block where the branch is located (hereafter referred to as NXS address) as well as the sequential next instruction block address of instruction block where branch target is located (hereafter referred to as NXT address). It is worth noting that the NXS address stated hereto is tantamount to NX address in FIG. 19A's embodiment and NXT address is tantamount to NX address in FIG. 19B's embodiment. The END control line is not displayed to facilitate reading.

As used herein, the CU address is '3' (corresponds to branch instruction, as denoted by circle in FIG. 21 and its target is instruction 2) and word-line 2023 is valid from the left boundary of IRB block 2001 which enables corresponding read port and makes the zero column output instruction 3. Meanwhile, SO control line 2043, TG control line 2042, NXS control line 2044 and NXT control line 2034 are all valid in terms of corresponding address. Because word-line 2023 intersects with SO control line 2043, the token is issued to TG token bus 2030. This embodiment is different from the former one in that SO control line 2042 doesn't terminate the token pass procedure towards the bottom right on word-line 2023. However, because 2023 has arrived at bottom boundary of block 2001 and intersects with corresponding END control line as used here before, the token (denoted as solid arrow in FIG. 21) upon it is issued to NXS token bus 2050. When NXS token bus 2050 intersects with NXS control line 2044, the token upon it is issued to word-line 2024 (denoted as hollow arrow in FIG. 21) and enables the corresponding read port. This leads to the first, second, and third columns to output instructions 4, 5, 6, and group 2005 provides instructions 3, 4, 5, 6 to front-end pipeline P of 4 execution units at the same time, which are the branch instruction itself and its following instructions with sequential address.

Meanwhile, the token on TG token bus is issued to word-line 2012 when TG token bus 2030 intersects with TG control line 2042, making the first, second columns to respectively output instructions 2 and 3. The word-line 2012 intersects with the corresponding END control line when it arrives at bottom boundary of block 2001 and the token upon it is issued to NXT token bus 2053 (this is denoted by solid arrow in FIG. 21). The token upon NXT token bus is transferred to word-line 2014 (denoted by hollow arrow in FIG. 21) when NXT token bus 2053 intersects with NXT control line 2034. Word-line 2014 enables corresponding read port, making the third column output instruction 4 and group 2007 output instructions 2, 3, 4, namely branch target instruction and its succeeding instructions with sequential address, to the last three execution units' front-end pipeline Q at the same time. Thus branch instruction and its succeeding instructions with sequential address are issued to front-end pipeline P, branch target instruction and its succeeding instructions with sequential address are issued to front-end pipeline Q in one clock cycle.

The back-end pipeline proceeds in execution with output from front-end pipeline P and discards result of front-end pipeline Q when the branch instruction is not taken, while it proceeds to execution with output from front-end pipeline Q and discards result of front-end pipeline P once the branch is taken (the branch instruction has already been executed and there is no need to proceed in execution in back-end pipeline).

Figure 22:
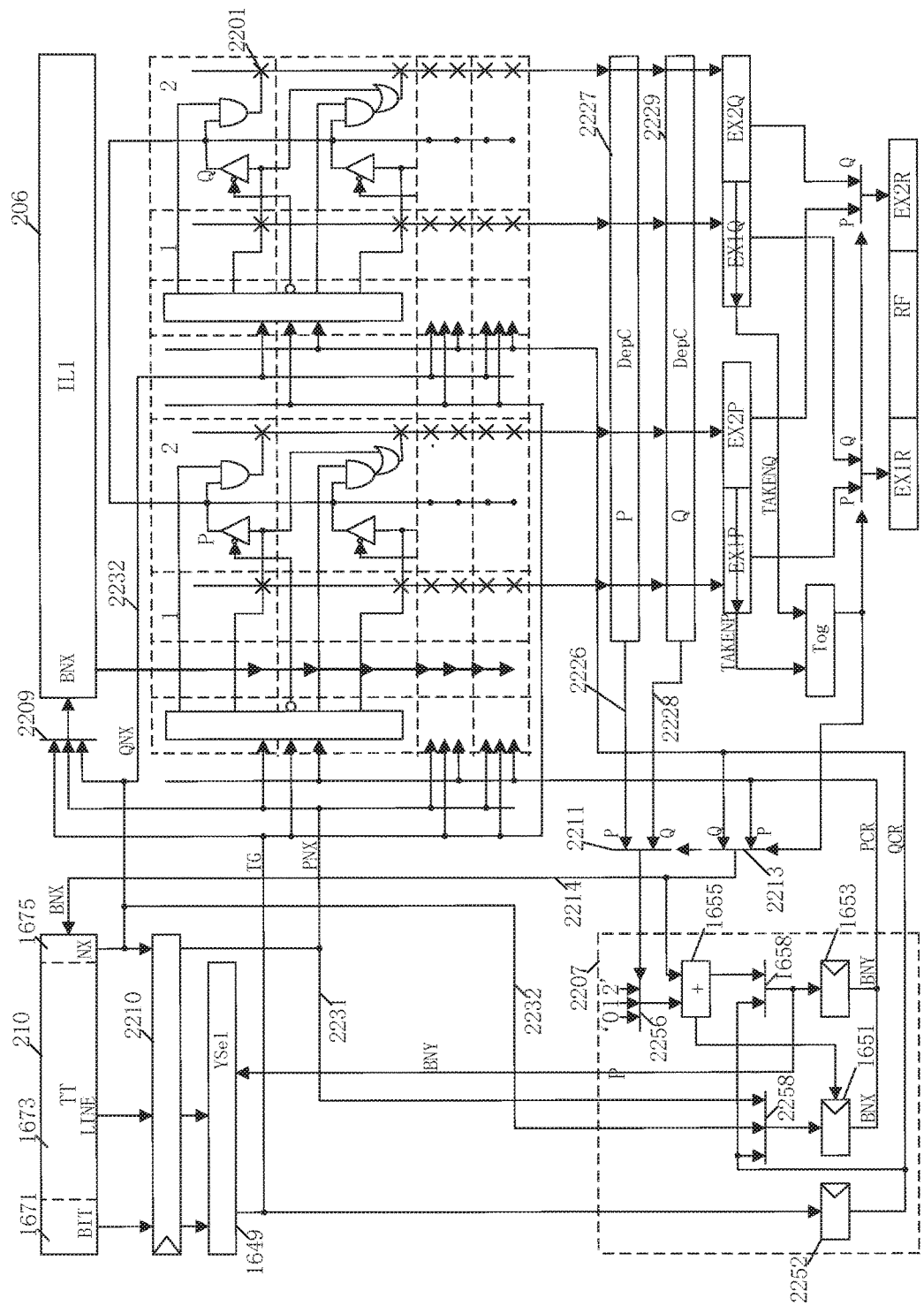
FIG. 22 illustrates an exemplary embodiment of lossless branching system that contains IRB.

As used herein, FIG. 22 displays an embodiment of IRB without performance loss in branch process. The structure and functionality of IRB 2201 is the same as the one in FIG. 21. The following paragraph is focused on the illustration of how control module generates correlation address and how to select execution result from front-end pipeline.

As used herein, the structure and functionality of track table 210 and branch target selection module 1649 is the same as FIG. 16A, with an additional track buffer 2210 to store the current track. Apart from registers 1651, 1653 and adder 1655 of tracker 1607 in FIG. 16A, tracker 2207 has an additional multiplexer 2258 and register 2252 which is used to store BNX and BNY of branch target. Input of tracker 2207's multiplexer 2256 are fixed at '0', '1' or '2', while embodiment in FIG. 16A are '1', '2' or '3'. There are two execution units in the embodiment herein, and each of them is comprised of 2 front-end pipeline (P and Q) and 1 back-end pipeline. Based on the result of branch decision in the last phase of front-end pipeline, it sends one result to back-end pipeline and selects inputs between multiplexers 2211 and 2213 so as to update the read pointer of tracker 2207.

As used herein, front-end pipeline P corresponds to continuous instructions starting from the current instruction. The front-end pipeline Q corresponds to branch target instruction if the first instruction of these two is a branch, or otherwise front-end pipeline Q doesn't work. It is worth noting that only the first instruction is a branch so the front-end pipeline be used because the maximum issue count of IRB 2201 is '2' in the embodiment hereto. As to other circumstances, the maximum issue count is '4'. For example, front-end pipeline Q is used if there is branch instruction in the former three instructions. Detailed operation procedure resembles the embodiment hereto. The following operation is the same as FIG. 19A once there is any branch in the instructions issued to front-end pipeline by IRB 2201. The below paragraphs focus on the explanation when instructions issued to front-end pipeline contain branch instruction.

The register 1651 and 1653 of tracker 2207 respectively store current instruction address's (namely CU address) BNX and BNY. The branch target address (namely TG address), which is comprised of BNX and BNY, is stored in register 2252. After the selection of multiplexer 2213, BNX of this TG address is transferred to track table 210 for addressing through bus 2214 to find corresponding row, and then read out its NXT address, send to IRB 2201 through bus 2232. Track read buffer 2210 could output NXS address directly and send to IRB 2201 through bus 2231. The control module of IRB 2201 is responsible for checking whether the instruction block corresponding to TG address, NXS address, and NXT address exist, and if not, multiplexer 2209 selects address corresponding to the instruction block which hasn't been stored and sends it to instruction cache 206, reads out the demanded instruction block and fills it into IRB 2201. Thus, IRB 2201 could output succeeding instructions of branch instruction and the branch target at the same time under the situation of output branch itself as stated in FIG. 21.

As used herein, dependency check module 2227 makes judgment between two instructions sent to front-end pipeline P and output control signal 2226 to multiplexer 2226 based on the increment of CU address at next clock cycle. If there is branch among the instructions sent to front-end pipeline P, dependency check module 2229 makes judgment of the correlation between the first branch and instructions before it (the first instruction as to this example) as well as correlation between instructions sent to front-end pipeline Q. It outputs control signal 2228 to multiplexer 2211 based on the increment of TG address at next clock cycle.

The multiplexer 2211 chooses output of dependency check module 2227 on bus 2226 as control signal of multiplexer 2256 in order to select the right increment of CU address and send it to adder 1655 when branch is not taken at front-end pipeline P. The possible increment of CU address could be '1' or '2', namely the increment is '2' when the two instructions don't correlate with each other in front-end pipeline P, otherwise '1'. The CU address chosen by multiplexer 2213 is sent to adder 1655 to compute the CU address of next clock cycle, and then write to register 1653 to update BNY of the CU address after being chosen by multiplexer 2658. BNX of NXS address (i.e. next instruction block's BNX) on bus 2231 is chosen by multiplexer 2258 and sent to register 1651. As illustrated before, if adder 1655 outputs carry bit, the carry bit controls the enablement of control register 1651, updating the value of register 1651 to next instruction block's BNX, or otherwise hold the value of register 1651. Thus, tracker 2207 generates new CU address. Besides, the output of adder 1655 is also sent to branch target select module 1649 in order to read out the first branch target address starting from the new CU address, i.e. new TG address, and then repeat above operations.

The multiplexer 2211 chooses output of dependency check module 2229 on bus 2228 as control signal of multiplexer 2256 for the sake of computing the correct TG address increment for adder 1655 when branch is taken in front-end pipeline P. Increment is '1' if branch instruction in front-end pipeline P doesn't correlate with instructions in front-end pipeline Q, or otherwise the increment is '0'. TG address's BNY of register 2252's output is selected by multiplexer 2213 and sent to adder 1655. New BNY of next clock cycle's TG address is then computed and written to register 1653, making that BNY of CU address update to the stated TG address of next cycle, which will be used as current address at next cycle and provide instructions from there. Multiplexer 2258 operates based on if the adder 1655 outputs carry bit. BNX of NXT address on bus 2232 is sent to register 1651 once there is a carry output, or otherwise BNX of TG address of register 2252. Write enable of register 1651 is valid when branch is taken and output of multiplexer 2258 writes to register 1651, making the BNX of CU address update and then repeat above operations.

Figure 23:
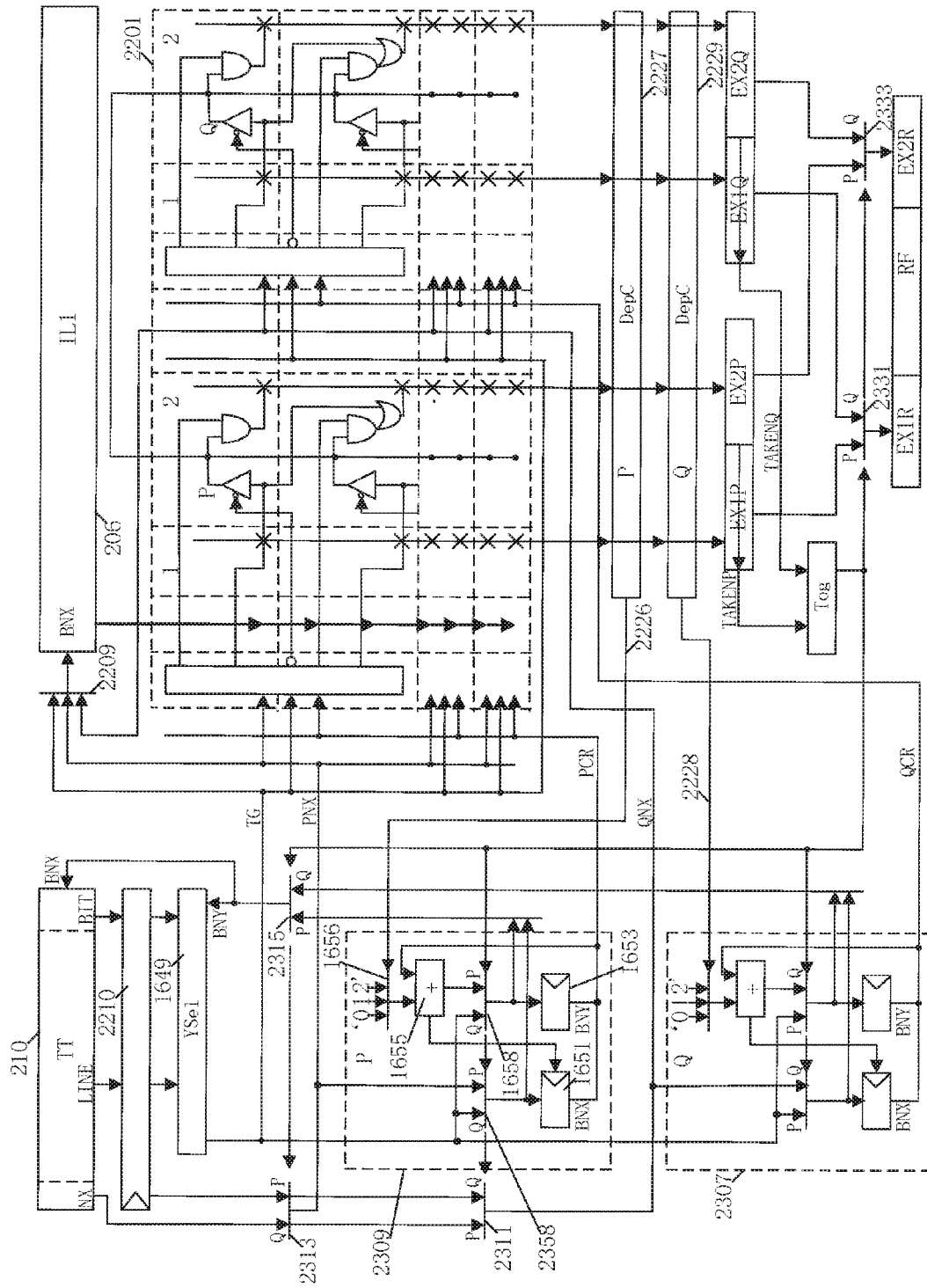
FIG. 23 illustrates another exemplary embodiment of lossless branching system that contains IRB.

Another embodiment of branch process without performance loss, which contains system of IRB, is illustrated in FIG. 23. Track table 210, track read buffer 2210, branch target select module 1649, multiplexer 2209, instruction cache 206, IRB 2201, dependency check module 2227, 2229 and execution unit in the embodiment herein are the same as corresponding components in embodiment of FIG. 22. The difference is in two trackers 2307 and 2309 substitute tracker 2207 in FIG. 22 and there is one additional controller 2305.

The structure of trackers 2307 and 2309 are exactly the same, while tracker 2307 corresponds to front-end pipeline P and dependency check module 2227, and tracker 2309 corresponds to front-end pipeline Q and dependency check module 2229. These two trackers consist of registers 1651, 1653, multiplexers 1656, 1658, 2358 and adder 1655. One front-end pipeline of P and Q provides succeeding instructions (the instruction count is '2' as used herein) starting from NX address, and if there is branch instruction, the other front-end pipeline provides succeeding instructions starting from the branch target address (TG address). Once the branch is taken, the situations of these two front-end pipelines are exchanged with each other. For ease of explanation, the tracker and front-end pipeline corresponding to CU address are hereafter referred to as CU tracker and CU front-end pipeline, while those that correspond to TG address is hereafter referred to as TG tracker and TG front-end pipeline.

As used herein, TG front-end pipeline doesn't work while CU front-end pipeline performs the same as front-end pipeline P in embodiment of FIG. 22 when there is no branch in the instructions sent to CU front-end pipeline by IRB 2201. The following is focused on the illustration when there is branch in the instructions sent to CU front-end pipeline.

Controller 2305 is responsible for the selection of execution result between front-end pipelines P and Q, and toggles the select signal every time branch is taken. Specially, controller 2305 controls the multiplexers 2331, 2333 between front-end and back-end pipelines based on the branch decision of CU front-end pipeline, i.e. issue execution result of CU front-end pipeline to back-end pipeline for further processing if branch is not taken or otherwise execution result of TG front-end pipeline is issued. Besides, each branch taken signal generated by CU front-end pipeline exchanges the two front-end pipelines, i.e. the original TG front-end pipeline becomes new CU front-end pipeline and the original CU front-end pipeline becomes new TG front-end pipeline. Meanwhile, original TG tracker becomes new CU tracker and original CU tracker becomes TG tracker. Controller 2305 also changes its status once the branch is taken, and controls multiplexers 2331, 2333 between front-end and back-end pipeline based on the result of branch instruction in new CU front-end pipeline.

Suppose that current CU front-end pipeline is P, and registers 1651 and 1653 of CU tracker 2307 store BNX and BNY of CU address. Multiplexer 2305 chooses this BNY and then sends it to branch target select module 1649 in order to read out address of the first branch starting from the CU address, i.e. TG address, which is then sent to IRB 2201 and TG tracker 2309, making that register 1651 and 1653 of TG tracker 2309 respectively store BNX and BNY of TG address. Meanwhile, BNX of the TG address is sent to track table 210 to read out NXT address and NXS address could be read out from track read buffer 2210. Thus, IRB 2201 can output succeeding instructions of the branch and its target in one clock cycle when it receives the above correlation address as said. Specifically, IRB 2201 outputs branch and its succeeding instructions to front-end pipeline P and dependency check module 2227 under the control of correlation address sent by CU tracker 2207, and outputs branch and its succeeding instructions to front-end pipeline Q and dependency check module 2229 under the control of correlation address sent by TG tracer 2209. These two trackers in the embodiment hereto can decide increment of CU address and TG address based on the control signals 2226 and 2228 sent by corresponding dependency check module before the branch decision is definite because these two trackers respectively store CU address (tracker 2307 as is the case) and TG address (tracker 2309 as is the case). And output succeeding instructions corresponding to the post-updated CU address and TG address to front-end pipeline P and Q for parallel execution until the branch decision yields.

If the branch is taken in front-end pipeline P, controller 2305 selects this result and controls multiplexer 2330 and 2331 between front-end and back-end pipeline to send the result from front-end pipeline Q to back-end pipeline for further execution. Then, control 2305 toggles its state and selects result of branch instruction in front-end pipeline Q as its output before next branch is taken. Meanwhile, front-end pipeline Q becomes CU front-end pipeline, front-end pipeline P becomes TG front-end pipeline, and tracker 2309 becomes CU tracker, tracker 2307 becomes TG tracker (TG tracker 2307 and TG front-end pipeline P don't work in the case that there is no branch instruction in CU front-end pipeline Q).

If the branch in CU front-end pipeline Q is not taken, controller 2305 controls multiplexers 2330 and 2331 between front-end and back-end pipeline to send the result of front-end pipeline Q to back-end pipeline for further execution. The branch is not taken; therefore, controller 2305 doesn't toggle its state and still selects the result of branch instruction in front-end pipeline Q as its output. The front-end pipeline Q remains CU front-end pipeline, front-end pipeline P remains as TG front-end pipeline, tracker 2309 remains CU tracker and tracker 2307 remains TG tracker and then continue the process of execution.

No matter if the branch in CU front-end pipeline is taken in following operation, it performs the same way as before and so will not be repeated here.

The IRB of each front-end pipeline has its specific read port and bit-line in processors containing multiple front-end pipelines. The same functionality implemented by token bus such as embodiments in FIGS. 21, 22 and 23 could be implemented through decoding address and controlling specific word-line so these ports could provide different instructions to different front-ends. As illustrated in FIGS. 24 and 25, an embodiment of processor implemented by decoding current, next and target address to drive word-line and thus making IRBs provide multiple instructions to multiple front-end pipelines. FIG. 24 illustrates structure of IRB used by address decode control method and a sample instruction snippet. FIG. 25 displays an embodiment of processor using this method.

Figure 24A:
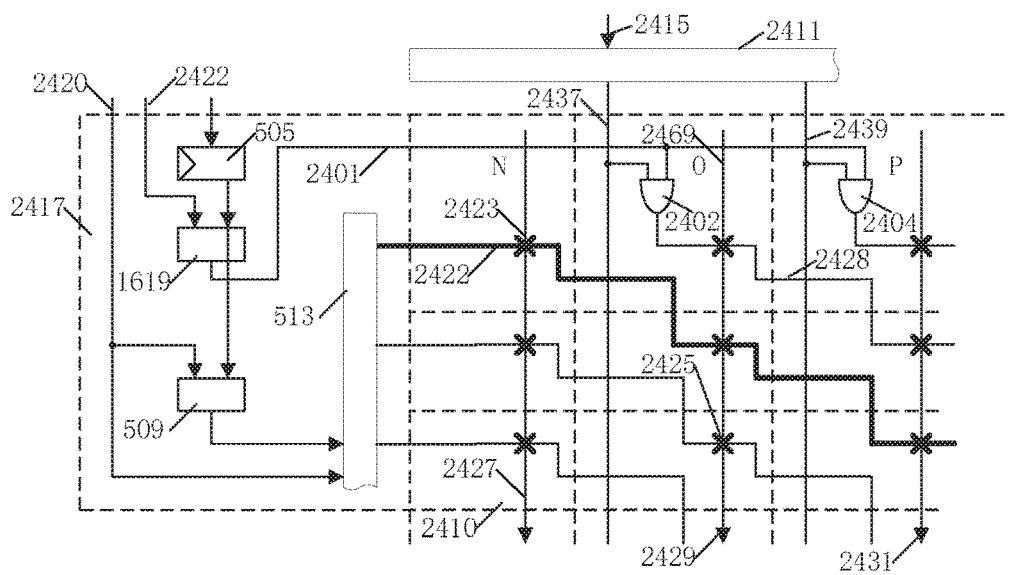
FIG. 24A illustrates an exemplary embodiment of the IRB that utilizes the said address decode control method of this disclosure.
Figure 25:
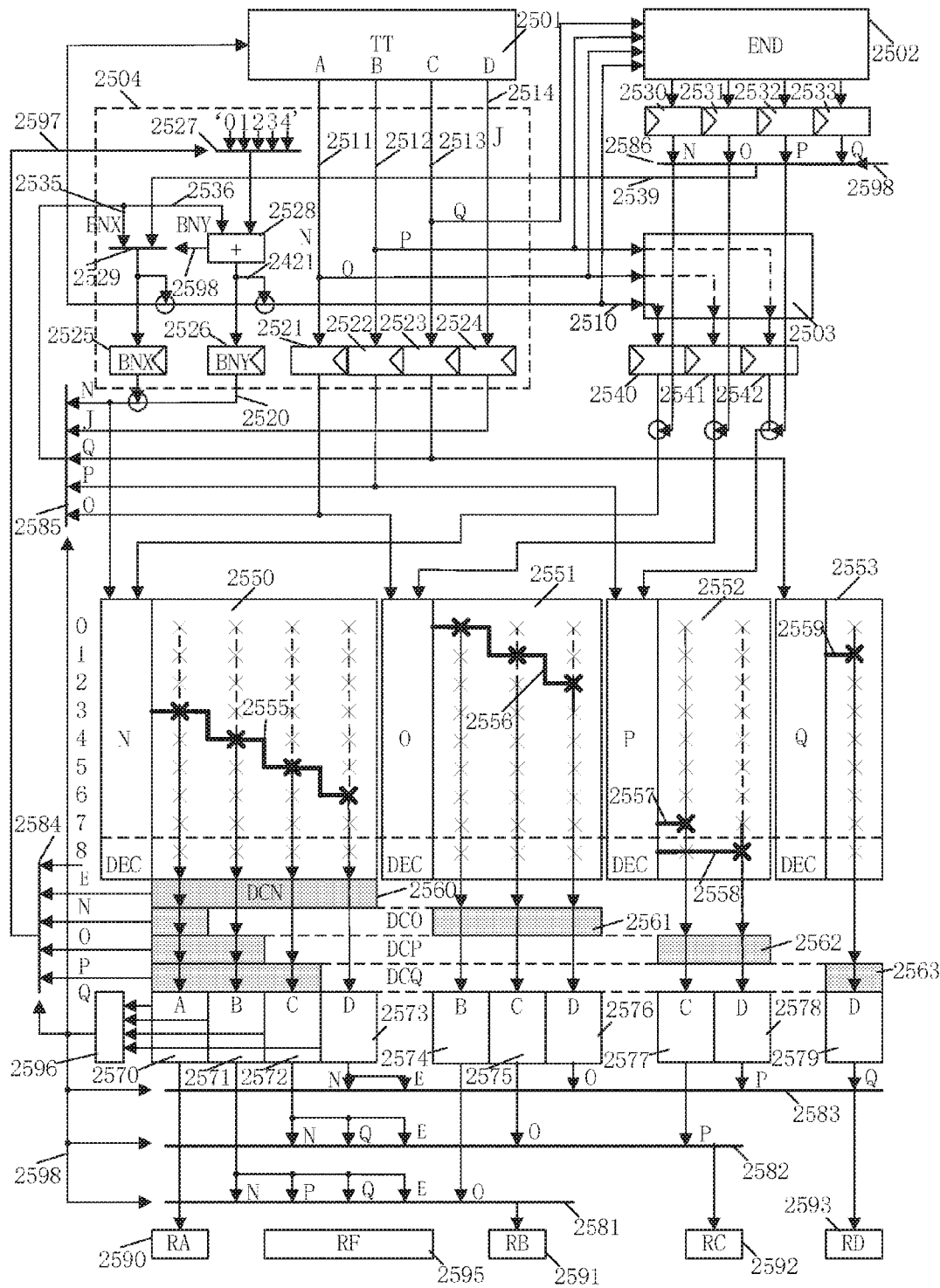
FIG. 25 illustrates an exemplary embodiment of the processor using the said address decode control method of this disclosure.

FIG. 24A is a structure of IRB used by embodiment in FIG. 25. As illustrated in embodiment of FIG. 16A, each instruction block of IRB 2410 contains one decoder module 2417 in which the structure and functionality of first address memory 505, current first address comparator 509, and current second address decoder 513 are the same as corresponding component in embodiment of FIG. 16A. A current address 2420 drives a zigzag (i.e. diagonal correlation) word-line 2422 and enables read ports 2423, 2425, and so on after matching and decoding by components above, sending a continuous instruction snippet to execution unit through bit-line 2427, 2429 and so on. The next block address comparator 1619's result against next block address bus 2422, as used in FIG. 16A, controls one input of AND gate (AND gate 2402, 2404 for example) of the first row in each IRB except for the leftmost column through NX control line 2401. Another input of these AND gates connects to token bus (such as bus 2437, 2439 and so on) and start instructions of current IRB fill the remaining columns of former IRB, which make the most of execution unit. The embodiment hereto differentiates with others that the token bus shared by all IRB block is driven by an independent column decoder 2411. The NX address's column address is transferred by processor's controller through bus 2415 to column decoder 2411 for the sake of driving token bus in the embodiment hereto. The column address is computed according to current address or lookup table, which is elaborated in embodiment of FIG. 25. All inputs of the AND gate (one is next block control line generated by next block address comparator 1619 compared with next block address, the other is token bus driven by column decoder 2411) in the first row of IRB enables the zigzag word-line driven by it and controls the instruction issue of the read port on it. Such as next block control line 2401 and token bus 2437 both are '1', AND gate 2402 drives bus 2432 and controls read port 2433, 2435 issuing instructions to execution unit through bit-line 2429 and 2431. The column address is the third dimensional address (after the first address (block address BNX) and the second address (inner block offset BNY)), which is hereafter referred to as the third address or BNZ.

Figure 24B:
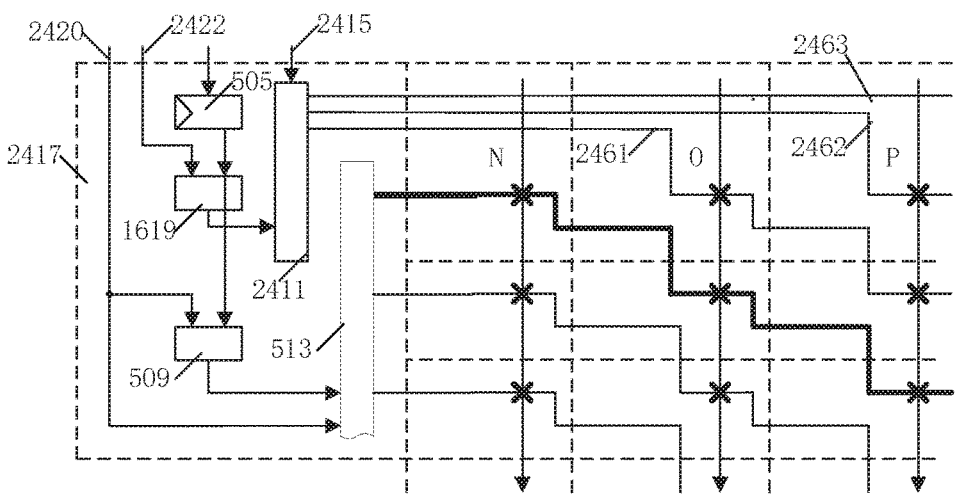
FIG. 24B illustrates another exemplary embodiment of the IRB that utilizes the said address decode control method of this disclosure.

Another structure of IRB without token bus is illustrated in embodiment of FIG. 24B. Every IRB's decoder contains one column decoder 2411 and the output signals 2461, 2462, 2463 of this decoder drive all zigzag buses directly starting from the first row (except for the first column). The way by which the IRB processes current instruction's address is the same as embodiment in FIG. 24A and will not be repeated. The next block address comparator 1619 enables column decoder 2411 in the decoder module if the next block address on the next bock address bus 2422 matches the first address in decoder module's first address memory 505. The column address BNZ on column address bus 2415 is decoded by the column decoder and then drives zigzag bus of corresponding column so as to issue instruction from the read port controlled by this bus. There is no need to use logic gate in the read port array stated hereto. The second address decoder 513 drives all zigzag buses from the leftmost column right directly and the column address decoder 2411 drives all zigzag buses from the topmost row down except for the leftmost column. The embodiment in FIG. 25 employs structure of IRB in FIG. 24B.

Figure 24C:
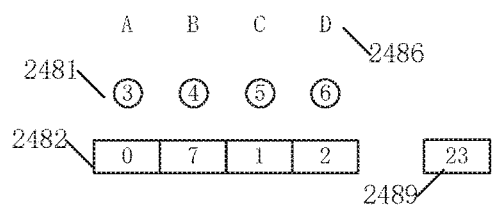
FIG. 24C illustrates an illustration of an instruction segment used by the IRB of this disclosure.
Figure 24D:
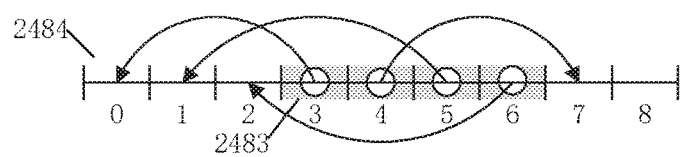
FIG. 24D illustrates an illustration of the instruction segment in address sequence axis

An instruction segment being executed is illustrated in FIG. 24C. Row 2481 consists of 4 sequential instructions to be issued at the same time and the instruction denoted by circle in the Fig. is branch instruction. All 4 instructions in this example are branch instructions and are located at the same IRB block, whose first address is '68' and next block address is '23'. The track table entries corresponding to the 4 instructions in row 2481 are demonstrated in row 2482. As illustrated in the Figure, the branch target of instruction 3 is '68.0', whereas instructions 4, 5, 6 are respectively '68.7', 68.1' and '68.2' (the address format denoted hereto is BNX.BNY). The track point 2489 is the end point of its track and it stores next block address '23'. For ease of explanation, the four different instructions issued at the same time are hereby defined as issued at different instruction issue slots by program sequence. As shown in row 2486, the instruction 3 is located at slot A, and instructions 4, 5, 6 are respectively located at slots B, C, D. FIG. 24D illustrates possible execution path of instruction segment such as 2481 with instruction address as axis. The point 2483 indicates the first instruction, the instruction 3, issued at one clock cycle and the shadowed area indicates the 4 instructions issued in the same cycle. The branch instructions denoted by the circle in this Fig. correspond to the ones in row 2484, while the arch derived from circle stands for a branch and the arrow which it points to represents branch targets corresponding to branch target addresses in row 2484. Instructions with addresses ranging from 0 to 7 have been filled into an IRB block and its first address BNX is '68', whereas instructions with addresses ranging from 8 to 15 have also been filled into another IRB block and it's first address BNX is '23'.

The execution of these 4 instructions starts from instruction 3 and there are 4 possible program execution paths at this cycle based on the different branch decisions of the former 3 branch instructions. Result of the 4th branch instruction influences next clock cycle and will be discussed later. The execution path will be branch instruction 3, branch target 0 and its succeeding instructions 1 and 2 if branch instruction 3 is taken, i.e. instruction 3, 0, 1, 2; and instruction 3's branch target instructions 0, 1, 2 are hereafter referred to as O way for ease of description. In a similar way, the execution path will be instructions 3, 4, 7, 8 if branch instruction 3 is not taken but branch instruction 4 is taken, and instruction 4's branch target instructions 7, 8 are hereafter referred to as P way. By the same reason, the execution path will be instructions 3, 4, 5, 1 if branch instruction 3 and 4 are not taken but branch instruction 5 is taken, and instruction 5's branch target instruction 1 is hereafter referred to as Q way. Finally, the execution path will be instructions 3, 4, 5, 6, which are hereafter referred to as N way if all these three branch instructions are not taken. The succeeding instructions 7, 8, 9, 10 will be executed at next cycle if instruction 6 is not taken which is hereafter also referred to as N way, or otherwise succeeding instructions 2, 3, 4, 5 which are hereafter referred to as J way. The N way and J way are different execution paths in next clock cycle but their difference does not affect instructions executed in the current cycle. As long as sufficient execution units and corresponding IRB read ports and bit-lines are provided for each possible execute paths during one cycle, all possible instructions that may be executed could be issued to multiple front-end pipelines at the same time and then selected by the branch decisions, only part of the possible instructions are sent to back-end pipelines for further execution.

Please refer to FIG. 25, which is an exemplary embodiment that can issue 4 instructions in parallel, and determine the program execution flow based on branch decisions on the branch instructions within the issued instructions. For ease of description, the execution unit pipeline of the embodiment has 3 stages: D pipe for instruction decode, E pipe for execution, and W pipe for write back. The method of this embodiment can be applied to pipelines of other forms and organizations. Instruction issued by IRB 2550, instruction decode, dependence check, branch decision and RF read are all performed in pipe stage D. The data engine shown in FIG. 18 will fill data into data read buffer DRB (not shown in FIG. 25) ahead of time. Under the control of IRB, DRB provides data at pipe stage E (bypass for execution) and at pipe stage W (for filling RF when executing load instructions); therefore, pipeline does not need the usual data access stage M.

The track table 2501 in FIG. 25 is different from previous embodiments. The track table can output the table entry 2511 pointed out by read pointer and the three sequential following table entries, 2512, 2513 and 2514, at the same time to provide up to 4 branch targets the 4 sequential instructions may point to. The End track point memory 2502 is detached from track table, but nevertheless stores its address content by the same row address as that in track table, and the content is updated at the same time as the corresponding row is updated in the track table. It has 4 read ports and outputs 4 End track points based on 4 BNX address inputs in parallel. 2503 is column address generator, it generates the column addresses corresponding the Next block addresses (those provided by End track point memory) based on the 4 input addresses. Registers 2530, 2531, 2532 and 2533 store the said 4 Next block addresses, and registers 2540, 2541, 1542 and 2543 store the corresponding column addresses. Way priority code 2598 controls multiplexer 2586 selecting one of the Next block BNX from the outputs of registers 2530, 2531, 2532 and 2533, the output of multiplexer is sent to one of the input of multiplexer 2529 for calculating the Current address for next cycle. In addition, the Next block address outputted by registers 2530, 2531, and 2532 are sent to Next block address comparator 1619, and the column addresses outputted by registers 2540, 2541 and 2542 are sent to column address decoder 2411, in IRB

2550, 2551 and 2553 to jointly control the zigzag word lines in a plural number of Next block IRB blocks. In this embodiment, register 2525, 2530, 2531, 2532 and 2533 store BNX; register 2526 stores BNY; registers 2521, 2522, 2523, and 2524 store both BNX and BNY, registers 2540, 2542, 2542 and 2543 store BNZ.

Tracker 2504 is different from before in that it can provide the current instruction address, and all the branch targets of branch instructions within 4 instructions at the same time starting with the current instruction. Specifically, registers 2525, 2526 respectively store the current instruction's first address BNX and second address BNY; register 2521, 2522, 2523 and 2524 store branch target addresses (BNX and BNY) 2511, 2512, 2513, 2514 of the current instruction segment (4 in this embodiment) outputted by the track table. In this example, the 4 BNXs are '68', four BNYs are respectively '0', '7', '1', '2'. The output of register 2525 (BNX) and 2526 (BNY) are joined together into bus 2520 (in the figure circle and arrow represent the two buses joined together). Outputs of registers 2521, 2524, 2523 are sent to all of the first address comparators 509 and the current second address decoder 513 in IRB 2504, the enabled 513s drives multiple zigzag word lines.

The outputs of bus 2520 and registers 2521, 2522, 2523, 2524 are selected by multiplexer 2585, which is controlled by branch decision. The first address BNX portion 2535 of multiplexer 2585's output is sent to the other input of multiplexer 2529; the second address BNY portion 2536 is sent to adder 2528 and added to the increment amount provided multiplexer 2527, which is under the control of dependency checker's detection result 2565. The sum of the adder is used as the new current second address BNY and stored into register 2526. Adder's carry output signal 2538 controls multiplexer 2529. When there is no carry out, multiplexer 2529 selects the current first address 2535; when there is carry out, multiplexer 2529 selects the Next bock's first address 2539; the output of multiplexer 2529 is the new current first address BNX and is stored into register 2526.

Multiplexer 2529's output and adder 2528's output are also joined to become read pointer 2510 to control the reading of the track table 2501. Read pointer 2510 (the current address of next cycle) and track table 2501's outputs 2511, 2512, 2513 (branch targets of instructions 1, 2, 3 in next cycle) are sent to End track point memory 2502 to read out the Next block address of each address; and are also sent to column address generator 2503. Column address generator generates the corresponding column address. The current address' Next block address is stored in register 2530, and its corresponding column address is stored in register 2540. The Next block addresses of 2511, 2512, and 2513, which are the branch target address of the first, second, and third instructions of the current instruction segment, are stored into registers 2531, 2532, and 2533, and their corresponding column addresses are stored in registers 2541, 2542 and 2543.

Column address generator generates corresponding column addresses based on the Current address of branch target address input in the following way. Define number of rows in every IRB block (number of storage entries) as n; block offset address (second address) as BNY, which has value 0~n−1, the row on the top is row 0; there are m columns in total, BNZ is the column address which have value from 0~m−1, the left most column is column 0; then the column address can be calculated by the following formula: BNZ=n−BNY, BNZ is invalid if larger or equal to m. For example, when n=8, m=4, w=4, BNZ=8−6=2. BNZ<4 Therefore, BNZ is valid. The meaning is that address '6' is decoded and drives zigzag word line, the instruction that corresponds to address '6' is issued from column '0', the instruction that corresponds to address '7' is issued from column '1', at this time the zigzag word line terminates as it reaches IRB block's lower boundary. At the same time, decoding of Next address points to the first instruction of the Next instruction block, the only thing that needs to be known is which column the instruction should be issued from to fully utilize processor resources and avoid collision with instructions issued by the current IRB. At this time, the column decoder 2411 in the Next block IRB block decodes column address BNZ=2 and drives the zigzag bus starting in the second column so the first instruction in the IRB block (BNY=0) is issued from the second column, the second instruction (BNY=1) is issued from the third column. If BNZ larger or equal to m, the generator generates an invalid signal which controls all column decoders 2411 so that they don't drive any zigzag word lines, because under the circumstances, the current IRB block issues instructions to all columns at the same time. The result of the above calculation can be placed in a reference table to replace calculation. Take the afore conditions as example, when BNY=0~4, BNZ=invalid; when BNY=5, 6, 7, BNZ=3, 2, 1. The said method is valid when n>m or n=m. Operations under other conditions can be deduced by analogy.

IRB 2550, 2551, 2552, and 2553 are 4 groups of IRBs like the structure of FIG. 24B. Among the four, IRB 2553 does not need to have Next block address decoder. Based on the dependency between the instructions, dependency checker 2560, 2561 2562 and 2563 provides signal 2597 to tracker 2504 to select the increment to determine the initial Current address in the next cycle. 2570~2579 are 10 front-end pipelines. Under the control of branch decisions, multiplexers 2581, 2582 and 2583 select outputs of the front-end pipelines for the further execution by the back-end pipelines 2590 etc. There are in total four rear-end pipelines 2590, 2591, 2592, and 2593 that support parallel execution of 4 instructions. RF 2595 is shared by all front-end pipelines and rear-end pipelines. Instruction being processed by front-end pipeline 2570 controls the fetch of data from RF 2595, and the data is sent to rear-end pipeline 2590 for further processing. Instructions being processed by front-end pipeline 2571-2579 controls the fetch of data from RF 2595, and the data together with the corresponding operation control obtained through instruction decoding are selected by multiplexers 2581, 2582, and 2583. The selected data and operation control are sent to rear-end pipeline 2591, 2592, and 2593 for further processing. The execution result of the instruction selected to be completed in the rear-end pipelines are written back into RF 2595.

There are in total 10 front-end pipelines because there are common paths, which can be shared by the said 4 execution paths determined by branch decision. For example, all 4 paths need to execute the first instructions in the instruction segment (instruction 3 in this example), Therefore, the first instruction in the segment only needs 1 front-end pipeline, not 4, to process. The second, third, and fourth instructions in the segment respectively need 2, 3, 4 front-end pipelines. The 4 instructions that are processed in the same cycle are in the same instruction execution slot. For ease of explanation, respectively name the instruction execution slots the 4 sequential instructions issued in the same clock cycle would occupy as slot A, B, C, and D in the order of instruction execution sequence. Slot A only has one choice, instruction 3 in the example in FIG. 24C, D; and slot B has two choices, instruction 4 (instruction 3 does not branch) or instruction 0 (instruction 3 branches); by the same reason, slot C has 3 choices, and slot D has 4 choices. Every instruction possibly executed in an instruction slot has its own designated front-end pipeline. Such as the A, B, C, D marked on front-end pipeline 2570 and etc indicates for which issue slot the front-end pipe line is designated as shown in FIG. 25. Rear-end pipeline 2590, 2591, 2592 and 2593 are marked as RA, RB, RC and RD to indicate each executes the instruction after branch decision selection in A, B, C, D instruction slots respectively. RF 2595 is shared by the front-end and rear-end pipelines of all of the instruction slots.

Because there may be multiple instructions issued in an instruction slot, for ease of explanation, define way as the possible different program execution paths due to branch instructions. First, define N way as the execution path in which the plural number of instructions in slots A, B, C are either non branch instructions or branch instructions that do not take the branches, there are 4 instructions in this cycle; presume instruction A is presumed as taken branches, then all the needed instructions from hereon are named O way, in this cycle there are 3 instructions; presume A instruction does not branch, but B instruction branches, then the instructions needed hereon are named P way, there are two instructions in this cycle; if instructions A and B do not branch, but instruction C does branch, then the needed instruction hereon is named Q way, in this cycle there is one instruction. A, B, C instructions do not branch, but the instructions needed by instruction branch D are named J way, in this cycle there are 0 of these instructions. Please note that the outputs of track table 2511, 2512, 2513, 2514 are the corresponding track table entries of A, B, C, D slot instructions in N way, the content is each instruction's branch target, and also the starting point of O, P, Q, J ways.

The third address BNZ can be marked with the alphabet of the instruction slot, to distinguish it from the number in the first address, second address. In addition, the algorithm of the said third address generation should be revised a bit to meet the definition of an instruction slot in this embodiment. The third address obtained by the original formula is based on the number of columns from which the instructions is issued. If the instruction pointed to by the Current address is not issued in column zero, then the third address calculated should be compensated. The formula is BNZ=n–BNY+Z, here Z is the column number (column address) of issuing based on Current address. Here, define the column number of slot A as '0', the column number of slots B, C, D as '1, 2, 3' for ease of calculation. But the third address in this embodiment is marked with alphabet. Each input in the column address generator 2503 occupies a specific issue slot, so the column address Z can be determined based on the specific input. Such as the address on input 2510 is the Current instruction address in Next cycle, and it belongs to N Way, and issues from slot A, Therefore, the Z for this input is '0'. The address on input 2511 is the branch target of the slot A instruction address in Next cycle, and it belongs to O Way, and issues from slot B, Therefore, the Z for this input is '1'. By the same reason, the address on input 2512 is belongs to P Way, and issues from slot C, Therefore, the Z for this input is '2'.

Dependency checker 2560~2563 has a structure similar to the dependency checker in FIG. 11, but the source of the instructions to be detected are slightly different. N way's structure and connections of dependency checker 2560 are the same as that of the dependency checker in FIG. 11, the RF address being examined is from the 4 contiguous instructions in N way. The fundamental structure of O way's dependency checker 2561 is similar to the dependency checker 2560, in that the last three instructions from the O ways of slots B, C, and D, and the first instruction comes from A slot's N way. The shadowed area in FIG. 25 shows the slot instructions that have to be examined by dependency check. P way's dependency checker 2562 examines the correlation of instructions of N way of slots A and B, and the P way of slots C and D. Q way's dependency checker 2563 examines the correlation of instructions in N way of slots A, B, and C, and D slot's Q way. Each dependency checker's result also has to be revised. For example, the first instruction O way issues is from slot B, if dependency checker 2561 does not detect any dependency, Therefore, increment value should be '3'; if slot D's instruction has dependency, the increment value is '2'; if instruction in slot C has dependency, the increment value is '1'; if instructions in slot B has dependency the increment value is '0', the next cycle should start issuing from slot B's instruction. By the same reason, the sources of dependency checker 2562 are N way of slots A and B and P way of slots C and D, and can correspondingly produce increments '2' (no dependency between instructions), '1' (slot D has dependency), and '0' (slot C has dependency). By the same reason, the sources of dependency checker 2563 are N way of slots A, B, C and Q way of slot D, and can correspondingly produce increments '1' (no dependency between instructions) and '0' (slot D has dependency). Here presumes branch address itself will change processor state, and thus create dependency with later instructions. If not so, introduce the instruction types in tracker register 2521, 2522, 2523 into dependency check, and disable dependency check between branch instructions and instructions in the issue slots following them. The increments outputted by all 4 dependency checkers are selected by multiplexer 2584 which is controlled by branch decision, the output 2597 of 2584 controls tracker's multiplexer 2527 to provide appropriate increments for adder 2528.

The IRB in FIG. 25 is organized by way for ease of explanation. If it is organized by slot, the principle and the result would be the same, and is Therefore, not repeated here. IRB 2550 corresponds to N way and has 4 issue slots A, B, C, and D as indicated by the marks on the corresponding front-end pipelines connected to the bit lines of each slot; each slot has a column of read ports linked together by a bit line, which issues instructions to the corresponding front-end pipeline. IRB 2551 corresponds to O way and has 3 issue slots in total (slot B, C and D). IRB 2552 corresponds to P way and has 2 issue slots in total (slot C and D). IRB 2553 corresponds to Q way and has 1 issue slot (slot D). Every time N way's IRB 2550's decoder 2417 issues, it drives zigzag word line. Whether or not the corresponding decoders of IRBs 2551, 2552, and 2553 drive word lines, depends on if the instruction issued by N way is a branch instruction or not. If N way's slot A is a branch instruction, the instruction type in register 2521 is branch. Then the decoder in O way IRB 2551 decodes the branch target address in register 2521 and drives its word line; it does not drive word line if the type is not branch. Because if slot A has no branch instructions, then it does not have branch targets, so O way does not need to be issued. By the same principle, the drive of word line in ways P and Q depends on if N way instruction in slots B and C is a branch instruction (see if the instruction type in register 2522, 2523 is branch or not). Branch type information is provided by reading out a table entry from track table. In this embodiment, the read ports are directly controlled by word lines, which are configured as zigzag word lines, the read ports do not need to be controlled by logic gates in the embodiment of FIG. 16.

When executing the instruction segment in FIG. 24C, initial conditions are that the instruction block with instruction addresses 0~7 is already in an IRB block, and the address in IRB block's first address register 505 is '68'; the instruction block with instruction addresses 8~15 are already in another IRB block, and the address in the IRB block's first address register 505 is '23'. In the previous clock cycle, read pointer 2510's first address BNX is '68', the second address is '3' (circle and arrow represents the two buses joined together). Using read pointer '68.3' as address, read four contiguous table entries starting from the 3rd table entry from track table 2501's row 63; the content of table entries in FIG. 19A, the branch target addresses '68.0', '68.7', '68.1', '68.2' are respectively read from buses 2511, 2512, 2513, and 2514 and sent to the input of registers 2521, 2522, 2523, and 2524. Here the address format is BNX.BNY. Each of the first instruction address BNXs on buses 2510, 2511 and 2512 are sent to End track point memory 2502 to read out the corresponding Next block address, while each second address BNY are sent to column address generator 2503 to calculate the correspondent column addresses. The BNX addresses on bus 2510~2512 are all '68', and the content of memory 2502's row 68 is '23', so End track point memory 2502's 3 outputs are all '23'. The second addresses of the current addresses '3' and '0' both produce invalid third addresses BNZs. The second address '7' should produce column address '1', but the input address from bus 2512 has a Z of '2', there for BNZ=8−7+2=3, then the third address BNZ is 'D'. Therefore, the inputs to registers 2530, 2531 and 2532 are '23', '23', and '23' in BNX format; inputs to registers 2540, 2541 and 2542 are 'x', 'x', and 'D' in BNZ format, where 'x' means invalid.

After the clock signal updates tracker registers and the Next block address register, value '68.3' on bus 2520 which is the outputs of register 2525 and 2526 joined together, is sent to N Way IRB 2550 in the current clock cycle. The value is matched by decoder's first address comparator and decoded by the second address decoder, which drives zigzag word line 2555, to issue instructions 3, 4, 5, 6 each in slots A, B, C, D along N Way. The Next bock address in N way, that is register 2530's output '23' and register 2540's output 'x', is invalid, Therefore, after decoding in column decoder 2411 does not drive any word line. At the same time, register 2521's output '68.0' is sent to O Way's IRB 2551. After being matched and decoded by decoder, it drives zigzag word line 2556, and issues instructions 0, 1, 2 along the O way of slots B, C, and D. The Next bock address of the O way, registers 2531's output '23' and register 2541's output 'x', is invalid, Therefore, no word lines are driven after decoded by the O Way decoder. At the same time, register 2522's output '68.7' is sent to P way IRB 2552, after being matched and decoded by decoder, drive zigzag word line 2557. After issuing instruction 7 along way P slot C, the word line terminates when it reaches IRB block's lower boundary. Next block address of the P Way of register 2532's output '23' and register 2542's output drives word line 2558 after the decoding in P way decoder, issue instruction 8 from row '0' in slot D in the Next block IRB block in P way. At the same time, register 2523's output '68.1' is sent to Q way's IRB 2553, and after matching and decoding by decoder, decoder drives word line 2559 and issues instruction '1' along Q way's slot D. Q way only has one issue slot D and has no possibility to cross IRB block boundary, Therefore, does not accept Next block address and column address.

Each branch decision is independently made in the front-end pipelines of slots A, B, C, D for instructions 3, 4, 5, 6 in N way. The branch decision outputted by a front-end pipeline is 'taken' only when the instruction being processed by the front-end pipeline is a branch instruction, and the branch is decided as taken and the instruction does not have dependence. Under other circumstances the branch decision would be 'not taken'.

The N way branch decision results of 4 slots are sent to priority encoder 2596 and encoded as way priority code 2598. Priority encoder 2596 sets the priority of branch decisions based on the address order of their corresponding instructions. If slot A way N branch decision is 'taken', then in this case the way priority code 2598 outputted by the encoder means to select way O, no matter the branch decision result of the instructions of N way of slot B, C and D. If the instruction in slot A way N is determined as 'not taken' and slot B way N branch decision is 'taken', then the way priority code 2598 outputted by the encoder means to select way P, no matter the branch decision result of the instructions of N way of slot C and D. If instruction in slot A, B way N is determined as 'not taken' and the instruction in slot C way N is determined as 'taken', the way priority code 2598 outputted by the encoder means to select way Q, no matter the branch decision result of the instructions of N way of slot D. If the instructions in N way in slots A, B, and C are determined as 'not taken' and the instruction in N way D slot is determined as 'taken', then the way priority code 2598 outputted by the encoder means to select way E, which will be explained later. Lastly when N way in slots A, B, C, and D are all determined as 'not taken', then the way priority code 2598 outputted by the encoder means to select way N.

Way priority code 2598 controls multiplexer 2581, 2582, 2583, 2584, 2585 and 2586. Not all multiplexers need the control of all the meaning types of way priority code, such as way priority code E does not control multiplexer 2586. First, look at the circumstance of selecting outputs of front-end pipelines to be provided to the rear-end pipelines. Multiplexers 2581, 2582 and 2583 select the operation control signals decoded by front-end pipelines and the data from the DRBs. As shown in embodiments in FIG. 18, the DRB (not show in FIG. 21) filled by data engine, are also organized into Ways, like the IRBs 2550~2553 in this embodiment; Slot N Way has 4 slots A, B, C, and D; O Way has 3 slots B, C, and D; P Way has 2 slots C and D; Q Way has slot D. The slop grouping is the same as IRB 2550~2553. DRBs in each slot provide data to rear-end processor and RF under the control of IRB 2550, 2551, 2552, 2553 of its corresponding slot. The data from DRB N way slot A and the operation control signal created by front-end pipeline 2570 of N Way slot A are both sent to rear-end pipeline 2580 for bypass execution or to be stored in RF 2595. The data from other slots in DRB and the operation control signal of the corresponding slot's front-end pipeline 2571~2579 are selected by multiplexer 2581, 2582 and 2583 and sent to rear-end pipeline 2591, 2592 and 2593 for bypassing execution or to be stored in RF 2595.

If way priority code means select O way, then multiplexers 2581, 2582, and 2583 select their O inputs, that is to select the outputs of the 3 O way front-end pipelines to rear-end pipeline 2591, 2592 and 2593 to continue processing. The output of front-end pipeline 2470 is sent to rear-end pipeline 2590 which is not affected by branch decision. Here the instruction of front-end pipeline of Slot A N way is instruction 3. The instructions in the front-end pipeline of O way in slots B, C, and D are the instructions that presume instruction 3 is a 'taken' branch instruction, that is, the branch target 0 of branch instruction 3, and the two instructions following the target (instructions 1 and 2). So instructions 3, 0, 1, and 2 are sent to rear-end pipeline 2590, 2591, 2592 and 2593 to process.

By the same reason, when way priority code means P way, multiplexers 2581, 2582, and 2583 all select their P inputs, that is, the output of the front-end pipeline of N way slots A and B and the output of the front-end pipeline of P way slots C and D are used as the output of multiplexers and provided to rear-end pipeline to continue processing. So instructions 3, 4, 7, and 8 are sent to rear-end pipeline 2590, 2591, 2592 and 2593 to be processed. By the same reason when way priority code means Q way, multiplexers 2581, 2582, and 2583 all select their Q inputs, front-end pipeline of N way slots A, B, and C outputs, the output of the front-end pipeline of Q way slot D is the multiplexer output provided to rear-end pipeline to continue processing. So instructions 3, 4, 1, and 2 are sent to rear-end pipelines 2590, 2591, 2592 and 2593 to be processed. By the same reason, when way priority code means N way, then multiplexers 2581, 2582, and 2583 all select their N inputs, and N way slots A, B, C, and D front-end pipeline outputs are provided to rear-end pipeline to continue processing. So instructions 3, 4, 5, and 6 are sent to rear-end pipeline 2590, 2591, 2592 and 2593 to be processed. When way priority code means E way, multiplexers 2581, 2582, and 2583 all select E input, and so output instructions 3, 4, 5, and 6. The selection of E way and N way are the same in the current clock cycle, the difference is only significant in the next cycle.

Way priority code 2598 also decides which segment of instructions to be executed next cycle. Way priority code 2598, which is generated from the branch decisions, controls multiplexer 2584, 2585 and 2586 to decide the program's course. Tracker 2504 calculates the initial instruction address of the instruction segment to be executed next clock cycle based on the output of multiplexers 2584, which selects the address increment amount of a certain way; the output of multiplexers 2585, which selects the initial address of the same way in the current cycle; and the output of multiplexers 2586 which selects the Next block address of the same way in the current cycle. Specifically, the method uses adder 2528 to add BNY address 2536 of the initial address of this certain way in the current cycle selected by multiplexer 2585 (from registers 2525, 2526, or from registers 2521, 2522, 2523, 2524) to the address increment amount selected by multiplexer 2527 which is controlled by the same way output selected by multiplexer 2584 (from dependency checker 2560, 2561, 2562 or 2563); the sum will be the second address BNY of the initial instruction in the next cycle. The carry-out output 2538 of the adder 2528 controls multiplexer 2529; if carry out is '0', select the first address BNX 2535 of the initial address of this way in the current cycle; if carry out is '1', select the output 2539 of multiplexer 2586, which is the first address BNX of the Next block address of this way in the current cycle selected by multiplexer 2586 (from registers 2530, 2531, 2532 or 2533), and the output of multiplexer 2529 is the first address BNX of the next cycle. The BNX and BNY join together to become the read pointer 2510 which points to track table 2501 and reads out the entry 2511 being pointed to, and the next 3 entries 2512, 2513, and 2514 in the same manner as described before. Read pointer 2510 is also sent to End address memory 2502 and column address generator 2503 to obtain the corresponding Next block addresses and column addresses. Therefore, when clock signal comes, BNX and BNY on read pointer 2510 are respectively sent to registers 2525 and 2526 as the current address; track table outputs 2511~2514 are each respectively latched into registers 2521~2524 as branch target addresses; End address memory 2502's outputs are latched into register 2530~2533 as the Next block address, and the outputs of column address generator 2503 are latched into register 2540~2543 as the corresponding column addresses. Processor starts a new cycle of operation, as said before.

When way priority code 2598 is N way, multiplexer 2584 selects the instruction dependency checker unit 2560's output as increment control signal 2597. When way priority code 2598 is O way, P way and Q way, multiplexer 2584 correspondingly selects the output of instruction dependency checker unit 2561, 2562, or 2563 as increment control signal 2597. When way priority code 2591 is E way, multiplexer 2584 always selects '0' as increment control signal 2597, the control signal selects increment value '0' at multiplexer 2527.

Here are a few actual examples: Presume branch decision is N way instructions 3, 4, 5, and 6 that do not branch, and the dependency check unit 2560 judges no dependence between instructions 3, 4, 5, 6. Then, branch priority encoder 2596 outputs way priority code as N way. Then multiplexers 2581, 2582, 2583 select N way's front-end pipeline outputs to send to rear-end pipelines 2591, 2592, 2593 to execute. Therefore, instructions 3, 4, 5, and 6 execute in rear-end pipeline, and the execution result is written back into the shared RF 2586. Multiplexer 2584 selects the output '4' of dependency checker 2560 as increment amount and sends to adder 2528 through 2597 which sums it with register 2526's content '3' selected by multiplexer 2585. The sum is '7', carry out is '0'. Therefore, multiplexer 2529 selects register 2525's content '68' through multiplexer 2585. Therefore, read pointer is '68.7', next cycle executes instructions 7, 8, 9, 10 (8, 9, and 10 are in the Next IRB block) in N way. Other ways O, P, and Q start execution from the branch target recorded from track table entries of instructions 7, 8, and 9. If an instruction is non-branch, the IRB of the corresponding way will not issue instruction, and the way will also not be selected for the final branch decision.

Presume branch decision has concluded that instructions 3, 4, and 5 do not take branch, but instruction 6 does take branch, and dependency check unit 2560 concludes there is no correlation between the four instructions. Here, branch priority encoder 2590 outputs way priority code as E way. Here multiplexers 2581, 2582, 2583 select N way's front-end pipeline output and send to rear-end pipeline 2591, 2592, 2593 to execute. Therefore, instructions 3, 4, 5, 6 execute in rear-end pipeline. Multiplexer 2584 selects J way's increment control '0' and sends to adder 2528 through 2597. The adder sums the said increment control with the content '2' in register 2524 selected by multiplexer 2585, the sum is '2' and the carry out is '0'. Therefore, multiplexer 2529 selects the first address '68' of register 2524 which is selected by multiplexer 2585. Therefore, read pointer is '68.2', next cycle instructions 2, 3, 4, 5 are issued in N way. Other ways O, P, and Q start execution from the branch target recorded in the track table entries of instructions 2, 3, and 4.

Presume branch decision in slot A instruction 3 does not take branch, but slot B instruction 4 does take branch, and dependency check unit 2562 concludes there is no dependence between the four instructions. Then, branch priority encoder 2596 outputs way priority code as P way. So multiplexer 2581 selects N way B slot's front-end pipeline output and sends it to rear-end pipeline 2591 to execute. Multiplexer 2582, 2583 select the front-end pipeline output of P way C slot, D slot, to be executed by rear-end pipeline 2592, 2593. Therefore, instructions 3, 4, 7, 8 are executed in rear-end pipeline. Multiplexer 2584 selects the increment control '2' of output of dependency check unit 2562 and sends to adder 2528 through 2597. Adder 2528 sums the increment control with the content '7' of register 2522 selected by multiplexer 2585. The sum is '1', and carry is '1'. Therefore, multiplexer 2529 selects the content of register 2532's first address '23' which is selected by multiplexer 2586. Therefore, read pointer is '23.1', instructions 9, 10, 11, 12 (4 contiguous instructions starting with the one with address '1' in the Next instruction block) are issued in N way in next cycle. Other ways O, P, and Q start execution from the branch target recorded in the track table entries of instructions 9, 10, and 11.

Presume branch decision is slot A instruction 3 does take branch and dependency check unit 2561 concludes O way B slot instruction 0 has dependency on and N way A slot instruction 3. Then, branch priority encoder 2596 outputs way priority code as O way. So multiplexers 2581, 2582, 2583 select the front-end pipeline outputs of O way B slot, C slot, D slot, to be executed by rear-end pipeline 2591, 2592, 2593. Therefore, instructions 3, 0, 1, and 2 are executed in rear-end pipeline; but then the 0, 1, 2 instruction in B, C, D slots are aborted due to dependency, only instruction 3 in A slot is completed and retired, and its result is written back to the shared RF 2595. Multiplexer 2584 selects the increment control '0' outputted by dependency check unit 2561 and send to adder 2528 through 2597. Adder 2528 sums the increment control with the second address content '0' of register 2521 which is selected by multiplexer 2585. The sum is '0', and carry is '0'. Therefore, multiplexer 2529 selects the content of register 2521's first address '68' selected by multiplexer 2585. Therefore, read pointer is '68.0', instructions 0, 1, 2, 3 are issued in N way in next cycle. Other Ways O, P, and Q start execution from the branch target recorded in the track table entries of instructions 0, 1, and 2.

This embodiment uses IRBs controlled by zigzag buses, which are capable of issuing plural number of instructions in order. This embodiment fully utilizes the branch target information and the Next block address information of the instructions, both stored in the track table, which are about to be executed, to control multiple numbers of the said IRB, to pre-process instructions in parallel on multiple execution paths due to branch instructions. This embodiment makes branch decisions on each of the branch instructions being processed, and then produces a final branch decision result taking into account the sequential order of the branch instructions. The branch decision result selects the intermediate pre-processing results of one set of the multiple execution paths to be further processed, and the dependency check result on instructions in the selected set decides whether a portion of or all of the instructions of the selected set are used to complete execution, while the others are aborted. It also adds the initial second address of the selected path to the address increment amount of the same path. For the next cycle, the sum of the addition will be the second address, and the initial first address will be the first address of the next cycle, if the sum does not overflow over the IRB block boundary. For the next cycle, the sum within the IRB block boundary will be the second address and the Next block address of the selected path will be first address, if the sum overflows over the IRB block boundary.

This disclosure discloses a method of instruction multi-issue. The method is to issue n sequential instructions in parallel starting with the instruction at address a, and use the dependency check modules to detect the dependence between the said plural number of instructions, and feedback an address increment amount i based on the dependency and the position of the dependent instruction; and issue n instructions starting from instruction address a=a+i. Here, the sequence of issuing instructions is defined as 0, 1, 2, . . . , n−1; then i=p, p is the position of the first dependent instruction in the instruction sequence; n is defined as the dependent instruction position if there are no dependencies found among the issued instructions. Here, the instruction later in the sequence of the two instructions that have dependency is defined as the dependent instruction.

This disclosure may employ special data read buffers (DRBs). Data engine pre-fetches and fills data that correspond to instructions into DRB in advance. When an instruction is issued, the corresponding data will automatically be extracted from IRB for execution.

The pipeline's processor may not start from the usual instruction fetch pipe stage, but rather starts from the instruction decode pipe stage; it also does not contain memory (data) access stage. Instructions are pushed to processor core by instruction engine containing track table, tracker, and IRB. Data is pre-fetched by data engines and filled into DRBs, the data is pushed to the core following the issuing of the corresponding instructions.

The specific implementation of this method is to use diagonal or so called zigzag word lines to control a memory, which has a plural number of read ports for a single instruction (or data in general) and there are a plural number of bit lines connecting those read ports, which are independent from each other, so a segment of sequential instructions (or sequential data) can be sent on the plural number of bit lines to the connected plural number of processing units for parallel processing.

The said multi-bit line memory controlled my oblique word lines is called instruction read buffer (IRB). As used herein, the IRB may be divided as instruction buffer blocks (IRB blocks) of the same capacity for ease of instruction or data replacement. The instruction segment issued may be located in different IRB blocks. In this disclosure, the oblique word lines are distinguished as Current instruction word line and the Next block instruction word line, they are driven by separate addresses. The Current word line is driven by the Current read pointer of the tracker or by the branch target address on the tracks in the track table. The current word line issues instructions starting from a specific instruction in a specific IRB block designated by the said address from the first instruction issue slot of the Way of the designated instruction to the last slot of the same Way, or to the last instruction in the IRB block. The Next block instruction word line is driven by the Next block address in the End track point of the track, and together with the Z address, issues instructions starting from a specific instruction in a specific IRB block designated by the said address from the first instruction issue slot of the Way of the designated instruction to the last slot of the same Way, or to the last instruction in the IRB block. Issue a segment of contiguous instructions from the first instruction in a Next block instruction address designated specific Next instruction block of the said Current or target instruction block in an instruction issue slot designated by the Z address to the last instruction issue slot. Here, the Z address is obtained through the block offset address of the said Current or target instruction block and the number of instruction issue slots in the Way of the instruction.

A slight modification to the multi-issue processor disclosed in FIG. 25, will enable it to further process branch target and the branch nesting in which the subsequent instructions are also branch instructions. FIG. 27 is an exemplary embodiment that supports an instruction segment and all possible branches of the instruction segment consistent with the disclosure. FIG. 26 explains the mechanism and the structure of priority encoder 2596 in FIG. 27. The embodiment in FIG. 27 adds IRB read ports, word lines, front-end pipelines, dependency checkers, and track tables on the basis of embodiment in FIG. 25; tracker also has additional registers, multiplexers to support the additional Ways. To facilitate understanding, the modules and connections in FIG. 27, which have the same function or expanded but similar functions of those in FIG. 25, still use the same numbers as in FIG. 25. The numbers starting with 26 are newly added. Please refer to FIG. 26A, which portrays a binary tree and the branch paths of the segment of instructions which the embodiment of FIG. 25 is capable of processing. In the figure each dot represents a non branch instruction, each circle represents a branch instruction. The left branch of the binary tree extended downwards from a dot or circle represents the program path of a not taken branch instruction or a non branch instruction. The instruction on the left branch is the fall-through instruction of the said dot or circle. The right branch of the circle represents the program path of a taken branch. The instruction on the right branch is a branch target instruction.

Instructions 2603, 2604, 2605, and 2606 in are the four instructions (instruction addresses 3, 4, 5, 6) in row 2481 of FIG. 24C. The instruction issue slots are divided by dotted lines in the figure, that is, instruction 2603 is issued from slot A, instructions 2604, 2605, 2606 are respectively issued from slots B, C, D, consistent with the embodiment in FIG. 25. Path 2610 connecting those four instructions is the N Way in FIG. 25; path 2611 branching from instruction 2603 is O Way, which has one instruction each in slots B, C, D; path 2612 branching from instruction 2604 is P Way, which has one instruction each in slots C, D; path 2613 branching from instruction 2605 is Q Way, which has one instruction in slot D. If the instructions of O Way, P Way, in slot B, C are branch instructions, then the embodiment in FIG. 25 can speculate execute them as non branch instructions. The instruction to start execution from in the next cycle depends on the branch decisions.

Figure 26A:
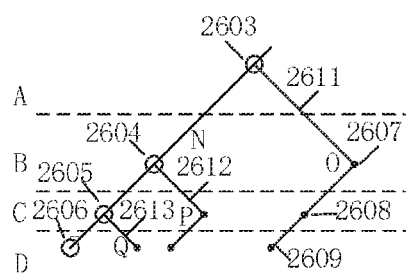
FIG. 26A illustrates an exemplary illustration of each branch route in a segment of instructions in binary tree form.
Figure 27:
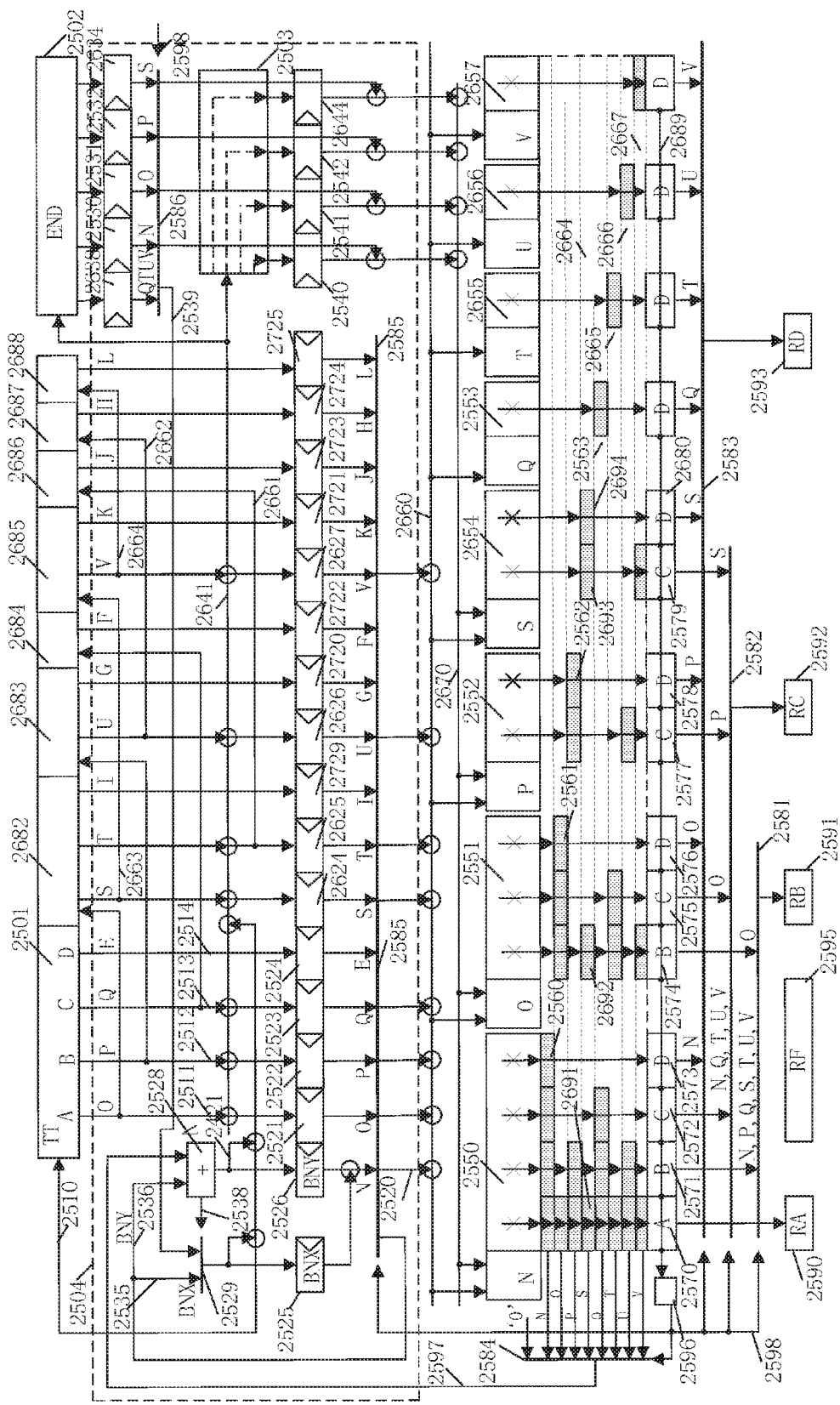
FIG. 27 illustrates another exemplary embodiment of the processor using the said address decode control method of this disclosure.

The N Way in FIG. 26A is the program execution path when all four instructions in the instruction segment are non branch instructions. The O Way is the program execution path when instruction 2603 takes branch and first executes the branch target instruction 2607 on the right branch of 2603, then executes the two sequential instructions 2608 and 2609 on the left branch of instruction 2607. Same as in O Way, P Way and Q Way also first execute the branch target instruction on the right branch of the branch instruction and then execute the sequential instructions on the left branch of the branch target instruction, till slot D instruction. These other Ways in this embodiment are also defined first right then left.

Figure 26B:
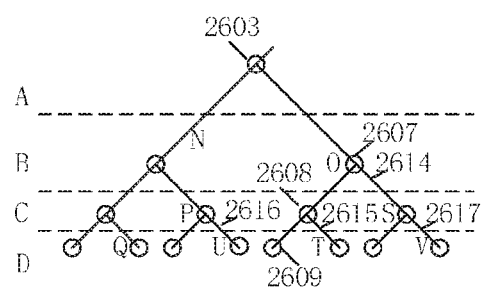
FIG. 26B illustrates an exemplary illustration of all possible branch routes of a segment of instructions in complete binary tree form.

Please refer to FIG. 26B, which portrays a complete binary tree with all possible branch paths of the segment of instructions which the embodiment of FIG. 27 is capable of processing. Compared with FIG. 26A, it adds the S Way 2614 branching from instruction in O Way B slot, the T Way 2615 branching from instruction in O Way C slot, the U Way 2616 branching from instruction in P Way C slot, and the V Way 2617 branching from instruction in S Way. A total of 15 columns of IRB, bit line buses, and 15 front-end pipelines organized into 8 ways, are needed to support the complete binary tree in which every instruction is a branch instruction as shown in FIG. 26B. There are various numbers of instruction issue slots in each of the ways; N Way issues instructions in four slots A, B, C, D; O Way issues instructions in three slots B, C, D; P Way and S Way issue instructions in two slots C, D; Q Way, T Way, U Way, V Way issue instructions in slot D only. The IRB in the embodiment in FIG. 25 already has N, 0, P, Q Ways, S, T, U, V Ways are added in the embodiment of FIG. 27. The tracker/track table has to provide the corresponding Current instruction address and Next instruction address to drive S, T, U, V Ways.

When each of the instructions in D slot are branch instructions, their branch decisions do not affect the instruction execution of this cycle, but may affect the program execution course in the next cycle. If the tracker/track table prepares the branch targets of the branch instructions in D slot in this cycle ready to be selected by branch decisions, then based on branch decision the processor of this embodiment in next cycle can select the right instruction along the correct path to execute program under any combination of branch instructions. Then as long as the branch targets are in the track table and IRB, this processor will have no performance degradation due to branching. To achieve this, it is necessary to define the branch paths for instruction in D slot. Please refer to FIG. 26C which is an illustration of the extension of the binary tree in FIG. 26B, including the branches in slot D. To facilitate explanation, the fall-through instructions of each of the instructions in D slot in next cycle (below the D slot dash line in the figure) are still named by the Way of each instruction in D slot, but the branch target instruction of the branch instruction in D slot are named with new Ways. For example, the fall-through instruction (left branch) 2601 of D slot N Way instruction still belongs to N Way, Therefore, instruction 2601 is named as N Way. The branch target instruction (right branch) 2602 of the D slot N way instruction is named with a new E Way. The other follow up instructions of D slot are also named this way, to obtain the 16 possible paths in next cycle. That is the left branches of instructions in D slot FIG. 26C. From left to right are N, Q, P, U, O, T, S, V 8 Ways as said before; and the right branches of instructions in D slot from left to right are E, F, G, H, I, J, K, L the newly added 8 Ways. Please note, the newly added 8 ways do not affect the operations in this cycle. The processor only fetches the address of the first instruction in these 8 ways from memory for the selection of branch decision, to be used in next cycle. By the same reason, the left branch 8 ways of D slot instructions, although named by the same way numbers of instructions in A, B, C, D slots of this cycle, they do not affect the operation in this cycle.

The branch decision of this cycle selects one of the addresses from 16 addresses of each of the first instructions in the 16 paths of next cycle provided by tracker 2504. Instruction segment starting with this address and any branch of the segment can be executed in N Way next cycle (not necessarily in the same path as the N Way of this cycle), the following ways explained in combination with FIG. 27 and FIG. 26C. The way tracker 2504 provides part of the said 16 addresses are explained in FIG. 25, which is the same in FIG. 27, that is, to add the instruction address selected by branch decision of previous cycles such as 2535, 2536 and the address increment amount 2527 selected by branch decision of previous cycles, the sum is the N Way address. Using this N Way address, index track table 2501 to read out the branch target address 2511, 2512, 2513, and 2514 of O Way, P Way, Q Way, and E Way, and store in registers 2521, 2522, 2523, 2524, and the N Way address is stored into register 2525 (BNX) and 2526 (BNY). The address of N, O, P, Q Ways are sent to IRBs 2550, 2551, 2552, 2553 through buses to control the instruction issue of each of those Ways; and the instructions stored in the said registers will wait for the selection of branch decision results of this cycle, and add with the increment amount as the N Way address of the next cycle.

Figure 26C:
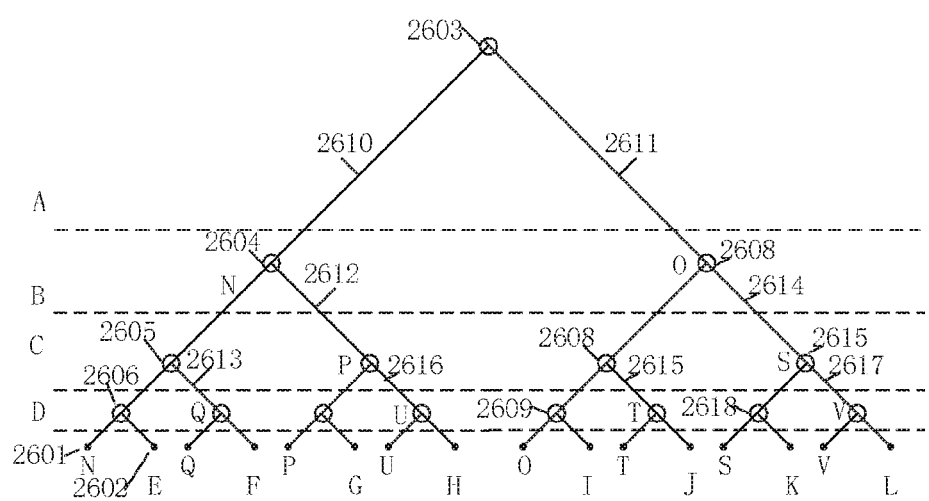
FIG. 26C illustrates an exemplary illustration expanded binary tree.

Each way in FIG. 26C other than the ways described above needs to check the table recursively, that is, using the output of track table as the input address of track table to inquire the branch target of deeper branch layers. From FIG. 26C, it can be seen N Way is 0 layer target as it does not need to check the table; the target addresses of each of the O, P, Q, E Ways are 1st layer target addresses, because they are read out from 1st layer track table 2501 indexed by 0 layer N Way address. By the same reason, 2nd layer target address can be read out from 2nd layer track table 2682, 2683, 2684, indexed by the 1st layer target address, which includes the S, T, I, Way target addresses from 2nd layer track table 2682 indexed by O Way address 2511; the U, G Way target addresses from 2nd layer track table 2683 indexed by P Way address 2512; the F Way target addresses from 2nd layer track table 2684 indexed by Q Way address 2513. By the same reason, 3rd layer target address can be read out from 3rd layer track table 2685, 2686, 2687, indexed by the 2nd layer target address, which includes the V, K, Way target addresses from 3rd layer track table 2685 indexed by S Way address 2663; the J Way target addresses from 3rd layer track table 2686 indexed by T Way address 2661; the H Way target addresses from 3rd layer track table 2687 indexed by U Way address 2662. And lastly, the L Way target addresses from 4th layer track table 2688 indexed by 3rd layer V Way target address 2664. The 16 way addresses obtained are stored into the registers such as register 2521 waiting for the selection of multiplexer 2585 (it is 16 input in FIG. 27, but still using the same number as in FIG. 25 for ease of comprehension) which is controlled by the way priority code 2598 generated by the front-end pipeline operations. The second address BNY after the selection is sent through bus 2536 to adder 2528, to be added with the address increment amount generated by instruction dependency checker such as 2560. The second address BNX after selection is sent to multiplexer 2529 to be selected by the carry output 2538 of adder 2528 as the N Way address of next cycle. Each of the N, O, P, Q, S, T, U, V, Way addresses are also sent through bus 2660 to the decoders inside of the IRBs to control the instruction issue of their corresponding ways, as shown in the operation of embodiment in FIG. 25. Specifically, the N Way Current address is produced by the joining of contents of registers 2525 and 2526 is sent to the N Way IRB 2550 controlling the N Way instruction issue. By the same reason, the O, P, S, Q, T, U, V Way Target addresses from registers 2521, 2522, 2624, 2523, 2625, 2626, 2627, are sent to the O, P, S, Q, T, U, V Way IRBs 2551, 2552, 2654, 2553, 2655, 2656, and 2657 to control the O, P, S, Q, T, U, V Way instruction issue. The IRB in this embodiment and in FIG. 25 does not make distinction between current address and branch target address, which are all processed by the same first address comparator's second address decoder.

Each of the N, O, P, Q, S, T, U, V Ways may encounter the issue of zigzag word line reaching the lower boundary of an IRB block. Therefore, the Next block address should be provided for each Way. The reading of Next block address of each of the N, O, P, Q Ways is the same as in the embodiment in FIG. 25. The corresponding Next block addresses can be read out from End track point table 2502 if the table is indexed with each of the N, O, P, Q, S, T, U, V Way addresses. The way to do it is to send to the End track point table 2502 the instruction address of the said 8 Ways 2510, 2511, 2512, 2513, 2663, 2661, 2662, 2664 through bus 2641, and read out the Next block addresses of those 8 Ways and store into registers. The Next block address of N Way is stored in register 2530, the Next block addresses of O, P, S Ways are stored in registers 2531, 2532, and 2536; the Next block addresses of Q, T, U, V Ways are stored in register 2638. The outputs of these 8 registers are selected by priority code 2598 controlled multiplexer 2586 (it is 8 input in FIG. 27, but still using the same number as in FIG. 25 for ease of comprehension) and then sent through bus 2539 to the multiplexer 2529 in tracker 2504, to be selected by carry out 2538 of adder 2528.

Priority code 2598 can select the 8 fall-through paths N, O, P, Q, S, T, U, V and 8 branch targets paths E, F, G, H, I, J, K, L, a total of 16 inputs as the 16 current and branch target addresses selected by 2585. However, the Next block addresses are sequential instruction address. Therefore, the Next address multiplexer 2586 only selects the Next block address of each of the N, O, P, Q, S, T, U, V Ways send through bus 2539 to multiplexer 2529 to be selected by the carry out of adder 2528. Specifically, when the Way priority code 2598 is N Way (the fall-through instruction of instruction in N Way slot D), or E Way (the branch target instruction of instruction in N Way slot D), the Next address multiplexer 2586 selects the N Way Next block address stored in register 2530. By the same reason, when the Way priority code 2598 is O Way or I Way, the Next address multiplexer 2586 selects the O Way Next block address stored in register 2531; when the Way priority code 2598 is P Way or G Way, the Next address multiplexer 2586 selects the P Way Next block address stored in register 2532; when the Way priority code 2598 is Q Way or F Way, the Next address multiplexer 2586 selects the Q Way Next block address stored in register 2638; when the Way priority code 2598 is S Way or K Way, the Next address multiplexer 2586 selects the S Way Next block address stored in register 2634; when the Way priority code 2598 is T Way or J Way, the Next address multiplexer 2586 selects the T Way Next block address stored in register 2638; when the Way priority code 2598 is U Way or H Way, the Next address multiplexer 2586 selects the U Way Next block address stored in register 2638; when the Way priority code 2598 is V Way or L Way, the Next address multiplexer 2586 selects the V Way Next block address stored in register 2638.

The instruction addresses of N, O, P, S Ways are also sent through bus 2641 to column address generator 2503. The column address generator has the same structure as the column address generator in FIG. 25, but includes additional compute/search logic for S Way. The column address Z (named Z address hereon) of N, O, P Ways are stored in registers 2540, 2541, 2542 as in the embodiment of FIG. 25, the newly added S Way Z address is stored in register 2644. The Z address output of these four registers are respectively combined with the Next block address and sent through the Next block address 2670 to the IRBs to control issue instruction starting with the Next block address if necessary. Specifically, the N Way Next block address in register 2530 and the N Way Z address in register 2540 are sent together to the N Way IRB 2550 to control the N Way Next block issuing. By the same reason, the O, P, S Way Next block address in registers 2531, 2532, 2634 and their corresponding N Way Z address in registers 2541, 2542, 2644 are sent together to the O, P, S Way IRB 2551, 2552, 2654 to control the O, P, S Way Next block issuing.

Figure 28:
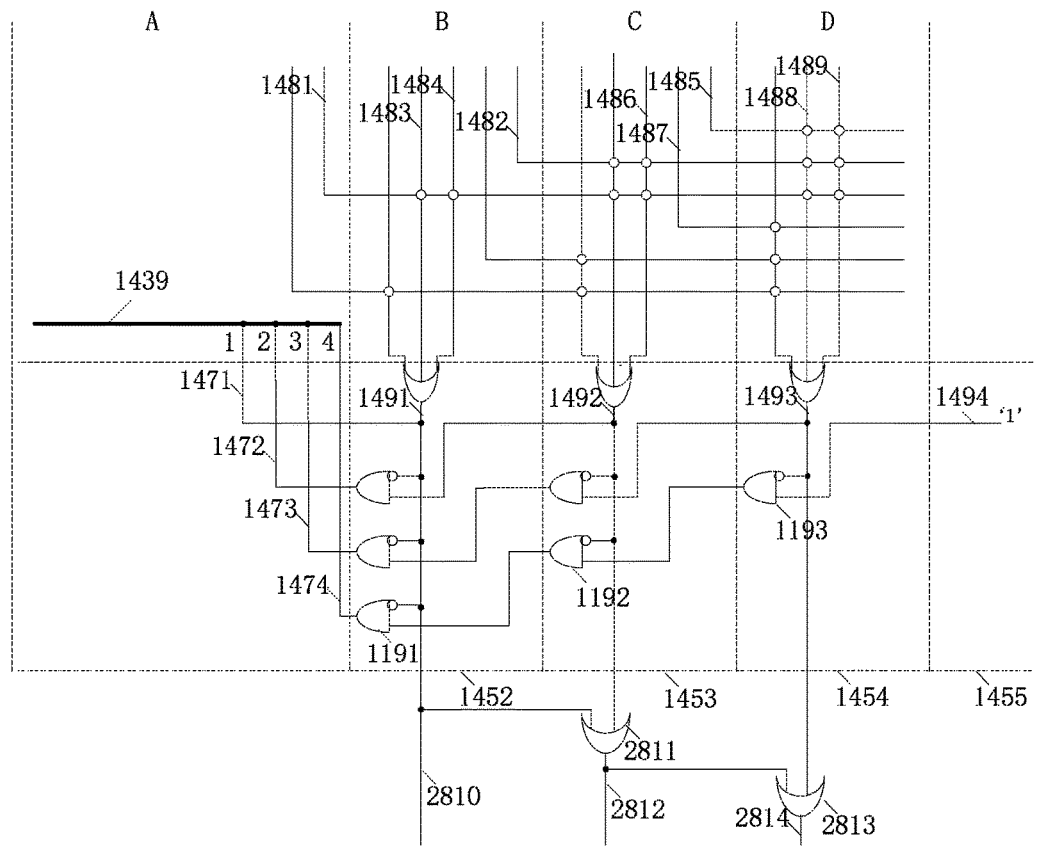
FIG. 28 illustrates an exemplary embodiment of the said configurable dependency check module of this disclosure.

In this embodiment, dependency checker module is configurable, that is, the dependency between instructions of different slots based on the configuration. Refer to FIG. 28, which is an exemplary configurable dependency check module consistent with disclosed embodiments. The structure of the dependency check module in FIG. 28 is similar to that of FIG. 11, its difference lies in the output of the OR gate (such as outputs 1491, 1492, and 1493) of this disclosure can be configured as '1', thus blocking the AND gates of corresponding slots. Specifically, the three-input OR gates in FIG. 28 can be changed into four-input OR gates, with the additional input as configuration input. When the additional input is '0', the said four-input OR gate has the same function as the three-input OR gate in FIG. 11; when it is '1', the output of the four-input OR gate is '1'.

For example, in FIG. 28, when the output of OR gate 1493 is configured as '1', AND gate 1193 is blocked (output is '0'), Therefore, the outputs of AND gates 1192 and 1191 are all '0'. That's equivalent to removing AND gate 1191, 1192, and 1193 from the embodiment in FIG. 11, and fixing the corresponding bit signal 1493 as '1', so the dependency check only applies to the three instructions in the three slots A, B, and C, and the D slot instruction does not exist for the detector. If there is no dependency between the three instructions, that is both outputs 1491 and 1492 are '0'. Then control line 1473 is '1', control line 1472 and 1471 are '0', select the address increment amount '3'. If slot C instruction depends on instructions in slot A or slot B, then output 1491 and 1492 are '0' and '1', that sets the control line 1472 as '1' and both control lines 1473 and 1471 as '0', select address increment amount to '2'. If slot B instruction depends on instructions in slot A, then output 1491 is '1', that sets the control line 1471 as '1' and both control lines 1473 and 1472 as '0', select address increment amount to '1'.

Similarly, output 1492 can be configured as '1' to conduct 2 issue, to check the dependency only on the instructions issued from slots A and B at the same time, and selecting address increment amount '2' or '1' based on the "no dependency" or "has dependency" detection result. The detail operation is the same as stated before, and is not repeated here. In addition, the output 1491 can be configured as '1' to conduct single issue, to block all the AND gates in slot A, so the value on control lines 1471, 1472, 1473, and 1474 is each '1', '0', '0', '0', fix address increment amount as '1'. In this example, at least one instruction has to be issued, Therefore, no matter what the dependency check result is, slot A instruction is always issued.

The issue Width can be adjusted to meet the requirement of each program on performance and power consumption, through combining the configuration of dependency check module and disable the corresponding front-end and back-end pipelines. For example, the resources for all Ways other than N Way may be disabled, and the front-end pipeline 2571, 2572, 2573 are disabled while enabling the N Way front-end pipeline 2570, N Way rear-end pipeline 2590, and IRB 2550; configure the instruction dependency check module 2560 as single issue as aforementioned. Then, the processor is configured as single instruction issue. Adding front-end pipeline 2571, 2574, P Way rear-end pipeline 2591 and the corresponding IRB 2551 configure the instruction dependency check module 2560, 2561, as two issue, then the processor is configured as two issue. Three issue can be deduced by analogy. Embodiments in and following FIG. 25 can all be multi issue processor configurable to issue 1, 2, 3, or 4 instructions per cycle.

Besides, dependency checker's result is also used to produce an abort signal that clears the result of instructions, which are issued in parallel but can't be executed in parallel. Specifically, when output 1491 is '1', there is dependency between slot B's instruction and slot A's instruction, Therefore, the abort signal 2810 is '1', and the front-end pipeline's execution results of slots B are all cleared. At the same time, through OR gate 2811, 2813, the output 1491 makes abort signals 2812 and 2814 are all '1', and thus clear front-end pipeline's execution results of slots C and D. This way is equivalent to only issuing and executing slot A's instruction, and the instructions of slots B, C, and D are not executed, and slots B, C, and D will not produce branch taken signal.

When output 1491 is '0', output 1492 is '1', which indicates slot C instruction has dependency with slot A's or B's instruction, and the instructions of slots A and B have no dependency. Therefore, slot B's abort signal is '0', making slot B's front-end pipeline execute normally. At the same time, the abort signals of slots C and D are '1', so the execution result of slot C's and slot D's front-end pipeline are cleared. This way is equivalent to only issuing and executing instructions of slots A and B, and not executing instructions of slots C and D, and slots C and D will not produce a branch taken signal.

When outputs 1491 and 1492 are both '0', and output 1493 is '1', it indicates that D slot's instruction has dependency with an instruction in either slot A, B, or C and instructions in slots A, B, and C have no dependency with each other. Therefore, the abort signals 2810, 2812 are '0', making the front-end pipeline of slots B and C execute normally. At the same time, the '1' value on output 1493 through OR gate 2813 setting abort signal 2814 as '1', clearing the execution result of slot D's front-end pipeline. This way it is equivalent to only issuing and executing instructions of slots A, B, and C, but not executing slot D's instruction this cycle. Slot D will not produce branch taken signal. Lastly, when outputs 1491, 1492, and 1493 are all '0', it indicates there is no dependency between instructions of slots A, B, C, and D. Therefore, the abort signals 2810, 1812 and 2814 are all '0', making the front-end pipelines of slots B, C, and D execute normally, which is equivalent to issuing and executing instructions of slots A, B, C, and D during this issue.

The instruction address increment amount produced by the dependency check module for instructions in the same issue slot may be different depending on how many instructions are in the Way. For example, when there are four instructions (only N Way) the increment amount is '4' if the dependency check module 2560 determines no dependency between the four instructions; when slot D instruction has dependency, the increment amount is '3'; when slot C instruction has dependency, the increment amount is '2'; when slot B instruction has dependency, the increment amount is '1'. For example, when there are three instructions (only O Way) the increment amount is '3' if the dependency check module 2561 determines no dependency between the three instructions; when slot D instruction has dependency, the increment amount is '2'; when slot C instruction has dependency, the increment amount is '1'; when slot B instruction has dependency, the increment amount is '0'. By the same reason, when there are two instructions (P Way and S Way) the increment amount is '2' if the dependency check module 2562, 2563 determine no dependency between the two instructions; when slot D instruction has dependency, the increment amount is '1'; when slot C instruction has dependency, the increment amount is '0'. When there is one instruction (Q, T, U, V Ways) the increment amount is '1' if the dependency check module 2564~2567 determine no dependency on slot D instruction. When slot D instruction has dependency, the increment amount is '0'.

FIG. 28 actually displays the structure of N Way dependency check unit 2560. Take V Way dependency check module 2567 as an example, the comparison logic (represented by circles) of B, C slots OR gate 1491, 1492, 2811, 2813, AND gate 1191 and other AND gates in the same column, AND gate 1192 and other AND gates in the same column, can all be removed. Define the address increment amount as '0' when the output of OR gate 1943 is '1'; the address increment amount as '1' when the output of OR gate 1943 is '1' (then output of AND gate 1193 is '1'). If V Way is picked as the path of next cycle by the processor in FIG. 27, the instructions actually executed in slots A, B, C, D are actually that of N, O, S, V Ways. N, O, S Ways each have their corresponding Way dependency check module 2560, 2561, and 2654 to perform the detection. 2567 only has to be responsible for the dependency of instructions in V Way to instructions in the prior issue slots. Other Q, T, U, V Way dependency check modules 2563, 2665, 2666 have the same structure. The structures of dependency check module 2562, 2564 for the Ways of two instruction issue keeps the detection logic in the C, D slots, and can be deduced by analogy. The dependency check module 2561 for the (O) way of three instruction issue keeps the structure in B, C, D slots, and is the same structure as in FIG. 28, nevertheless, the definition of address increment amount under the same dependency within the same slot is '1' less than the Way of four instruction dependency check module 2560.

The removal of dependency check logic also reduces the number of abort signals such as 2810, 2812, so one abort signal controls a front-end pipeline. Specifically, the slot B, C, D abort signals (2810, 2812, 2814 in FIG. 28) of the N Way dependency check module 2560 controls N Way slot B, C, D front-end pipelines 2571, 2572, 2573. There is no dependency on slot A instructions, Therefore, slot A front-end pipelines 2570 does not need to be controlled. The slot B, C, D abort signal of the O Way dependency check module 2561 controls O Way slot B, C, D front-end pipelines 2574, 2575, 2576. The slot C, D abort signal of the P Way dependency check module 2562 controls P Way slot C, D front-end pipelines 2577, 2578. The slot C, D abort signals of the S Way dependency check module 2664 control S Way slot C, D front-end pipelines 2579, 2580. The slot D abort signal of the other Q, T, U, V Way dependency check modules 2563, 2665, 2666, 2667 controls their own Way's slot D front-end pipeline.

Back to FIG. 27, 4 additional instruction dependency checkers are added in this embodiment to support the newly added four-way of S, T, U, V. Slightly different from FIG. 25, is that the dependency checker in FIG. 27 each has the function of increment multiplexer 2527 in FIG. 25, making FIG. 27 easier to comprehend, that is, address increment amount itself is passed on bus 2597, instead of the control signal which controls to select the increment amount in FIG. 25. The detector 2560~2563 have the same function and detection range as the detector with the same number in FIG. 25 (except directly produce the increment amount as said before), and are not repeated here. The dependency checker for instructions in the same Way are shown between two dashed lines in FIG. 27, each detector accepts the input of four instructions, and the location of the shaded portion denotes the four instructions the detector checks. In which the newly added detector 2664 supports the dependency check of S Way instructions by checking the N, O, S, S Way instructions in the four slots of A, B, C, D. That is within the detector 2664, the shaded portion 2691 corresponding to slot A front-end pipeline 2570 in N Way (IRB 2550); the shaded portion 2692 corresponding to slot B front-end pipeline 2574 in O Way (IRB 2551); the shaded portion 2693, 2694 corresponding to slot C, D front-end pipelines 2579, 2680 in S Way (IRB 2654). The slot B, C, D abort signals outputted by the detector controls the branch decision produced by the corresponding front-end pipeline. For example, the slot B abort signal (from shaded portion 2692) controls the branch decision of slot B front-end pipeline 2574; the slot C, D abort signals (from shaded portion 2693, 2694) control the branch decisions of slot C, D front-end pipeline 2579 and 2680. By the same reason, detector 2665 detects the N, O, O, T way instructions in the four slots in support of T Way; detector 2666 detects the N, N, P, U way instructions in the four slots in support of U Way; detector 2667 detects the N, O, S, V way instructions in the four slots in support of V Way. The way priority code 2598 controls the 9-input multiplexer 2584 in selecting one out of the 8 Way address increment amount produced by the 8 instruction dependency checkers. The output of the multiplexer is passed through address increment amount bus 2597 to the adder 2528 inside of tracker 2504 to be added to the initial address of the same Way selected by multiplexer 2585. When the branch decision is one Way of E, F, G, H, I, J, K, L, multiplexer 2584 selects increment amount '0' to put on address increment amount bus 2597 to be added with the branch target address of the same Way selected by multiplexer 2585.

The intermediate processor result of front-end pipeline 2570 is further processed by rear-end processor 2590 as in the embodiment of FIG. 25. Way priority code 2598, as in the embodiment in FIG. 25, also controls multiplexer 2581, 2582, 2583 to select instructions of one Way, one instruction each from the B, C, D instruction issue slots, to be further processed by rear-end pipeline 2591, 2592, and 2593. Instruction selection has 16 ways to choose from, but its actual function is selecting one from the 16 possible paths as the N Way of Next cycle. In the instructions actually processed in this cycle, slot A only has one choice N Way, slot B has two Ways N, 0 to select from, slot C has four Ways N, O, P, S to select from, and slot D has 8 Ways N, O, P, Q, S, T, U, V to select from. The way priority code representing the branch target instruction of slot D instruction and the way priority code representing the fall-through instruction of slot D instruction (that is the way priority code of the slot D instruction itself) both control multiplexers such as 2581 to select the front-end pipeline of the slot D instruction to be processed by rear-end pipeline. Specifically, when way priority code 2598 is N Way (the fall-through instruction of N Way slot D instruction), or E Way (the branch target instruction of N Way slot D instruction), all instructions from the four instruction slot processed by the rear-end pipelines 2590, 2591, 2592, and 2593 are all from N Way, that is, NNNN; within it, the first ones in sequential order are the N Way slot A instruction from front-end pipeline 2570, the second one is the N Way B slot instruction from front-end pipeline 2571, the third one is the N Way C slot instruction from front-end pipeline 2572, the fourth one is the N Way D slot instruction from front-end pipeline 2573. From here on, all the Ways are described in this format, that is, the alphabet represents the Way, the sequential order represents the instruction issue slot A, B, C, and D. By the same reason, when the priority code 2598 is O Way or I Way, the instructions selected by multiplexer 2581 etc to be processed by each of the rear-end pipelines are NOOO; when the priority code 2598 is P Way or G Way, the instructions processed are NOPP; when the priority code 2598 is Q Way or T Way, the instructions processed are NOPQ; when the priority code 2598 is S Way or K Way, the instructions processed are NOSS; when the priority code 2598 is T Way or J Way, the instructions processed are NOOT; when the priority code 2598 is U Way or H Way, the instructions processed are NNPU; when the priority code 2598 is V Way or L Way, the instructions processed are NOSV.

In summary, depending on whether the instructions are branch instructions, the processor illustrated in FIG. 27 is capable of issuing up to 15 instructions from a mix of up to 15 Current instructions in 8 ways and up to 7 Next block instructions in 4 ways to 15 front-end pipe lines in 4 instruction slots. At the same time the current cycle Current instructions addresses of 16 possible execution paths next cycle are outputted by register 2521 etc. and are waiting at multiplexer 2585 to be selected by the way priority code 2598, while the current cycle Next block addresses of 8 possible execution paths next cycle are outputted by registers 2530 etc. and are waiting at multiplexer 2586 to be selected by way priority code 2598. The 8 increment amounts produced by the 8 instruction dependency checkers and a '0' increment amount wait at multiplexer 2584 to be selected by way priority code 2598. The outputs of 14 front-end pipelines, with the exception of 2579 in N way slot A, wait at multiplexers 2581, 2582, 2583 to be selected by way priority code 2598.

Each of the front-end pipelines makes judgment on whether or not to take the branch when executing branch instruction. This judgment and the corresponding abort signal by the instruction dependency checker of the same way in the same slot of the front-end pipeline constitute the branch decision signal of the front-end pipeline. When the abort signal's meaning is 'dependent', then the branch decision signal the front-end pipeline produces is 'not take branch'; when the abort signal's meaning is 'no dependency', then the branch decision signal the front-end pipeline produces depends on its internal branch decision logic. Another implementation is to let the abort signal directly terminate the instruction processing in the corresponding front-end pipe line. The branch decision output of each of the processing terminated front-end pipelines is set as 'not take branch'. All of the branch decisions produced by all 15 front-end pipelines are sent through bus 2689 to priority encoder 2596 to produce way priority code 2598.

Way priority code 2598 is produced by each of the branch decisions from each of the front-end pipelines based on the instruction slot priority of its corresponding instruction node position on the instruction path binary tree. FIG. 26 D is one implementation of priority encoder 2596, its structure is an up-side down mirroring of the binary tree in FIG. 26C, a 4 layer binary selection tree consists of 15 two-input multiplexers, with each layer corresponding to an instruction issue slot, The upper layer multiplexers correspond to issue slot D, each of the 16 inputs has a code that corresponds to 16 possible instruction paths next cycle, the position of each path on the multiplexer tree corresponds to the 16 instructions of the same path next cycle. For example, N way code 2691 corresponds to the N way instruction 2601 in FIG. 26 C, E way code 2692 corresponds to E way instruction 2602 in FIG. 26C.

Figure 26D:
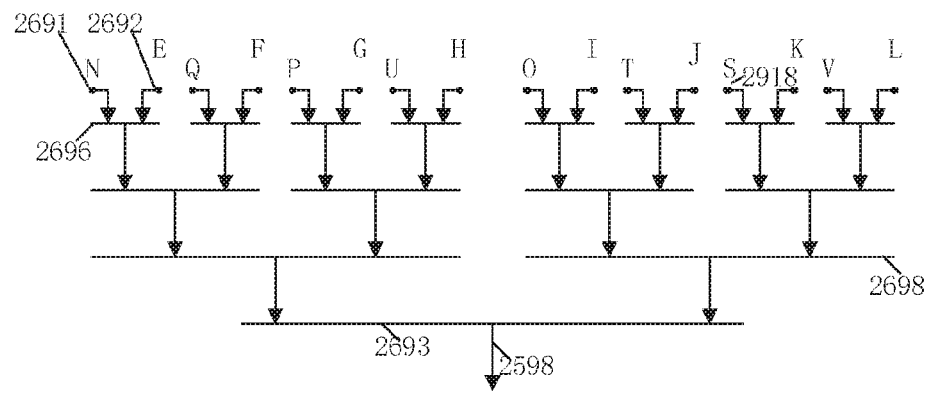
FIG. 26D illustrates an exemplary of implementation of priority encoder 2596.

Each two-input multiplexer in FIG. 26D corresponds to a circle that represents an instruction in FIG. 26C, and this multiplexer is controlled by the branch decision produced by executing the instruction which is represented by the circle. When the branch decision is "not take branch" select the left input of the multiplexer as the output of the multiplexer. When the branch decision is "taken", select the right input of the multiplexer as the output of the multiplexer. For example, multiplexer 2696 corresponds to the N Way slot D instruction represented by circle 2606 in FIG. 26C, and is controlled by the branch decision produced by executing that instruction, that is, the branch decision of N Way slot D front-end pipeline 2673. By the same reason, multiplexer 2698 corresponds to the O Way slot B instruction 2608 and is controlled by the branch decision of the O Way slot B front-end pipeline 2574 executing that instruction in FIG. 27; multiplexer 2693 corresponds to the N Way slot A instruction 2603 and is controlled by the branch decision of the N Way slot A front-end pipeline 2570 executing that instruction in FIG. 27; other multiplexers and their controls can be deduced by analogy. 15 branch decisions produced by 15 front-end pipelines in FIG. 27 each control one of the 15 multiplexers based on the position of each front-end pipeline on the instruction binary tree. The final code outputted by multiplexer 2603 is the way priority code 2598.

Although the number of inputs of multiplexers 2581~2586 of FIG. 27 and the number of inputs of the corresponding multiplexers of FIG. 25 are different, but the principle and operation of way priority code 2598 controlling each of the multiplexers are the same as in the embodiment of FIG. 25. Assuming the N Way slot A instruction (instruction 2603 in FIG. 26C), O Way slot B instruction (instruction 2607), S Way slot C instruction (instruction 2615), S Way slot D instruction (instruction 2618), are all branch instructions. In this case, the N Way BNX, BNY address in register 2525, 2526, are sent through bus 2660 to IRB 2550 to control the issue of N Way instructions in A, B, C, D slots. By the same reason, the O Way, S Way instruction address in register 2521, 2624, are sent to IRB 2521 and 2654 to control the issue of O Way instructions in B, C, D slots, and S Way instructions in C, D slots. If the second address in the S Way instruction in register 2624 is the maximum value of IRB block, then the instruction issued in S Way D slot is the first instruction of an IRB block in IRB 2654 which matches the S Way Next block address from register 2634 issued in D slot under the control of z address in register 2644. All issued instructions are processed in front-end pipelines and instruction dependency checker. The S Way slot D instruction in the said four branch instructions, NOSS has dependency with single or plural number of instructions within the three instructions NOS in slots A, B, C, then the B, C slots' dependency signals of S Way instruction dependency checker 2664 are "no dependence" which do not affect the branch decision output of the corresponding front-end pipeline 2574, 2578 (slot A does not have dependency signal because the instructions which the slot A instruction has dependency with, are in the previous cycle); but the D slot dependency signal is "has dependence", which sets the branch decision of the corresponding front-end pipeline 2680 as "branch not taken"; and the increment amount outputted by the S Way instruction dependency checker 2664 is "1". The front-end pipelines 2570, 2574, 2578, 2680 process the said four branch instruction of NOSS Way, and make branch decisions. The branch decisions are N Way slot A (instruction 2603 in FIG. 26C), O Way slot B (instruction 2607 in FIG. 26C), S Way slot C (instruction 2615 in FIG. 26C), (that is, the branch decision output of front-end pipeline 2570, 2574, 2578) are all "branch taken"; but the S Way slot D (instruction 2618 in FIG. 26C) branch decision (that is, the branch decision output of front-end pipeline 2680) is "branch not taken". Then, the priority encoder 2596 selects the S Way code 2918 in FIG. 26D and outputs it as way priority code 2598, under the control of each of the said branch decisions mentioned above.

Then, under the control of S Way way priority code 2598, multiplexers 2581, 2582, 2583 each selects the output of front-end pipeline 2574, 2579, and 2680 to be further processed by rear-end pipeline 2591, 2592, and 2593. A total of four instructions NOSS each is processed in the rear-end pipeline in A, B, C, D slots including the front-end pipeline 2570 output processed by the rear-end pipeline 2590. The S Way way priority code 2598 controls the rear-end pipeline dependency selector (not shown in FIG. 27) to select the outputs of S Way instruction dependency checker 2664 to send to each of the rear-end pipelines. The "no dependence" signals in A, B, C slots enables the normal execution and completion of instructions in rear-end pipeline 2590, 2591, 2592, but the "dependence" signal in slot D aborts the instruction execution in rear-end pipeline 2593 and not to write back the result. Another implementation is to set the status of each of the "dependence" instructions as "abort" in the front-end pipeline. When an instruction with "abort" status is selected and sent to the rear-end pipeline, the rear-end pipeline will not execute the instruction. This implementation does not use rear-end pipeline dependency selector.

The S Way way priority code 2598 controls multiplexer 2584 to select the increment amount output of S Way instruction dependency checker 2664. The S Way way priority code also controls multiplexer 2585 to select the S Way address register 2664. The selected S Way increment amount and the second address (BNY) 2536 of the selected S Way address are added together by adder 2528. The sum of adder 2528 is '0', which will be the second address N Way next cycle. The carry out output of adder 2528 is "carry", which controls multiplexer 2529 to not select the S Way branch first address 2535 (that is, the first address of S Way slot C instruction in the current cycle), but select the address on Next block bus 2539 which is the S Way Next block address in S Way Next block address register 2634 selected by multiplexer 2586 under the control of way priority code 2598. The output of multiplexer 2529 will be the first address of N Way next cycle, and also indexes track table 2501 to read out the OPQE Way branch target addresses of next cycle. The OPQ Way address further indexes track table 2682, 2683, 2684 to read out the branch target of the rest of the Ways as said before. Each of those instruction addresses are stored into branch target register 2521, etc. as mentioned before. Their corresponding next block addresses and Z addresses are also stored in the Next block address 2530, etc. and Z address register 2540, etc. as mentioned before. This way, in the next cycle, the processor in FIG. 27 using the S Way slot D instruction address of the current cycle as the N Way address issues instructions from N Way IRB 2550 to front-end pipeline 2570 etc, instructions in other corresponding Ways are also issued by their corresponding IRBs to the corresponding front-end pipelines in the same way as in the current cycle.

Another example of instruction execution contains the same four branch instructions as the previous example, but the branch decision of all four instructions are "branch taken" in this example, the output of S Way, instruction dependency checker 2664 determines that the slots A, B, C, D have "no dependence", the increment amount is '2'. Under these conditions, the way priority code 2598 is K Way. This time, multiplexer 2581 selects NOSS Way instruction to normally execute and retire in the rear-end pipelines as the previous example. The K Way way priority code 2598 controls multiplexer 2584 to select the increment amount '0'. The K Way way priority code also controls multiplexer 2585 to select the K Way address from K Way address register 2624. The selected K Way increment amount '0' and the second address (BNY) 2536 of the selected K Way address are added together by adder 2528. The sum of adder 2528 will be the second address N Way next cycle. The carry out output of adder 2528 is "no carry" which controls multiplexer 2529 to select the K Way branch first address on bus 2535 as the N Way first address in the next cycle. The other operations are the same as the previous example.

Another example of instruction execution contains the same four branch instructions as the previous example, and the branch decision of all four instructions are "branch taken" in this example, the output of O Way, instruction dependency checker 2561 determines that slot B, has dependence on slot A, then the corresponding dependence signals of the B, C, D slots are all "dependent", and the increment amount is '0'. Under these conditions, those B, C, D slot dependency signals set each of the branch decisions of each front-end pipeline to "branch not taken". That is, the N Way slot A branch decision is "branch taken" the O Way slot B, C, D branch decisions are "branch not taken". In the priority encoder 2596, these branch decision select NOOO Way, which makes the code representing the O Way as way priority code 2598. The branch decisions from other front-end pipelines are not selected, their corresponding code (such as S Way etc) are filtered.

Under this condition the way priority code 2598 is O Way. This time, multiplexer 2581 etc selects NOOO Way instruction to execute in rear-end pipeline as the previous example. O Way way priority code 2598 selects the slot B, C, D dependency signal (all have dependence) from the O Way instruction dependency checker 2561 control the rear-end pipeline to only completely the instruction execution in slot A, but abort the intermediate execution results of slots B, C, D. O Way way priority code 2598 controls multiplexer 2584 to select the increment amount output '0' of instruction dependency checker 2561 as address increment amount 2597. The O Way way priority code also controls multiplexer 2585 to select the O Way address from 0 Way address register 2521. The selected O Way increment amount '0' and the second address (BNY) 2536 of the selected O Way address are added together by adder 2528. The sum of adder 2528 will be the second address N Way next cycle. The carry out output of adder 2528 is "no carry" which controls multiplexer 2529 to select the O Way first address on bus 2535 as the N Way first address in the next cycle. The other operations are the same as the previous example.

This embodiment is capable of handling the instruction binary tree on which every instruction is a branch instruction as shown in FIG. 26C. If a certain instruction is not a branch instruction, then the table entry that corresponds to the instruction in the track table records a non branch instruction type. When the IRB receives a non branch instruction type, it will not issue instructions, and its corresponding processor units do not function. When receiving a non branch instruction type, the tracker will not use the address in the entry as track table address to index the next layer track table reading the branch targets on that Way. The other embodiments of this disclosure follow this principle.

This disclosure further discloses another method of multi instruction issue. The method is to divide n sequential instructions starting from an initial address, and the possible branch target instructions from the branch instructions within the n instructions, and the branch target instructions of the branch targets, into different Ways based on each instruction's position on the instruction binary tree, and issue them at the same time. The said plural number of instructions simultaneously issued is each independently executed. The dependency amongst instructions is checked, the execution of instructions with dependency and the follow up instructions in the same way are all aborted; and a way address increment amount is feed backed for each way based on if there is dependence amongst the instructions and the location of the dependent instruction. Make branch decision independently execute each branch instruction regardless of other branch decisions. Determine the way of execution in current cycle and next cycle based on each of the independent branch decisions and branch priority based on the branch instruction sequence order. Based on the way determined, select n instructions from the said simultaneously issued instructions for normal execution and retirement, and terminate the rest of the instructions. Based on the determined way of next cycle, sum the current cycle address of the way with the address increment amount of the way. The result is the block offset address BNY of the initial address of next cycle. Take the current cycle address of the determined way as the initial block address BNX for next cycle if the above sum does not overflow the block address boundary. Take the current cycle Next block address of the determined way as the initial block address BNX for next cycle if the above sum does overflow the block address boundary. Then n sequential instructions start from this initial address, and the possible branch target instructions from the branch instructions within the n instructions are issued at the same time. This process is performed repeatedly.

Figure 29:
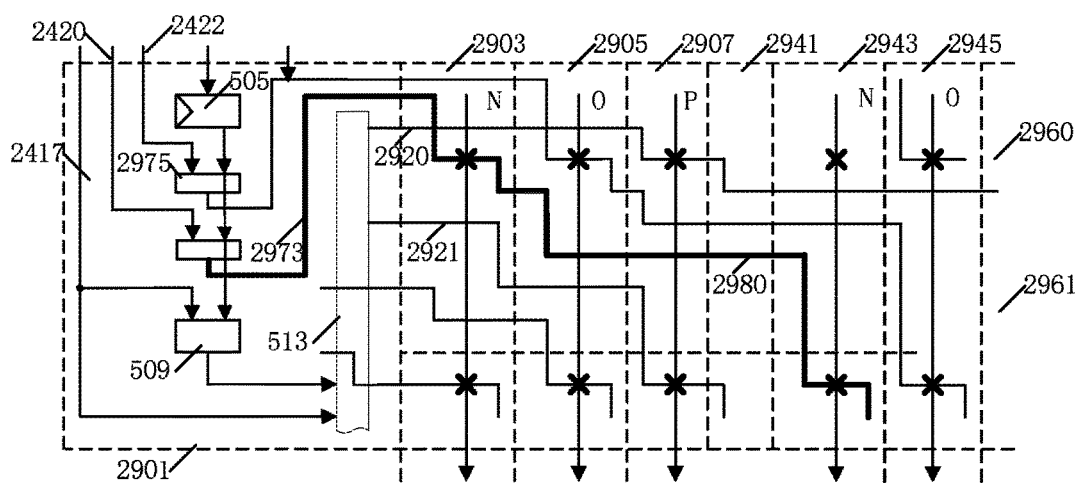
FIG. 29 illustrates the exemplary structure of the IRB organized by the said issue slot organization of this disclosure.

As used herein, the IRB may also be organized by execution slots, Therefore, the IRB and decoder structure organized this way is different from the IRB in embodiment in FIG. 25, consequently the logic structure that provides Z address (column address generator 2503 in FIG. 25) to IRBs is also different refer to FIG. 29, which is an exemplary structure of IRB organized by issuing slots. Structure of IRB organized by slot differs in each slot. In the figure, the decoder 2901 is for instruction issue slot C, column 2903, 2905, and 2907 are the columns formed by the read ports and bit line of C slot N Way, O Way, and P Way. First address comparator 509 and second address decoder 513 inside decoder 2901 are the same as that of FIG. 25 embodiment. The difference lies in that word line 2920, 2921 produced by the second address decoder 513 control the right most column of the read ports instead of the left most column of read ports (the column of C slot N Way). In an IRB organized by slot, the second address decoder controls the read ports in the Way initiated from this instruction issue slot. Therefore, the second address decoder in A slot controls the read ports in N Way; the second address decoder in B slot controls the read ports in O Way; the second address decoder in C slot controls the read ports in P Way; the second address decoder in D slot controls the read ports in Q Way. Decoder 2941 in the figure is the decoder of D slot, column 2943, 2945, are the read ports and bit line column of N Way and O Way in slot D, the P Way and Q Way read port columns of D slot are not shown in the figure.

The zigzag word line 2920, etc does not connect the neighboring two columns of read ports in the same slot. But rather, connects one read port of one Way in one slot to a read port in the same way the next row in the slot to the right, thus enabling the sequential instructions in the same Way issued one in each instruction issue slot at the same time. Therefore, the word line driving the read port of row 2961, N column 2903 comes from the read port of row 2960, N column (slot B). By the same reason, the word line driving the read port of row 2961, O column 2905 comes from the read port of row 2960, O column (slot B). All of the read ports in the C slot, with the exception of the read ports in first row 2960 or in the P column 2907, are controlled by the zigzag word line from the read ports in a previous row same way in B slot. The read ports in the first row do not have a previous row. Therefore, the P column read ports are controlled by the decoder 513 generated word line 2920 etc. (the first row as well as the other rows in P column), the first row 1960 read ports on N column 2903 and on O column 2905 are each directly controlled by the Next block address comparator 2973 and 2975.

There is no Z address decoder, such as the one in the decoder in FIG. 25 embodiment, in decoder 2901. Because the neighboring Z address (it actually is the instruction slot address) falls into different slots in an IRB organized by slot, that is, based on the Z address of the Next block address BNX, this Next block address will be sent to one of the decoders 2901 or 2941. The logic determining sending the Next block address to which slot will be explained in FIG. 30. The decoders in each slot are similar, but contain different numbers of comparators and decoders. Decoder has a number of Next block address which equals to one less than the total number of columns, such as slot A only has N Way, so its decoder only has one set of first address comparator such as 509 and second address decoder such as 513, but without Next address comparator such as 2973; Slot B has two Ways N Way and O Way, so its decoder has one set of first address comparator and second address decoder to drive the read ports on column 0, has one Next address comparator to drive the read port in N column first row, the other read ports in the rest of the column N are driven by zigzag word lines from read ports in A slot N column of previous row. Decoders in Slot C 2901 have one set of first address comparator and second address decoder, has two Next address comparators corresponding to N Way and O Way. Decoders 2941 in Slot D have one set of first address comparator and second address decoder, has three Next address comparators corresponding to N Way, O Way, and P Way. If there are multiple Ways initiate from the same slot at the same time, then each Way has its own first/second address comparator/decoder to drive the read ports of this Way (column).

In FIG. 29, the Next block address inputted from the C slot N Way Next block address bus 2420 matches with the address stored in first address register 505, so comparator 2973 drives zigzag word line 2980 issue the instruction in row 2960 from column 2903 of C slot N Way, and issue its next sequential instruction from column 2943 of D slot N Way. The two sequential instructions prior to the instruction in row 2960 are issued by an IRB block, which is the prior IRB block in address sequence, from the row before the last row in A slot N Way, and from the last row in B slot N Way.

Figure 30:
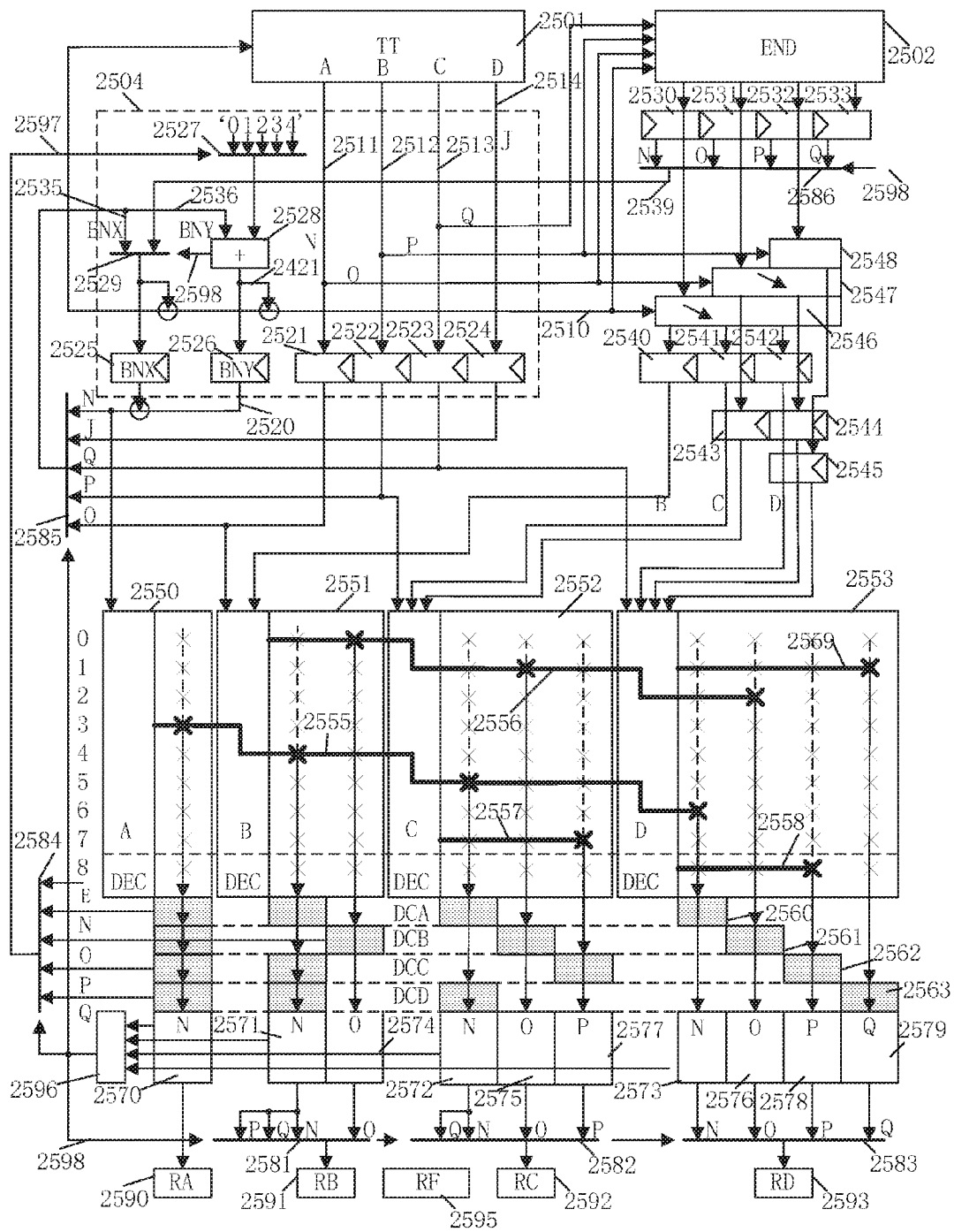
FIG. 30 illustrates another exemplary embodiment of the processor of the said address decode control method.

Please refer to FIG. 30, which is another exemplary embodiment that can issue 4 instructions in parallel, and determine the program execution flow based on branch decisions on the branch instructions within the issued instructions. This embodiment uses the same instruction segment as that used in FIG. 25. In FIG. 30, track table 2501, End track point memory 2502, tracker 2504, register 2521-2524, front-end pipe lines 2570-2579, real-end pipe lines 2590-2593 are all the same as that in FIG. 25. The difference lies in that the IRBs in this embodiment is organized by slot as described in FIG. 29. IRB 2550 corresponds to slot A and has a column of read ports linked together by a bit line, which issues instructions to the corresponding front-end pipeline 2570. There is only 1 way (N way) in slot A, which is identified by the mark on the corresponding front-end pipeline 2570. IRB 2551 corresponds to B slot and has 2 ways in total (N way and O way). IRB 2552 corresponds to slot C and has 3 ways in total (N way, O way, P way). IRB 2553 corresponds to slot D and has 4 ways in total (N way, O way, P way, and Q way). Every time Slot A's IRB 2550's decoder 2417 issues, it drives zigzag word line 2555 to read out the instructions in N way of slots A, B, C, and D and then issue to the corresponding front-end pipeline. Whether or not the corresponding decoders of IRBs 2550, 2551, and 2552 drive word lines, depends on if the instruction issued by N way is a branch instruction or not. If slot A's N way is a branch instruction, the instruction type in register 2521 is branch. Then the decoder in slot B IRB 2551 decodes the branch target address in register 2521 and drives word line 2556 to read out the instructions in O way in slots B, C, and D and issues to the corresponding front-end pipeline; it does not drive word line if the type is not branch. Because if slot A has no branch instructions, then it does not have branch targets, so O way in slots B, C, and D does not need to be issued. By the same principle, the drive of word line in ways P and Q depends on if N way instruction in slots B and C is a branch instruction (see if the instruction type in register 2522, 2523 is branch or not). Branch type information is provided by reading out a table entry from track table. In this embodiment, the read ports are directly controlled by hard-wired zigzag word lines.

As described in FIG. 25, the track table 2501 in FIG. 21 is different from previous embodiments. The track table can output the table entry 2511 pointed out by read pointer and the three sequential following table entries, 2512, 2513 and 2514, at the same time to provide up to 4 branch targets the 4 sequential instructions may point to. The End track point memory 2502 outputs 4 End track points based on 4 BNX address inputs in parallel. Registers 2530, 2531, 2532 and 2533 are used to store the Next block addresses. Based on the 4 BNX address inputs, the Next block addresses provided by the End track point memory can be deemed as valid or invalid. Shifters 2546, 2547 and 2548 are responsible for shifting these Next block addresses (provided by the End track point memory) to the appropriate slot. Registers 2530, 2531, 2532 and 2533 store the said 4 Next block addresses. In these four Next block addresses, the first Next bock address after being shifted by shifter 2546, can be stored by either register 2540, 2541, or 2542; the second Next bock address after being shifted by shifter 2547, can be stored by either register 2543 or 2544; the third Next block address after being shifted by shifter 2548, is stored by register 2545. The Next bock address BNX outputted by registers 2530, 2531, 2532 and 2533 is selected by multiplexer 2586, which is controlled by branch decision result 2598. The output passes through bus 2539 and is sent to an input of multiplexer 2529 in tracker 2504 for the calculation of Current address of next clock cycle. Also, the Next block addresses outputted by registers 2530, 2531 and 2532 are sent to the Next bock address comparator 2419 in IRBs 2550, 2551 and 2552. The Next bock address outputted by register 2540 is sent to column address controller 2411 in IRB 2551, the Next block addresses outputted by registers 2541 and 2543 are sent to column address controller 2411 in IRB 2552, the Next block addresses outputted by registers 2542, 2544 and 2545 are sent to column address controller 2411 in IRB 2553; these control the plural number of zigzag word lines in the Next IRB blocks. In this embodiment, register 2525, 2530, 2531, 2532 and 2533 store BNX; register 2526 stores BNY: registers 2521, 2522, 2523, and 2524 store both BNX and BNY.

As used herein, the Next block addresses of current instruction or branch target may be generated based on the following method. The generated Next block addresses may be shifted to store in appropriate registers. Define number of rows in every IRB block (number of storage entries) as n; block offset address (second address) as BNY, which has value 0~n−1, the row on the top is row 0; there are m slots in total, which have value from 0~m−1, the left most slot is slot 0; there are w ways in total, which have value from 0~w−1, the left most is O way. Then, the Next block address is valid if ((m−w)−(n−BNY)) is greater than 0, invalid if otherwise. In this embodiment, the next block addresses for N, O, and P ways can be shifted to appropriate slots based on the corresponding initial BNY addresses. Q way does not need the said Next block address. Specifically, the value of ((m−w)−(n−BNY)−1) is used as the shift amount and right shifts the Next block address.

In this example, n=8, m=4, w=4, N corresponds to Way0, O corresponds to Way 1, P corresponds to Way 2, Q corresponds to Way 3. When N way's BNY=6, ((m−w)−(n−BNY))=((4−0)−(8−6))=2, greater than 0, Therefore, the Next block address is valid. The meaning is that address '6' is decoded and drives zigzag word line, the instruction that corresponds to address '6' is issued from N way slot A, the instruction that corresponds to address '7' is issued from N ways slot B, at this time because the zigzag word line terminates as it reaches IRB block's lower boundary. At this time, decoding of Next address points to the first instruction of the Next instruction block, the only thing that needs to be known is which slot of N way the instruction should be issued from to fully utilize processor resources and avoid collision with instructions issued by the current IRB. At this time, the shift amount ((m−w)−(n−BNY)−1)=1, shifter 2546 shifts right one position of the valid Next block address, which is the N way Next block address stored in register 2530, and store the shifted result to register 2541 of N way slot C (the values of N way's other corresponding registers 2540 and 2542 are invalid). This address is decoded by the column decoder 2411 of Next instruction block in column 2 to issue the first instruction (BNY=0) from N way slot C, the second instruction (BNY=1) is issued from N way slot D. If ((m−w)−(n−BNY)) is less than 0, the Next bock address is invalid, and the corresponding registers 2540, 2541, 2542 of N way are all invalid. Controller controls all column decoders 2411 so that they don't drive any zigzag word lines, because under the circumstances, the current IRB block issues instructions to all columns at the same time. The result of the above calculation can be placed in a reference table to replace calculation.

Dependency checker 2560 etc. has the same structure of dependency checker in the FIG. 25 embodiment. However, FIG. 25 is organized by Way while FIG. 30 is organized by slot, the input sources of dependency checkers in the two embodiments are the same. For example, dependency checker 2560 in FIG. 25 checks the correlation of instructions in N way's A, B, C, D slots, while dependency checker 2560 in FIG. 30 checks the correlation of N Way instructions in slots A, B, C, D; and dependency checker 2563 in FIG. 25 checks the correlation of instructions in N way's A, B, C and in Q Way's D slots, while dependency checker 2563 in FIG. 30 checks the correlation of N Way instructions in slots A, B, C and Q Way instruction in slot D.

This embodiment and embodiment in FIG. 25 differs in how IRBs 2550, 2551, 2552 and 2553 issue instructions. Take the same instructions segment in FIG. 24C as an example, and the initial conditions are the same as in FIG. 25 embodiment. Using read pointer '68.3' as address, read four contiguous table entries starting from the 3rd table entry from track table 2501's row 63; the branch target addresses '68.0', '68.7', '68.1', '68.2' are respectively read from buses 2511, 2512, 2513, and 2514 and sent to the input of registers

2521, 2522, 2523, and 2524. Here the address format is BNX.BNY. Each of the first instruction address BNXs on buses 2510, 2511 and 2512 are sent to End track point memory 2502 to read out the corresponding Next block address, while each second address BNY, like stated before, is used to produce the corresponding shift amount. The BNX addresses on bus 2510~2512 are all '68', and the content of memory 2502's row 68 is '23', so End track point memory 2502's 3 outputs are all '23'. As said before, the current address' second address '3' and O way's second address '0' both produce invalid Next block addresses. P way's second address '7' can produce valid Next bock address, and shift amount ((m−w)−(n−BNY)−1)=((4−2)−(8−7)−1)=0, does not need to shift, and is directly stored into register 2545 (here register 2540, 2541, 2542, 2543 and 2544 are all invalid)

After the clock signal updates tracker registers and the Next block address register, value '68.3' on bus 2520 which is the outputs of register 2525 and 2526 joined together, is sent to slot A IRB 2550 in the current clock cycle. The value is matched by decoder's first address comparator and decoded by the second address decoder, which drives zigzag word line 2555, to issue instructions 3, 4, 5, 6 along slots A, B, C, D; the Next bock address in N way of registers 2540, 2541 and 2542 are all invalid, Therefore, after decoding slots B, C, and D the column decoder 2411 does not drive any word line in N way. At the same time, register 2521's output '68.0' is sent to slot B's IRB 2551. After being matched and decoded by decoder, it drives zigzag word line 2556, and issues instructions 0, 1, 2 along the O way of slots B, C, and D; the Next bock address of the O way of registers 2543 and 2544 is invalid, Therefore, no word lines are driven by column decoder 2411 in slots C and D. At the same time, register 2522's output '68.7' is sent to P way IRB 2552, after being matched and decoded by decoder, drive zigzag word line 2557. After issuing instruction 7 along way P slot C, the word line terminates when it reaches IRB block's lower boundary; register 2545's P way's Next block address is valid, Therefore, D slot's decoder decodes it to drive word line 2558; in D slot's P way's IRB of Next instruction block, it's '0' row issues instruction 8. At the same time, register 2523's output '68.1' is sent to Q way's IRB 2553, and after matching and decoding by decoder, decoder drives word line 2559 and issues instruction '1' along Q way's slot D. The rest of the operations are the same as in the FIG. 25 embodiment, Therefore, is not repeat here.

Figure 32:
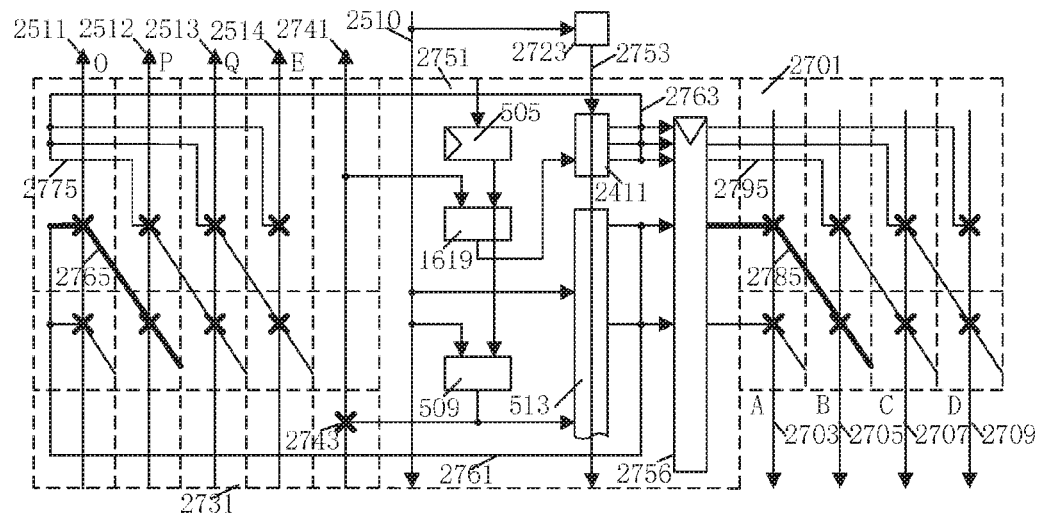
FIG. 32 illustrates an exemplary embodiment of the said joint buffer of this disclosure.

The multi layer track table 2501, 2682, 2683, 2684, 2685, 2686, 2687, 2688 in the embodiment in FIG. 27 can be implemented with 8 read port memory. FIG. 32 shows one of the implementations, this implementation is to build a micro track table 2731 corresponding to an IRB block 2701. When an instruction block is filled into the IRB, its corresponding track is also filled into its corresponding micro track table to be read by tracker. Micro track table 2731 is a matrix that consists of read ports, bit line, and oblique (zigzag) word line like IRB block 2701 (the difference is the memory read port and bit line width is the data width of track table entry not the instruction width in IRB block matrix 2701), plus a Next block address read port 2743 and Next block bit line 2741 for reading out the End track point on the track. Take the N Way IRB used in FIG. 25 or 27 as an example. In this embodiment, bit line 2703, 2705, 2707 and 2709 in the IRB block matrix 2701 are bit lines each for A, B, C, D instruction issue slots. Correspondingly, bit line 2511, 2512, 2513, 2514 in micro track table 2731 is each used to read out the track table entry corresponding to the instruction in the A, B, C, D instruction issue slots. Because the content of the track table entry is the branch target of its corresponding branch instruction, Therefore, the content read out from the said four bit lines from the micro track table matrix the branch target address of instructions in the four slots of A, B, C, D that is, the starting address of four ways O, P, Q, E. The micro track table 2731 shares decoder 2751 with IRB block 2701.

The first address register 505, the first address comparator 509, second address decoder 513, Next block address comparator 1619, Z address decoder 2411 in the decoder 2751 have the same function as the same number functional blocks in decoder 2417 in FIG. 24B's embodiment. The Z address generator 2723 has the same function as the Z address generator 2503 in FIG. 27, its function is to calculate or check table to find the Z address based on the second address in the Current address 2510, the resulting Z address is sent through bus 2753 to the Z address decoder 2411 in all IRB blocks in the IRB. The first address comparator 509 compares the Current first address on the Current address bus 2510 (in this example, it is from the tracker bus 2510) with the address in first address register 505. If match, then read port 2743 is controlled to put the End track point in mini track table 2731 on the Next block address bit line 2741, and also enables the second address decoder 513. The enabled second address decoder decodes the second address on bus 2510, its output 2761 directly drives the oblique word lines (it is called the Current word line) starting from the left edge of the matrix in micro track table, such as word line 2765 etc. to read out the corresponding entries from the micro track table through bit line 2511, 2512, 2513, 2514. The Next block address comparator 1619 in each of the IRB blocks compares the address on the Next address bit line 2741 (which is driven by the said IRB block which matches with the Current first address on bus 2510) with the first address in register 505 of each IRB block. If a comparator 1619 in a certain IRB block matches, then it enables the Z address decoder 2411 within the block to decode the Z address on bus 2753 to drive the oblique word lines (named Next block word line) such as word line 2775, etc. starting from upper edge (except the left most column) of the micro track table matrix 2731 in the Next block IRB block (may not be the same block of the Current IRB block) to read out the corresponding entries from this Next micro track table through bit line 2512, 2513, 2514.

In the Current IRB block, the output 2761 of second address decoder 513 are latched by register 2756, and drive the Current word line such as 2785 in the Current IRB block to control read ports issuing instructions in the next cycle. In the IRB block of the Next block, the output 2763 of Z address decoder 2411 are latched by register 2756, and drive the Next block word line such as 2795 in the Next block IRB block to control read ports issuing instructions in the next cycle. Following the description in the FIG. 25 embodiment, the instruction slots these two IRB blocks issue are complementary, that is four instructions in sequence are issued from bit lines 2703, 2705, 2707, and 2709 no matter if those instructions are from one or two instruction blocks. By the same reason, the micro track table matrix 2731 reads out O Way, P Way, Q Way, E Way, branch target addresses through bit lines 2511, 2512, 2513, 2514, and the N Way Next block address through bit line 2741 at the clock cycle before the instruction issuing, no matter those instruction addresses are from one or two micro tracks as said in the prior embodiments when the Current address on bus 2510 does not match with the address in first address register 505 of any IRBs; or when the Z address 2751 outputted by Z address decoder 2753 is valid (means the Next block is needed) but the Next address on bus 2741 does not match with the address in first address register 505 of any IRBs, the IRBs requests the corresponding track and IRB block through address on bus 2510 or bit line 2741 from the track table and level one instruction cache to fill micro track table and its corresponding IRB block.

Figure 31:
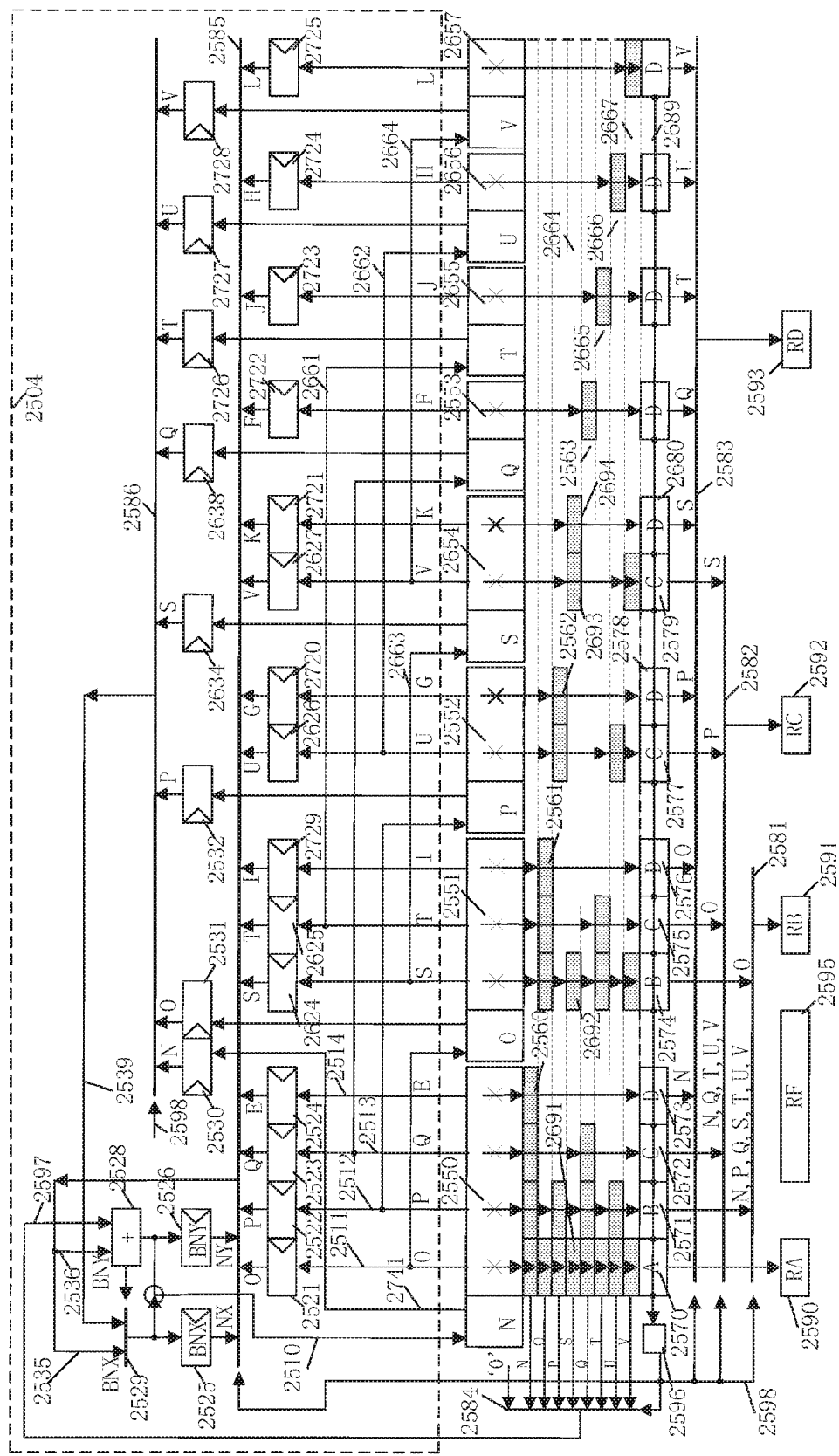
FIG. 31 illustrates another exemplary embodiment of the processor of the said address decode method.

The joint track table/IRB in this embodiment (joint buffer hereafter, each block in it is named a joint block) can be applied to the embodiment in FIG. 25 and FIG. 27 to replace track table 2501, 2682, 2683, 2684, 2685, 2686, 2687, 2688. Further, the joint buffer in this embodiment may also replace the End track memory 2502 and Z address generator in FIG. 27 because their functions are already included in the joint buffer. FIG. 31 is an embodiment implementing the processor in FIG. 27 using joint buffer. Other than using joint buffers replacing the track table, IRBs and track memory 2502, Z address generator 2503, Z address register 2540~2543, other functions of other function blocks and the operation of the entire processor is identical to the processor in the FIG. 27 embodiment. The numbers in the figure follow the same as in FIG. 27. In FIG. 31, the N Way joint buffer 2550 performs the function of track table 2501 in FIG. 27 besides performing the same instruction issue function as IRB 2550 in FIG. 27. By the same reason, the joint buffer 2550, 2551, 2552, 2654, 2553, 2655, 2656, 2657 of O, P, S, Q, T, U, V Ways also performs the function of track table 2501, 2682, 2683, 2684, 2685, 2686, 2687, 2688 in FIG. 27 besides executing the same instruction issue function as the IRB 2550 in FIG. 27.

The first address outputted by multiplexer 2529 within the tracker 2504 is sent to register 2525, the second address outputted by 2528 in 2504 is sent to register 2526. The instruction address 2510 formed by joining this first and second address is sent to N Way joint buffer 2550 (in FIG. 27 this address is sent through bus 2510 to track table 2501 to read the branch target address of O, P, Q, E Way), and sent through bus 2641 to the End track memory 2502 to read the Next block address of N Way, through bus 2641 sent to Z address generator 2503 to produce the N Way Z address produced by the joint buffer is for its own internal use, thus not outputted; the other N Way next block address (first address is sent to N Way next block address register 2530); branch target address of O, P, Q, E Ways (first and second addresses) is each sent through bus 2511, 2512, 2513, 2514 to the Current address register 2521, 2522, 2523, 2524. The O Way branch target address on bus 2511 is also sent to address the O Way joint buffer 2551; also P Way, Q Way branch target addresses respectively on bus 2512, 2513 are sent to address P Way, Q Way joint buffers 2552, 2553.

O Way branch target address on bus 2511 addresses O Way joint buffer 2551; the O Way Next block address outputted by O Way joint buffer 2551 is sent to O Way Next block address register 2531; S, T, I Way branch target address each is sent through bus 2663, 2661, etc. to Current address register 2624, 2625, 2729. P Way branch target address on bus 2512 addresses P Way joint buffer 2552; the P Way Next block address outputted by P Way joint buffer 2552 is sent to P Way Next block address register 2532; U, G Way branch target address each is sent through bus 2662, etc. to Current address register 2626, 2720. Q Way branch target address on bus 2513 addresses Q Way joint buffer 2553; the Q Way Next block address outputted by Q Way joint buffer 2553 is sent to Q Way Next block address register 2638; K Way branch target address is sent to Current K Way address register 2722.

By the same reason, the S Way branch target address on bus 2663 outputted by O Way joint buffer 2551 addresses S Way joint buffer 2654; the S Way Next block address outputted by joint buffer 2654 is sent to the S Way Next block address register 2634; the V Way, K Way branch target addresses are sent to the Current V Way, K Way address registers 2627, 2721. The T Way branch target address on bus 2661 outputted by O Way joint buffer 2551 addresses T Way joint buffer 2655; the T Way Next block address outputted by joint buffer 2655 is sent to the T Way Next block address register 2726; the J Way branch target address is sent to the Current J Way address register 2723. The U Way branch target address on bus 2662 outputted by P Way joint buffer 2552 addresses U Way joint buffer 2656; the U Way Next block address outputted by joint buffer 2656 is sent to the U Way Next block address register 2727; the H Way branch target address is sent to the Current H Way address register 2724. The V Way branch target address on bus 2664 outputted by S Way joint buffer 2654 addresses V Way joint buffer 2657; the V Way Next block address outputted by joint buffer 2657 is sent to the V Way Next block address register 2728; the L Way branch target address is sent to the Current L Way address register 2725.

In the next cycle, all 16 of the said branch targets are latched in the corresponding said 17 Current address registers 2521, etc. (for ease of explanation, the first address and second address of N Way are each stored by register 2525 and 2526), waiting for the selection of multiplexer 2585. When 2585 selects N Way, it selects the joint output from register 2585, 2586 as the N Way input and all the 8 said branch targets are stored in the corresponding said 8 Next block address registers 2530, etc, waiting for the selection of register 2586. Each of the second address decoders output 2761 and each Z address decoders outputs in each of the decoders 2751 in each of the joint buffers like 2550 are latched in register 2756 to drive the Current word lines, such as word line 2785 etc, also drives the Next block word line in IRB 2701 such as word line 2795, etc. (please see FIG. 32). Issue up to 15 instructions in up to 8 Ways of the said N, O, P, S, Q, T, U, V Ways to the front-end pipeline 2570, etc. As in the embodiment of FIG. 27, way priority encoder 2596 produces a Way priority code 2598 controls multiplexer 2581, 2582, 2583 to select the intermediate result of a proper Way of instruction to be executed by rear-end pipeline 2590~2593. It also selects the branch increment amount of the same Way through bus 2597 to one input of the adder 2528. Way priority code 2598 also controls multiplexer 2586 to select the Next block address 2539 of the same Way to input of multiplexer 2529 waiting to be selected. The branch target of these slots doesn't need to provide the next target address in this cycle, Therefore, multiplexer 2586 selects the fall-through instruction address of D slot instruction when the way priority code represents the branch target of D slot instruction; multiplexer 2586 selects N Way when the way priority code is E Way. The way priority code 2598 also controls multiplexer to select the Current address of the same way. The first address 2535 of the Current address is sent to another input of multiplexer 2529 to be selected, and the second address 2536 is sent to another input of adder 2528. The sum of the adders is the new N Way second address. The carry out output of the adder controls multiplexer 2529. If this output "no carry", select the Current first address as the new N Way first address. If this output is "carry" then select the Next block address as new N Way first address. The first address outputted by multiplexer 2529 is sent to register 2525. The second address outputted by adder 2528 is sent to register 2526; the N Way address 2510 formed by joining the first and second addresses is sent to N Way joint buffer 2550 starting the addressing of the new cycle. This process repeats.

IRB can contain its corresponding micro track table, together it is called the joint buffer. Because the track corresponds to the instruction block, Therefore, the filling of the micro track table and IRB block in a joint buffer can be done at the same time. The two also share the same set of decoders.

Figure 33:
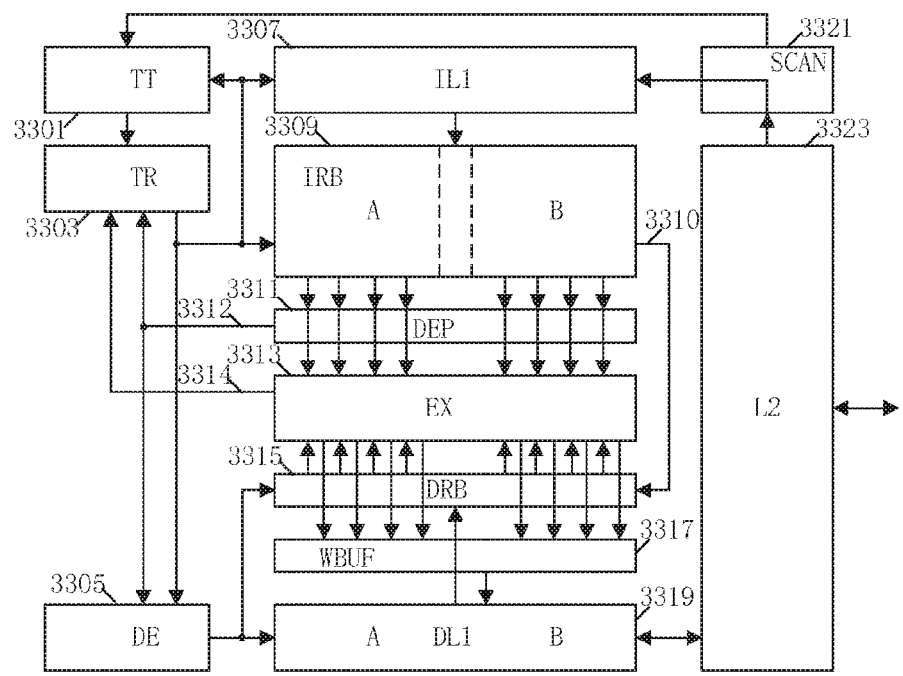
FIG. 33 illustrates an exemplary embodiment of the complete structure of the said processor system of this disclosure.

Please refer to FIG. 33, which is an exemplary complete structure of the lane processor system consistent with the embodiments. In this embodiment, processor system is composed of track table module 3301, tracker module 3303, data engine module 3305, first level instruction cache 3307, IRB 3309, dependency checker module 3311, execution unit 3313, data read buffer 3315, write buffer 3317, first level data cache 3319, scanner 3321, and second level cache 3323. Second level cache 3323 stores both instructions and data. As said in a previous embodiment, when tracker 3303 finds that branch target instruction has not yet been stored in first level instruction cache 3307, it fetches the corresponding instruction block from second level cache 3323 and fills it to first level instruction cache 3307, and at the same time builds a corresponding track in track table 3301 after scanner examines the instructions that are filled. When data engine 3305 finds the data corresponding to the data address of a data access instruction has not yet been stored in first level data cache 3319, it fetches the corresponding data block from second level cache 3323 and fills it to first level data cache 3319, at the same time write back to the second level cache 3323 the data block replaced out of first level data cache 3319.

When the said processor system includes multiple columns (that is: Ways or slots), each column has a set consisting of execution unit(s), IRBs, and DRBs. Dependency checker module 3311 can be configured, to detect the dependency between instructions issued within a column, or certain columns in a plurality of columns, or all columns in a plurality of I columns. Tracker module 3303 indexes track table module 3301 and fetches branch target instruction from first level instruction cache 3307 and fills it to IRB 3309 before processor executes the branch instruction if the it is not already in 3309.

In addition, as described in the embodiments of FIG. 25, tracker module 3303 provides instructions for execution units in different columns. Tracker 3303 calculates the new current BNX, BNY by adding the initial BNX, BNY with the increment amount outputted by the dependency check unit 3311, both in a Way determined based on the branch result 3314 outputted by execution unit 3313.

Data engine module 3305 is similar to the one in FIG. 18. It calculates the possible data addresses for the next time a data access instruction is executed based on stride information, and the corresponding data from first level data cache 3319 to DRB 3315 if the data is not yet there. Specifically, when IRB 3309 issues data access instruction to execution unit 3313, at the same time addressing DRB 3315 through bus 3310 (for example FIG. 18B's embodiment obtains address from decoder 1820 through bus 1815, and then address DRB 1818) reads out the data corresponding to the data access instruction.

In addition, in the embodiment's processor system, write buffer 3317 temporarily stores the data that execution unit 3313 intends to write back to first level data cache 3319, and writes the temporary data back to first level data cache 3319 if it is not filling data into DRB 3315 (first level data cache 3319's port is not busy at the time). This reduces the read/write collisions in first level data cache 3319, and ensures that the data that may be used in execution unit 3313 will be filled into DRB 3317 as soon as possible.

As said in the previous embodiments, under the guidance of tracker module 3303, the processor system of this embodiment can control IRBs to provide the correct instruction to be executed in execution unit along the program flow without interruption, and based on the information stored in IRB find corresponding data in DRB, no matter if the branch instructions take branch or not. Because each column used in the processor system has its own IRB and DRB to provide instructions and corresponding data, Therefore, instructions and corresponding data can be provided to different columns (that is: different issue slots or Ways) at the same time, which improves processor system efficiency.

It is understood by one skilled in the art that many variations of the embodiments described herein are contemplated. While the invention has been described in terms of an exemplary embodiment, it is contemplated that it may be practiced as outlined above with modifications within the spirit and scope of the appended claims.

INDUSTRIAL PRACTICALITY

The apparatuses and methods of this disclosure may be applied to various applications related to cache, and may enhance efficiency of the cache.

The invention claimed is:

1. A method for facilitating operation of a processor system, comprising:
   naming possible execution paths of a section of sequential instructions starting from an initial address, naming sequential instructions starting from the branch target instructions of the branch instructions within the section of sequential instructions as ways, and naming the initial address and the branch target addresses as way starting addresses;
   issuing a plurality of instructions in the ways in parallel to processor pipelines for processing;
   checking dependency among the plurality of instructions, and generating an address increment amount for each way based on the dependency;
   making branch decisions independently for other branch instructions among the plurality of instructions of each way;
   generating a way selecting signal based on the plurality of branch decisions and positions of corresponding branch instructions in the execution paths;
   executing only instructions having no dependency prior to and in a selected way;
   updating the initial address by adding the starting address of the selected way and the address increment amount of the selected way.

2. The method according to claim 1, wherein:
   provided that m and w are positive integer, m sequential instructions starting from the initial address, together with possible branch target instructions and subsequent instructions of the branch instructions within the sequential instructions, are organized into w ways based on the possible execution paths, and into m instruction issue slots based on a program sequence of the instructions, wherein m is a total number of issue slots in a way, and w is a total number of ways;
   a plurality of instructions of each way are in a plurality of slots; and
   each slot processes the plurality of instructions in different ways.

3. The method according to claim 2, wherein:

naming pipeline stages up to a branch decision stage of a processing pipeline as a front-end pipeline, and pipeline stages after the branch decision stage as a rear-end pipeline, each issue slot has a processor pipeline structure consisting at least one rear-end pipeline and up to w front-end pipelines, where each front-end pipeline corresponds to an instruction of a way.

4. The method according to claim 3, wherein:

based on dependency among issued instructions in each way together with all prior instructions and positions of dependent instructions, generating an address increment amount for each way.

5. The method according to claim 4, wherein:

branch decisions are made independently when processing branch instructions in issued plurality of instructions;

a way with each of the branch decisions is selected based on a priority of corresponding instruction node positions on an instruction execution path binary tree;

each branch decision controls a 2-to-1 selection which selects a fall-through way if the branch decision is not taking-branch and selects a target way if the branch decision is taking-branch;

a plurality of the selections are configured according to positions of corresponding plurality of branch instructions in the execution path binary tree, with a selection result corresponding to a later branch instruction in execution sequence as an input to a selection corresponding to an earlier branch instruction in sequence; and a last selection corresponds to a first branch instruction, and a result of the last selection designates the selected way.

6. The method according to claim 5, further including:

selecting a plurality of front-end pipeline outputs of instructions in the selected way and instructions prior to the selected way to the rear-end pipeline for further execution;

completing and retiring non-dependent instructions in the selected way and the instructions prior to the way, based on the dependency of the selected way; and replacing the initial address by a summation of the starting address and the address increment amount of the selected way.

7. The method according to claim 6, further including:

adjusting the number of instructions issued in parallel by adjusting a configuration of dependency check, wherein setting the dependency check of a slot to having-dependence disables the front-end pipeline and the rear-end pipeline of the slot.

8. The method according to claim 7, wherein:

an instruction read buffer (IRB) stores a plurality of instructions;

there are plurality IRB read-ports for each instruction stored in the IRB, each of the read-port corresponding to a same instruction issues the instruction to a front-end pipeline via a separate set of bit-lines; and the plurality of IRB read-ports are organized as a two-dimension matrix with read-ports corresponding to different instruction as one dimension and read-ports corresponding to different sets of bit-lines as another dimension.

9. The method according to claim 8, wherein:

using diagonal word lines to control the IRB read-port matrix outputting a plurality of sequential instructions to a plurality front-end pipelines;

IRB read-ports connected to a single set of bit-lines correspond to a slot; and

IRB read-ports controlled by a single diagonal word-line corresponds to a way.

10. The method according to claim 9, further including:

extracting instruction information from instruction blocks filling into an instruction cache;

building tracks corresponding to the instruction blocks based on extracted information storing in tracks of a track table, wherein a sequential next block address is stored to a multi-port end address table.

11. The method according to claim 10, wherein:

the initial address is used to address the track table and the multi-port end address table;

the track table outputs target addresses which also address the multi-port end address table;

the multi-port end address table outputs sequential next block addresses of the initial address and target addresses; and the initial address, the target addresses, and the next addresses are send to the IRB.

12. The method according to claim 11, wherein:

the IRB stores a plurality instruction blocks and their corresponding block addresses;

the IRB matching the initial addresses, the target addresses, and the next addresses with the block addresses stored in the IRB to identify the instruction blocks;

offset addresses of matched incoming addresses are decoded to enable zig-zag word lines in the identified block to issue a plurality of instructions controlled by the word lines to the front-end pipelines for processing.

13. The method according to claim 12, wherein:

the slot corresponding to the first instruction in a way is named as the starting slot of the way;

the initial address and the target addresses enable the word-lines originating in the starting slots of corresponding way;

the next addresses enable the word-line starting in the slot after the slot where the last instruction of corresponding prior block is issued; and the IRB sends out a plurality of instructions from the read-ports controlled by the enabled word-lines to the corresponding front-end pipelines for processing.

14. The method according to claim 13, wherein:

n sequential instructions starting from an initial address, and the possible branch target instructions from the branch instructions within the n instructions, and the branch target instructions of the branch targets, are divided into different ways based on each instruction's position on the instruction binary tree, and issued simultaneously;

each of the simultaneously issued instruction is independently executed;

dependency among the instructions are checked, and a way address increment amount is generated for each way based on whether there is dependency among the instructions and a location of a dependent instruction;

branch decision is made independently by executing each branch instruction;

a way of execution is determined based on each of the independent branch decisions and branch priority based on the branch instruction sequence order;

based on the way determined, up to n instructions are selected from the simultaneously issued instructions for normal execution and retirement, and rest of the instructions are terminated;

based on the determined way, the current address of the way is added with the address increment amount of the way to be the next initial address; and each branch target address addresses a separate track table or a multiple port track table to read out branch target addresses of the branch target instruction block.

15. The method according to claim 14, wherein:

the instructions and extracted instruction information are stored in a joint buffer, the instruction information corresponds one-to-one to the instructions stored in the joint buffer;

based on the initial address, the joint buffer provides corresponding instructions of each way, the branch target instruction address, and the next block address of each way;

based on the said branch target instruction address of each way, the joint buffer further provides corresponding instructions of each way, the branch target instruction address and the next block address of the said branch target for each way;

the initial address, branch target address, and the next block address respective enable the corresponding diagonal word-lines to control the IRB to output the instructions to the corresponding front-end pipeline.

16. A system for facilitating operation of a processor, comprising:

a plurality of instruction read buffers;
a plurality of execution units;
a plurality of dependency check units; and
a plurality of priority encoder,
wherein:

naming possible execution paths of a section of sequential instructions starting from an initial address, naming sequential instructions starting from the branch target instructions of the branch instructions within the section of sequential instructions as ways, and naming the initial address and the branch target addresses as way starting addresses;

the instruction read buffers and the execution units have one to one correspondence; each instruction read buffer issues an instruction to a corresponding execution unit; and the instruction read buffers issue a plurality of instructions in the ways in parallel to the execution units in a corresponding way;

each dependency check unit corresponds to a way, checks dependency among the plurality of instructions in the way, and generates an address increment amount for the way based on the dependency;

the execution units are configured to execute instructions issued by the instruction read buffers;

when instructions being executed are branch instructions, the execution unit makes branch decisions independently for other branch instructions among the plurality of instructions of each way;

each priority encoder corresponds to a way, and generates a way selecting signal based on the plurality of branch decisions and positions of corresponding branch instructions in the execution paths; and the initial address is updated by adding the starting address of the selected way and the address increment amount of a selected way; and the execution units execute only instructions having no dependency prior to and in the selected way.

17. The system according to claim 16, wherein:

provided that m and w are positive integer, m sequential instructions starting from the initial address, together with possible branch target instructions and subsequent instructions of the branch instructions within the sequential instructions, are organized into w ways based on the possible execution paths, and into m instruction issue slots based on a program sequence of the instructions, wherein m is a total number of issue slots in a way, and w is a total number of ways.

18. The system according to claim 17, wherein:

a plurality of instruction read buffers store a same plurality of instructions;

each instruction read buffer has a plurality of read-ports, and each read-port corresponds to a bit-line, and corresponding to an instruction stored in the instruction read buffer;

for each instruction read buffer, the read-ports form a two-dimension matrix, with read-ports corresponding to different instructions as one dimension and read-ports corresponding to different sets of bit-lines as another dimension;

word lines of the instruction read buffer are in a diagonal form, and control the read-port matrix outputting a plurality of sequential instructions to a plurality of execution units;

IRB read-ports connected to a single set of bit-lines correspond to a slot; and

IRB read-ports controlled by a single diagonal word-line corresponds to a way.

19. The system according to claim 17, wherein:

the processing pipeline of each execution unit is further divided into a front-end pipeline up to the branch decision stage, and a rear-end pipeline including the rest of the pipeline stages;

each issue slot has a processor pipeline structure consisting at least one rear-end pipeline and up to w front-end pipelines, where each front-end pipeline corresponds to an instruction of a way;

based on the dependency check result, the outputs of the plurality front-end pipelines in the selected way is sent to the rear-end pipelines for completion; and the initial address is replaced by the summation of the starting address and the way address increment amount of the selected way.

20. The system according to claim 16, further including:

a scanner, a track table, an end address table and a tracker, wherein:

the scanner is configured to extract instruction information from instruction blocks filling into an instruction cache and build tracks corresponding to the instruction blocks based on the extracted information;

the track table is configured to store the tracks;

the end address table is configured to store sequential next block addresses;

the tracker is configured to address the track table and the end address table, to output target addresses which also address the end address table and sequential next block addresses of the initial address and the target addresses, and to send the initial address, the target addresses, and the next addresses to the IRB for instruction issuing.

* * * * *